United States Patent
Page et al.

(10) Patent No.: US 9,285,139 B2
(45) Date of Patent: Mar. 15, 2016

(54) STRUCTURE AND ARTICULATION SYSTEM FOR SOLAR COLLECTORS

(75) Inventors: James S. Page, Oakland, CA (US); Robert L. Lamkin, Pleasanton, CA (US); Eric Cummings, Livermore, CA (US); Jacques J. Belanger, Livermore, CA (US); Kyle Theile, Livermore, CA (US)

(73) Assignee: COOLEARTH SOLAR, Livermore, CA (US)

( * ) Notice: Subject to any disclaimer, the term of this patent is extended or adjusted under 35 U.S.C. 154(b) by 1125 days.

(21) Appl. No.: 13/015,339

(22) Filed: Jan. 27, 2011

(65) Prior Publication Data

US 2011/0180057 A1 Jul. 28, 2011

Related U.S. Application Data

(60) Provisional application No. 61/310,228, filed on Mar. 3, 2010, provisional application No. 61/299,124, filed on Jan. 28, 2010.

(51) Int. Cl.
*F24J 2/10* (2006.01)
*F24J 2/52* (2006.01)
*F24J 2/54* (2006.01)

(52) U.S. Cl.
CPC .............. *F24J 2/523* (2013.01); *F24J 2/1052* (2013.01); *F24J 2/525* (2013.01); *F24J 2/5233* (2013.01);
(Continued)

(58) Field of Classification Search
CPC ........... F24J 2/1052; F24J 2/145; F24J 2/523; F24J 2/5233; F24J 2/525; F24J 2/5264; F24J 2/5271; F24J 2/5406; F24J 2002/5458; F24J 2002/5462; F24J 2002/5489; F24J 2002/5496

USPC ................ 126/600, 605, 689, 690, 696, 697; 136/206, 251

See application file for complete search history.

(56) References Cited

U.S. PATENT DOCUMENTS 3,337,418 A * 8/1967 Halacy, Jr. ...................... 202/83
4,033,676 A * 7/1977 Brantley et al. ............... 359/847
(Continued)

FOREIGN PATENT DOCUMENTS

WO WO 82/00719 A1 3/1982
WO 2011/094485 A1 8/2011

OTHER PUBLICATIONS

International Preliminary Report on Patentability for PCT Application No. PCT/US2011/022847, mailed on Jul. 31, 2012, 11 pages.
(Continued)

*Primary Examiner* — Gregory Huson
*Assistant Examiner* — Nikhil Mashruwala
(74) *Attorney, Agent, or Firm* — Kilpatrick Townsend & Stockton LLP

(57) ABSTRACT

Solar energy may be harvested utilizing arrays of solar collectors, supported and articulated to follow movement of the sun. Particular systems include arrays of solar collectors mounted on an elevation-azimuth tracking structure. From the ground up, embodiments of this system may include a Ground Interface, a Base, an Upper Truss, and a Collector. The system is designed to transmit loads with minimal deflection from the surface of the collector to the ground, while tracking the position of the sun across the sky. The use of structural, actuator, and collector elements with a minimum amount of low-cost materials, and which are able to be mass produced, allows large scale deployment of the system at reduced cost.

29 Claims, 192 Drawing Sheets

(52) U.S. Cl.
CPC .............. *F24J 2/5264* (2013.01); *F24J 2/5406* (2013.01); *F24J 2002/5458* (2013.01); *F24J 2002/5462* (2013.01); *F24J 2002/5489* (2013.01); *F24J 2002/5496* (2013.01); *Y02E 10/47* (2013.01)

(56) References Cited

U.S. PATENT DOCUMENTS

| | | | |
|---|---|---|---|
| 4,108,019 A | 8/1978 | Martin | |
| 4,126,123 A * | 11/1978 | Hall | 126/625 |
| 4,129,360 A * | 12/1978 | Deflandre et al. | 359/853 |
| 4,145,021 A * | 3/1979 | Gaechter et al. | 248/371 |
| 4,161,942 A * | 7/1979 | Monk | 126/576 |
| 4,185,616 A * | 1/1980 | Johnson | 126/652 |
| 4,256,088 A * | 3/1981 | Vindum | 126/571 |
| 4,262,457 A * | 4/1981 | Darmstadt et al. | 52/2.17 |
| 4,340,031 A * | 7/1982 | Niedermeyer | 126/600 |
| 4,364,053 A * | 12/1982 | Hotine | 343/915 |
| 4,404,961 A * | 9/1983 | Stuhlman | 126/647 |
| 4,416,262 A * | 11/1983 | Niedermeyer | 126/690 |
| 4,432,342 A * | 2/1984 | Lucas et al. | 126/570 |
| 4,457,297 A | 7/1984 | Sobczak et al. | |
| 4,483,323 A * | 11/1984 | Murphy | 126/684 |
| 4,552,126 A * | 11/1985 | Boyd | 126/680 |
| 4,561,423 A * | 12/1985 | Blasey | 126/604 |
| 4,672,389 A * | 6/1987 | Ulry | 343/915 |
| 4,691,075 A * | 9/1987 | Murphy | 136/246 |
| 4,804,972 A * | 2/1989 | Schudel | 343/840 |
| 4,875,467 A * | 10/1989 | Murphy | 126/600 |
| 5,404,869 A | 4/1995 | Parkyn et al. | |
| 5,617,843 A * | 4/1997 | Erwin | 126/681 |
| 6,123,067 A | 9/2000 | Warrick | |
| 6,485,152 B2 * | 11/2002 | Wood | 359/853 |
| 6,650,304 B2 * | 11/2003 | Lee et al. | 343/915 |
| 6,960,717 B2 * | 11/2005 | Stuart et al. | 136/246 |
| 7,382,332 B2 * | 6/2008 | Essig et al. | 343/878 |
| 7,997,264 B2 * | 8/2011 | Sankrithi | 126/697 |
| 8,074,638 B2 * | 12/2011 | Cummings | 126/684 |
| 8,237,098 B2 * | 8/2012 | Cabanillas Saldana | 250/203.4 |
| 8,307,820 B2 * | 11/2012 | King et al. | 126/634 |
| 8,360,052 B2 * | 1/2013 | Nix | 126/608 |
| 8,522,772 B1 * | 9/2013 | Olsen | 126/600 |
| 2001/0036024 A1 * | 11/2001 | Wood | 359/853 |
| 2008/0047546 A1 * | 2/2008 | Cummings | 126/684 |
| 2008/0168981 A1 * | 7/2008 | Cummings et al. | 126/600 |
| 2008/0247069 A1 * | 10/2008 | Bronstein | 359/871 |
| 2009/0050191 A1 | 2/2009 | Young et al. | |
| 2009/0277440 A1 | 11/2009 | Angel et al. | |
| 2009/0301466 A1 * | 12/2009 | Humanes Asensio et al. | 126/600 |
| 2010/0078012 A1 * | 4/2010 | Nix | 126/686 |
| 2010/0108057 A1 * | 5/2010 | Cummings et al. | 126/697 |
| 2010/0229850 A1 * | 9/2010 | Sankrithi | 126/601 |
| 2013/0314774 A1 * | 11/2013 | Page et al. | 359/361 |

OTHER PUBLICATIONS

International Search Report for PCT application PCT/US2011/022847 (May 26, 20110.

* cited by examiner

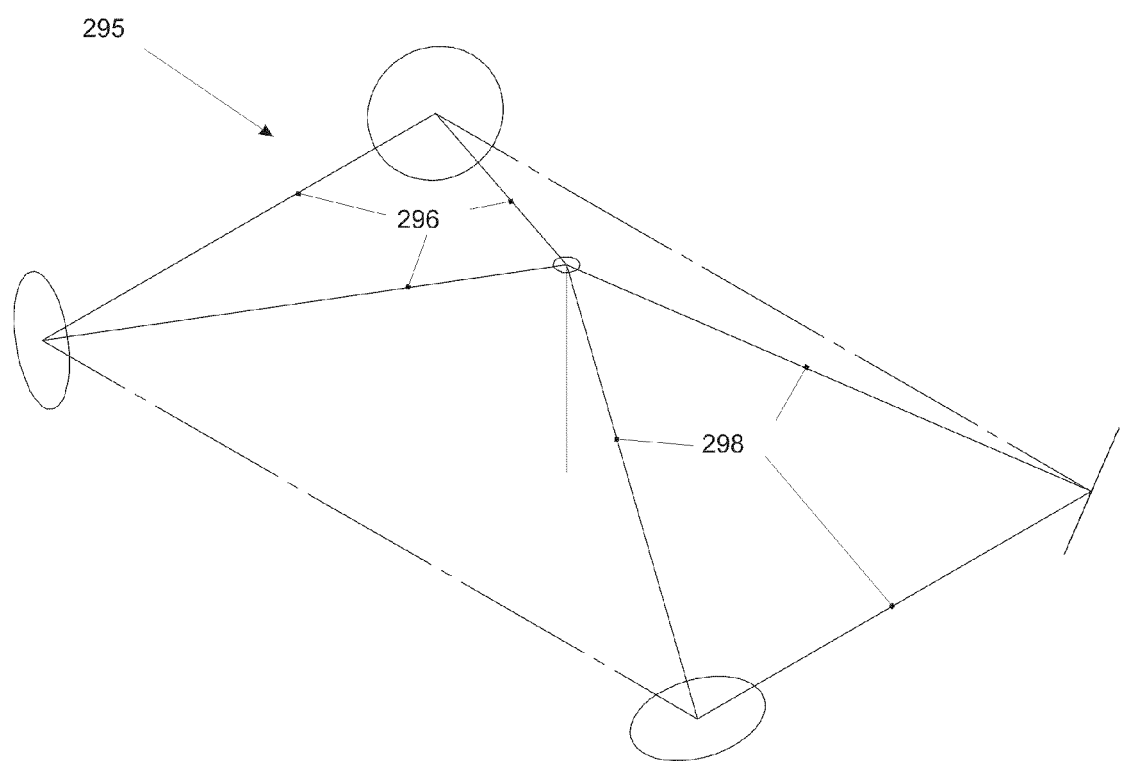

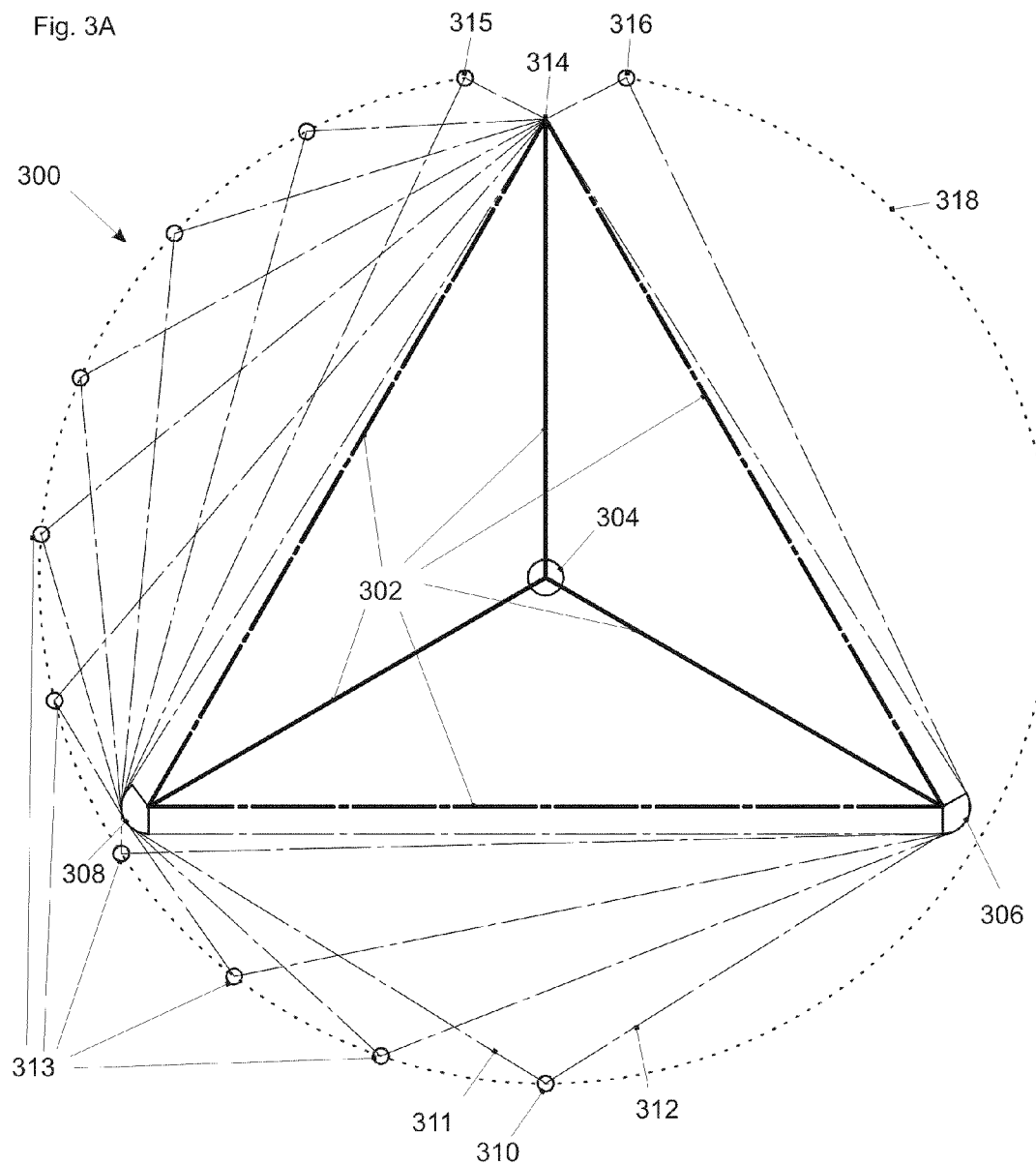

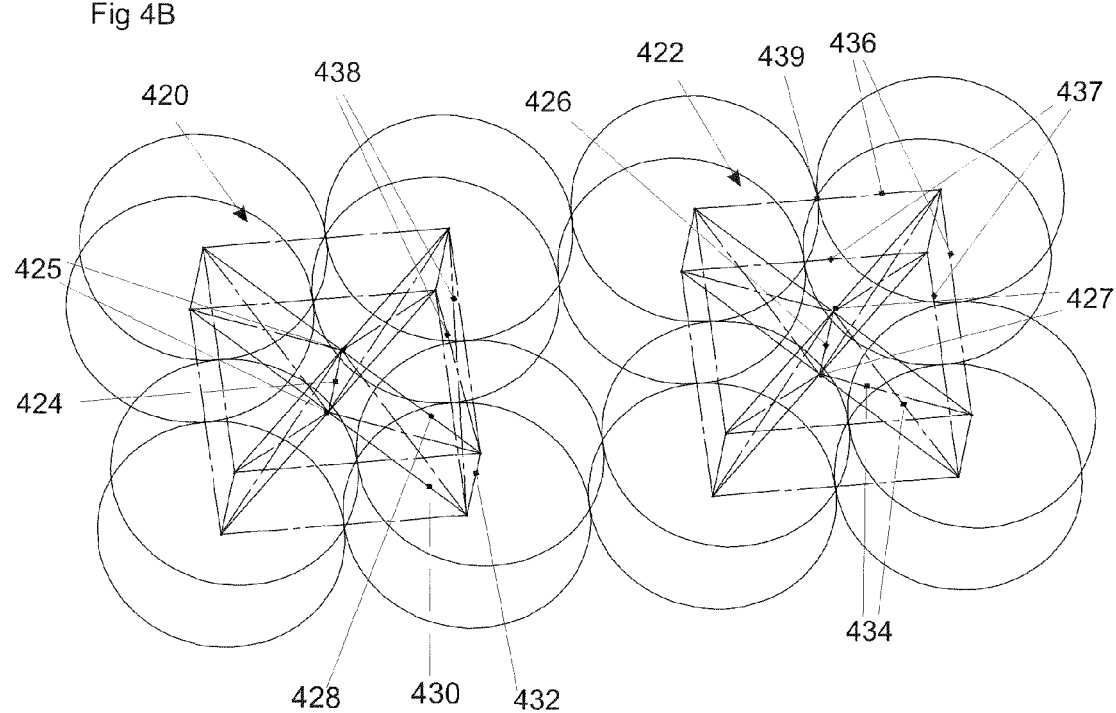

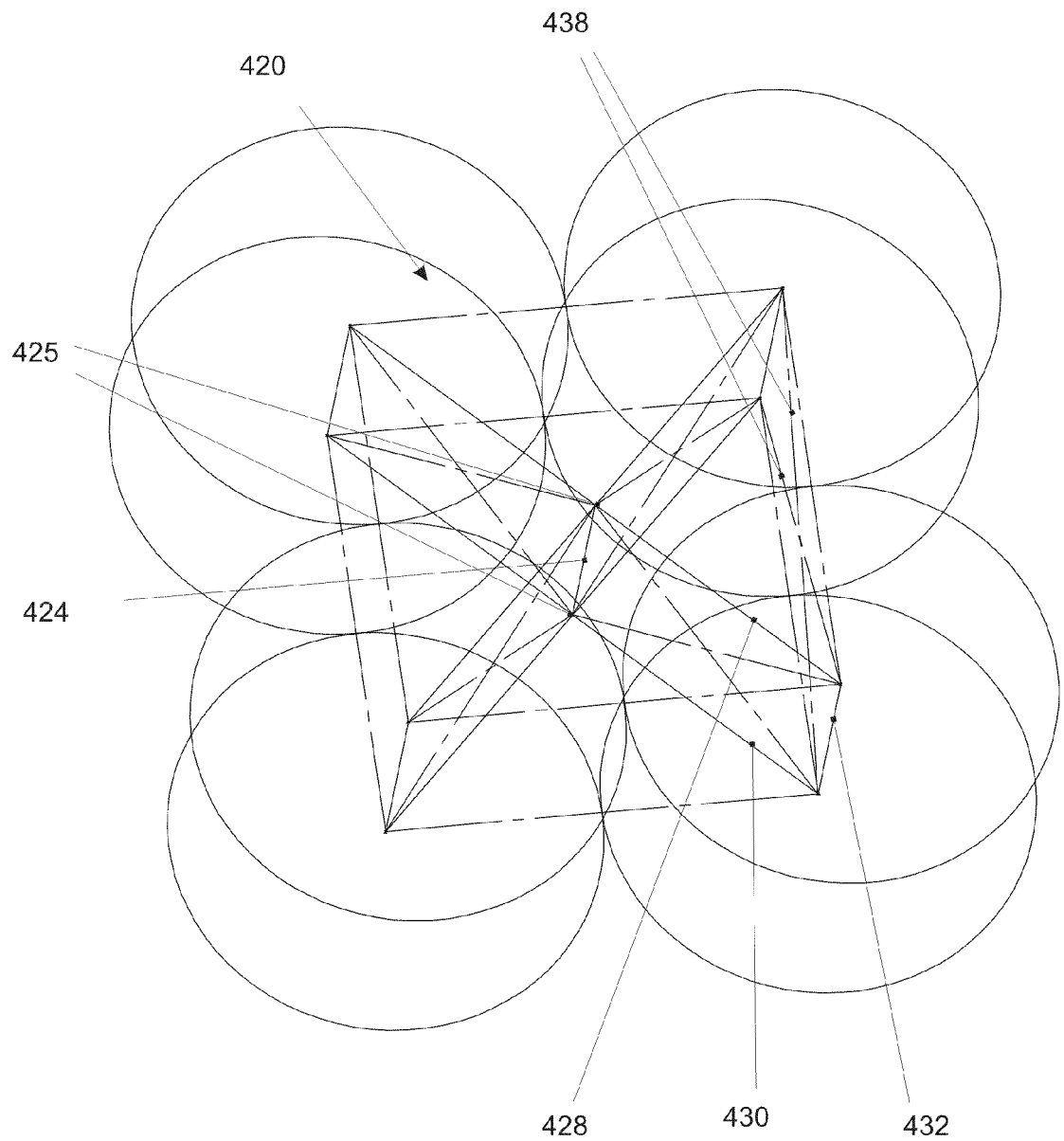

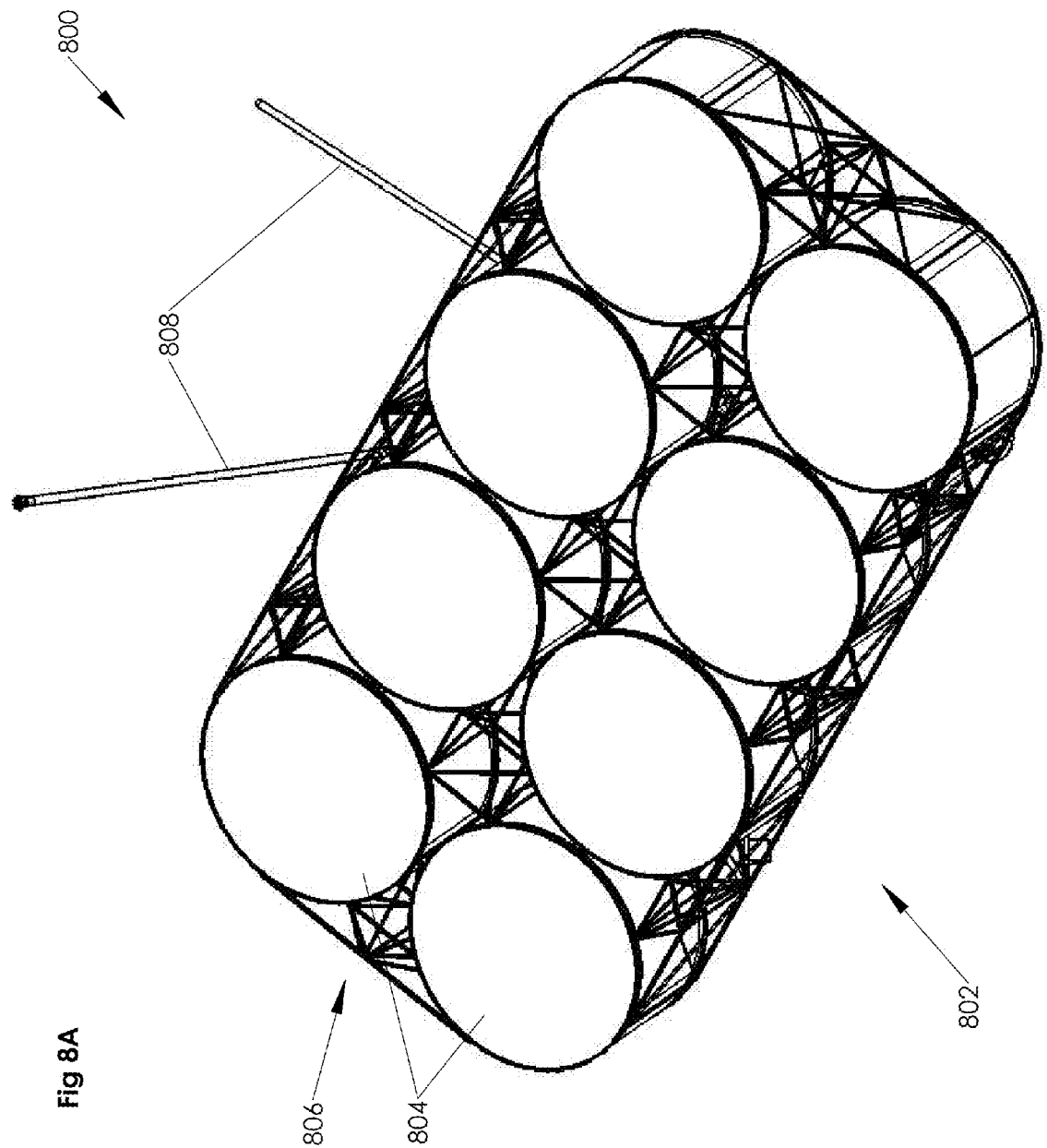

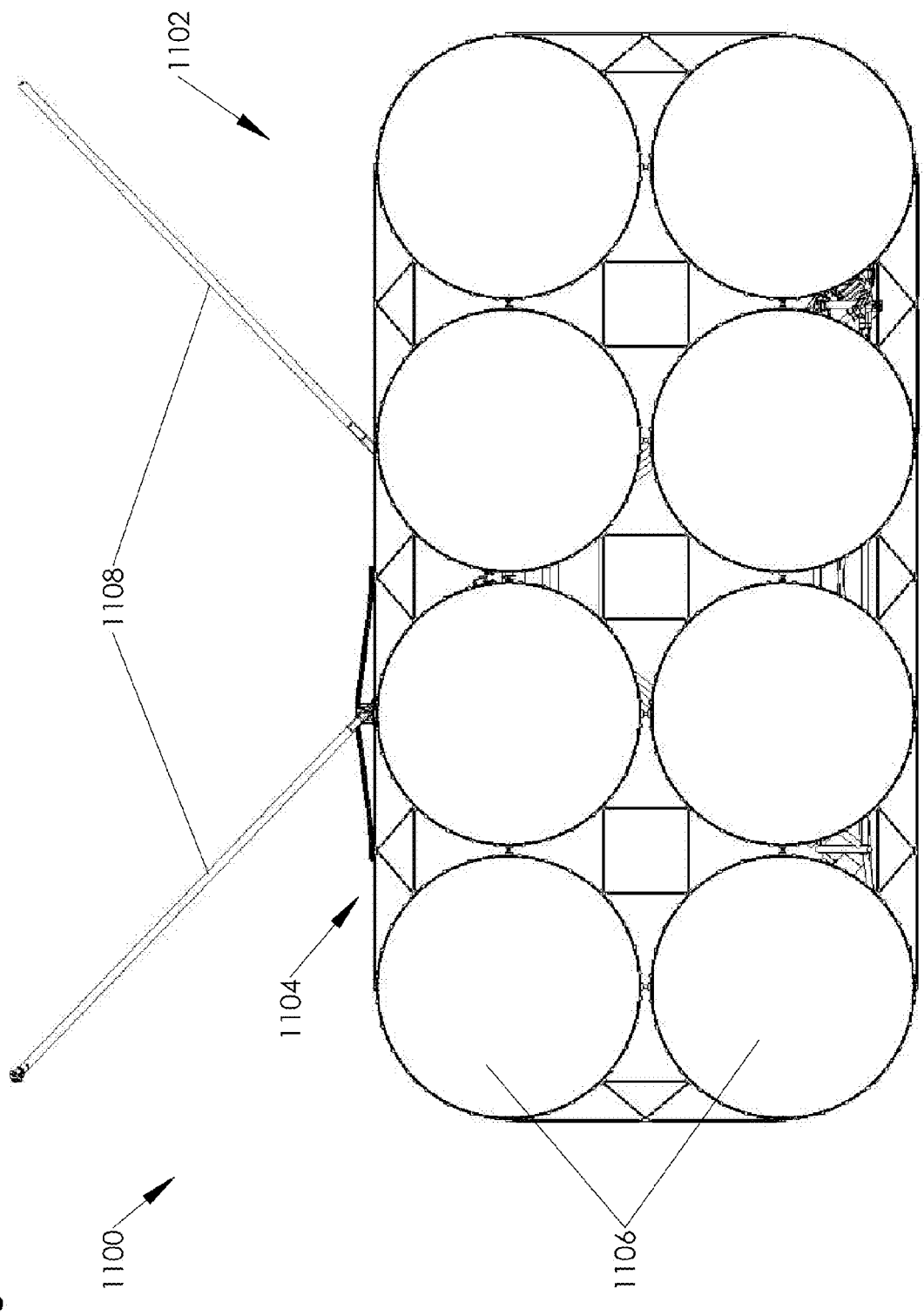

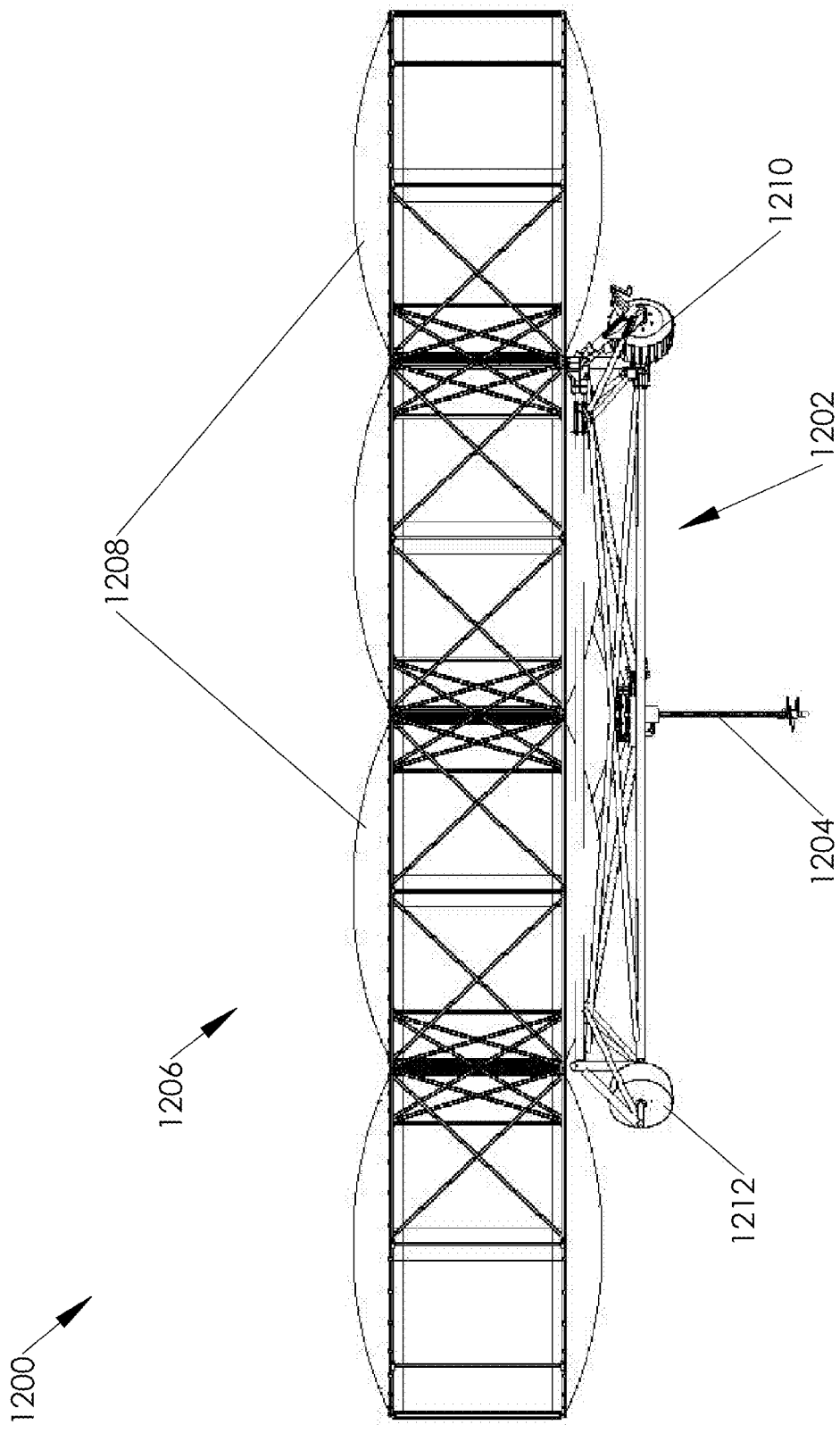

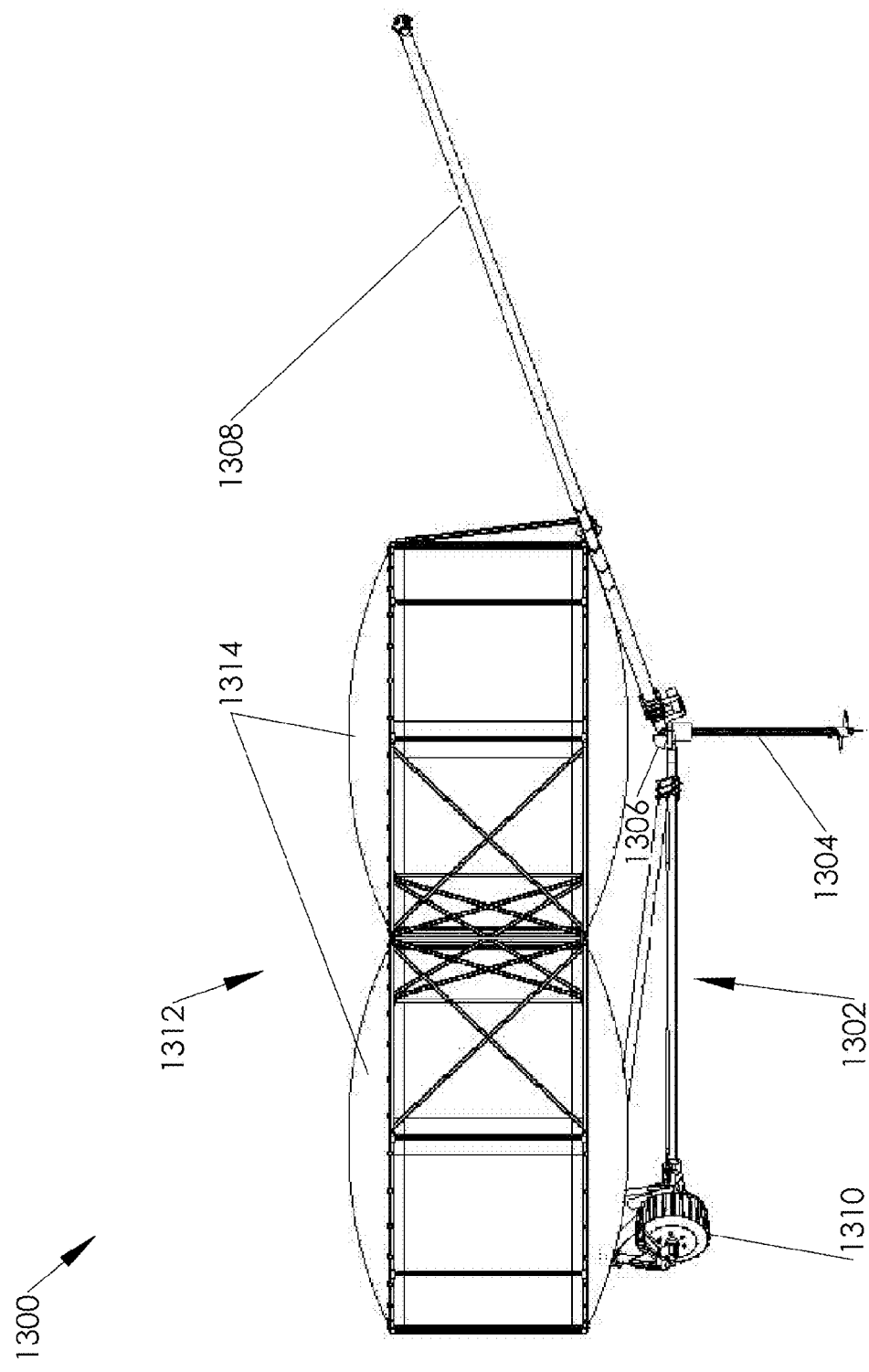

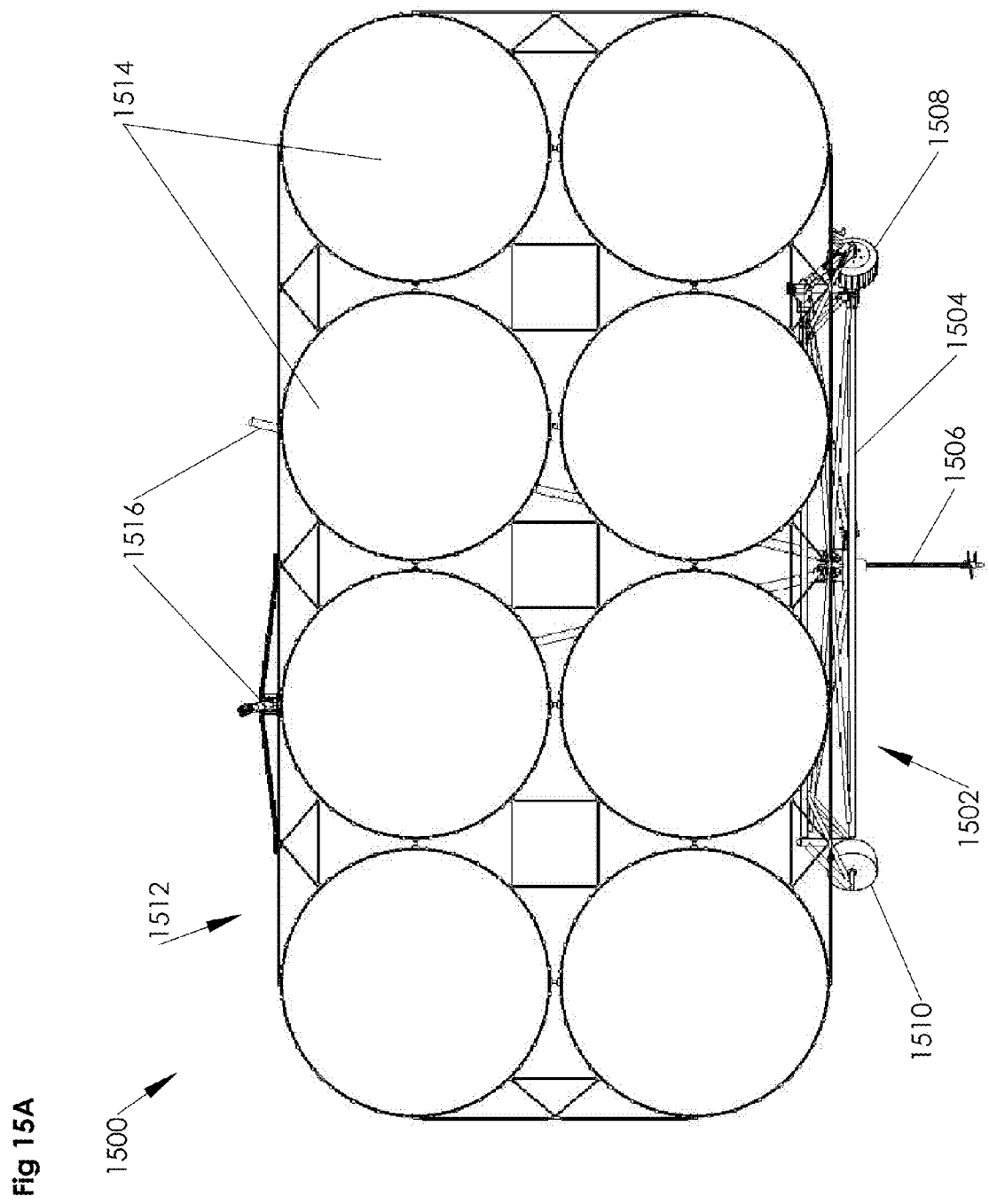

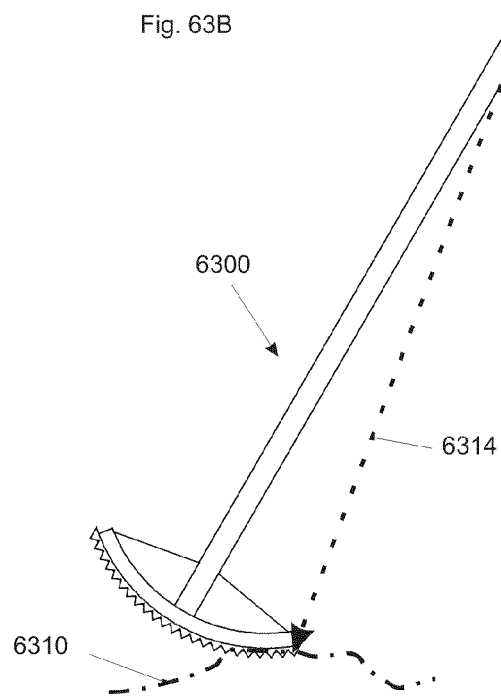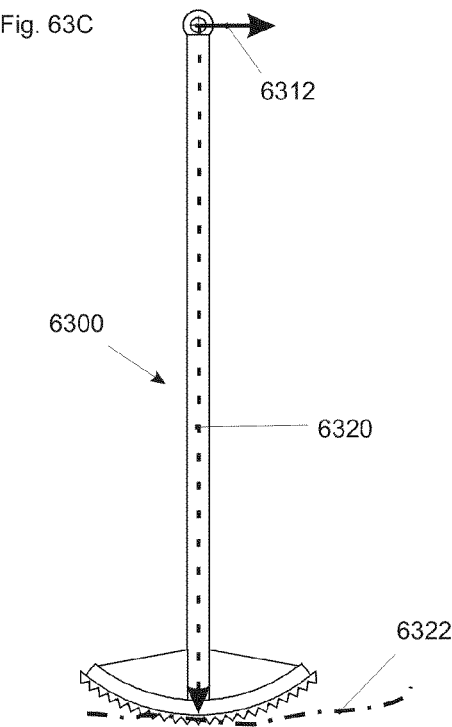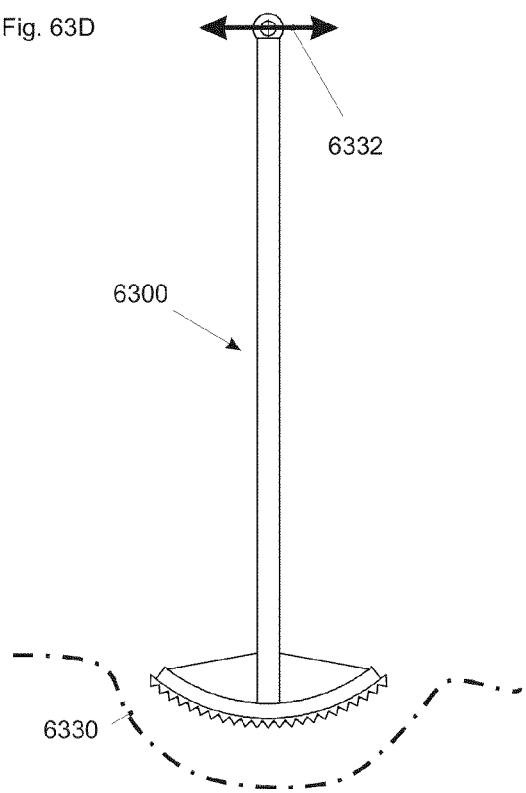

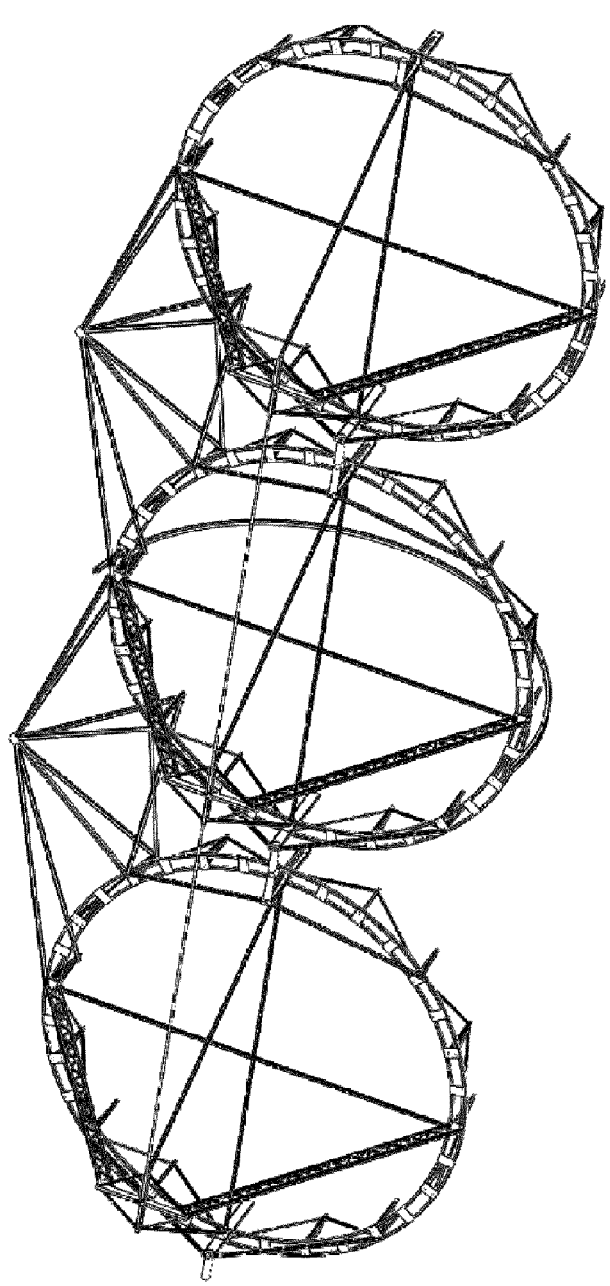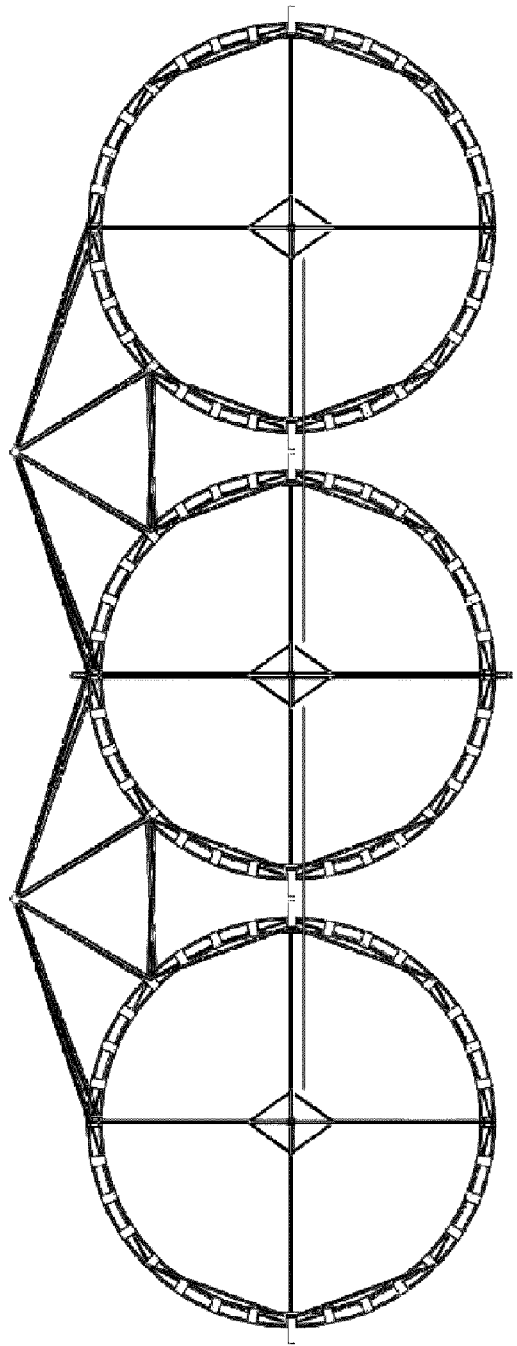
Fig 73A
Fig 73B

8070

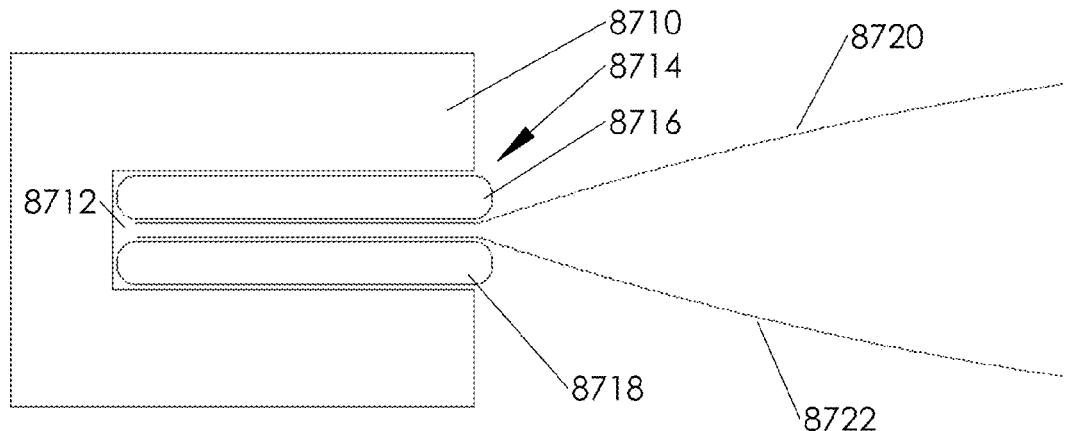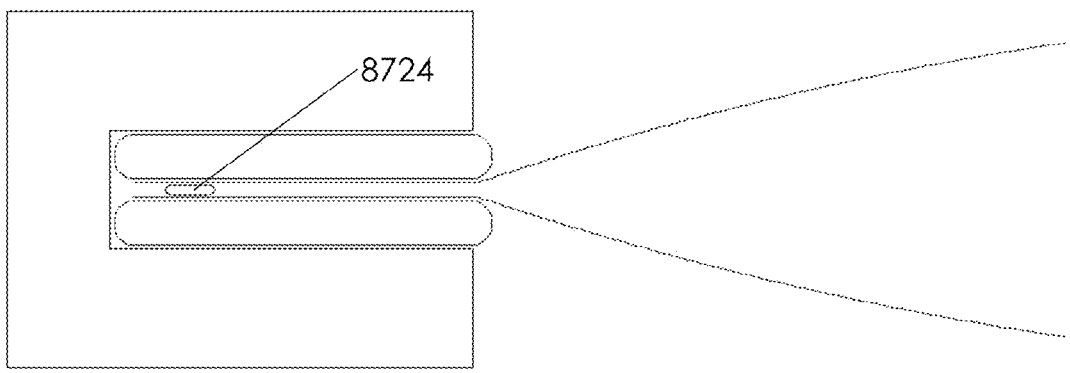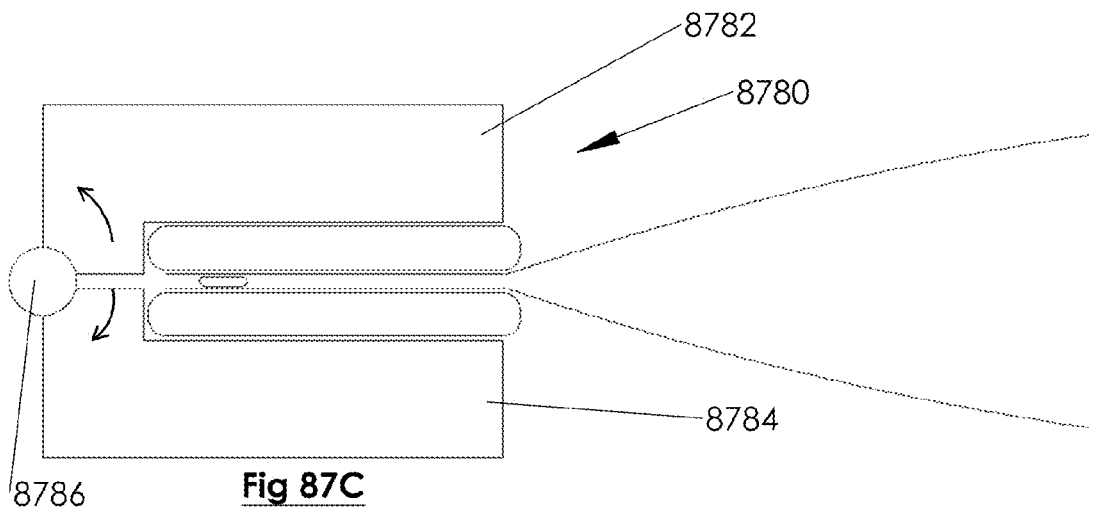

SECTION B-B
SCALE 1 : 4

DETAIL C
SCALE 1 : 1

DETAIL A
SCALE 1 : 1

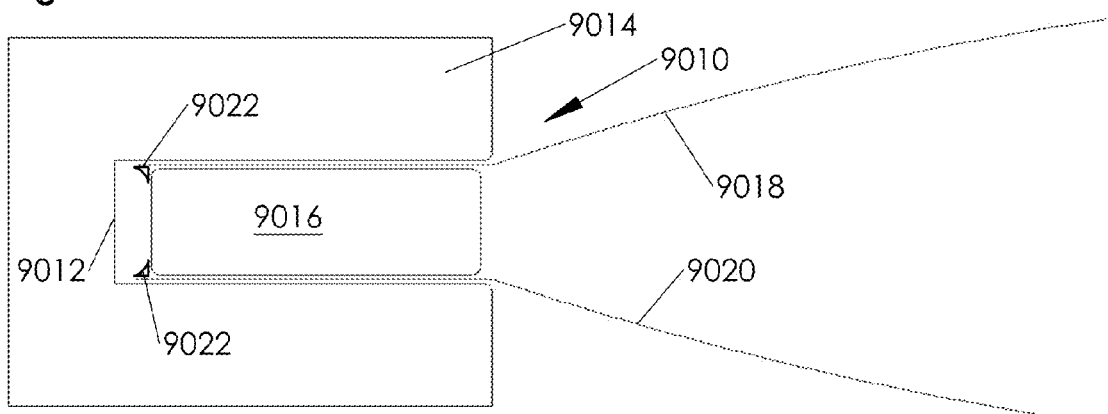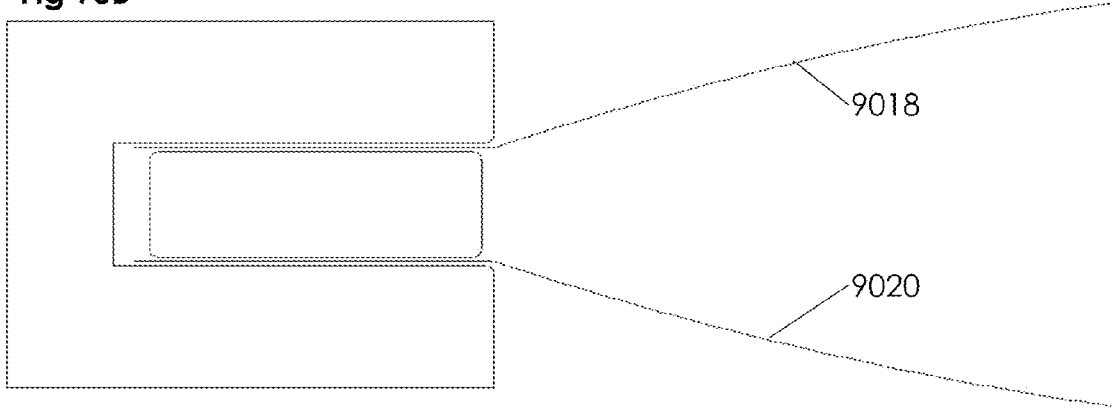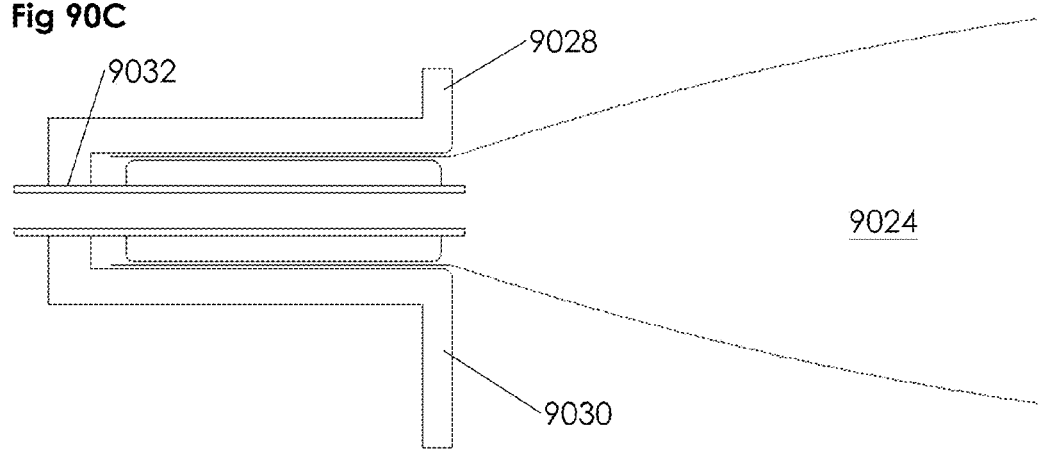

STRUCTURE AND ARTICULATION SYSTEM FOR SOLAR COLLECTORS

CROSS-REFERENCE TO RELATED APPLICATIONS

This application claims the benefit of U.S. Provisional Patent Application No. 61/299,124 filed Jan. 28, 2010, and U.S. Provisional Patent Application No. 61/310,228 filed Mar. 3, 2010, both of which are incorporated by reference in their entireties herein for all purposes.

BACKGROUND

The present invention is related to solar collectors, and more particularly to structures and articulation systems used for maneuvering solar collectors.

Solar radiation is the most abundant energy source on earth. However, attempts to harness solar power on large scales have so far failed to be economically competitive with most fossil-fuel energy sources.

One reason for the lack of adoption of solar energy sources on a large scale is that fossil-fuel energy sources have the advantage of economic externalities, such as low-cost or cost-free pollution and emission. Political solutions have long been sought to right these imbalances.

Another reason for the lack of adoption of solar energy sources on a large scale is that the solar flux is not intense enough for direct conversion at one solar flux to be cost effective. Solar energy concentrator technology has sought to address this issue.

Specifically, solar radiation is one of the most easy energy forms to manipulate and concentrate. It can be refracted, diffracted, or reflected, to many thousands of times the initial flux, utilizing only modest materials.

With so many possible approaches, there have been a multitude of previous attempts to implement low cost solar energy concentrators. So far, however, solar concentrator systems cost too much to compete unsubsidized with fossil fuels, in part because of excessive material and installation costs in the mechanical supports and solar tracking apparatus for the collectors. While many solar collectors utilize support trusses, their architectures lead to excessive material usage, and complicated and time consuming assembly and installation, rendering them unsuitable for large-scale solar farming.

Accordingly, there is a need in the art for support structures used to maneuver solar collectors that are robust, less expensive and easier to install and use.

There is also a need in the art for solar energy concentrators that occupy less areas and use less materials making them less expensive and better able to compete economically with existing fossil fuels.

SUMMARY

Solar energy may be harvested utilizing arrays of solar collectors, supported and articulated to follow movement of the sun. Particular embodiments relate to systems including arrays of solar collectors mounted on an elevation-azimuth tracking structure. From the ground up, embodiments of this system can include a Ground Interface, a Base, an Upper Truss, and a Collector. The system is designed to transmit loads with minimal deflection from the surface of the collector to the ground, while tracking the position of the sun across the sky. The use of structural, actuator, and collector elements with a minimum amount of low-cost materials, and which are able to be mass produced, allows large scale deployment of the system at reduced cost.

In an embodiment, an apparatus includes a solar energy collector supported by a base frame, a first ground interface of the base frame stationary relative to the ground, a second ground interface of the base frame in direct moveable contact with the ground, and an azimuth drive system configured to pivot the base frame about the first ground interface. The linkage provides a degree of freedom accommodating movement of the base frame over uneven ground out of a ground plane. The base frame is in pivotal communication with the first ground interface through a linkage. The first ground interface can include a ground anchor, a stake, an auger, a screw, a pad, a ballast, or an anti-skid contact. The linkage can include a ball joint, a flexible coupling, a multi-link coupling, a universal joint, or a coupling with two substantially orthogonal pivot axes. The second ground interface can be driven by the azimuth drive system. The second ground interface can include a wheel, a leg, a roller, a track, a passively rolling belt, a vibratory pad, or a skid. The ground on which the apparatus operates can be unprepared.

In another embodiment, the apparatus includes a third ground interface in direct moveable contact with the ground. The second and third ground interfaces each can include a wheel.

In yet another embodiment, the apparatus includes a support structure in contact with the solar collector and with the base frame, an elevation actuator in mechanical communication with the base frame and with the support structure. The elevation actuator is configured to change an elevation angle of the solar collector relative to the base frame. The support structure can be rotatable about an axis relative to the base frame. The apparatus can further include a curved elevation rack in communication with the support structure and with the elevation actuator. Alternatively, the apparatus can include a linear actuator in communication with the support structure and with the base frame.

In yet another embodiment, the solar energy collector of the apparatus includes an inflatable concentrator defining an inflation space. The solar energy collector can further include a receiver disposed inside the inflation space. Alternatively, the solar energy collector can further include a receiver disposed outside the inflation space.

In yet another embodiment, the inflatable solar concentrator of the apparatus includes a boundary, an optically reflective element attached to and spanning the boundary, an optically transparent element attached to and spanning the boundary, and a receiver positioned to receive concentrated light from the optically reflective element. The optically reflective element and the optically transparent element define a volume containing an inflation pressure of a pressurized gas. The apparatus can also include a cartridge holder.

In another embodiment, the apparatus includes a primary structural element positioned substantially along a diameter of the inflated concentrator. The primary structural element can include one or more diametrical members spanning diameters of the boundary.

In yet another embodiment, the inflatable solar concentrator of the apparatus includes a bottom boundary and a top boundary separated by a distance, a side material spanning the distance between the top and bottom boundaries, an optically reflective element attached to and spanning the bottom boundary, an optically transparent element attached to and spanning the top boundary, the side material, and a receiver positioned within the closed volume and configured to receive concentrated light from the optically reflective element. The optically reflective element and the optically transparent element define a volume containing an inflation pressure of a pressurized gas. The apparatus can further include a primary structural element positioned substantially along a diameter of the inflated concentrator. The primary structural element can include a diametrical member spanning orthogonal diameters of the top boundary or of the bottom boundary. The apparatus can further include diagonal structural members connecting first and second diametrical members that respectively span orthogonal diameters of the top and bottom boundaries. The first and second diametrical members and the diagonal members lie in two orthogonal planes. The apparatus can further include an array of solar energy concentrators, each solar energy concentrator including respective optically transparent and optically reflective top and bottom circular members corresponding with the top and bottom boundaries. The top and bottom circular members are connected to the diagonal members of adjacent solar energy concentrators of the array. The top and bottom boundaries are circular.

In yet another embodiment, the inflatable solar concentrator of the apparatus includes an array of two or more inflated solar concentrators.

In yet another embodiment, the inflatable solar concentrator of the apparatus includes a 3×1 array of inflated solar concentrators.

In yet another embodiment, the inflatable solar concentrator of the apparatus includes a plurality of facets.

In another embodiment, an apparatus includes a cartridge. The cartridge includes an optical film in contact with a ring exhibiting stiffness in a radial direction of the film, and a cartridge holder exhibiting stiffness in an axial direction of the film and configured to receive the cartridge for mounting onto a support and tracking structure. The optical film can include a reflective film. The optical film can include a transparent film. An insert can maintain contact between the film and the ring. Alternatively an adhesive can maintains contact between the film and the ring. Alternatively, a heat seal can maintain contact between the film and the ring. The ring can include an outer membrane and an inner pressurizable chamber, so that the ring has a stiffness that changes depending on the pressure in the pressurizable chamber. Alternatively, the ring can include an inflatable chamber.

In yet another embodiment, the apparatus further includes a seal between the cartridge and the cartridge holder. The seal can be between the optical film and the cartridge holder. Alternatively, the seal can be between the ring and the cartridge holder. The seal can be adhered to the ring by an adhesive or by heat sealing.

In yet another embodiment, the cartridge holder of the apparatus includes a first portion moveable relative to the second portion to receive the cartridge. The first portion can be hinged to the second portion. The first portion can be configured to mate with the second portion.

In yet another embodiment, the cartridge holder of the apparatus includes a recess configured to receive the cartridge.

In yet another embodiment, the cartridge of the apparatus includes a second optical film. The second optical film can be in contact with the optical film and/or with the ring. The cartridge can further include a second ring exhibiting stiffness in the radial direction, and the second optical film is in contact with the second ring. The cartridge can further include a seal between the first ring and the second ring. The cartridge can further include a filling tube in selective fluid communication with an inflation space defined between the first film and the second film.

BRIEF DESCRIPTION OF THE DRAWINGS

A further understanding of the nature and advantages of the invention may be realized by reference to the remaining portions of the specification and the drawings, presented below. The Figures are incorporated into the detailed description portion of the invention.

FIG. 2F shows an embodiment of a non-planar arrangement in which GI ground contact can be maintained as described for FIG. 2D.

FIG. 3A shows a diagram of an embodiment of an azimuthal actuator acting on a three-sided base.

FIG. 4B shows a diagram of an embodiment of two sub-trusses intended to maintain parallel axes of the collectors.

FIG. 4BA shows an enlarged view of one of the sub-trusses illustrated in FIG. 4B.

FIGS. 6 through 15A show various views and positions of an embodiment of a solar collector array and articulation system.

FIGS. 63A-63D show an embodiment of a pawl apparatus.

FIGS. 73A-73B show a 3×1 array of solar concentrator structures of FIG. 71.

FIGS. 87A-87C show embodiments of a film attachment and seal system for an inflated solar concentrator.

FIGS. 90A-90C show other embodiments of film attachment and seal systems for an inflated solar concentrator.

DETAILED DESCRIPTION

Figure 1:
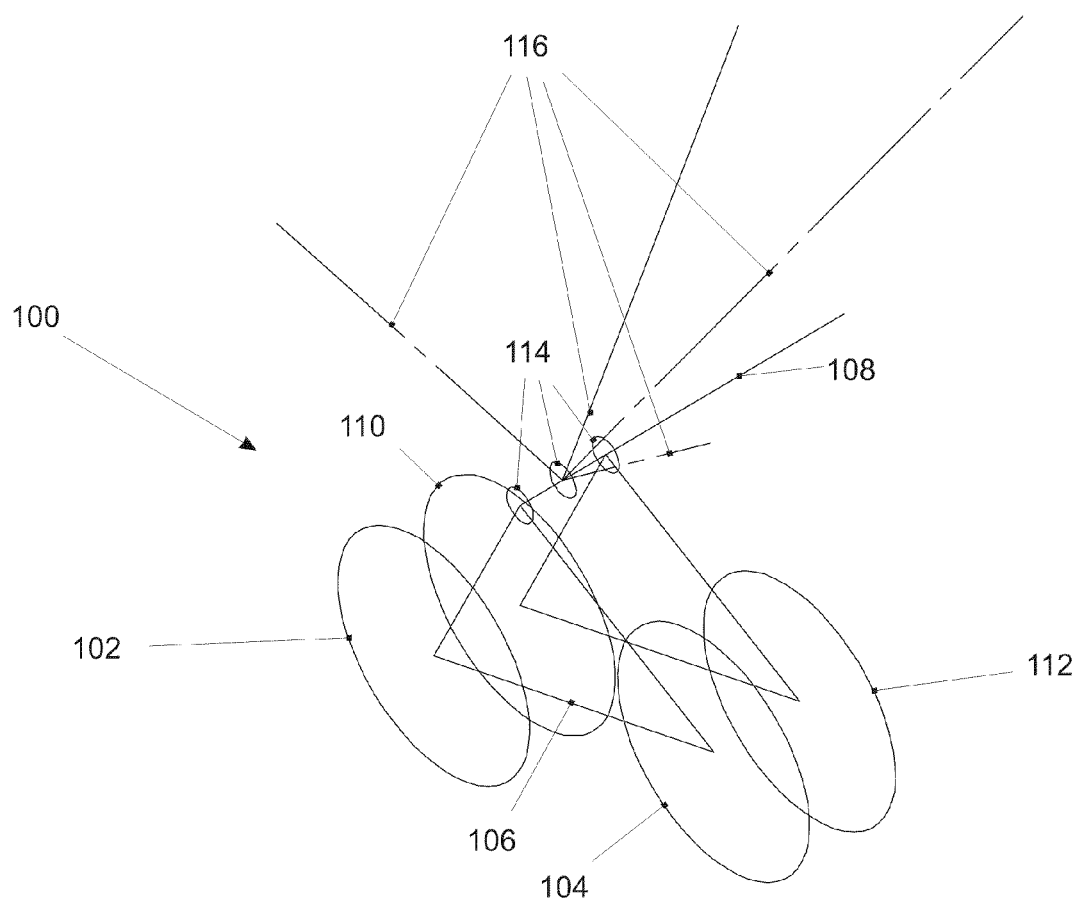
FIGS. 1A-1D show embodiments of compound ground interfaces (GIs) that support rotary driving.

Particular embodiments relate to systems comprising arrays of solar collectors mounted on an elevation-azimuth tracking structure. From the ground up, embodiments of this system may comprise a Ground Interface, a Base, a Support Structure, and a Collector. The system is designed to transmit loads with minimal deflection from the surface of the collector to the ground, while tracking the position of the sun across the sky.

As used herein, the term collector refers to an element that manipulates light from the sun, for example a photovoltaic panel or array, a solar concentrator, a mirror such as a heliostat mirror, or other such arrangement of reflectors, refractors, diffractors, and absorbers. As used herein, the term support structure refers to structural elements that are present between the collector and the base.

Incorporated by reference herein for all purposes, is the U.S. patent application Ser. No. 12/782,932 (the '932 application) filed May 19, 2010 and titled "Architecture for Power Plant Comprising Clusters of Power-Generation Devices," which describes various embodiments of power plants. Embodiments may exhibit one or more features of the apparatuses disclosed in that patent application.

Certain embodiments seek to reduce the levelized cost of energy of a solar power plant, and to maximize the scale at which such plants can be deployed. These goals can be achieved by the use of structural, actuator, and collector elements employing minimal materials and low-cost materials, that are able to be mass produced. Other desirable attributes of the structural, actuator, and collector element are simple and rapid accurate installation and assembly, ease of maintenance, robustness, favorable performance at and below a design wind speed, and survivability at and below a higher maximum wind speed.

Some embodiments may seek to economically externalize the costs of major structures, for example by the use of inflation air as a primary compressive support, and/or by the use of the ground as an intrinsic part of the actuation system. By economically externalizing these resources, embodiments may minimally perturb the ground environment/ecosystem, and are well suited for disturbed lands such as fallow farm fields and pastures.

As described in detail below, particular embodiments may seek to exploit spontaneous and natural tendencies of materials. Examples of such tendencies include but are not limited to the tendency of a flat plastic-film disc to assume a smooth concave shape under inflation, and the tendency of a long beam to flex.

Embodiments may exploit other features, such as the material efficiency and resiliency of flexible tensile elements, and the wide difference between wind speeds at which a solar power plant must economically operate, and the maximum wind speeds which the solar power plant must survive. Embodiments also exploit routine maintenance and minimized consumables to reduce technological, environmental, and obsolescence risks.

Ground Interface (GI)

As used herein, the term "move" refers to translation, rotation, or a combination of these actions relative to the ground frame. An apparatus that does not substantially move in the ground reference frame throughout the range of motion of the support structure is herein called "stationary." Examples of stationary structures include ground-mounted poles, stakes, towers, trusses, and the like.

Since elements of structures, according to embodiments, generally articulate, ground-contacting stationary apparatus can generally be in mechanical communication (possibly through intermediate structure) to an interface between stationary and moving structure elements. As used herein, the "ground interface" or "GI" refers to an element or apparatus coupling a structure to the ground so that forces may be transmitted from the structure to the ground.

A GI can be simple, in that it is resolvable to a kinematic point. Alternatively, a GI can be compound, in that it comprises a coupled arrangement of elements that resolve to a reduced number of kinematic points. For example, a simple GI could comprise a single wheel. A compound GI could comprise a plurality of wheels having shafts that are coupled via one or more truss elements.

The compound GI generally transfers its forces to another structure via a linkage, e.g., a shaft, pivot, joint, etc. that provides degrees of freedom to the compound GI. These additional degrees of freedom can be used to ensure the elements comprising the compound GI remain in contact with the ground in spite of unevenness.

GIs can be stationary or non-stationary. Non-stationary GIs can have motion that is rotational, translational, or combination of rotational and translational motion. Stationary GIs are typically used to anchor or support structures when they are not tracking, such as in stowed or service positions. Examples of stationary GIs include but are not limited to ground anchors, stakes, augers, screws, pads, anti-skid contacts, and elements that protect against lift off of light structures in high winds, etc.

Non-stationary GIs generally permit rotation in one or more axes of connected elements of the support structure. Such GIs can have the nature of a "pin" joint, providing for uninhibited rotation about a single axis. Alternatively, such GIs can have the nature of a "ball" joint, providing uninhibited rotation about any axis, or of a "universal" joint comprising the composition of more than one non-coaxial "pin" joints.

These joints may provide uninhibited motion over a limited angular range. For example, a stationary GI joint may provide for changes in elevation and tilt angle in addition to azimuthal rotation, for example as a result of ground unevenness. Some embodiments of ground interface apparatus according to embodiments are ball and socket joints, such as common trailer-hitches and the like.

Translational and combined rotational and translational ground interface apparatus can be driven and passive. GIs can be driven internally via actuators that move with the structure. Alternatively, or in combination with an internal driving mechanism, GIs can be driven externally via actuators that are mounted in a different reference frame, for example the ground reference frame.

Rotary Driven GIs

GIs can be driven via rotary and linear actuators. Examples of a rotary driven GI, in accordance with embodiments, include a wheel or a plurality of wheels or rollers arranged in tandem, side-by-side, or more generally. Rotary driven GIs, in accordance with embodiments may include a track or textured roller-driven belt, a lead screw/worm gear, or a spur or beveled gear having straight or helical teeth and the like arranged such that rotary motion is converted to displacement along the ground and reaction forces tangential and normal to the ground are transmitted effectively from the contact to the ground.

Over their range of motion, rotary elements bear on a region of an opposing surface. Certain embodiments may achieve a large ratio of the surface area of this bearing region to that of the rotary element. In some embodiments the ratio of the surface area of the bearing region to the rotary element may be a ratio greater than 5:1. In other embodiments, the ratio of the surface area of the bearing region to the rotary element may be a ratio greater than 10:1.

A large area ratio provides mechanical advantage to the actuator, potentially reducing the need for gear reductions in an actuator drive train. A large area ratio further provides for reduction in engineered material use and cost, for example where the opposing surface comprises inexpensive material such as lightly prepared or unprepared ground, gravel, and the like as described below. Thus, rotary-driven GI elements can be disposed internally to make optimum use of materials.

FIGS. 1A-1D show embodiments of compound GIs that support rotary driving. FIG. 1A shows a compound GI 100 comprising a tandem, inline arrangement of simple rotary GIs (102, 104) such as wheels, connected via linkages 106 to produce motion normal to an axis of element 108. A second arrangement of simple rotary GIs (110, 112) can be disposed normal to the axis of element 108. Joint 114 transfers loads from structural truss elements 116 to the coupled simple rotary GIs while providing for maintaining multiple ground contacts and articulation of truss 116.

A possible benefit of a tandem arrangement of wheels is the ability to resolve actuation torques without coupling into element 108. This uncoupling prevents torsional compliance of element 108 from reducing azimuthal rigidity. Because torsion of element 108 produces no substantial position error, element 108 can be used to provide rotational compliance to the truss 106 to accommodate ground unevenness without the complexity of an additional joint. If this compound GI is driven, driving can be applied to one or more of the simple GIs. In some embodiments, driving rates are coordinated such that the compound GI follows a desired arc or profile.

Figure 1B:
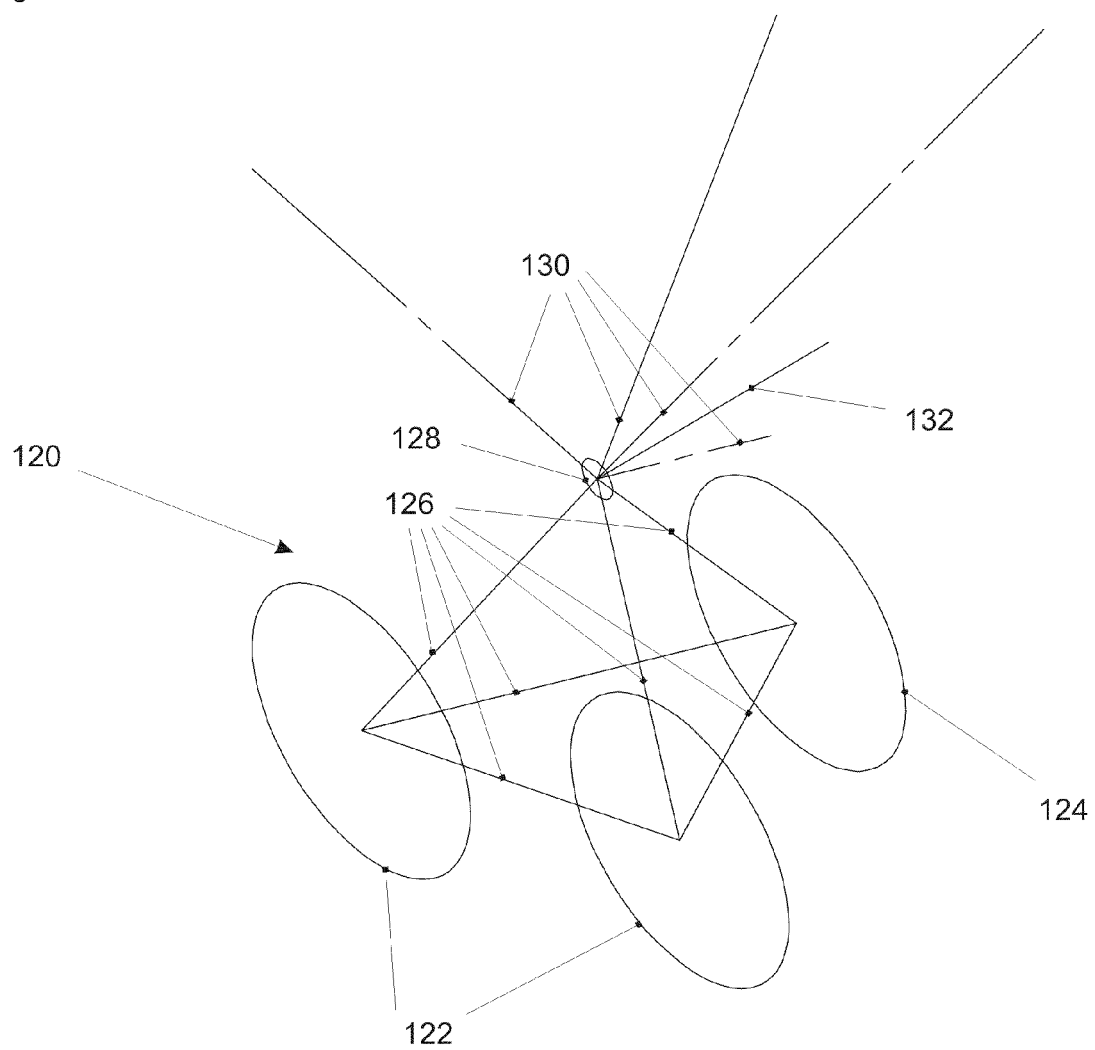

FIG. 1B shows an embodiment of another compound GI 120 that supports both passive and active driving. A pair of tandem simple GIs 122 can be disposed inside or outside a single simple GI 124 and coupled by an assembly 126 to provide motion normal to a direction 132. A joint 128 transfers loads from articulating truss 130 to the ground. One or more of the simple GIs can be driven. If GIs at different positions along direction 132 are driven, they can be driven in a coordinated fashion to cause the compound GI to follow a desired arc or profile.

Figure 1C:
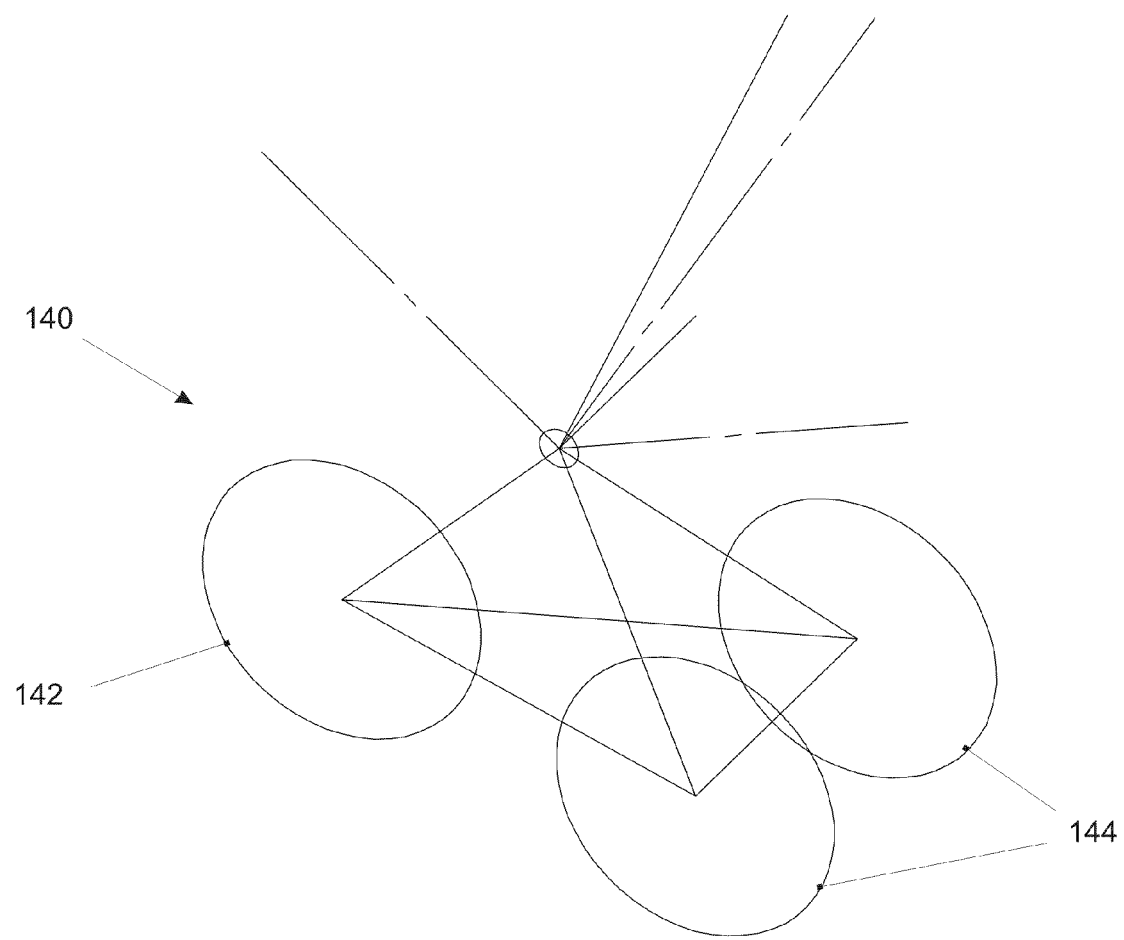

FIG. 1C shows another embodiment of a compound GI 140 having an alternate spatial arrangement, similar to that in FIG. 1B, but staggering the physical contact points of the simple GIs (142 and 144), which may reduce the tendency of the ground to rut, etc. Again, one or more simple GIs can be driven and the driving can be coordinated such that 140 follows a desired arc or profile without requiring steering or stabilizing forces from other truss elements.

Figure 1D:
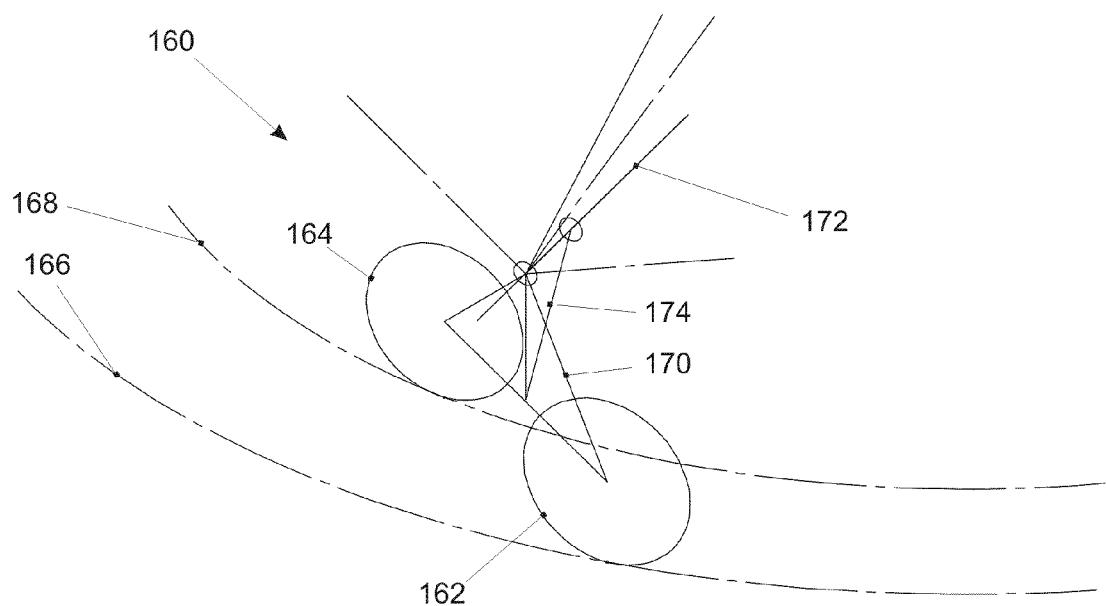

FIG. 1D shows a compound GI 160 comprising two offset simple GIs, 162 and 164 that follow profiles 166 and 168, respectively. This staggered arrangement provides for the local resolution of actuation torques and the attendant uncoupling of torsional compliance of an element or truss 172 from the azimuthal position of the truss 174.

Moreover, as described previously, these GIs can be driven in a coordinated fashion such that they follow their respective profiles. This coordination can be accomplished by the use of wheels having an appropriate diameter ratio driven at the same angular velocity, or wheels having the same diameter driven at different angular velocities, or combinations thereof.

If employed, an angular velocity ratio can be static, e.g., produced via different gear, timing belt, or pulley ratios. Alternatively, an angular velocity ratio can be produced by separate rotary actuators. These actuators could be controlled by sensors that detect linear forces or torques produced by non-ideal coordination of the two GIs.

Alternatively or in addition, one or more truss elements (for example 170) can be placed to produce steering correction forces via bending of element of truss 172. Conventionally, using a substantially long element in bending is inconsistent with material efficient design. Here, however, the required steering forces are generally much lower than the forces transmitted to the ground, and the compound GI coupling can be designed such that small amounts of bending of element of truss 172 do not produce first order errors in azimuthal or elevation position. In other words, small amounts of bending produce at most a $\cos''(\theta)$ relative length change or pivot point displacement, where θ is the bending angle and the exponent n is greater than zero. In this case, the some compliance of an element of truss 172 can help the system accommodate ground unevenness resiliently without reducing the angular pointing rigidity.

If actuation torques are not resolved locally to a compound ground contact, it may be preferable to resolve actuation torques through elements outside the GI. Maintaining an adequate stiffness of this typically larger structure may require disproportionately more material than resolving the torques or forces locally a result that applies generally in material efficient design.

Another alternative embodiment that is similar in principle to a rotary GI, is a walking mechanism that uses one or more legs. Most such designs will use multiple legs in order to apply driving forces to the ground and move the structure smoothly. In certain embodiments two legs plus an alternating driving mechanism with connection to a structure, can be used to create smooth motion of the structure by pushing against the ground with a first leg while moving the second leg forward so that the second leg can in turn be used to push while the first leg is moved forward. This forms a bipedal cycle.

In another embodiment a single leg with a vibratory or quick oscillatory motion is used to drive the structure in a deliberate direction at a predictable speed.

In alternative embodiments, more than two legs can also be used, and various multi-pedal gaits are possible which may be of benefit on uneven ground. A walking drive can be used to minimize erosion.

Another alternative embodiment that is similar in principle to a rotary GI, is a lead screw or helical drive element.

A helical element may use the ground as a mating helical element (like a lead screw on a half nut) which effectively uses the ground to achieve an even greater gear reduction than is possible with a wheel driving on the ground. Helical elements can reduce the cost of manufacturing GIs by eliminating expensive transmission gear stages.

Helical elements can also reduce erosion because the effective ground contact area of a helical element can be larger than that of a wheel. Helical drive elements may also be less prone to sudden drops as it travels over bumps because of the larger ground contact.

A helical drive element may be rigid (like a screw), or it may be flexible. A flexible helical drive element could be formed by rolling a bar or a tube into a helix (like a simple spring). Such a flexible drive element could be bent to match the radius of travel of a semi-circular path. If properly restrained and driven, the helical drive element would flex continuously as it rotated so that it could always match the correct radius and create the least amount of erosion.

Helical drive elements can be formed from sheet metal, rod, wire, tube, plastic, or other materials. They may also have a taper to the helix at one or both ends to aid in traversing uneven ground.

Linearly Ddriven GIs

Linearly driven GIs include actuators that extend or contact at least one structural element. Such a structural element may comprise a tensile element such as a cable or chain, an element that supports compression such as a helically wound or threaded rod or tube, gear rack, or telescoping pole, or a combination of one or more compressive elements such as a tube and one or more tensile elements. Linear elements can be disposed internally or externally.

Passive GIs include bidirectional, unidirectional, and braked interfaces. An embodiment of a passive bidirectional GI includes a wheel or plurality of wheels or rollers as described above, a track or passively rolling belt, or a skid and the like, such that motion along the ground in either direction is relatively unimpeded but reaction forces are effectively transmitted normal to the ground.

An embodiment of a passive unidirectional GI includes the same items as a passive bidirectional GI, with the addition of an element that transmits tangential forces in one direction to the ground. For example, this element can be a ratchet/pawl that prevents rotations or other similar structures. This element can comprise asymmetric arrangements of features that contact the earth that provide for slipping in one direction and binding in the other.

An embodiment of a braked GI is a bimodal apparatus that functions as a passive contact ("free motion" or "damped") in one mode, and a contact that transmits ground-tangential forces from the interface to the ground ("braked") in the other mode. In some embodiments, the braked GI modes are bistable, requiring power only to switch modes. In certain embodiments the modes are stable in the braked mode and actively powered to release.

Ground Preparation and Wheels

One cost associated with building solar power plants is site preparation, specifically the cost of preparing the ground to accept solar power plant structures. Concentrated photovoltaic power plants generally require structures that track the sun with at least single axis motion and often motion about 2 axes (most commonly azimuth plus elevation axes).

Many conventional designs have an azimuth axis that pivots about a single pole attached to the ground, so that the structural loads including wind loading are born by that single ground attachment and that attachment is subject to significant bending moments when unbalanced loads exist. This type of system may adversely affect tracking accuracy, because small bending displacements of the central pole or central structure are amplified over the width of the structure. Specifically, the displacement at the lateral edges of the structure may be large for small angular deflections of the central support structure.

Other conventional designs have attempted to eliminate bending loads by employing a laterally dispersed structure that transfers wind loads and weight to the ground at more than one location. Several designs use wheels near the extreme edges of the structure that roll on either a concrete track or a steel track that must be carefully constructed. While these designs have succeeded at reducing bending deflections via the use of wheels and tracks, they may increase cost as such tracks are costly to produce and/or install.

Embodiments offer one or more approaches that minimize or eliminate bending moments, greatly reduce material usage, and eliminate most or all the expense of a concrete or steel track. Certain embodiments employ wheels that roll directly on the ground with little or no ground preparation required. Wheels are designed so that they can roll directly on and over dirt, sand, mud, rocks, gravel, plants or other materials that may be present at a potential power plant site.

For certain embodiments, no ground preparation at all is required. Other embodiments may benefit from certain types of ground preparation that are less costly than building a steel track or a steel reinforced concrete track. There are many possible types of such low cost ground improvement.

One type of low cost ground improvement is to plant or otherwise encourage vegetation to grow. Some types of vegetation such as grasses, ivy, ground cover, vines or other plants may form a natural mat that can reinforce the soil, prevent erosion, prevent mud from forming, prevent soil from blowing away, prevent soil from being picked up and moved by structure wheels or tracks, utilize, soak up or evaporate excess moisture, even out bumps or ruts on the ground, and enhance the traction of a driving wheel or track. Certain types of vegetation will be able to survive and grow despite having wheels or tracks roll over them slowly one or two times per day.

Another type of low cost ground improvement is to distribute an adhesion enhancing mixture on an area of soil that may be subject to erosion. The mixture may be sprinkled on top of the soil, or it may be worked in to the soil by plowing, disking, raking, sifting or other mixing process. An adhesion enhancing mixture could be in the form of an adhesive alone, or an adhesive mixed with soil or an adhesive mixed with another material such as natural fibers or man-made fibers. Other adhesion enhancing substances that could be spread on or mixed with soil include but are not limited to acrylic emulsion, portland cement, plaster, asphalt, and concrete.

In addition to simply spreading or mixing an adhesion enhancing mixture, specific shapes could be formed into the soil using pressure and/or heat. Helpful features that could be formed include a flat or level track that a wheel could roll smoothly on, or some repetitive feature such as dips, bumps or teeth.

Teeth could be formed in soil plus admixture that mate with corresponding teeth on a driving wheel or track in order to create positive traction and positive, repeatable location capability. Teeth or other repeated features may be formed by the motion of the structure itself.

Another type of low cost ground improvement is to distribute some other material on top of the soil or mix another material into the soil. Typical natural materials could include but are not limited to gravel, sand, pea stones, lava rock, vermiculite, wood bark, wood fiber, straw, hay, grass, other plant fiber, animal fiber, bentonite, wood chips, or post industrial natural waste. Typical man-made materials could include but are not limited to general post industrial waste, recycled plastics, metals, glass, plastic fibers, glass fibers, paper fibers, or rubber among others.

Additional material may be added to the soil either before a solar collector system is used or after the solar collector has already compacted the soil and created a defined track. Applying additional material after a track is created can help minimize the material needed. That is, it can be applied only in the track and applied only when needed and only as much as is needed, rather than incurring costs ahead of time.

Existing soil could be first leveled before distributing another material, or the additional material could be distributed on top of the existing soil in its existing potentially non-level, non-flat condition. Additional material could serve to both prevent erosion and even out or level the surface to be traversed.

Another type of low cost ground improvement is to lay down a structured material. Some possible structured materials include but are not limited to fabric or fiber matting, road fabric, carpet, synthetic turf, netting, rope, corrugated metal or plastic, cardboard, wire mesh, and plastic film.

Figure 28:
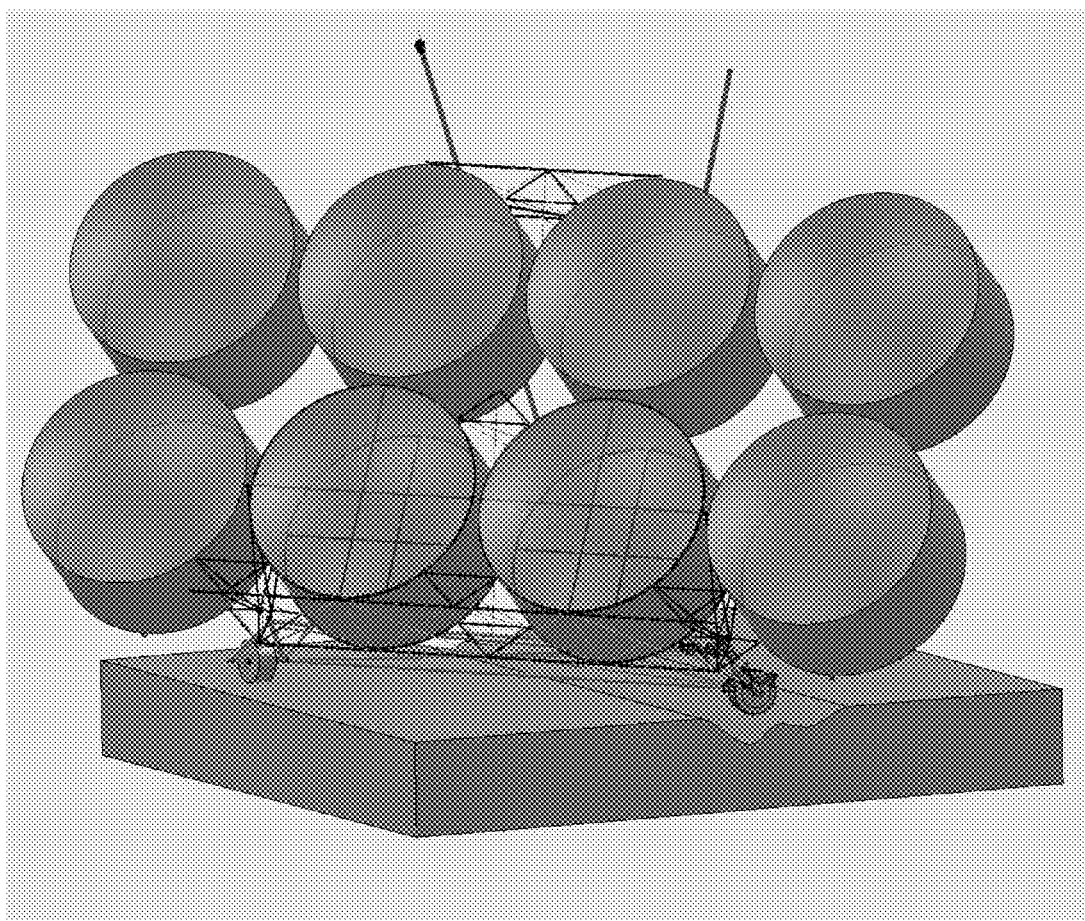
FIGS. 28 and 28A show one embodiment of a solar array structure moving over uneven ground.
Figure 28A:
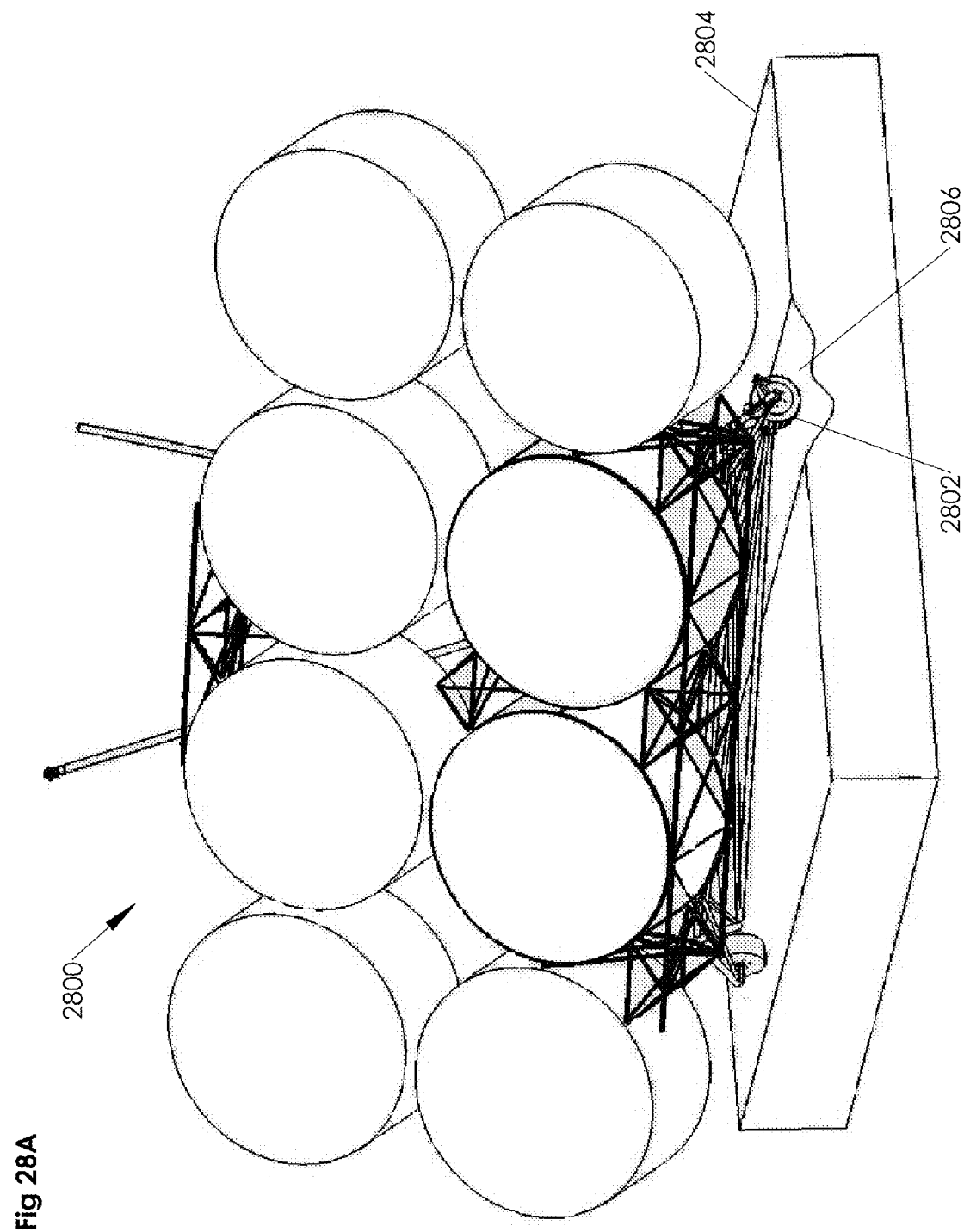

FIGS. 28 and 28A show one embodiment of a solar array structure moving over uneven ground. Certain embodiments accommodate variations in ground surface such as bumps, ruts, vegetation and small rocks by traveling over them, and correcting the tracking position via elevation axis and possibly the azimuth axis. For example, when the system is rolling over a bump, the elevation axis will move lower to hold the solar collectors within the desired alignment tolerance to the sun. FIG. 28A shows a solar collector and tracking apparatus 2800 moving over ground 2804 with irregularities, bumps or dips 2806.

Such a tracking correction system may take the form of velocity adjustments with a continuous motion algorithm. An alternative tracking correction system may take the form of discrete adjustments with an algorithm that adjusts position periodically, holding the system relatively stationary between adjustments. With either algorithm, errors in system position tracking the sun can be reduced.

The error can also be reduced by increasing the stiffness of the system structure, increasing the accuracy of position measurement, and decreasing the size of the possible actuation increment. Such strategies yield improved tracking accuracy and reduced cost by using the ground as a structural element.

The ground can also be used as an element in the gear reduction system for the drive train. For example, by using a driven wheel at the largest possible radius, other gear reduction stages can be eliminated. Specific embodiments act on the largest possible distance from an azimuthal pivot, and thus a rotational driving element rotates a maximal angle per azimuthal angle increment, providing mechanical reduction at low cost.

FIGS. 22, 22A, 23 and 23A show a drive wheel attached to a solar collector array structure. FIGS. 25, 25A, 26, and 26A show one possible embodiment of a drive wheel with features to prevent or minimize erosion. These features include sides with no holes or minimal holes (i.e. solid wheel side walls) so that they minimize the amount of soil that they lift which could be blown away by the wind.

One or more wheels may be driven to create the azimuth actuation motion. The driven wheel may have tread features designed to minimize erosion. In certain embodiments, the drive wheel has a corrugated surface or sections of steel angle forming a tread, which puts enough soil in shear to provide sufficient traction but has shallow enough tread angles that it readily sheds soil rather retaining it. The tread pattern may create semi-permanent shapes in the soil which effectively transform the soil into a form of gear rack (for example a roughly planar or possibly conical semi-circular pattern of teeth), thereby further increasing maximum potential traction and reducing erosion or repeated soil displacement.

In certain embodiments, a frustum or truncated cone as the wheel surface may be employed to reduce wheel scrubbing and therefore reduce soil displacement. One design would employ a frustum with a slope such that an imaginary extension of the cone would converge to a point coincident with the azimuth rotation axis. This shape allows sections of wheel material to come into and out of contact with the ground without any relative motion or scrubbing. Such a shape may be described in that the diameter of the wheel at the outer edge (the edge that travels at the larger radius from the central pivot point where the structure is tethered to the ground) has a larger diameter than the inner edge of the wheel. The outer edge of the wheel must travel a greater distance than the inner edge of the wheel. The truncated cone shape permits this without requiring any relative motion between the wheel contacting surface and the ground, as the wheel moves.

A drive wheel may have several additional features. A transmission element may be attached such as a sprocket, gear, pulley or the like. A brake or clutch component may also be attached. An embodiment of a drive wheel includes a clutch drum cylinder. Additional components of the clutch system allow the drive wheel to selectively be rigidly connected to the driving transmission or disconnected from the transmission so that the solar collector system and structure may be moved manually or by some means other than the primary drive system.

A wheel assembly (driven or passive) may also include a fender to prevent any soil that is picked up by the wheel from being blown by the wind. A fender may have features that cause soil, stones or other particles to drop back into the track or path of the wheel. A fender may also have features that remove soil or particles from the wheel such as brushes, scrapers or other means for dislodging soil or particles.

A wheel may also have side flanges which prevent soil, stones or particles from falling off the wheel to the side. In such an embodiment soil, stones, or particles fall back into the path of the wheel.

Figure 24:
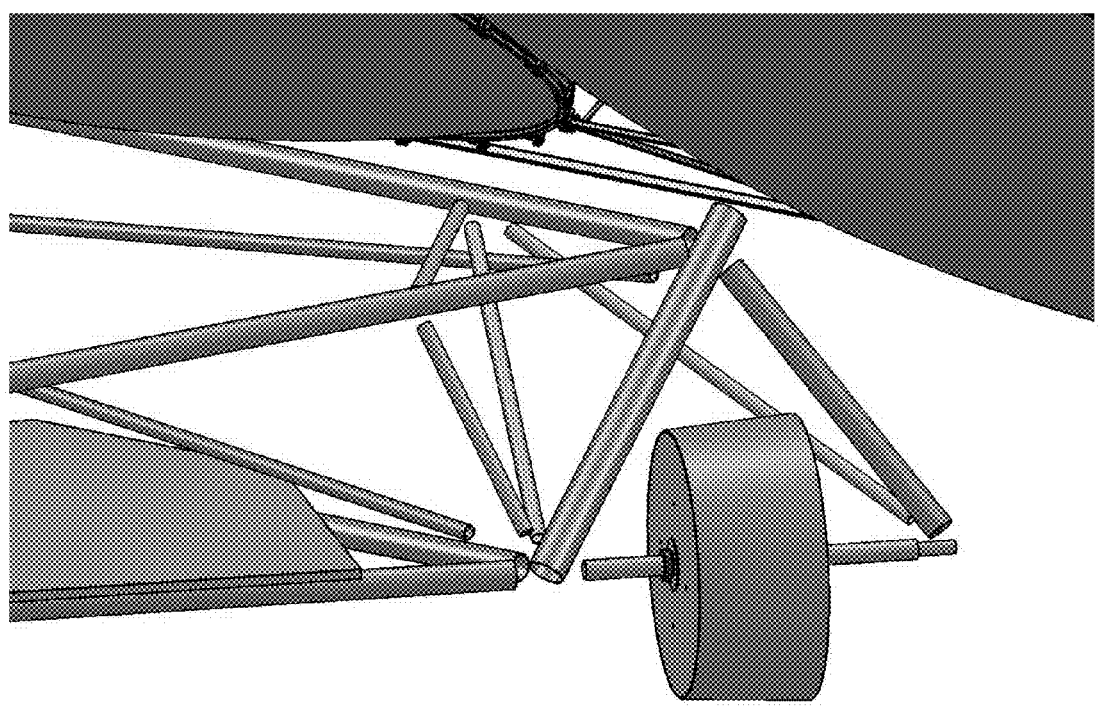
FIGS. 24 and 24A show embodiments of a passive wheel attached to a solar collector structure.
Figure 24A:
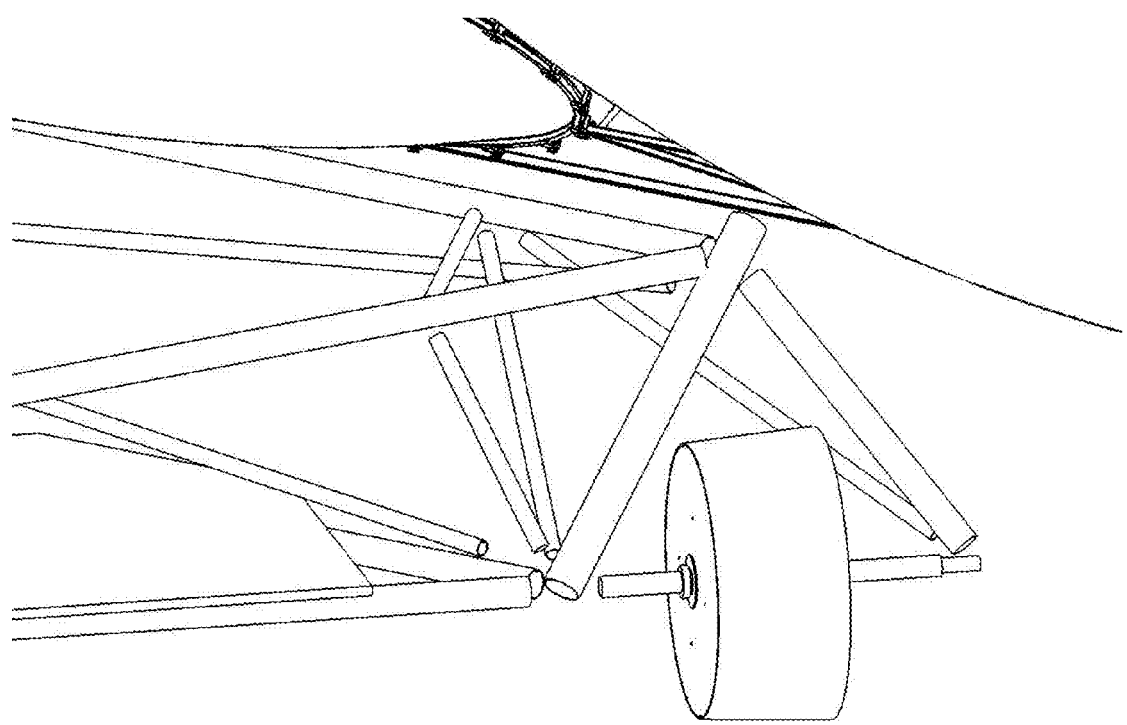
Figure 25:
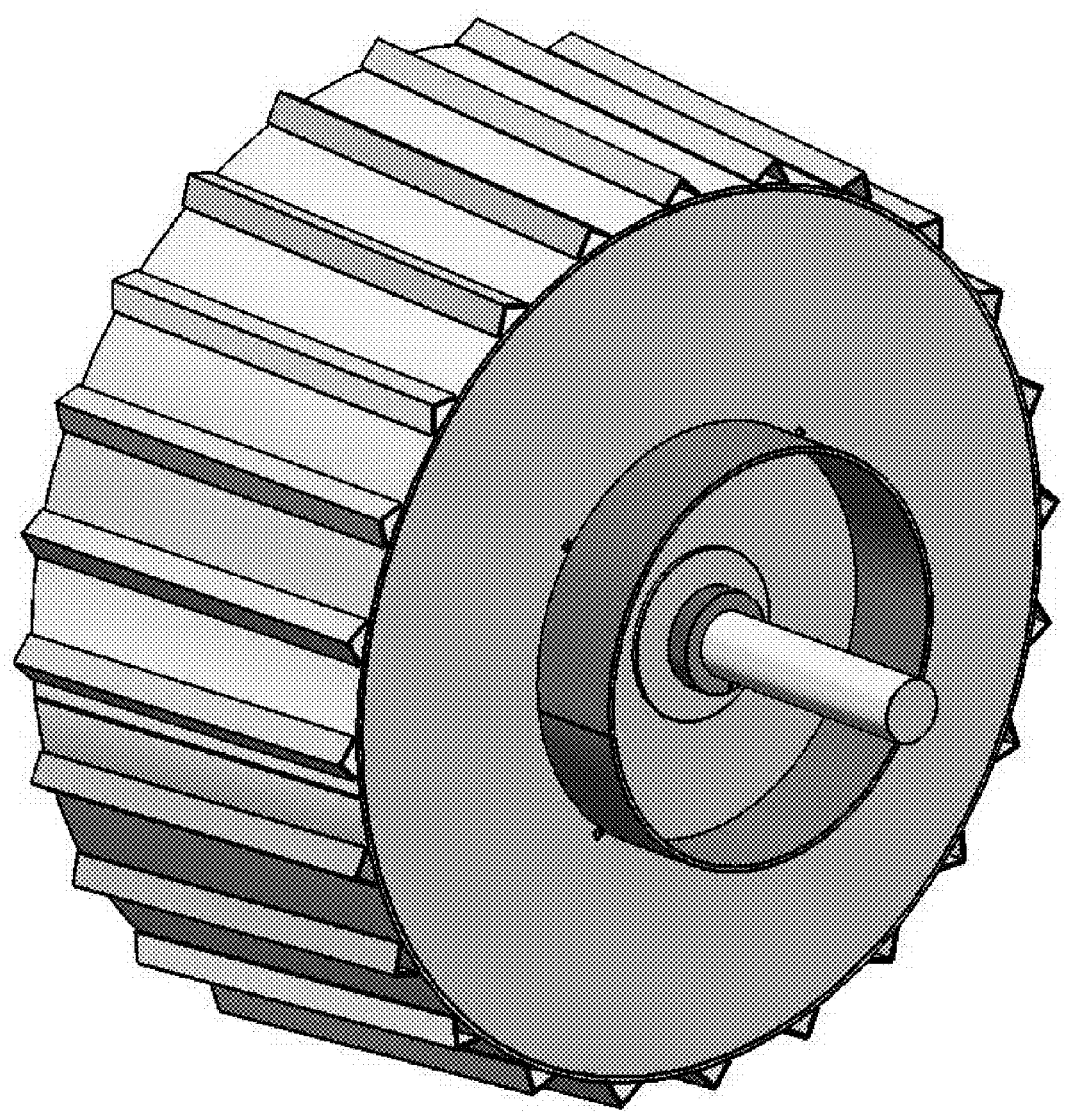
FIGS. 25, 25A, 26, and 26A show one embodiment of a drive wheel with features to prevent or minimize erosion.
Figure 25A:
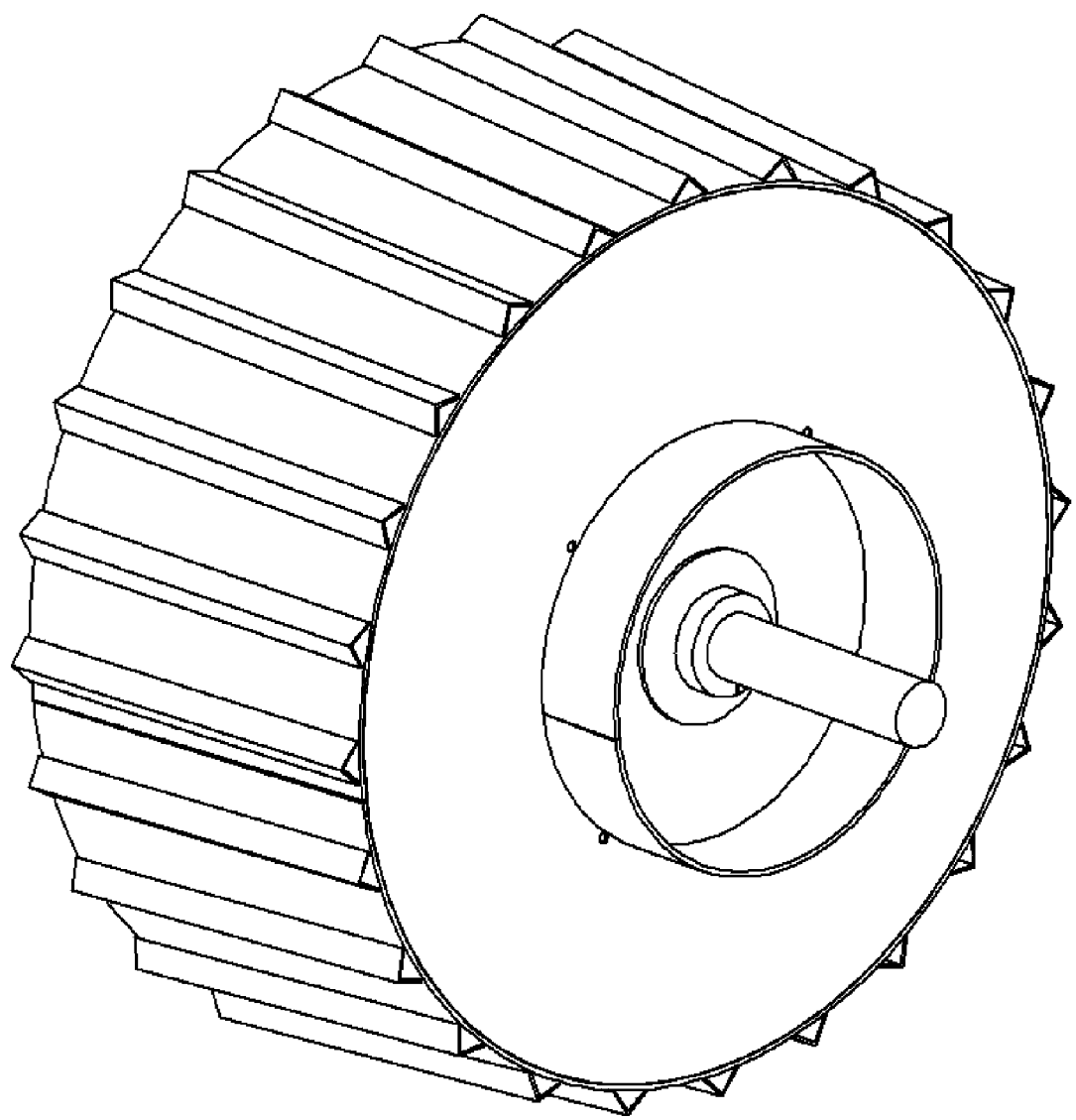
Figure 26:
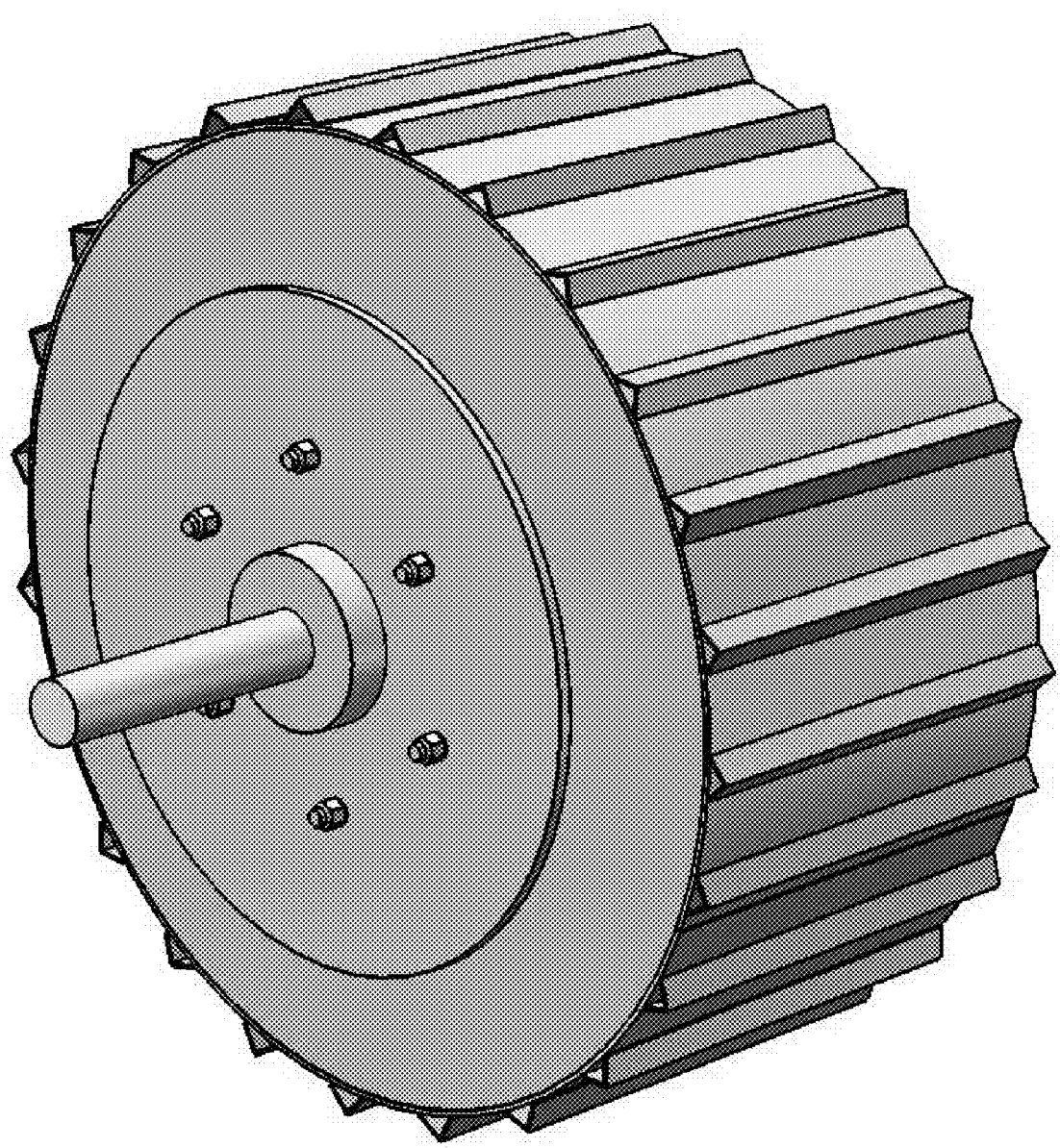
Figure 26A:
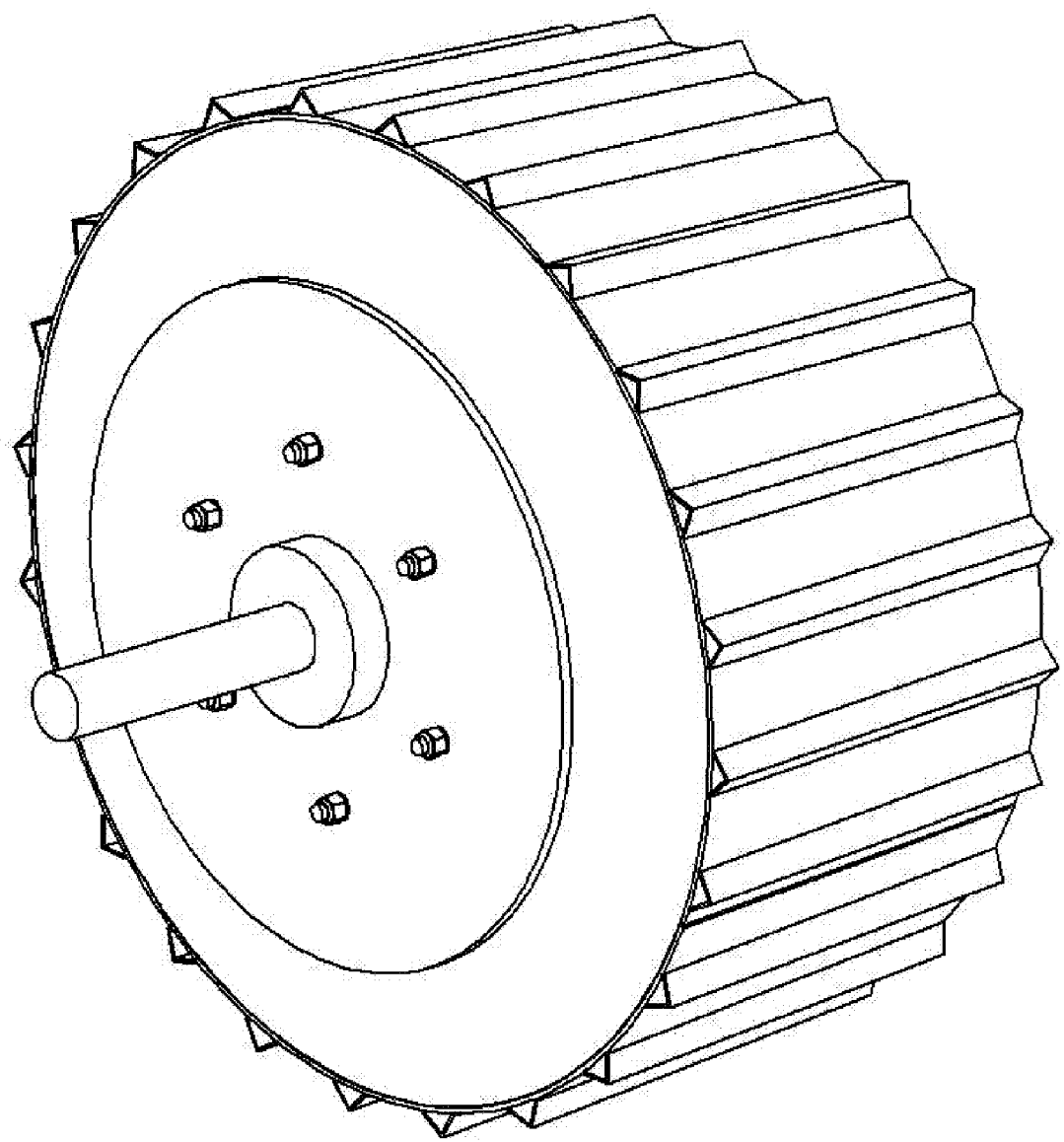
Figure 27:
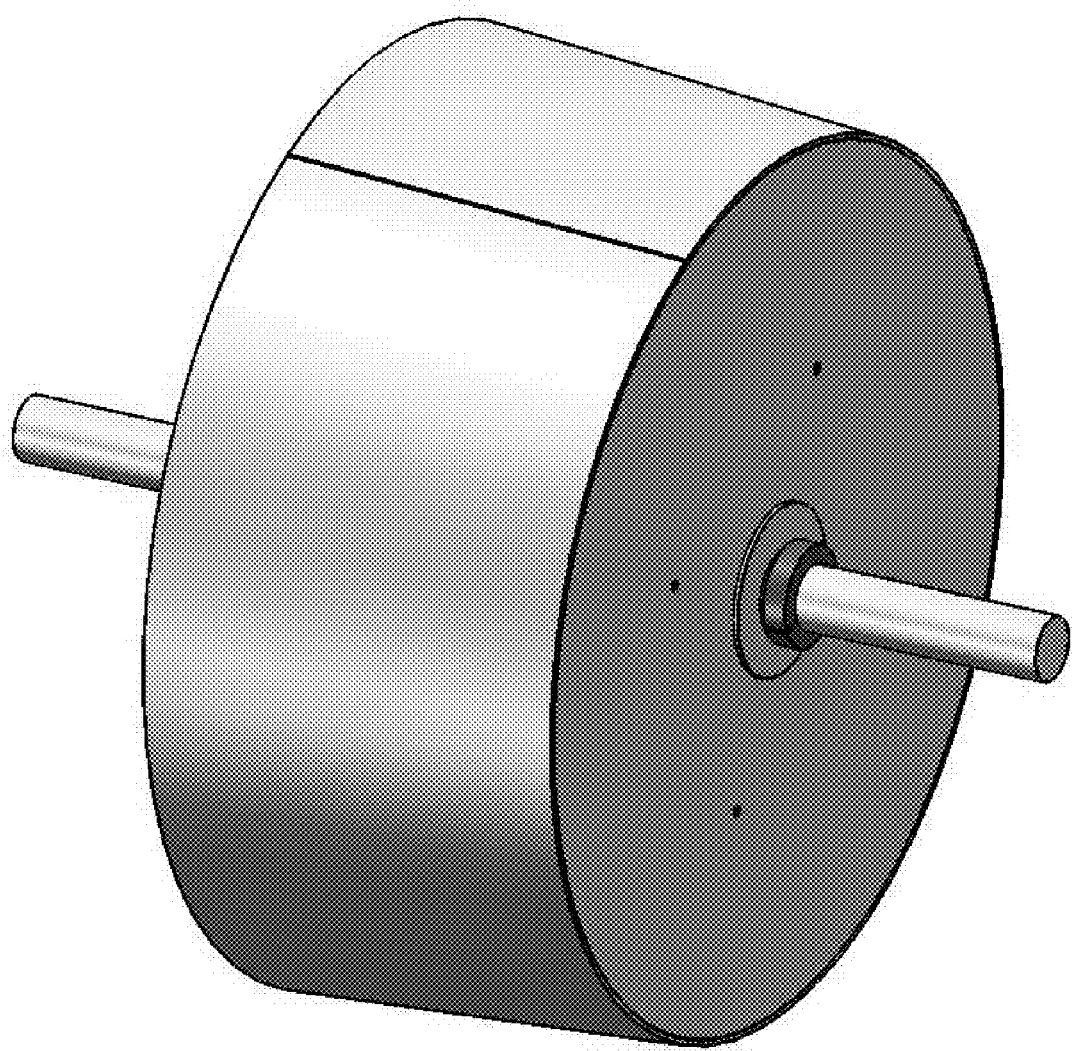
FIGS. 27 and 27A show embodiments of an inexpensive construction for a passive wheel with features to minimize erosion.
Figure 27A:
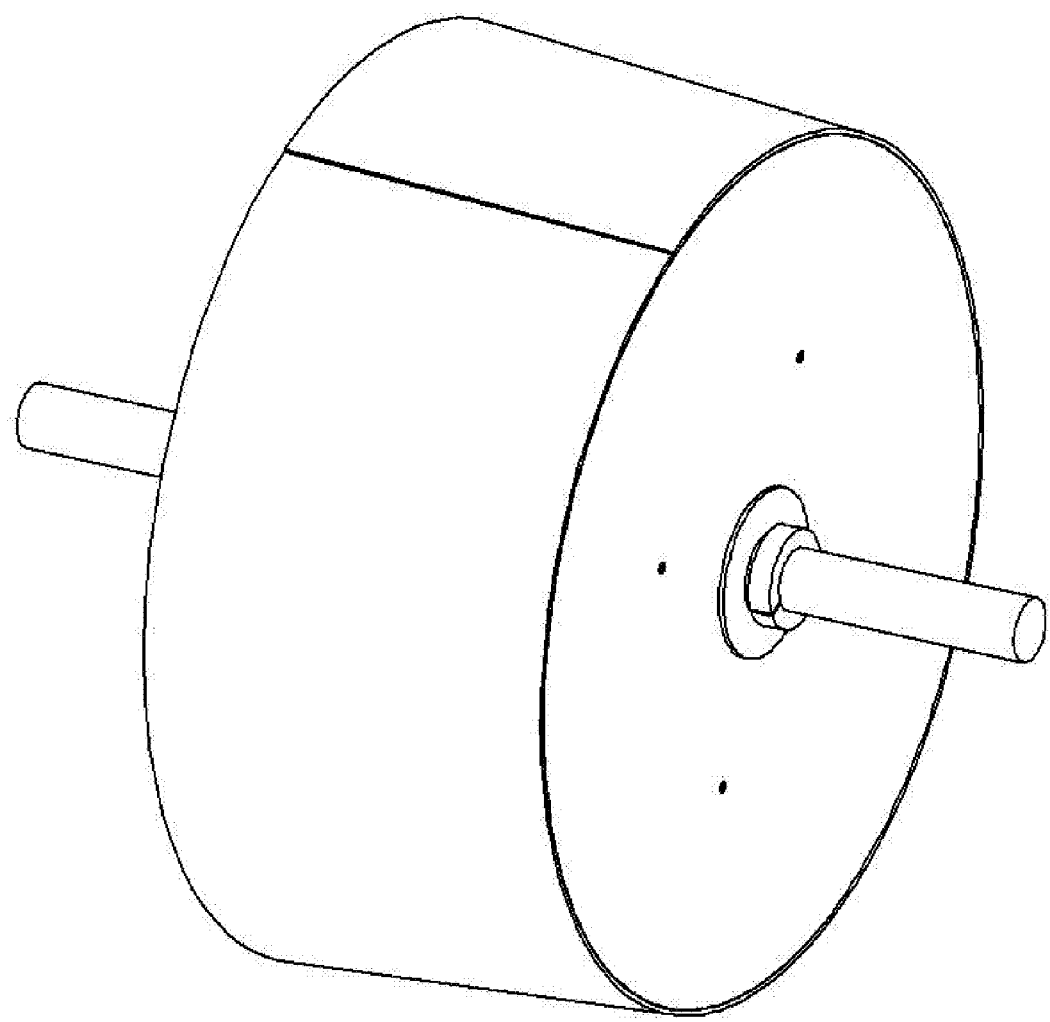

FIGS. 24 and 24A show embodiments of a passive wheel attached to a solar collector structure. FIGS. 27 and 27A show embodiments of an inexpensive construction for a passive wheel with features to minimize erosion. Specifically the wheel shown has minimal holes or other features to pick up soil.

Number of Ground-Normal Constraints

Tracking support structures may be classified by the number of nodes having ground-normal translations that are constrained by GIs. These nodes are herein referred to as a "ground-normal constraint" or "GNC". Depending on the structure such a GNC could comprise a simple GI, or a compound GI made from multiple simple GIs. Thus, the count of simple GIs in a system is typically greater than or equal to the number of GNCs.

Conventional bending and torsion based designs typically employ one GNC, with a GI located atop a pole or vertical tube. The other degrees of freedom are resisted by bending and torsion.

The use of two GNCs or a set of multiple co-linear GNCs, can provide enhanced rotational rigidity normal to the line of GNCs. Bending or torsional stiffness resists rotation in other directions.

Three non-collinear GNCs provide a foundation on which rotational rigidity in all directions can be maintained through the use of axially loaded truss elements. Three such GNCs provide for kinematic or near kinematic structure supports, which propagate angular deviations, but no substantial stress concentrations when traversing uneven ground. The kinematic contact points remain in contact with the ground, maintaining pointing rigidity in spite of unevenness in the ground surface. Active control can prevent ground unevenness from producing pointing angle errors.

Figure 2A:
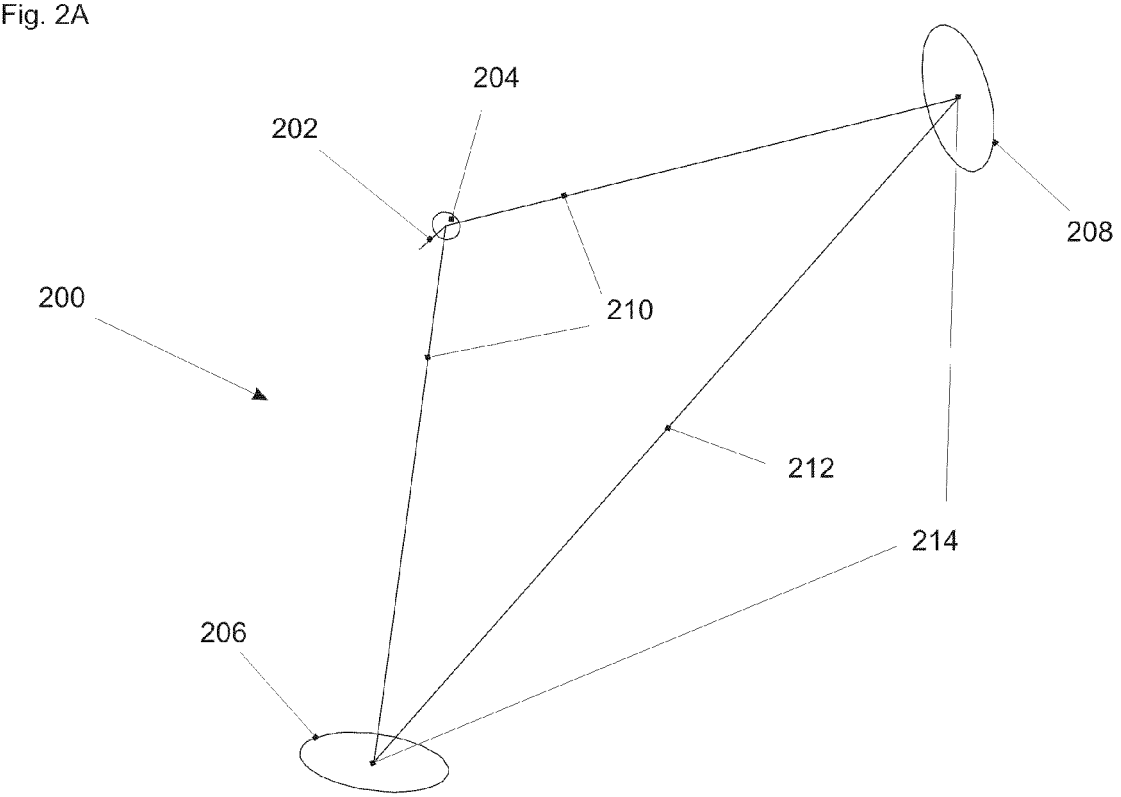
FIG. 2A shows a diagram of an embodiment of a simple 3-Ground Normal Constraint (GNC) base.

FIG. 2A shows a diagram of an embodiment of a simple 3-GNC base 200. Stationary base 202 supports a ground contact pivot 204. Circles (206, 208) denote simple or compound GIs, not limited to wheels or circular structures.

Two radial trusses or truss elements 210 project from the pivot 204 to the non-stationary GIs (206, 208). An additional element or truss 212 stabilizes the spacing of the non-stationary GIs (206, 208). Element or truss 212 may optionally be included on the articulating structure supported by the base 200. Locations 214 are logical pivot or actuation points for the articulated structure. This configuration provides a kinematic base that does not require precise leveling of the ground along the trajectory of GIs (206, 208).

Unevenness in the ground may be accommodated by use of a suitable joint at pivot 204, by flexure of the stationary base 202 or truss elements 210, or by a combination of these approaches.

Points 214 are also convenient locales for ballast weight, if used to hold GIs to the ground, possibly to facilitate traction or to handle wind or over-hung loads. Alternate locations for ballast include regions on truss elements (210, 212). If ballast is used, it is most preferable to employ materials that are otherwise needed for the apparatus, e.g., cooling water, materials that are available on site, e.g., dirt, rocks, etc., alternatively, ballast can include dense materials of low cost and high abundance.

Alternatively or in addition, a ground preload can be maintained via bending resistance of stationary base 202 or truss element 210. However, the force capacity of such a bending or torsion-based preload can be limited without using significantly more material than is needed to maintain rigidity without this preload.

An alternative or supplement of a preload, is to physically restrain the GIs either continuously or at discrete points along their arc directly to a ground-mounted apparatus, consistent with the philosophy of resolving forces locally. Such physical restraints could be employed at a minimum number of positions to provide anchors for the system in one or more safe-stow positions.

Figure 2B:
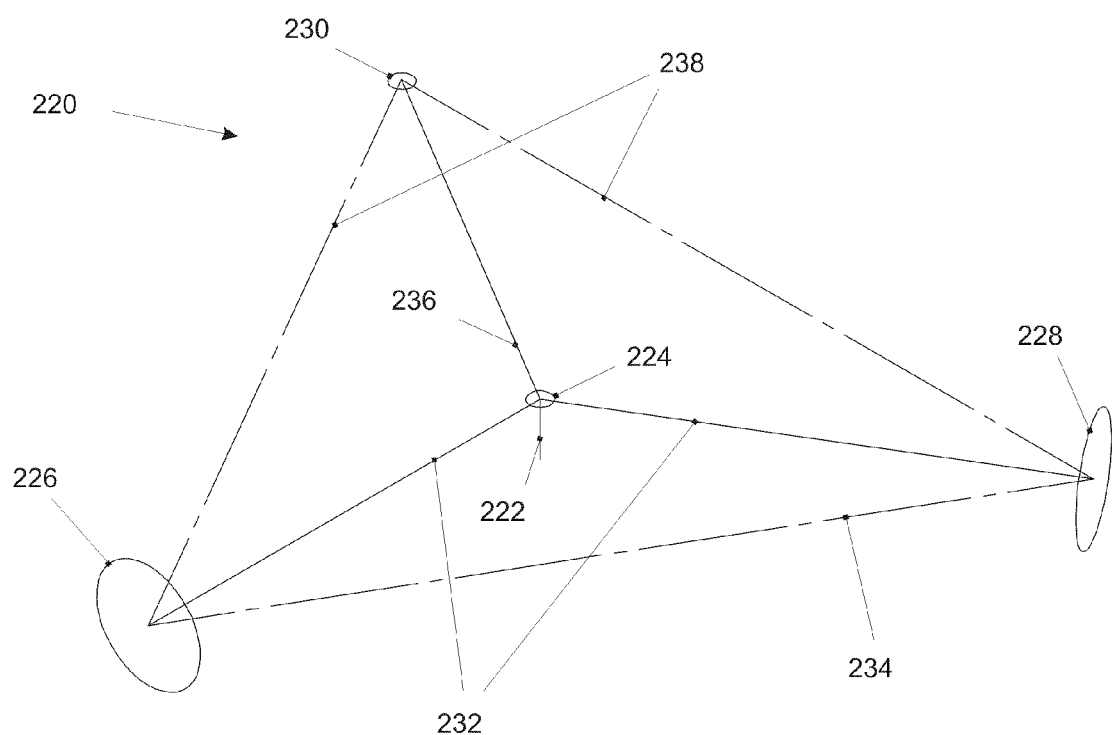
FIG. 2B shows a diagram of an alternative embodiment of a three-GNC system.

FIG. 2B shows a diagram of an alternative three-GNC system 220. In this and other figures, a dashed line signifies a truss element or truss that can be tensile in some embodiments. A solid line signifies a truss element or truss that can be compressive or mixed compressive and tensile in some embodiments.

In FIG. 2B, elements (226, 228, 232, and 234) functionally resemble elements (206, 208, 212, and 214) of FIG. 2A, respectively. The addition of element 236 and elements 238 provide a reaction force that may permit elements 238 and 234 to be tensile and therefore employ flexible, resilient, low material use elements. Moreover, these additional elements can support a structure herein called an actuator contact 230. This actuator contact 230 facilitates external actuation or internal linear actuation as described below. An anchor element 222 prevents translation of the center of the system 220. This may be in the form of a ground screw, a ballast or other means of securing the system. Anchor 222 is connected to system 220 by a joint 224 which permits revolution in an azimuthal direction and optionally allows limited rotation in other directions.

In some embodiments the radii of GIs relative to a pivot are substantially similar to minimize the ground surface area required to be processed or modified. In other embodiments these radii of the GIs are different, to spread loads over a wider surface area, possibly allowing less aggressive or no surface preparation.

Structures having more than three non-collinear GNCs are statically indeterminate, and the lengths of elements connecting the structure to the GNCs satisfy a compatibility condition. A simple compatibility condition is that the ground beneath each GNC is perfectly planar across the locus of contact points and all such planes are parallel. Satisfying this simple condition and ensuring its maintenance may involve significant amounts of ground preparation and material, typically concrete and steel.

Alternatively, the compatibility requirements can be satisfied by mounting GIs on variable-length elements, and adjusting these elements in concert with ground unevenness. One implementation of a compatibility adjustment is an actuated element that is controlled to maintain a sensed contact force or displacement.

Another implementation of a compatibility adjustment is a GI mounted on a structure having low-frequency compliance, e.g., a dashpot or viscoelastic material. This GI provides support against perturbations of higher frequency than those from traversing uneven ground, e.g., wind loads, flutter, and mechanical oscillations.

Another implementation is a bimodal GI having a "free-motion" or "damped" and "braked" state. During transit, this bimodal compatibility adjustment is periodically or occasionally switched to its "free-motion" or "damped" state to allow the GI to adjust its position passively for uneven terrain. Most of the time, the adjustment is "braked" to provide rigidity. In some embodiments, the adjustment modes are bistable, requiring power only to switch modes. In other embodiments the modes are stable in the braked mode and actively powered to release. One example of a bimodal compatibility adjustment is a hydraulic cylinder having a fluid port valve. Another example is a dashpot having a valved fluid leak. Some other examples employ mechanical brakes, including but not limited to telescoping tubes with a circumferential brake, rods or cams having face brakes, or mechanically interlocking components having retractable pawls.

A bimodal adjustment can provide zero-frequency stiffness against sustained winds, gravity loads and the like.

Alternatively, a GI can be completely passive, such as a rigid pendulum having a ground-contact foot. Under normal operation this foot drags at a modest angle from vertical with a portion of its foot in contact with the ground. The foot is designed to slip relatively freely when pulled (actuated) and to resist backwards or downward motion. The cosine of the maximum angle at which the foot is effective at resisting against downward motion, determines the amount of tolerable ground unevenness. Because such a pendulum acts like a ratcheting pawl on the ground, it generally resists backwards motion.

Reversing the actuation direction may be done at least once a day. This can be facilitated by having a mechanism to force or actuate the pendulum into a raised position.

Alternatively, a cavity can be dug beneath the pendulum position at the extremes of travel. This cavity allows the pendulum to fall freely without binding on the ground.

Figure 63A:
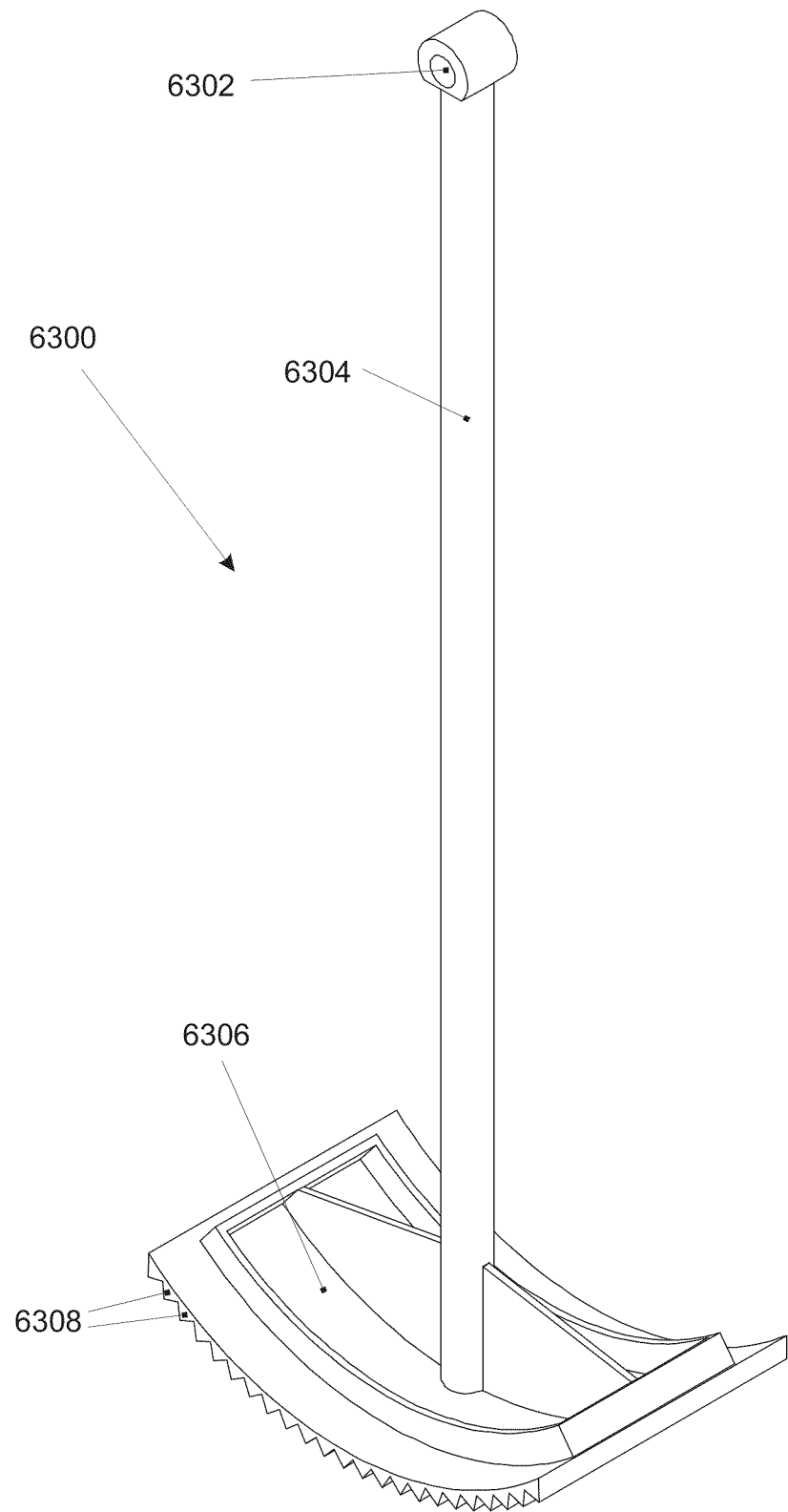

Direction reversal is then possible, swinging the pendulum backwards without binding. In the backwards-swung direction the foot contact can be designed to glide freely bi-directionally or to bind on the ground. FIG. 63A shows an embodiment of such a pawl apparatus 6300. Forces from joint 6302, which can provide for limited or complete rotation about one or more axes, are transmitted through element 6304 to a "foot" 6306 to the ground. Optional features 6308 on the foot can prevent slippage if there is a tangential component of the transmitted force with the ground. FIG. 63B shows the position of pawl 6300 when it traverses a relatively high spot in the ground 6310 in the direction indicated by 6312. Motion up and down relative to the ground or in the direction opposite of 6312 is resisted by forces along the line 6314. FIG. 63C shows the position of pawl 6300 at the lowest ground level 6322 in its accommodation range. In this position, forces 6320 resist motion only normal to the ground. FIG. 63D shows the pawl over a dip in the ground 6330. Such a dip provide for a reversal of the motion of the stage, since the pawl can freely pivot backwards in this disengaged state, as indicated by the direction arrows 6332.

Having more than three non-collinear GNCs may provides advantages that can overcome the disadvantages of having to ensure compatibility. For example, more GNCs can provide enhanced static and dynamic stability at a lower overall structure weight. Three GCs may not easily map to support a rectangular upper structure with good rigidity against torsion from side loads.

Some otherwise favorable arrangements of three GNCs do not provide good resistance to high winds. Additional GNCs can be arranged to reduce the risk of damage in wind storms.

Figure 2C:
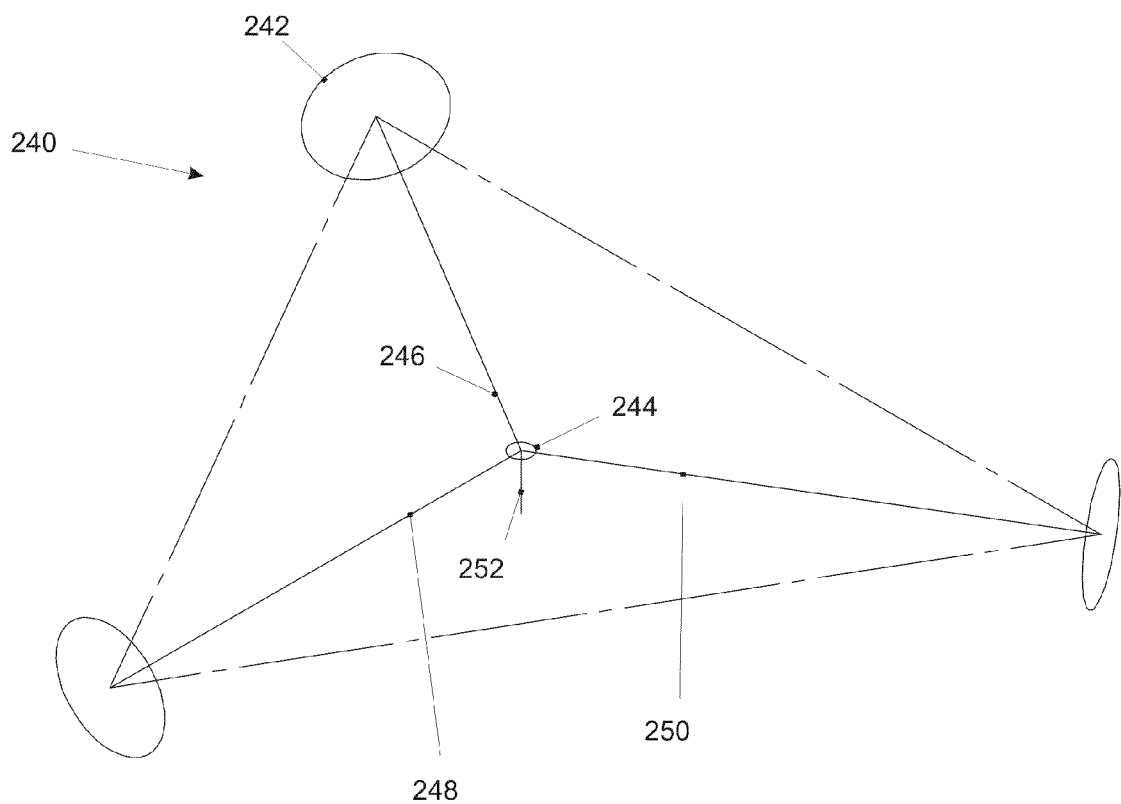
FIG. 2C shows a diagram of an embodiment of a four-GNC system.

FIG. 2C shows a diagram of an embodiment of a four-GNC system 240. This system is functionally similar to that in FIG. 2B, with the addition of a non-stationary GI 242. The addition of this non-stationary GI 242 provides for a wide support baseline and is compatible with external and internal linear actuation modalities.

In some embodiments compatibility can be maintained by flexure of at least one of the elements (246, 248, and 250). In some embodiments, element 252 can flex or extend to satisfy compatibility. The pivot in such embodiments may not function as a GNC to the rest of the structure. Other embodiments can employ a combination of these approaches to satisfy compatibility.

Alternative embodiments satisfy compatibility using other techniques as described herein. As described earlier, the GNCs can be preloaded if necessary by ballast weight and flexure of elements (246, 248, and 250), possibly under the influence of a length change of element 252.

Figure 2D:
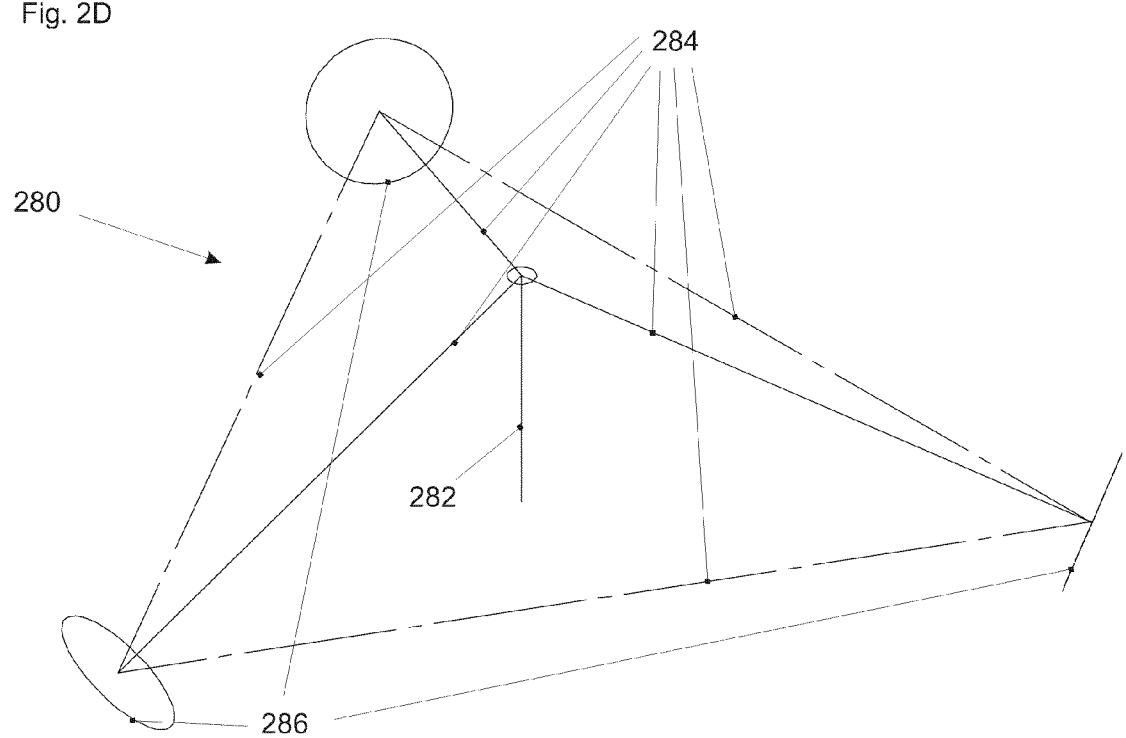
FIG. 2D provides an alternate embodiment of a method of ensuring that GIs remain in contact with the ground.

The base arrangement 282 shown in the alternate GI system 280 of FIG. 2D provides an alternate method of ensuring that GIs remain in contact with the ground. By extending the element 282 the planar structure in FIG. 2C becomes a pyramidal structure 284. A tensile force applied along 282, will resolve into forces that maintain contacts 286. This mechanical structure can apply significant forces to prevent liftoff of the contacts in a material efficient manner. The force applied by 282 can be produced via a constant-force actuator, e.g., a constant force spring or hydraulic cylinder or a variable force actuator, such as a linear spring. The force-deflection curve can be tailored such that preloads on the wheels are limited to prevent excessive rutting, but sufficient force is applied to prevent excessive liftoff in a wind storm.

The force or displacement along element or truss 282 can be actively controlled. In some embodiments, a displacement-rate-sensitive element such as a dashpot can be employed. In some embodiments, this dashpot may have direction-dependent relaxation rates, for example a low resistance to compressive perturbations and a higher resistance to tensile perturbations. In some embodiments, length changes are resisted by a mechanical brake or hydraulic cylinder with an actuated valve. In other embodiments, length changes or preloads are produced by lead screws. In other embodiments, length changes or preloads are produced by drum actuators, gears, including rack and pinion gears, driven chains or timing belts, or generally any actuator that can produce a displacement. This actuator can act to resolve compatibility. Alternatively an actuator, damper, break, ratchet, etc., can be applied to lengthen or shorten any of the elements of truss 284 toward the same end.

Figure 2E:
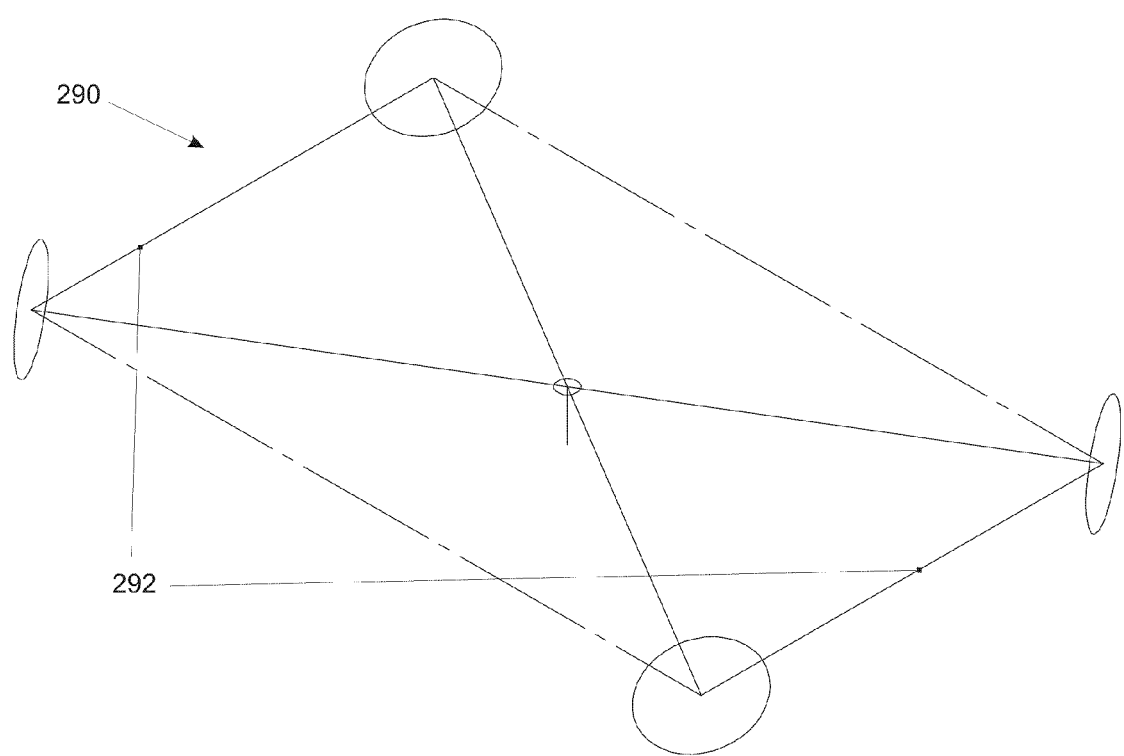
FIG. 2E shows an embodiment with a base comprising a planar arrangement of 5 GNCs.

FIG. 2E shows an alternate GI system 290 with a base comprising a planar arrangement of five GNCs. Such an arrangement tends to support rectangular elevated structures more optimally than four or three GNC arrangements. The side elements 292 are drawn to suggest compressive elements, which may be optimal for some arrangements of elevator actuators and hinges, though they can be tensile elements given a sufficient preload. FIG. 2F shows an alternate GI system 295 with non-planar arrangement in which GI ground contact can be maintained as described for FIG. 2D. While adding an extra GNC might appear to increase the complexity of actuation required to maintain ground contact, the two triangular truss sections 296 and 298 can rotate and flex to accommodate ground nonuniformity given a single preloaded or adjusted element, as described in FIG. 2D.

In some embodiments, the number of GIs can change in different modes of operation. For example, in a stow position designed to weather severe storms, additional simple GIs can provide extra stability. In some embodiments, such GIs can be stationary only.

In general, structures in accordance with embodiments may employ a mix of passive and driven GIs. Some embodiments may utilize a single driven GI. Minimizing the count of driven GIs can reduce cost and complexity.

In other embodiments, the number of driven GIs is greater than one. In these cases, the plurality of GIs may function such that differential motion of the GIs produces actuation apart from that produced by a common motion. For example, motion of two driven GIs toward or away from each other can change the geometry of a linkage between the GIs to produce a desired motion, such as elevation. In some embodiments, multiple driven GIs are employed to share traction loads, possibly improve traction authority, and/or detect and recover from slippage of one or more GI.

Some embodiments further mix the types of passive and driven GIs. For example, a structure may use passive GIs that can unconditionally support the structure normal to the ground (such as a wheel or a track), in concert with one or more structures that cannot stably provide this support (such as a pawl or a pendulum).

Azimuth Control

Azimuth control can be categorized as internally and externally driven, and linearly and rotationally driven. As described herein, some embodiments employ at least one internal rotary drive. Other embodiments employ multiple internal rotary drives. Some embodiments employ compound GIs whose geometry resolves rotary actuation torques, without coupling this torque with the truss position.

Other embodiments employ linear drives. In some embodiments, actuation may be via cables on a sparsely spoked pulley/drum.

Certain embodiments employ at least one linear drive that works by drawing on a flexible tensile element, e.g. a strap or cable. Such a flexible tensile element is herein referred to for succinctness as a "cable," but is understood to refer generally to any flexible structure including wire and fiber rope, fiber bundles, elastomers, reinforced elastomers, thin metal sheets and strips, particularly hardened strips, wires, chains, and the like, as further described in U.S. patent application Ser. No. 11/844,877 ("the '877 application"), filed Aug. 7, 2007 and titled "Rigging System For Supporting And Pointing Solar Concentrator Arrays," which is incorporated by reference in its entirety herein for all purposes. As used herein, the term "chain" refers to a cable having a plurality of regular geometrical features, such as a timing belt, linked chain, braided or wrapped ropes, or other cables having such geometrical structure.

Some embodiments employ at least one linear drive that works by drawing and release of a plurality of flexible tensile elements. Other embodiments employ a plurality of linear drives that each draw and release a flexible tensile element arranged in measured opposition, such that the combined displacement of the plurality of tensile truss elements produces a desired azimuthal motion.

FIG. 3A shows a diagram of such an azimuthal actuator 300 acting on a three-sided base 302, like those in FIGS. 2B, 2C, and 2D. This diagram is fixed in the plane view of the three-sided base, such that the locus of positions of ground fixed apparatus appears to trace an arc 318 about the central pivot 304. Item 310 is a point that is fixed in the ground frame when the base 302 is rotated to its mid position.

In some embodiments, this base comprises a simple translation-resistant ground anchor for two cables (311, 312) which pass respectively over base-mounted slides or pulleys 308 and 306 on route to one or two base-mounted actuators at point 314. In other embodiments base-mounted actuators may be located in an alternate position, for example if more rotational range is desired.

In other embodiments, one or two actuators are mounted in the ground reference frame such that cables 311 and 312 pass respectively over guides 308 and 306 on their way to a tie point 314 to the base 302. In other embodiments this tie point may be elsewhere.

One or more actuators work to draw and release the cables in measured opposition to achieve a smooth motion of the base without producing excessive cable slack. In some embodiments, a single actuator rotates a cam drum designed to accomplish this measured opposition. An example of such a cam drum structure is described in the '877 application. In other embodiments, two actuators may be coordinated to perform this opposed motion also as described in the '877 application. Other embodiments may employ actuators coupled such that one actuator produces nearly all the motion and another actuator, brake, or ratchet takes up any slack.

The circles 313 depict the locations of the ground-fixed apparatus at discrete rotation angles and show the routing of the cables at these positions. The circle 315 shows approximately one extreme actuated position, and circle 316 shows the extreme position in the other rotational direction. This structure can provide for nearly 360 degrees of rotation. At common latitudes of interest for solar tracking, an azimuthal angular range of approximately 220 degrees is sufficient.

Figure 3B:
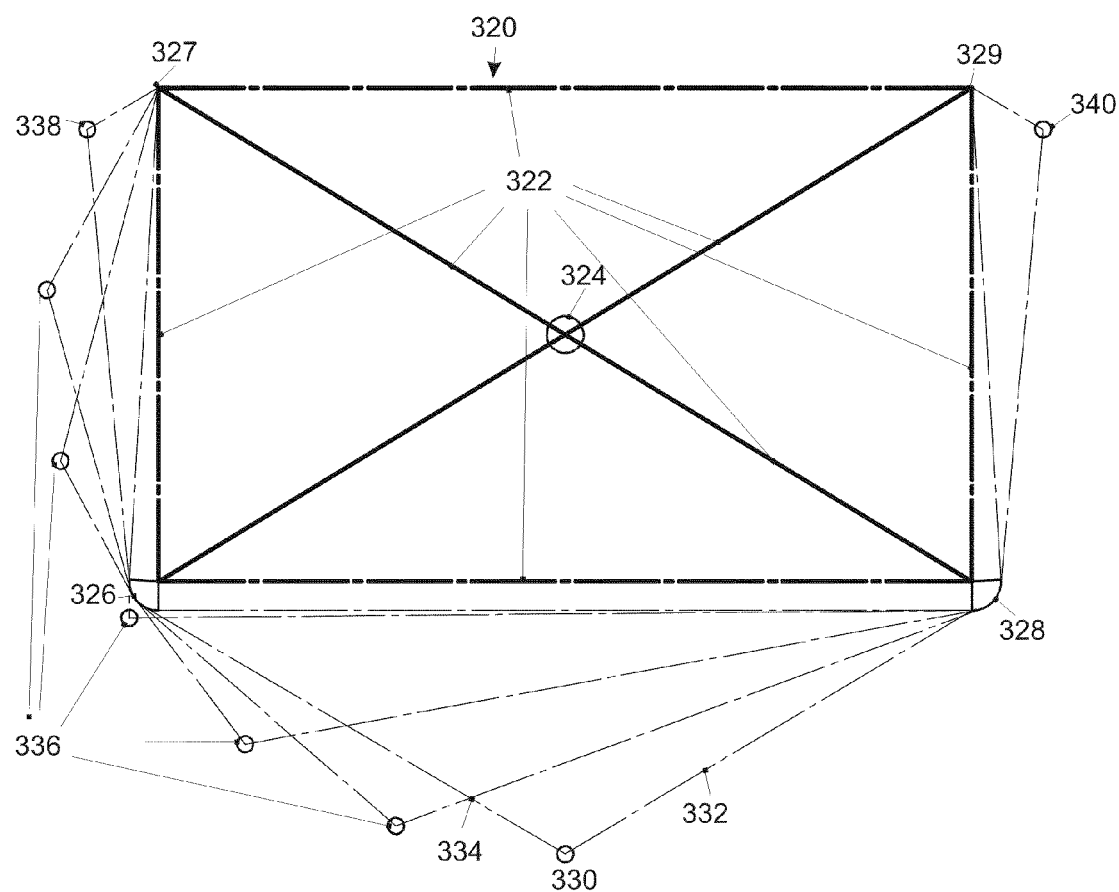
FIG. 3B shows an embodiment with an azimuthal actuator for a rectangular base.

FIG. 3B shows an embodiment with a similar actuator 320 for a rectangular base 322, like that in FIGS. 2E and 2F. Again, the diagram takes the reference frame of the base and ground mounted apparatus sweep a circular arc about pivot 324. As in the embodiment of FIG. 3A, the base has either cable slides or guides (326, 328) depending on the position of the actuator. Item 330 shows the position of the ground mount in the middle of the rotational range.

The cables (334, 332) terminate on the base at points (327, 329) respectively. As in FIG. 3A, these termination points are either actuators or tie points, depending on whether the actuators are internally or externally mounted, respectively. And, as in the embodiment of FIG. 3A, the locations of these termination points can be changed. The circles 336 depict the locations of the ground-fixed apparatus at discrete rotation angles and show the routing of the cables at these positions. The circle 338 shows approximately one extreme actuated position, and circle 340 shows the extreme position in the other rotational direction.

Elevation Actuator

Embodiments may use an azimuth actuator and an elevation actuator to articulate a solar collector array. The elevation actuator axis may rotate with the azimuth actuator position, but the azimuth actuator axis may be independent of the elevation actuator position. Such a configuration is referred to as "elevation over azimuth".

Conventional actuators could accomplish the basic function of rotating an array of solar cells or solar collectors about a horizontal axis. However, conventional rotational actuators mount very near the axis of rotation. Rotating a large panel, structure or array by (only) applying forces near a pivot point, leaves the outer edges unsupported and can create relatively large tracking errors due to bending of the structure or panel. Additionally, backlash or other small errors at the drive system become large errors at the edges of the panel or structure, because they are multiplied by the ratio of the largest radius of the structure (half the width) to the small radius at which the actuator acts.

Conventional linear actuators can be used to rotate a panel or structure by exerting a force away from its pivot point, which helps to eliminate bending issues. However, conventional inexpensive linear actuators are generally either not designed to move structures with large travel (10 feet or more).

By contrast, the linear actuator for elevation described in the following embodiments, can be built in high volume manufacturing for a small fraction of the cost of conventional linear actuators. In particular, specific embodiments of linear actuators for elevation may reflect at least one of the following principles to reduce cost. One principle is to use low cost mass manufactured materials and components instead of typically expensive custom or precision components.

A second principle is to move (actuate) a large panel or array by applying forces as far away from the pivot axis as possible. Such a configuration creates the greatest possible stiffness.

A third principle is to perform actuation away from the pivot axis, thereby avoiding the need for tight tolerances on actuation components. For example, an angular tolerance of 0.1 degrees equates to 0.42 inches at a distance of 20 feet away from the pivot axis. This means that the angular tolerance can easily be held with very low precision components.

Several embodiments of actuators are described below for elevation actuation of solar collectors. Depending upon the particular embodiment, these elevation actuators may offer one or more advantages. Examples of such advantages include but are not limited to durability, overall lowest cost of combined components, high ratio of accuracy to cost, ability to take advantage of existing high volume manufacturing, and inexpensive materials or mass produced commodity materials with the highest commercially available stiffness to cost ratio.

Pole, Chain, and Pulleys

FIGS. 38, 38A, 39, and 39A show various views of one embodiment of a long travel linear actuator which can be created using a thin wall hollow tube such as, for example welded, roll-formed steel tubes such as Electrical Mechanical Tubing (EMT). This embodiment includes one or more driven pulleys at one end of the pole, one or more free pulleys at the other end of the pole, one or more loops of chain that travel around the pulleys and along the length of the pole, and an attachment of the array or structure to be actuated, to the loop or loops of chain or cable.

Chain may be preferred because it can be driven without slippage with only a partial wrap around a driven pulley, i.e. a chain sheave. A cable lacking regular geometrical features may be used, but requires extra measures to ensure that it will not slip on the driven pulley such as more than one wrap around the driven pulley, a pinch roller system, or other means of creating more friction or positive engagement.

Figure 40:
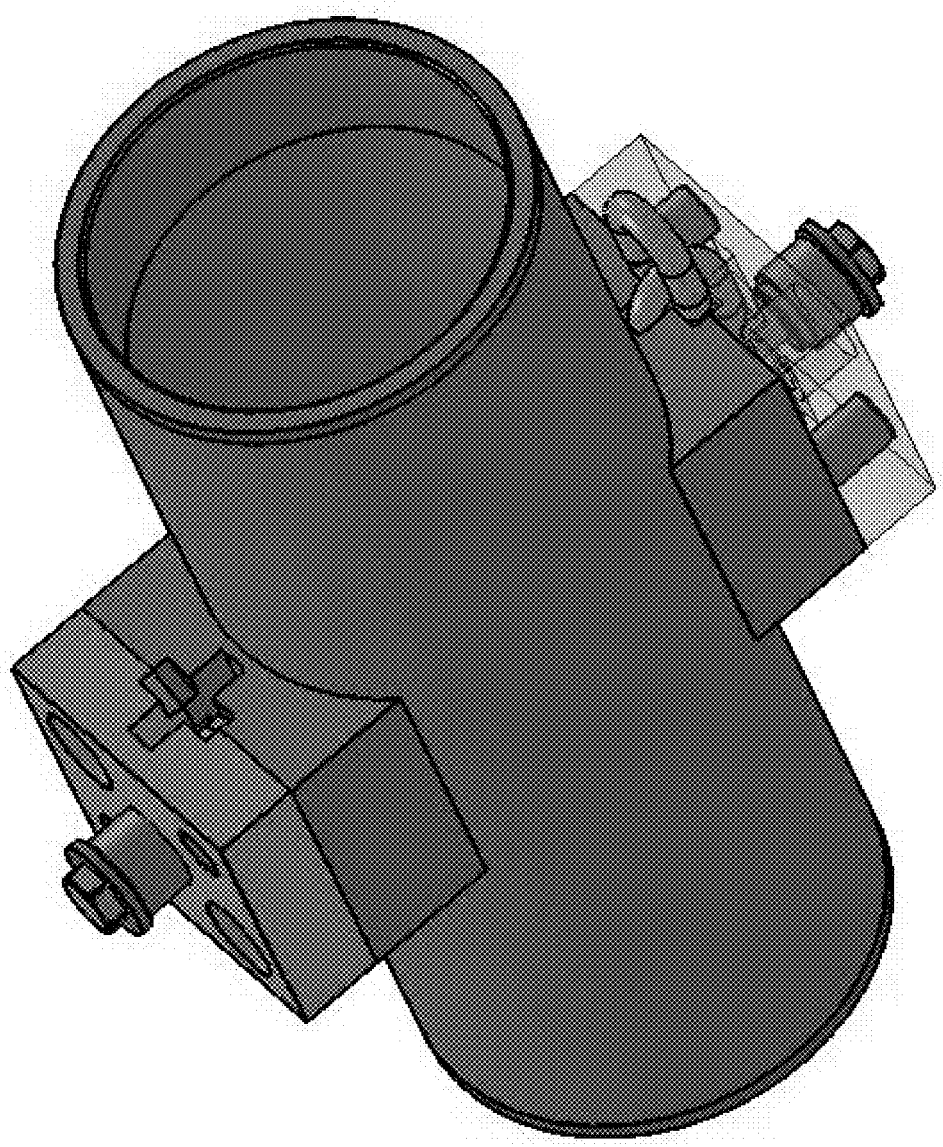
FIGS. 40 and 40A show one embodiment of a carriage and associated components that allow a chain to be fastened to the carriage on opposite sides
Figure 40A:
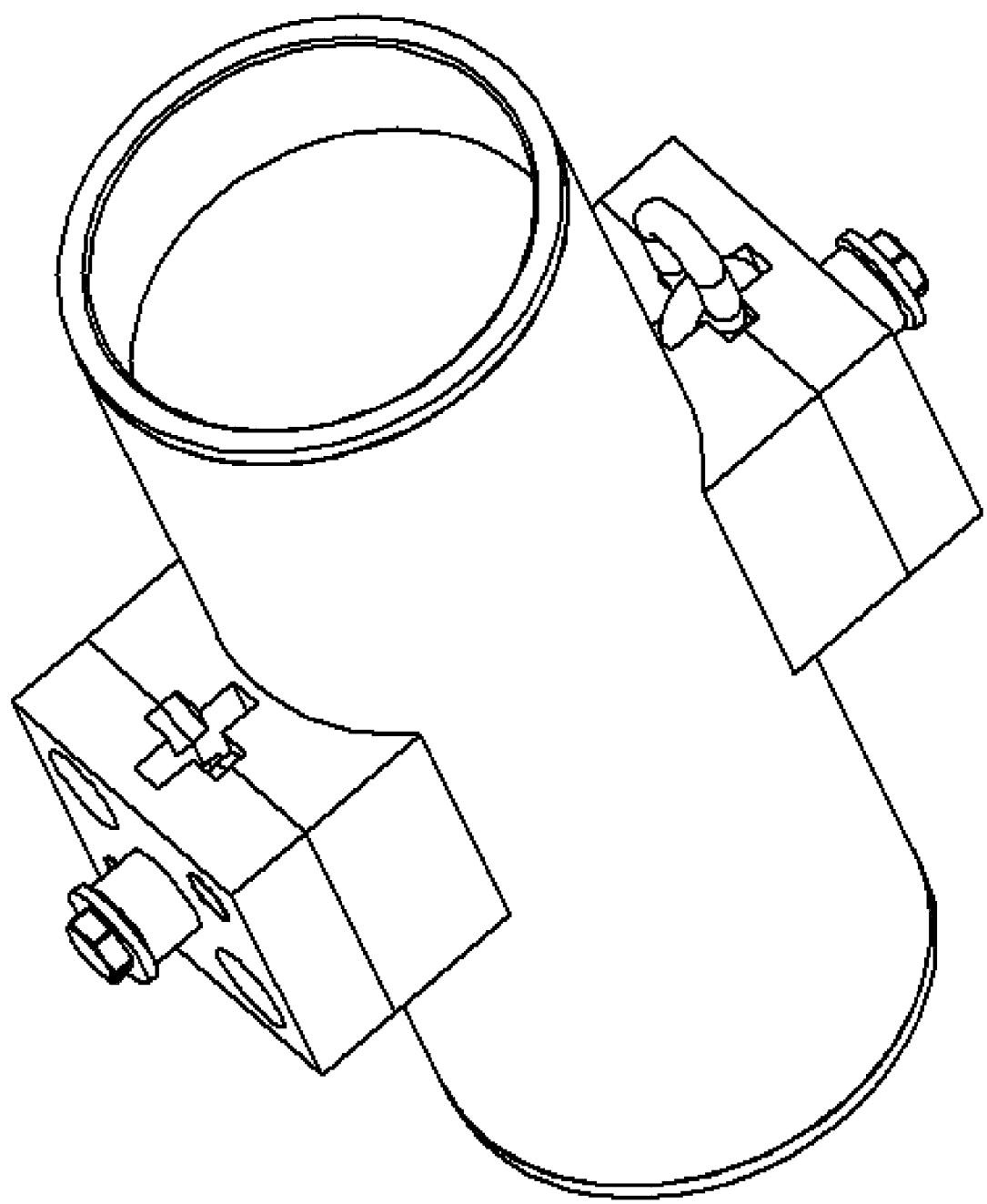
Figure 41:
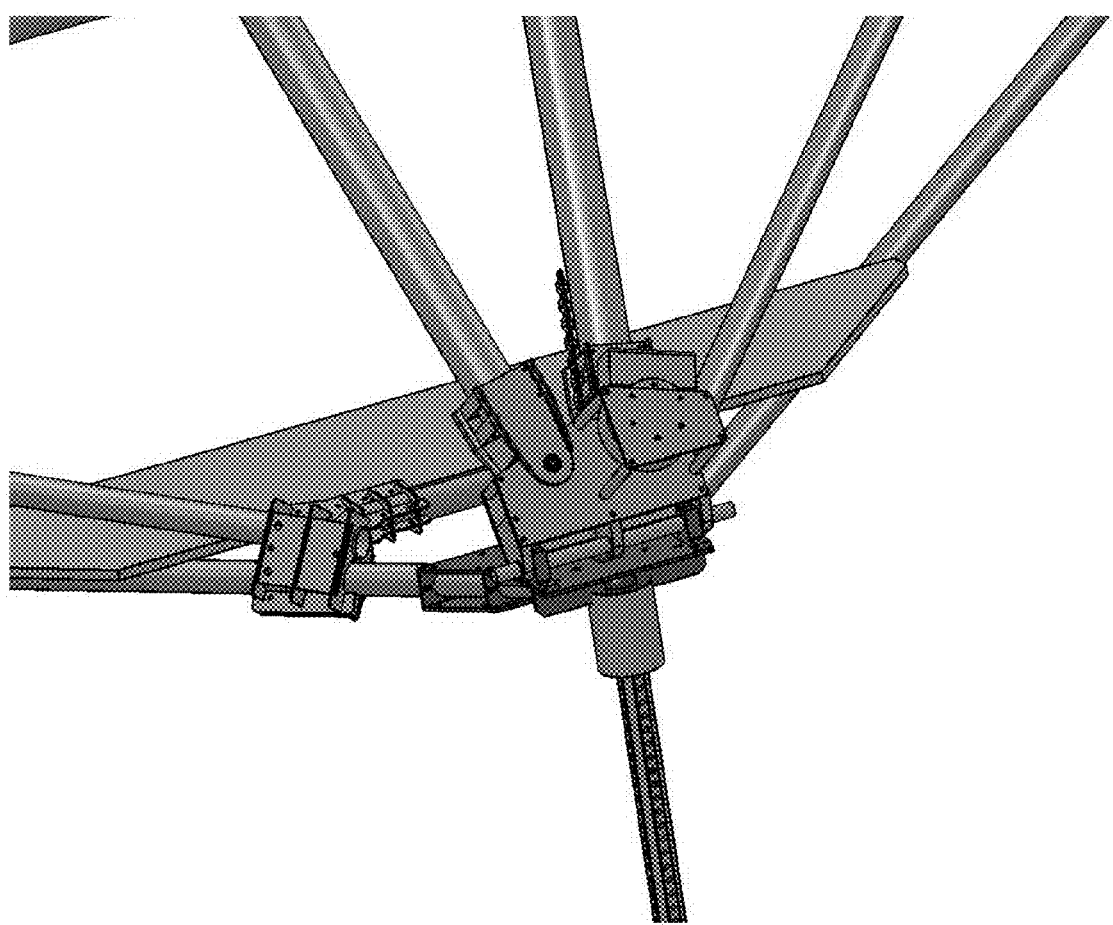
FIGS. 41, 41A, 42, and 42A show an embodiment of a base frame, ball-and-socket joint and connection to elevation actuator pole assemblies which places the pivot axes in close proximity.
Figure 41A:
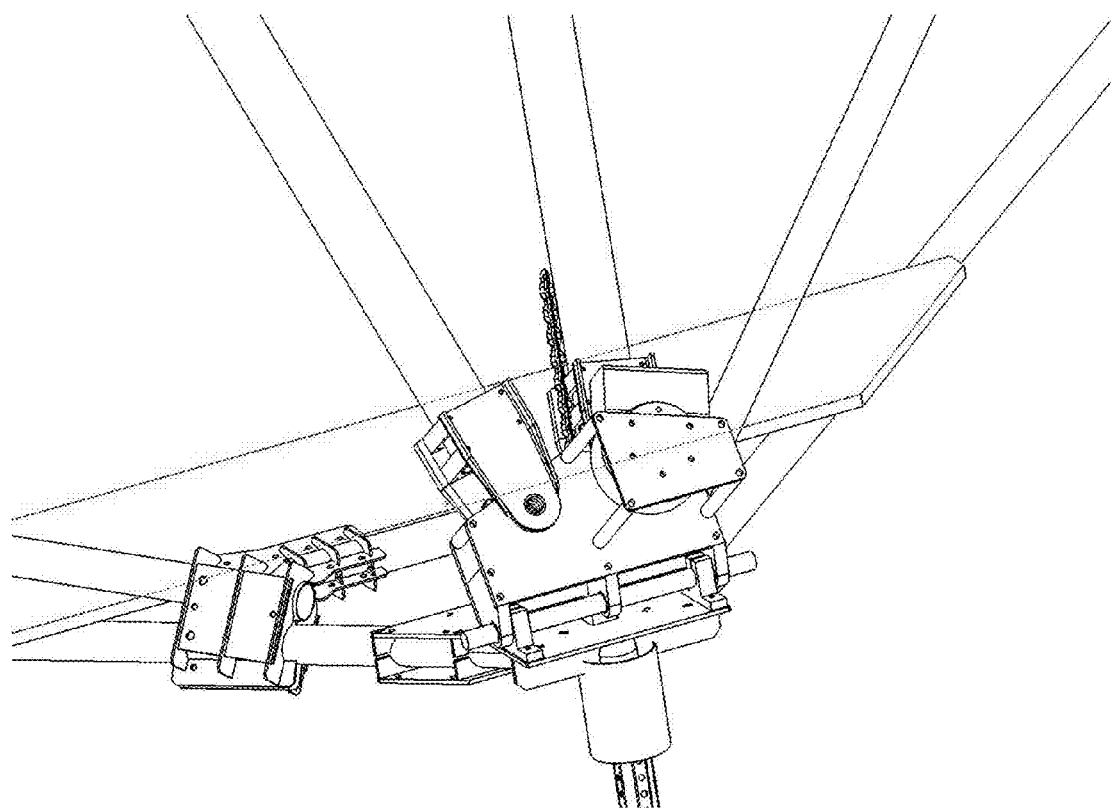
Figure 42:
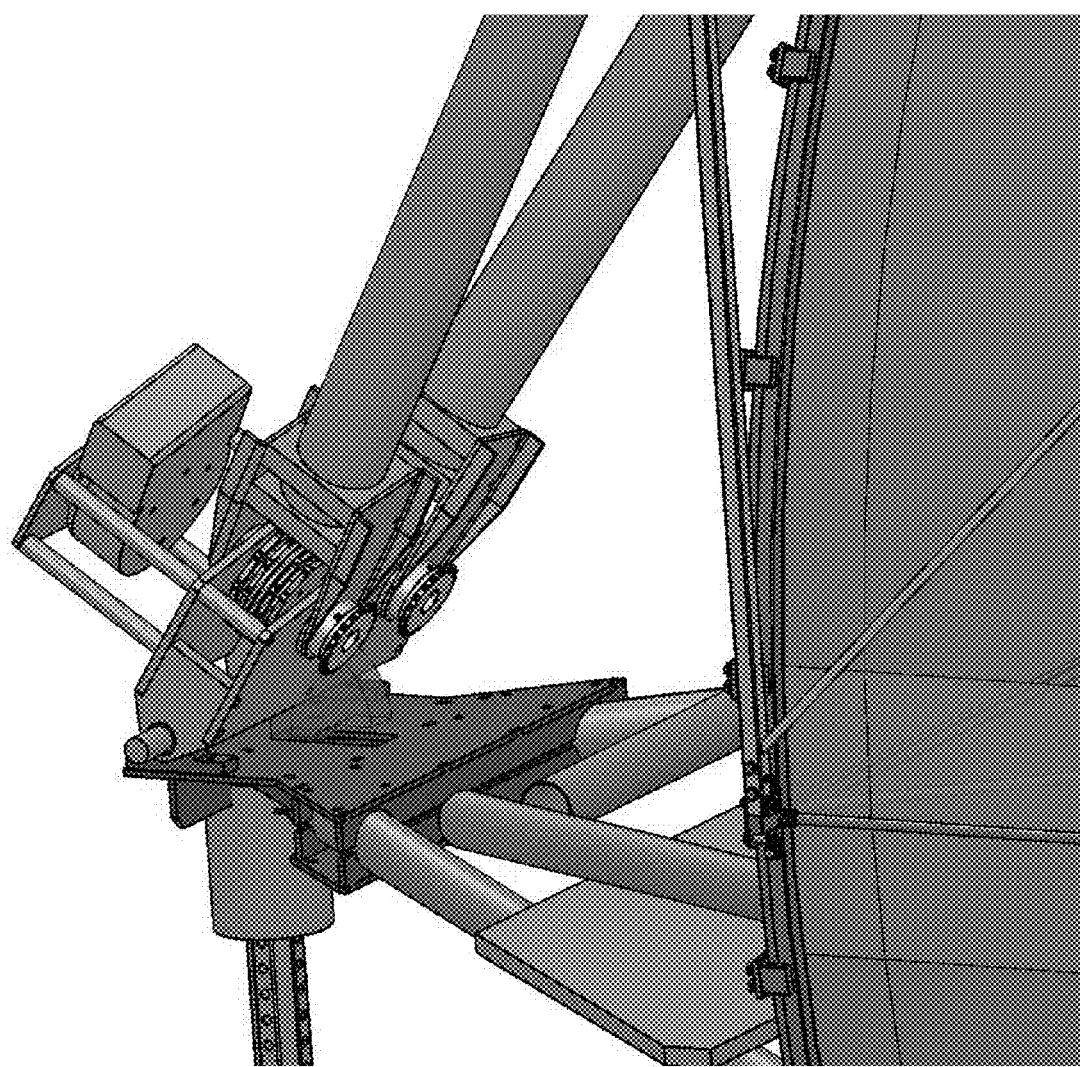
Figure 42A:
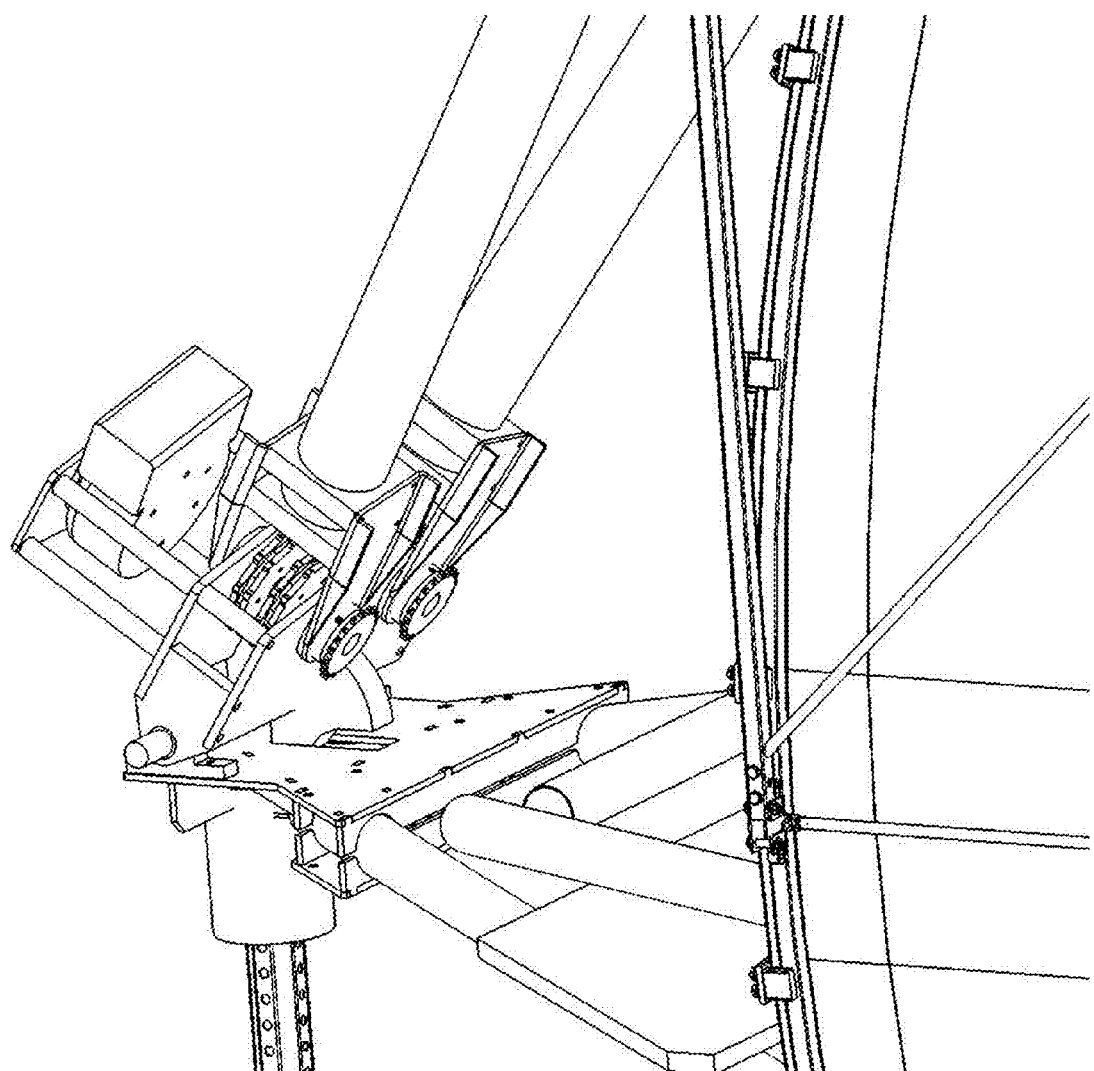
Figure 43:
FIGS. 43, 43A, 44, and 44A show views of an embodiment of an elevation actuator.
Figure 43A:
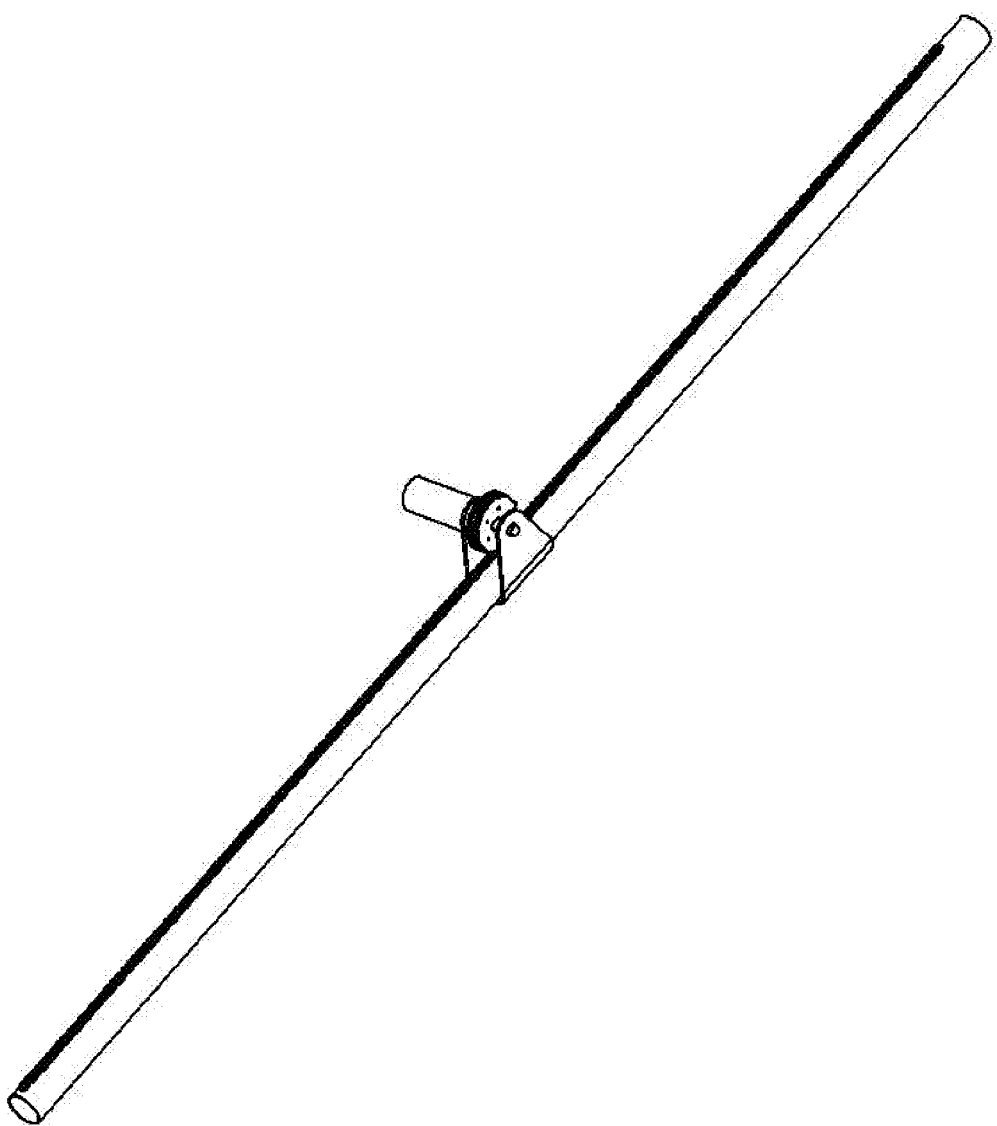

FIGS. 40 and 40A show one embodiment of a carriage and associated components that allow chain to be fastened to the carriage on opposite sides. The carriage could be driven by a single chain, but an embodiment that attaches to two loops of chain so that it is pulled from both sides may offer the potential advantage of creating equal loads on both sides of the pole and therefore minimizing the bending/buckling moment applied to the pole.

FIGS. 41, 41A, 42, and 42A show the attachment of the actuator pole assemblies to the base structure. Also shown are roller chain cogs used to couple the lifting chain sheaves together (the roller chain is not shown).

Climber: Pole, Rack, and Climber Gear

FIGS. 43, 43A, 44, and 44A show one embodiment of an elevation actuator, long travel lifting assembly, that can be manufactured for very low cost and which is a variation of a rack and pinion mechanism. This form of elevation actuator will be referred to here as a "Climber" mechanism.

Conventional rack and pinion systems at the scale required to actuate large solar arrays (typically 10 to 60 ft across), are quite expensive because of the cost of manufacturing of the large gear and long sets of mating linear gear teeth (rack). Embodiments reduce costs by using a chain as the rack, and a simple, low precision chain sheave in place of the mating pinion gear. This latter element will be referred to here as the pinion, and may represent a chain sheave, pinion gear, friction roller or other component that translates rotary motion to linear motion.

Figure 44:
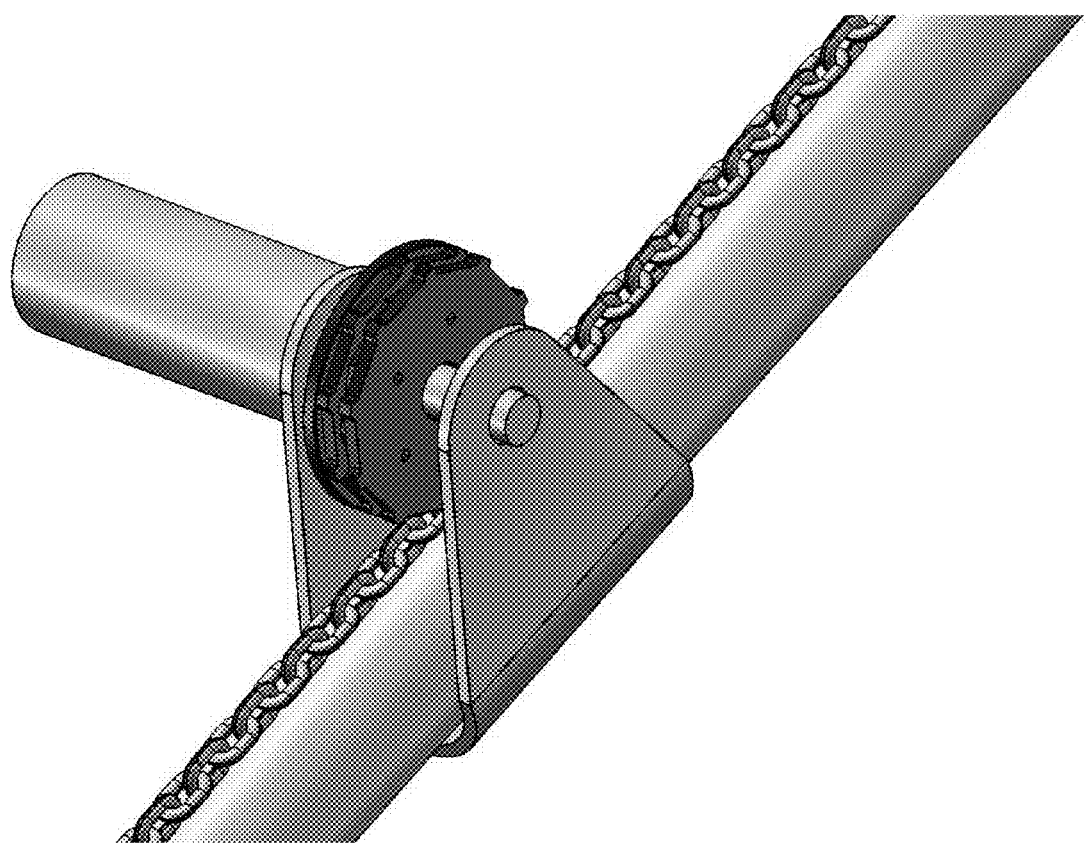
Figure 44A:
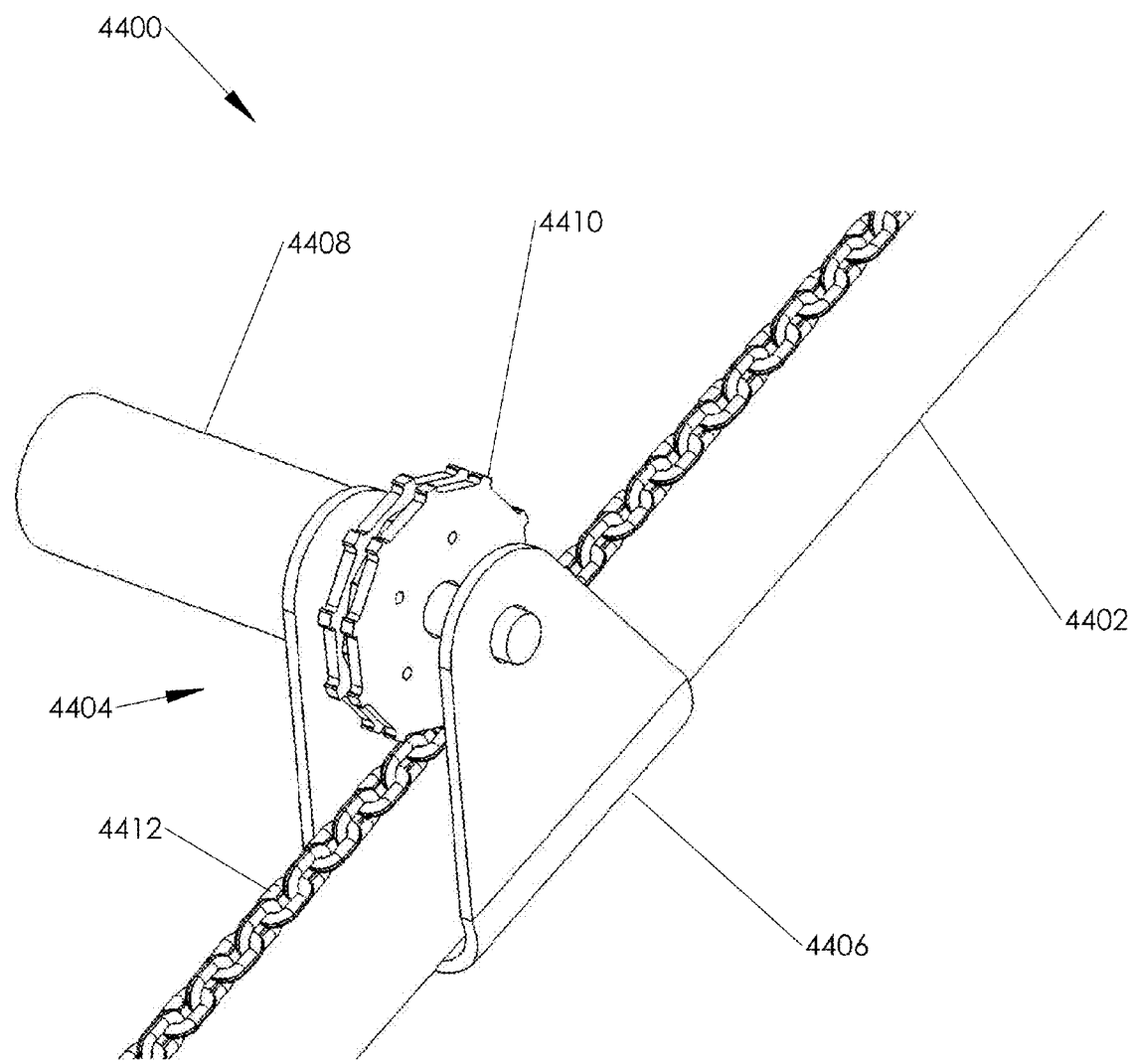

There are several options for creating a low cost rack. These include but are not limited to lifting chain, wire-link chain, roller chain, bicycle chain, other types of chain, wire cable with index features such as molded on or crimped on blocks or spheres or the like, rope with similar indexing features, formed sheet metal linear gear teeth, a sheet metal strip with punched holes, other formed sheet metal shapes and the like. FIG. 44A shows a linear actuator 4400 comprising a drive system 4404, a pole 4402, and a chain 4412 attached to the pole. Drive system 4404 comprises a yoke 4406, a motor 4408, and a chain sheave 4410 which is driven by the motor. FIGS. 43, 43A, 44, and 44A show a lifting chain, but other alternative components can accomplish this function.

Chain sheaves can be inexpensively fabricated because they may not require tight tolerances. Some low cost ways of manufacturing inexpensive, durable chain sheaves are: 1) fabricate several shapes from flat plates and attach them together with pins, screws or the like to form a layered chain sheave; 2) sand casting with little post machining required.

The cable runs along the length of a primary structural member such as a tube or pole, and may be fastened to the pole at the top end or may be fastened to the pole at intervals or may be fastened continuously along the length of the pole. The tube or pole can be made of inexpensive, low precision material such as EMT.

A carriage apparatus travels along the length of the pole. The carriage may be attached to the chain sheave or pinion via a shaft and rotational bearings. The chain sheave may be driven by a motor and gear reduction transmission or other driving apparatus (not shown in the figures).

The Climber mechanism functions as follows. When the driving apparatus applies a torque to the pinion, the pinion turns and climbs the chain. The carriage is attached to the pinion and is therefore caused to controllably move along the pole. If a structure or panel is attached to the carriage, it will be caused to move or rotate when the carriage moves. In an embodiment where two poles each with its own carriage and pinion are used, each may also have its own motor and transmission (power unit), or the two climber mechanisms may be driven by a single power unit linked via shafts, belts, chains, universal joints or other transmission components.

Additional variations of embodiments of a Climber mechanism are possible. Certain embodiments may include a rack that is integral to the pole. This can be accomplished by forming rack teeth, holes or some other repeated locating feature along some portion of the length of the pole, possibly in the pole material itself. The pinion would engage these rack features as it rotates.

Another embodiment of a Climber mechanism features a configuration wherein the pinion creates driving force against the pole via friction. This concept would not require a rack with teeth.

Worm Climber

Figure 45:
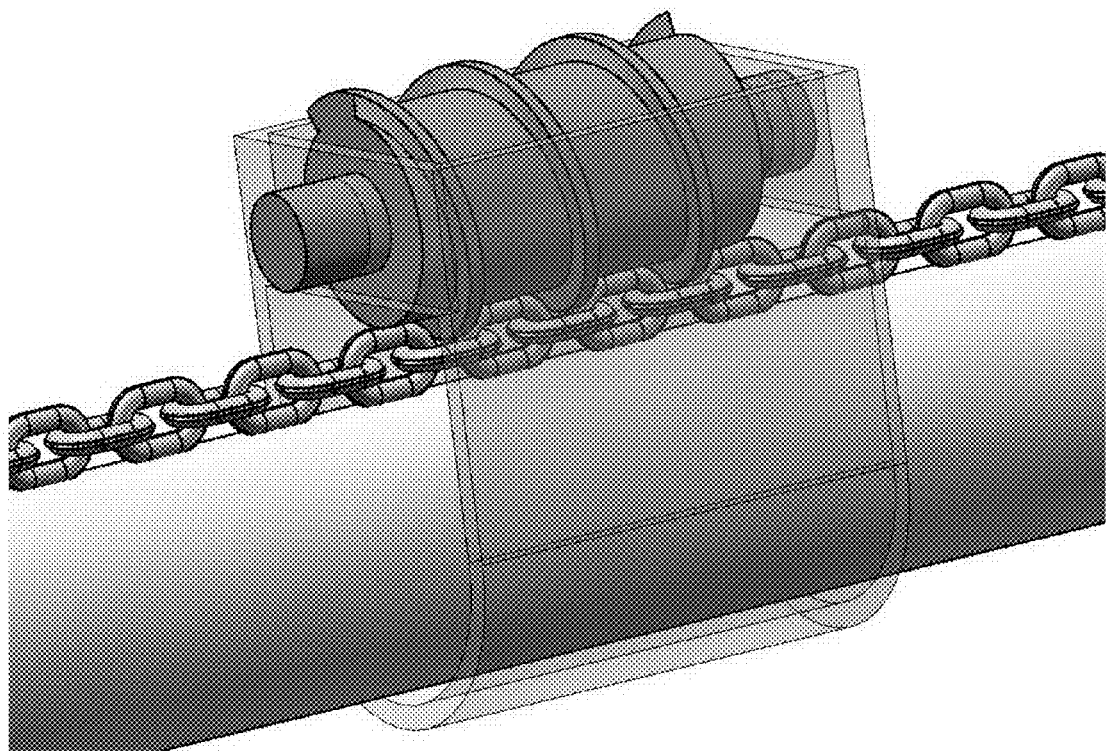
FIGS. 45 and 45A show views of an embodiment of an elevation actuator.
Figure 45A:
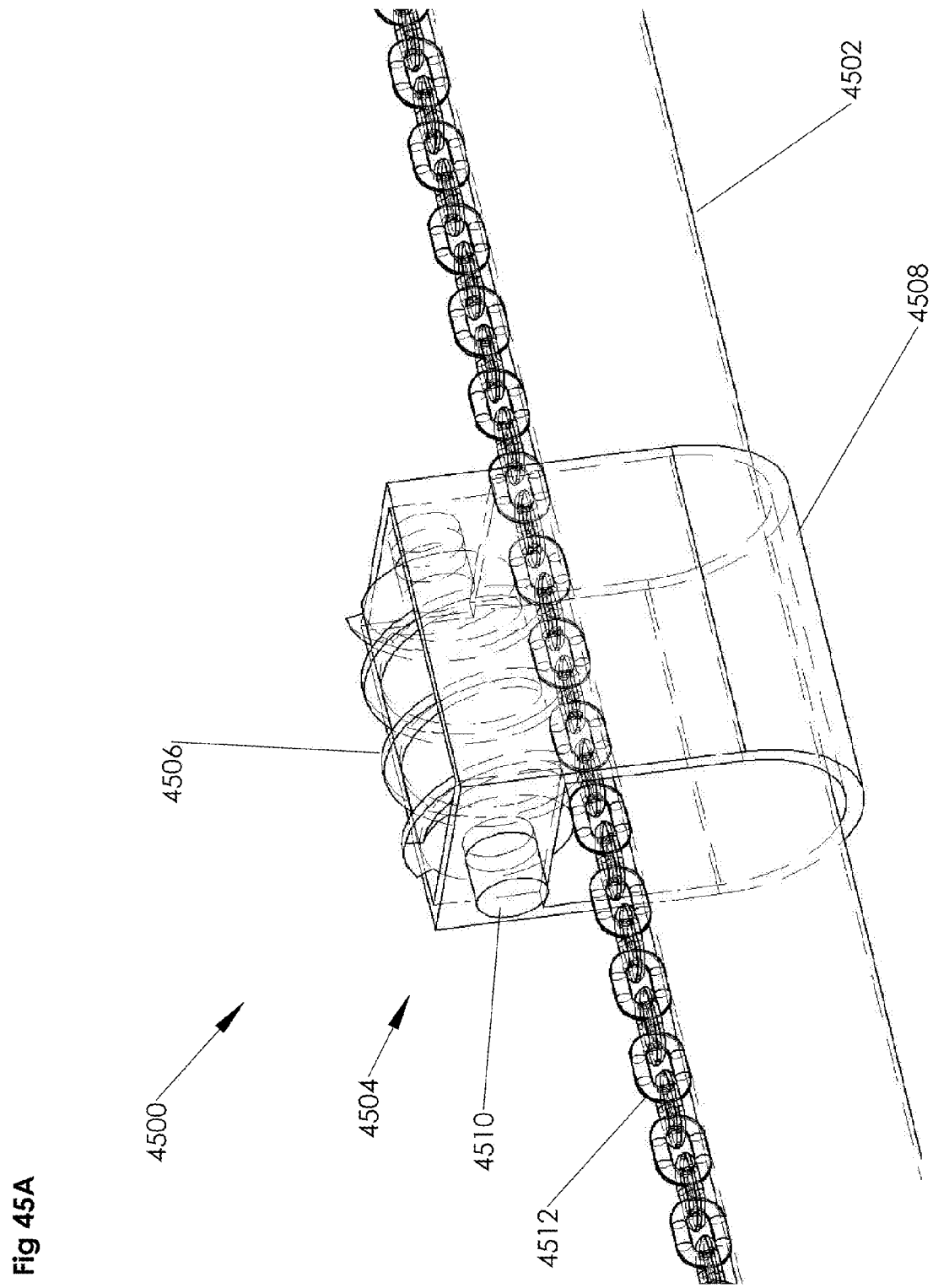

FIGS. 45 and 45A show another embodiment of an elevation actuator for long travel lifting, which uses a pole, a rack component, a carriage and a worm gear. This type of mechanism will be referred to here as a "worm climber" mechanism.

The rack component has repeated location features such as teeth, holes, ridges, bars, links or the like. While conventionally machined metal toothed racks are very expensive, there are other lower cost ways of accomplishing a similar function.

FIG. 45A shows a linear actuator 4500 comprising a pole 4502, a yoke 4508, a worm gear 4506, a shaft 4510, and a chain 4512, such that rotating the worm gear causes a carriage 4504 to climb the pole. FIGS. 45 and 45A show a chain which serves the function of the rack, but other components can be used to accomplish this function. The function of a rack can be accomplished using a chain such as lifting chain, roller chain or other types of chain, molded rack teeth made of plastic, metal, composite or other materials, formed sheet metal, punched sheet metal and other low cost methods.

The worm gear function may be accomplished by using several types of components including traditional machined worm gears, as well as lower cost components such as screws, cylinders with formed threads, spiral wound rod, wire, bar or other section, a central spindle with surrounding spiral feature, a component made of molded plastic, metal, composite, ceramic or other material, or other component with a helical feature suitable for applying force to the rack.

In an embodiment of the worm climber mechanism, the worm gear is attached to the carriage via a rotational bearing such that it can transmit axial forces to the carriage while it rotates and is constrained so that it cannot move out of contact with the rack. The worm gear is controllably rotationally driven by a motor or transmission apparatus (not shown in the figures). The worm gear engages the rack such that when it rotates it also pushes axially on the rack and creates a translation or controllable variable axial position which relates directly to its rotational position.

One advantage of a worm climber is that it provides an additional gear reduction stage at the worm gear itself, because a helical element can generally be arranged to have a lower ratio of linear motion to rotational motion compared to a pinion of similar dimensions and load capability. Another advantage of a worm climber is that it can be easily and reliably made to be non-back-drivable. This is a helpful safety feature for large solar collectors.

A worm climber may also limit the total backlash or play in the motion of the structure or panel to the linear play or backlash of the worm. Thus, backlash in other parts of the motor or transmission system do not add to the backlash or play of the structure or panel under wind loads that vary in direction and magnitude. Significant cost savings can thus be achieved because lower precision transmission components can be used. Non back-drivability of a worm climber also limits the shock load forces transmitted to the rest of the transmission which saves cost and weight because other transmission components do not need to be designed to handle these shock loads.

Pole Leadscrew

FIGS. 46, 46A, 47, 47A, 48, and 48A show another embodiment of an elevation actuator for long travel lifting, which uses a pole, a helical drive component or feature, and a nut or other component that rides on the helical drive component. This type of mechanism will be referred to here as a "pole leadscrew" mechanism.

Leadscrews are currently commercially available. However, for long travel, low precision applications can reduce costs substantially compared to currently available components.

Specifically, leadscrews commonly have a cut, ground, or formed thread on the outside of a shaft. For long (typically 6 to 60 feet) travel applications with high loads, conventional leadscrews become expensive, because to support the required axial loads without buckling, the shaft or leadscrew must have a large diameter. Both the raw material cost and the cost of creating the thread feature become high.

Embodiments of a pole leadscrew reduce cost by using a central pole or tube made from inexpensive mass produced material such as Electrical Mechanical Tubing (EMT). This saves weight and cost because it is a thin wall, hollow member.

Control of large solar collector arrays may be considered low precision if actuation is done from the edge of a large structure. For example, a tight angular tolerance such as about +/−0.1 degrees, can be achieved with a very loose linear actuator position tolerance such as about +/−0.4 inches.

For low precision applications such as elevation axis actuation of solar collectors, a sufficiently precise helical element can be created via several low cost, low precision methods. Examples of methods of creating a low cost helical element include but are not limited to wrapping or forming wire, rod, bar sheet metal or other material into a helical shape. This can be done by creating the helical shape and then attaching it over the pole or it can be done by wrapping it around the pole directly.

The helical component can be attached to the pole via welding, gluing, fasteners, rivets or other attachment methods. A helical feature could also be molded onto a pole (insert-molding).

As an alternate to creating a helical component, a helical feature can be created as part of the pole itself. Methods of creating helical features include but are not limited to rolling, stamping, forming a feature into a flat strip and rolling or rolling and twisting the strip to create the pole with integral helical feature, welding, molding the feature as part of a molded pole and machining, or grinding, among other methods.

The function of the pole leadscrew actuator mechanism is as follows. The nut is constrained within or attached to the structure to be moved. The helical element is arranged to be substantially concentric with the axis of the pole. That is, the helical element wraps around the pole and is fixed to the pole at one or more locations, so that the pole and helical element move together in unison. The pole and helical element engage the nut so that the helical surface of the helical element engages a drivable feature in the nut, which may be in the form of a helical surface or a non-helical surface such as a cylinder. This results in linear motion of the nut along the axis of the pole when the pole is rotated.

Figure 46:
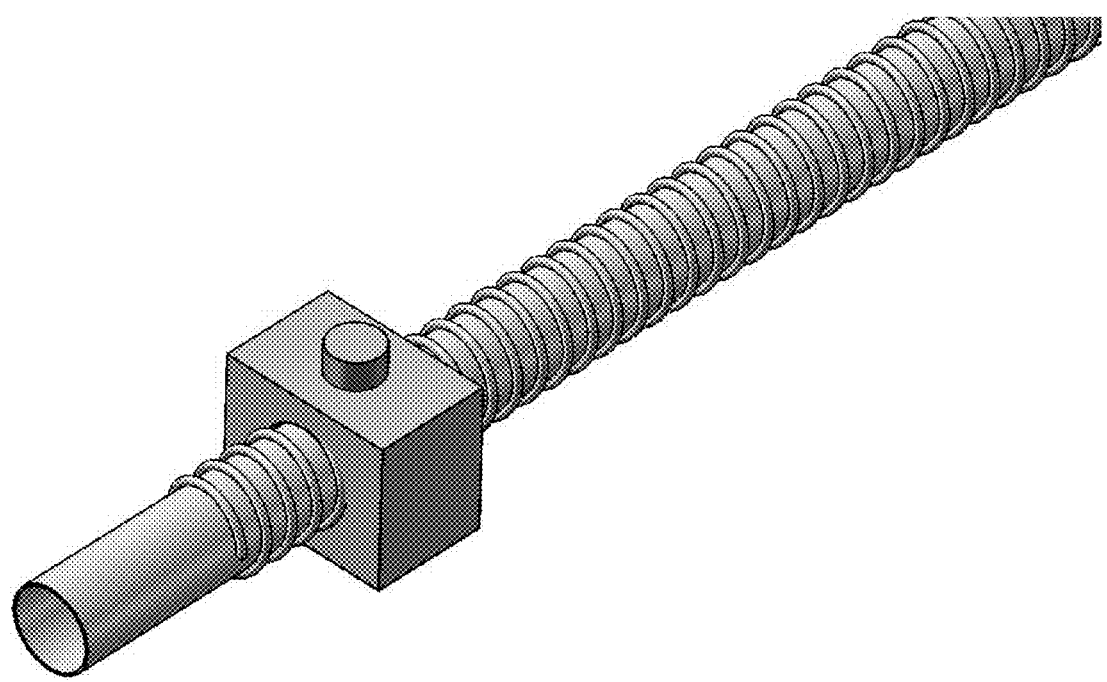
FIGS. 46, 46A, 47, and 47A show views of an embodiment of an elevation actuator.
Figure 46A:
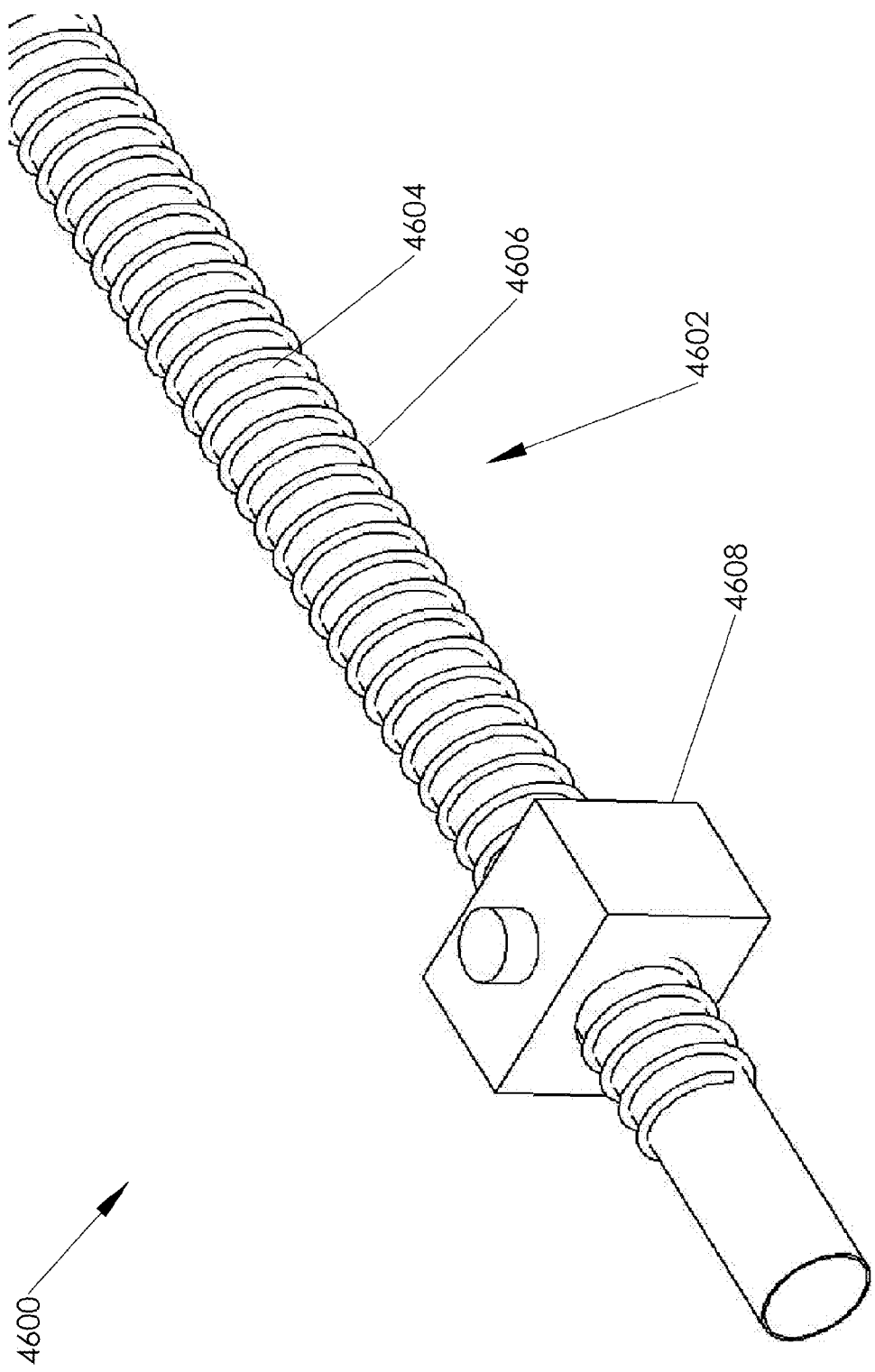

FIG. 46A shows an embodiment of an inexpensive leadscrew actuator 4600. A carriage 4608 is threaded to mate with a pole assembly 4602 comprising a helical feature 4606 which is attached to a pole 4604 such that when pole assembly 4602 is rotated, carriage 4608 moves linearly along the pole assembly.

Figure 47:
Figure 47A:
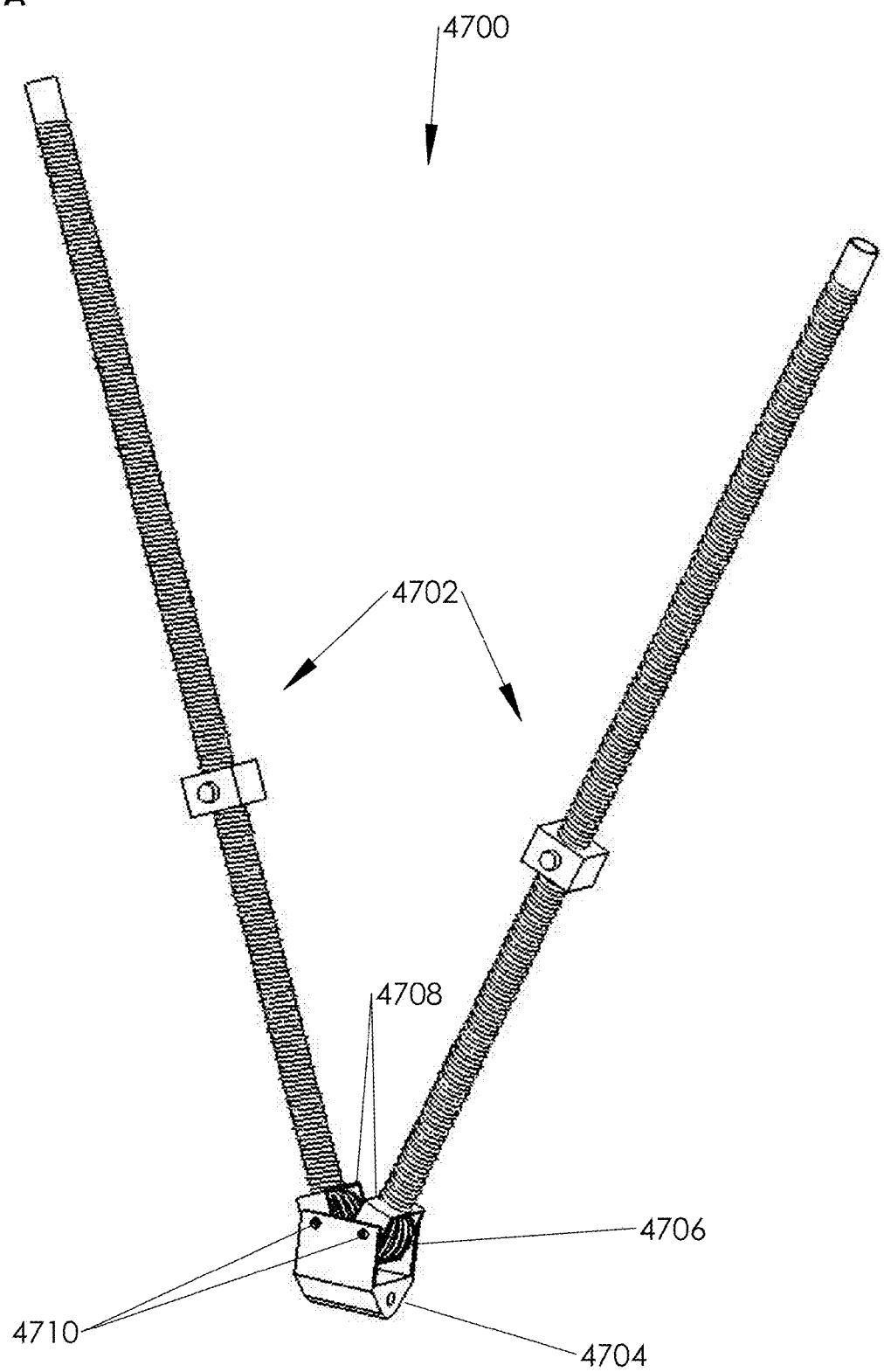

FIGS. 47 and 47A show one embodiment of this elevation actuator system 4700 which uses two pole leadscrew assemblies 4702 similar to those described above. Leadscrew assemblies 4702 are constrained by yokes 4708 and base 4704. Spherical gears 4706 cause the leadscrew assemblies to be rotationally coupled. Pivots 4710 allow yokes 4708 and the leadscrews to rotate with respect to the base. This system is configured such that both poles turn at the same rate in opposite directions. If the poles turn in opposite directions the helixes should be opposite. If the poles are geared to turn the same direction the helixes can be the same.

Figure 48:
FIGS. 48 and 48A show an embodiment of spherical gears which rotationally couple two poles evenly as the angle between the poles changes.
Figure 48A:
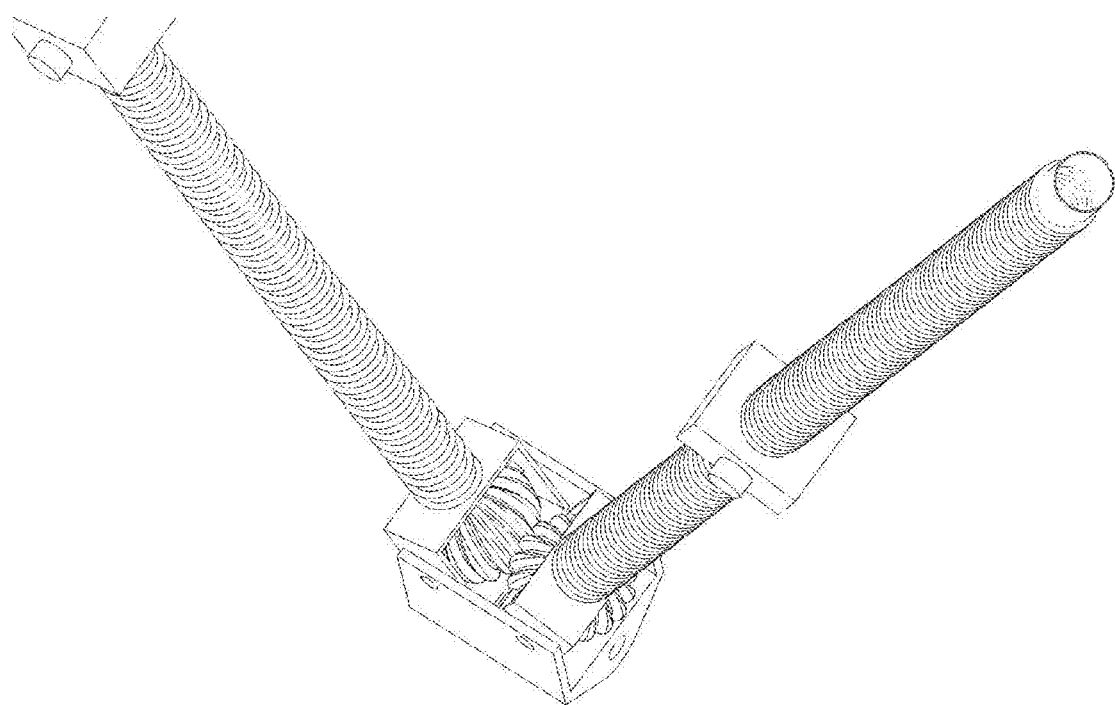

FIGS. 48 and 48A show spherical gears which rotationally couple the two poles even as the angle between the poles changes. Rotational coupling of the poles can be accomplished by other transmission components as well including gears, shafts, universal joints, chains, belts, flexible shafts and friction drives among others.

The poles are connected to the base structure (not shown in the figures) at their lower end via a rotational bearing so that the weight, wind, and other forces borne by the poles, are transmitted to the base structure substantially through the same point or member or the same general location on the base.

The connection of the poles to the base also allows limited rotation about two other axes. The nuts or carriages that travel along the axes of the poles are connected to the structure or panel to be moved, such that a limited amount of rotation about two axes relative to the structure or panel is possible in addition to the rotation of each pole about its own longitudinal axis. This configuration allows the poles and the panel or structure to form a triangular shape with a lower vertex where the poles join the base and upper vertices at opposite lateral sides where the carriages attach to the structure or panel. As the elevation actuator moves, the positions of both carriages relative to their respective poles change, which effectively changes the lengths of the lower two sides of the triangle. In an embodiment, the upper substantially horizontal side of the triangle remains the same length during actuation. In this way an efficient, cost effective actuator and structure are created. The actuators serve as part of a very stiff structure, and minimum material and cost are required as compared with conventional approaches for performing the same elevation actuation function.

While certain embodiments rotate both pole leadscrew poles at substantially the same rate so that both carriages move upward in unison, this is not required. In accordance with alternative embodiments, it would also be possible to control or rotate each pole separately potentially at a different rate, to correct warp of the structure or other tracking errors if desired. Each pole could also be driven by its own transmission, motor or power unit.

Winch/Brake

FIGS. 65 through 67A show another embodiment of an elevation actuator for long travel lifting which uses a pole, a pulley, a cable, a driving element in communication with the cable, a carriage, and a brake or ratchet mechanism. This type of mechanism will be referred to here as a "winch/brake" mechanism.

A simple winch and pulley system in which a winch at one end of a pole, pulls a cable that goes along one side of the pole (or through the center of the pole) over a pulley at the other end of the pole and back to a carriage, would work as a linear actuator. But, such a system offers a potential disadvantage that wind forces or other unbalanced forces could cause the structure, panel, or load being lifted, to move upward in an uncontrolled fashion if such forces exceed the fraction of the weight of the panel or structure that is being born by the carriage(s). This is because the cable or tensile element can only resist motion in one direction and the system relies on gravity to maintain cable tension and therefore position of the load.

Embodiments offer a solution to this problem allowing a simple winch, pulley, and cable system to function without danger of uncontrolled upward motion due to unbalanced external forces. Specifically, embodiments employ a brake or ratchet mechanism. Such a brake or ratchet could be actively controlled by the system, or it could be passive.

One embodiment of a passive brake system operates on the principle that when weight is applied to the carriage, the brake is off. A lever and pivot or other mechanism actuates the brake as soon as some fraction of the structure or panel weight is removed by wind or other forces.

There are many mechanisms that could accomplish this task. In one embodiment, the mechanism comprises a simple lever and pivot mechanism wherein the structure weight is applied to one end of the lever, the brake is actuated by the other end of the lever, and the pivot point of the lever connects the lever to the carriage.

Another embodiment of the mechanism uses the tension in the cable to keep the brake disengaged from the pole. FIGS. 65 through 67A show this embodiment. Specifically, winch 6500 drives cable 6502 around pulleys 6504 disposed on pole 6506. Carriage 6508 is slidably engaged to the pole. Carriage bears a weight (here generically indicated by weight 6510), which represents the weight of the collector and some portion of the support structure.

Figure 66:
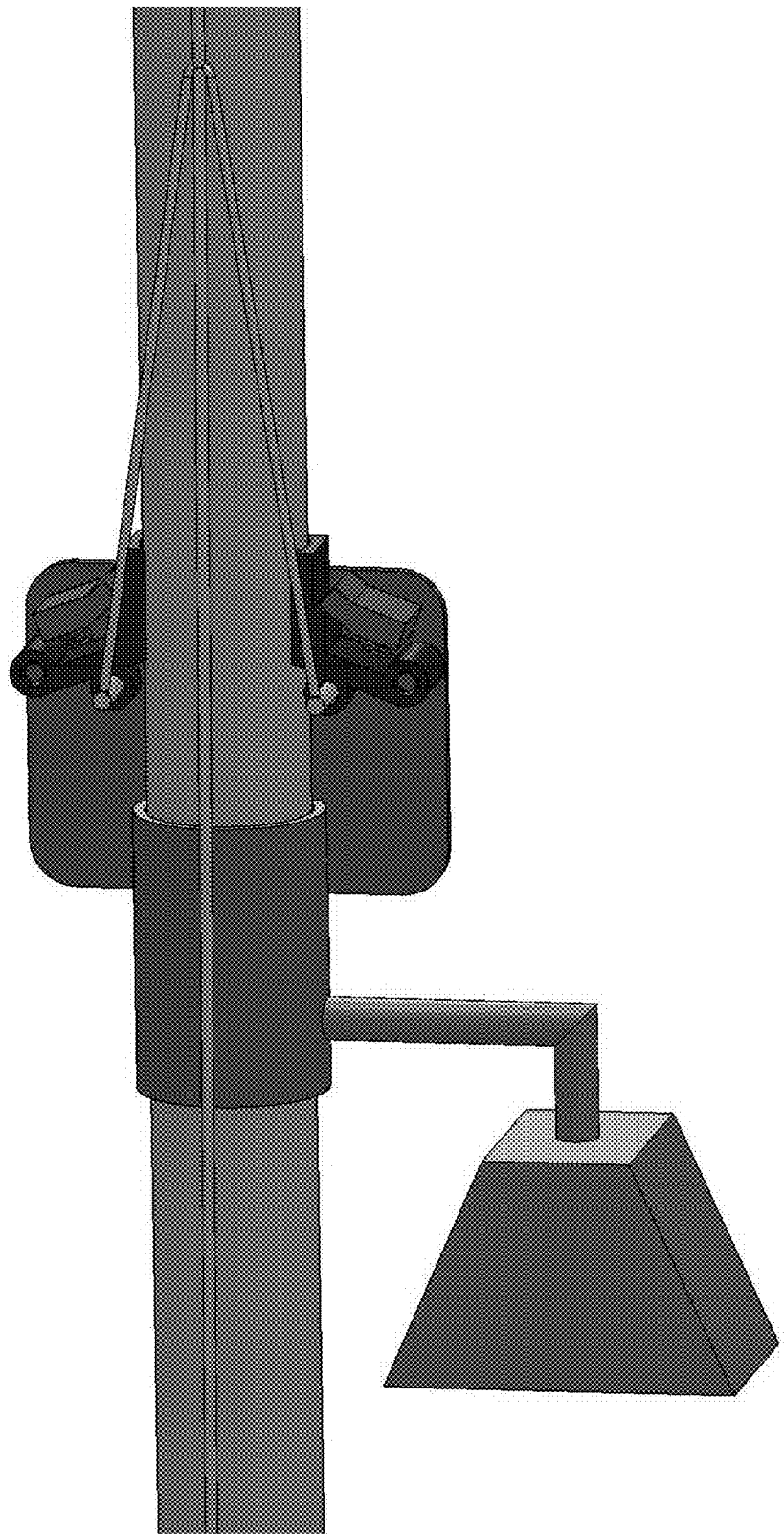
FIGS. 66-66A show a closeup view of a schematic brake system in a "winch-brake" linear actuator mechanism.
Figure 66A:
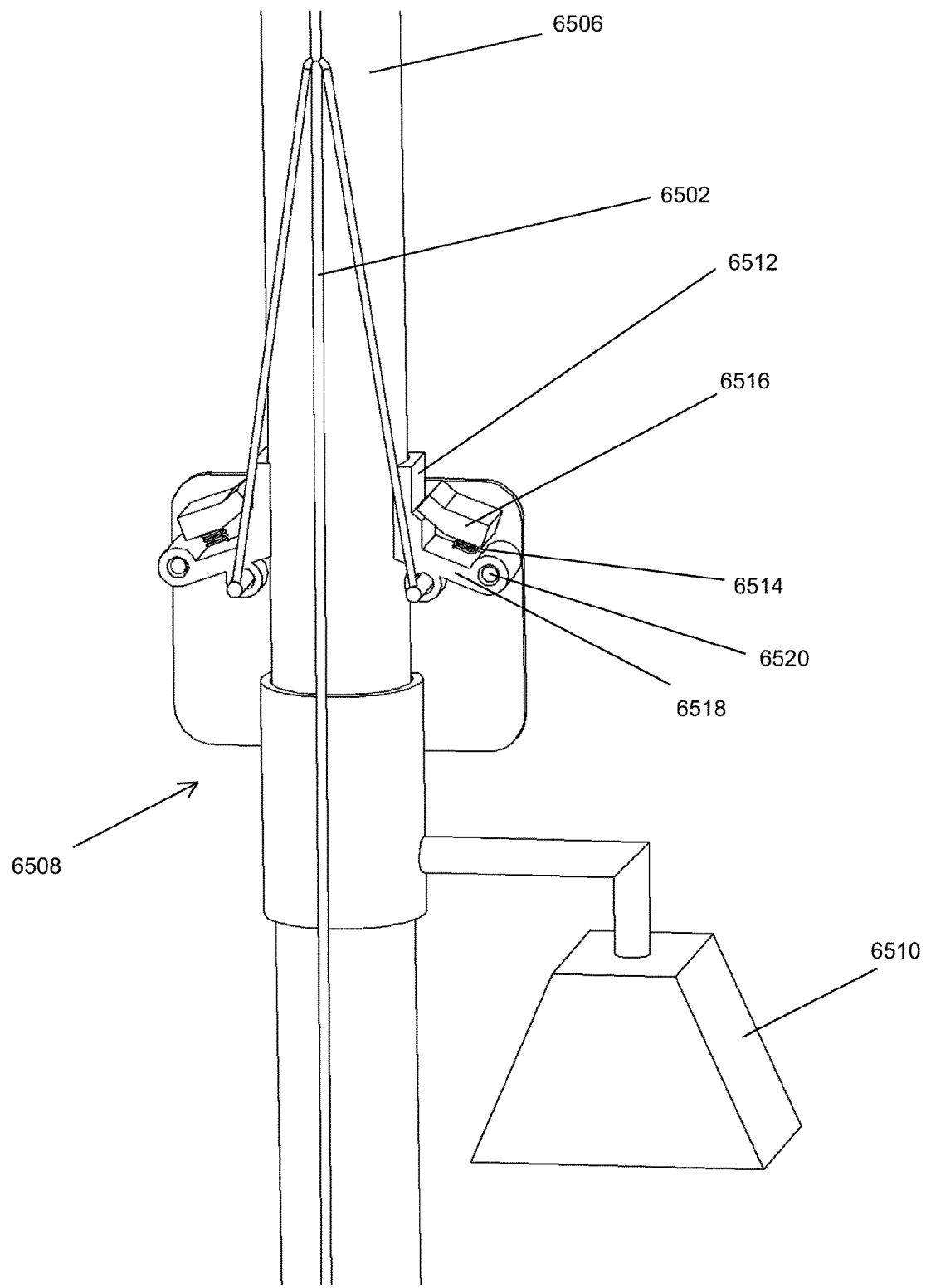
Figure 67:
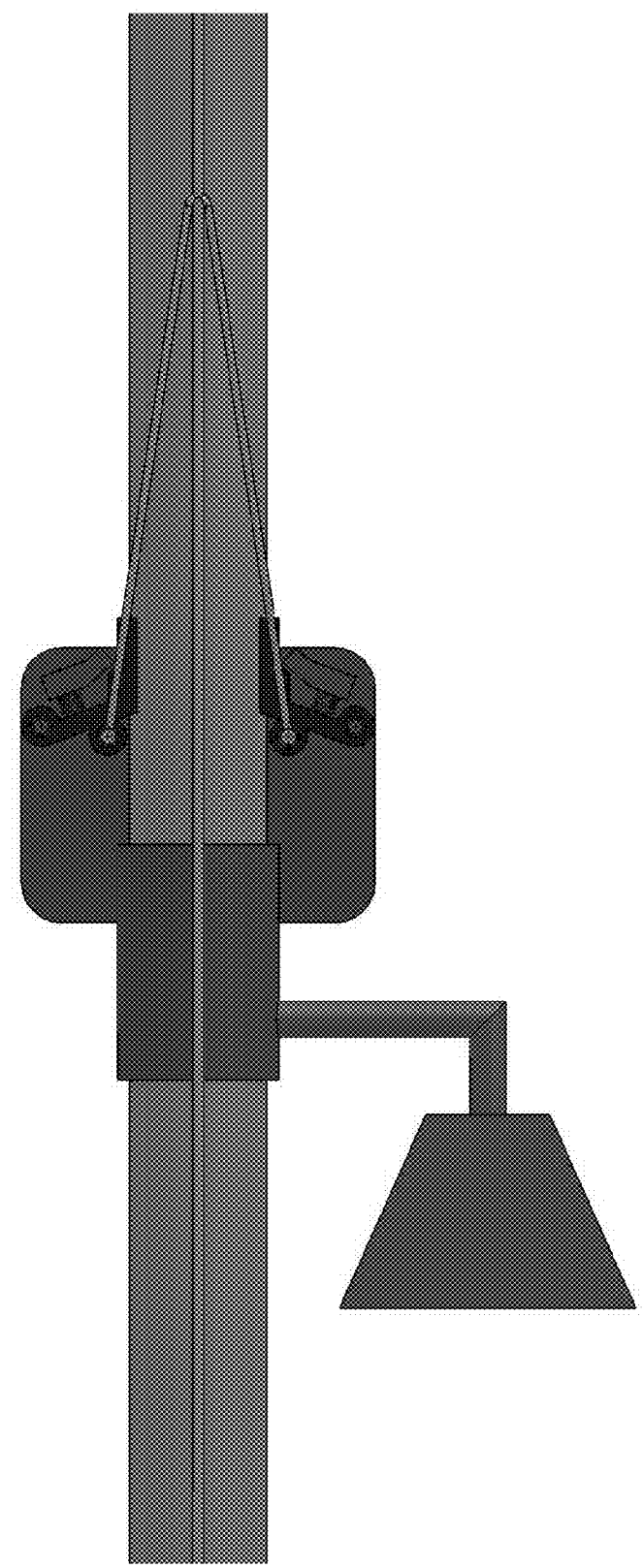
FIG. 67-67A show a closeup front view of a schematic brake system in a "winch-brake" linear actuator mechanism.
Figure 67A:
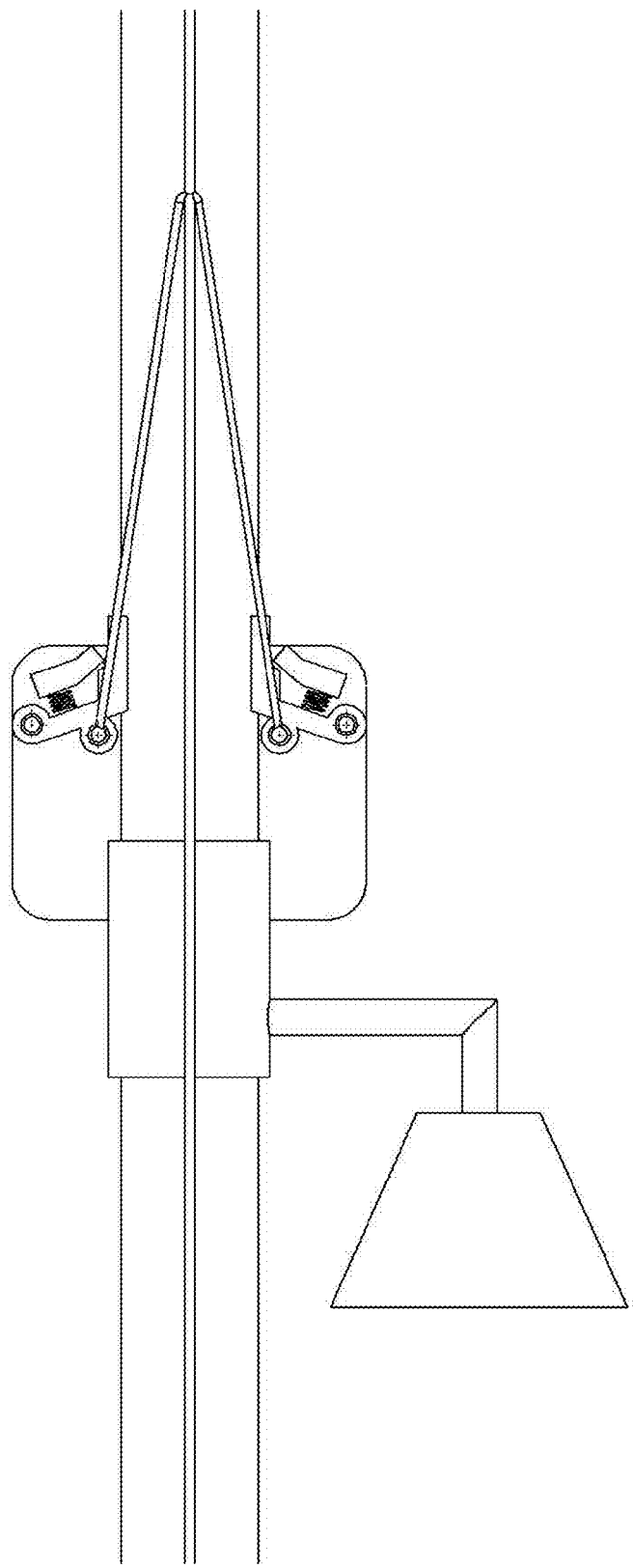

Whenever the tension in the cable is reduced (for example by wind forces), the brake 6512 becomes engaged. FIG. 66 shows a view of the same components with greater detail. In particular, one end of spring 6514 is in contact with boss 6516 of the carriage 6508. The other end of the spring is in contact with brake lever 6518.

Lessening of tension in the cable causes brake lever 6518 to pivot about pin 6520 that connects the lever to the carriage. The brake lever then engages the pole, halting upward movement.

In this embodiment, a spring is configured to provides the force of engagement. Alternative embodiments, however, could employ another mechanism providing force such as gravity to cause the brake to become engaged.

Elevation Actuator and Structure Architecture

For purposes of this discussion, an array of solar collectors is referenced here as the Array, and the system for articulating the array is referenced as the System. FIGS. 6 through 15A show one embodiment of a solar collector array and articulation system that illustrates one embodiment of the elevation actuator architecture.

Figure 6:
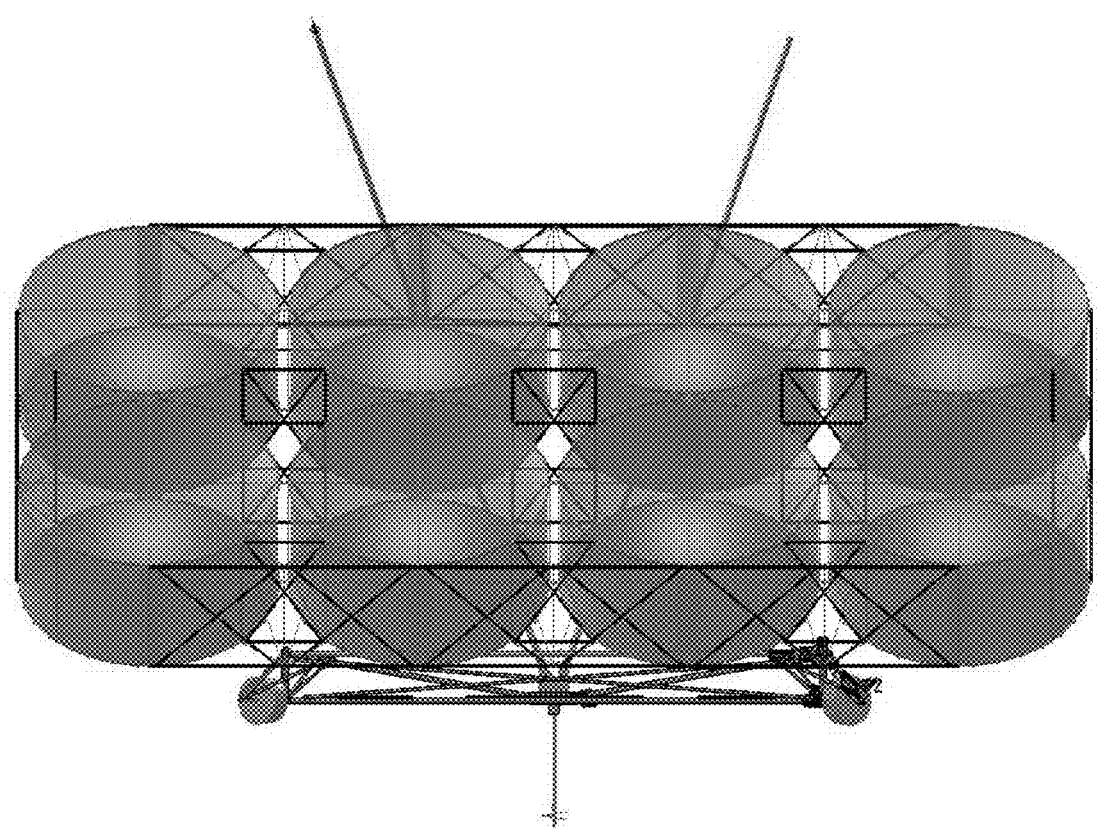
Figure 6A:
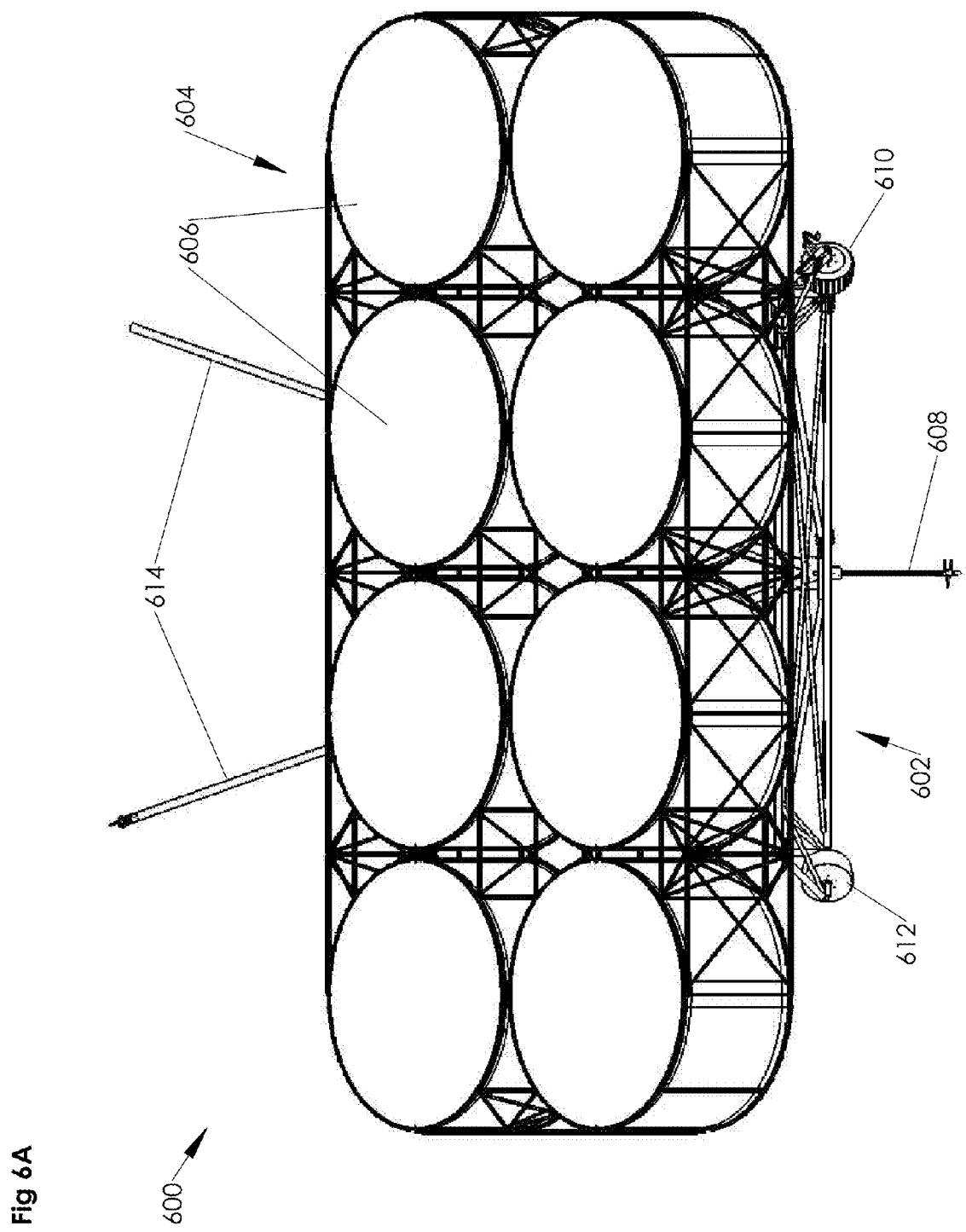

FIGS. 6 and 6A show a front view of the System with the Array elevated to 30 degrees from the horizontal. In particular, FIG. 6A shows a solar energy collector positioning apparatus 600.

A base frame 602 pivots azimuthally about a ground anchor 608. Driving forces to control azimuth motion of frame 602 are applied to the ground (not shown) via a drive wheel 610. A second wheel 612 may be passive or it may be driven. In this particular embodiment, a collector array 604 comprises 2 rows of four concentrators 606.

Other embodiments may use different numbers of concentrators or different array dimensions. Elevation motion of array 606 is controlled by elevation actuator poles 614 which transfer elevation actuation forces and other loads between frame 602 and array 604.

Figure 7:
Figure 7A:
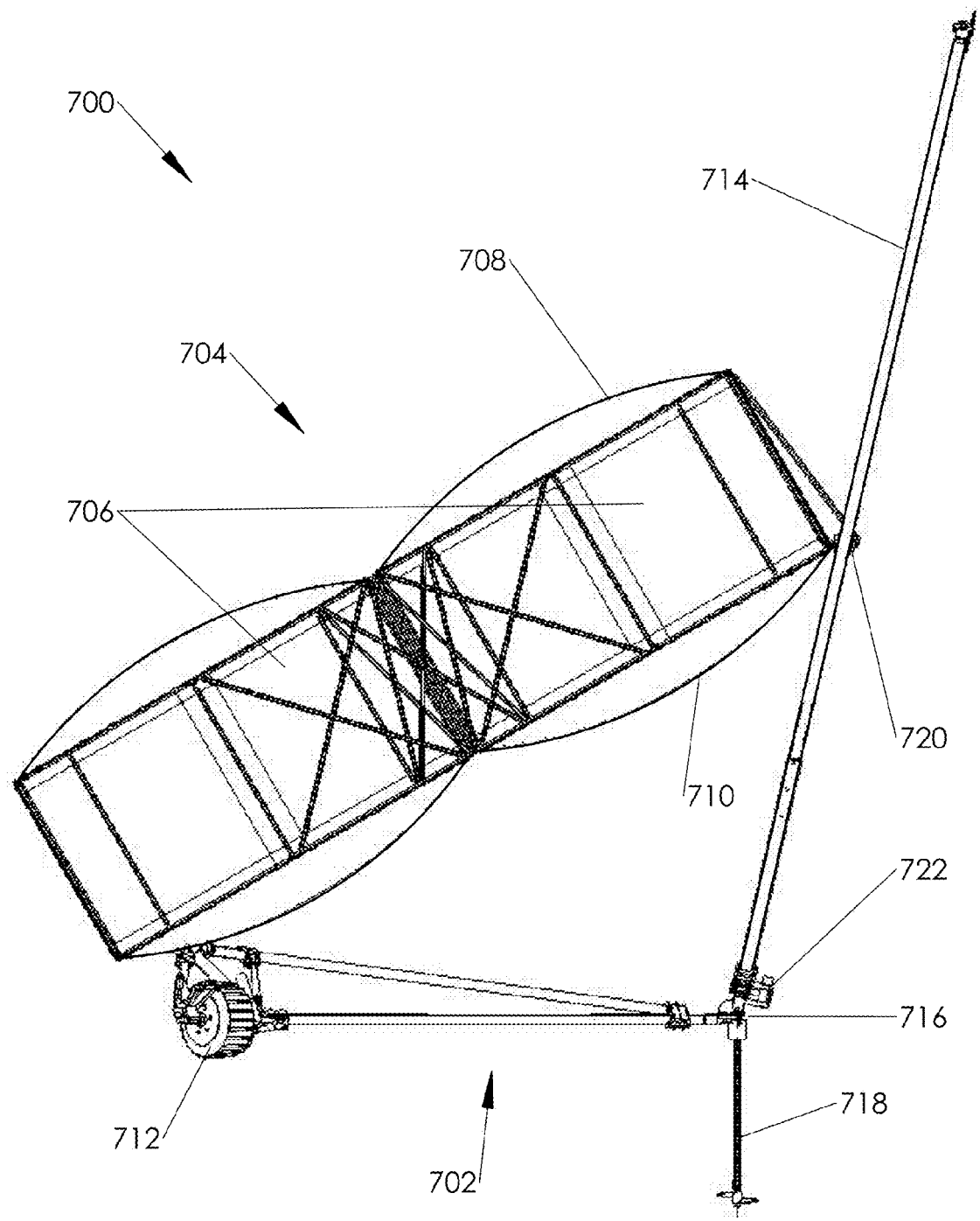

FIGS. 7 and 7A show a side view of a solar collector system 700 with the Array elevated to 30 degrees from the horizontal. In particular, FIG. 7A shows a ball joint or linkage 716 that connects a base frame 702 to anchor 718. Element 704 is an array of solar collectors 706 which have front clear films 708 and reflective back films 710. Element 712 is a drive wheel. Element 714 is an elevation actuator pole which moves array 706 via a joint 720. Element 722 is an elevation actuator drive system.

Figure 8:
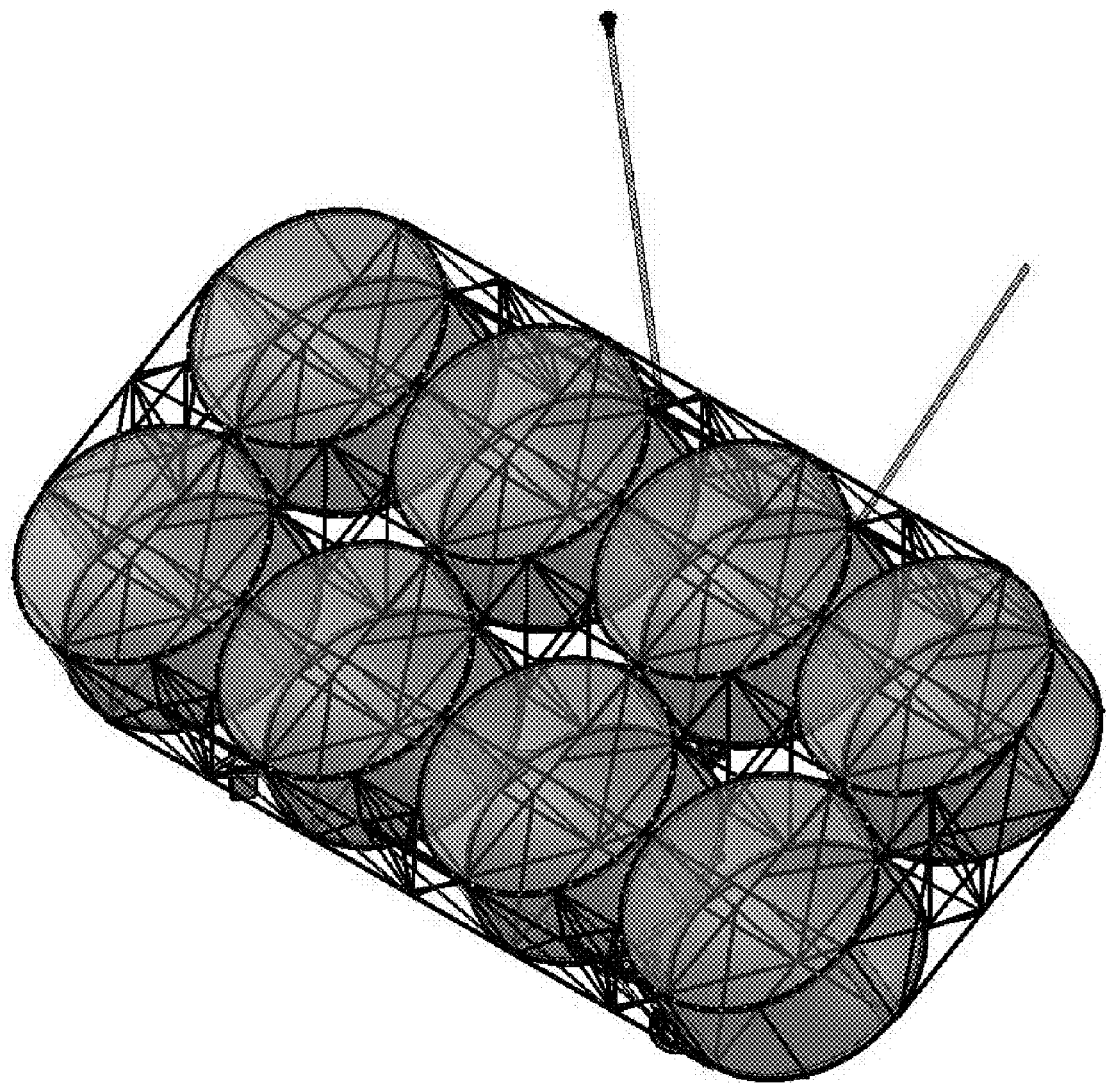

FIGS. 8 and 8A show an isometric view of a solar collector system 800 with the Array elevated to 30 degrees from the horizontal. An array 802 of solar collectors comprises individual solar collectors 804 joined together by an interconnecting framework 806. Array 802 is elevated by elevation actuator poles 808.

Figure 9:
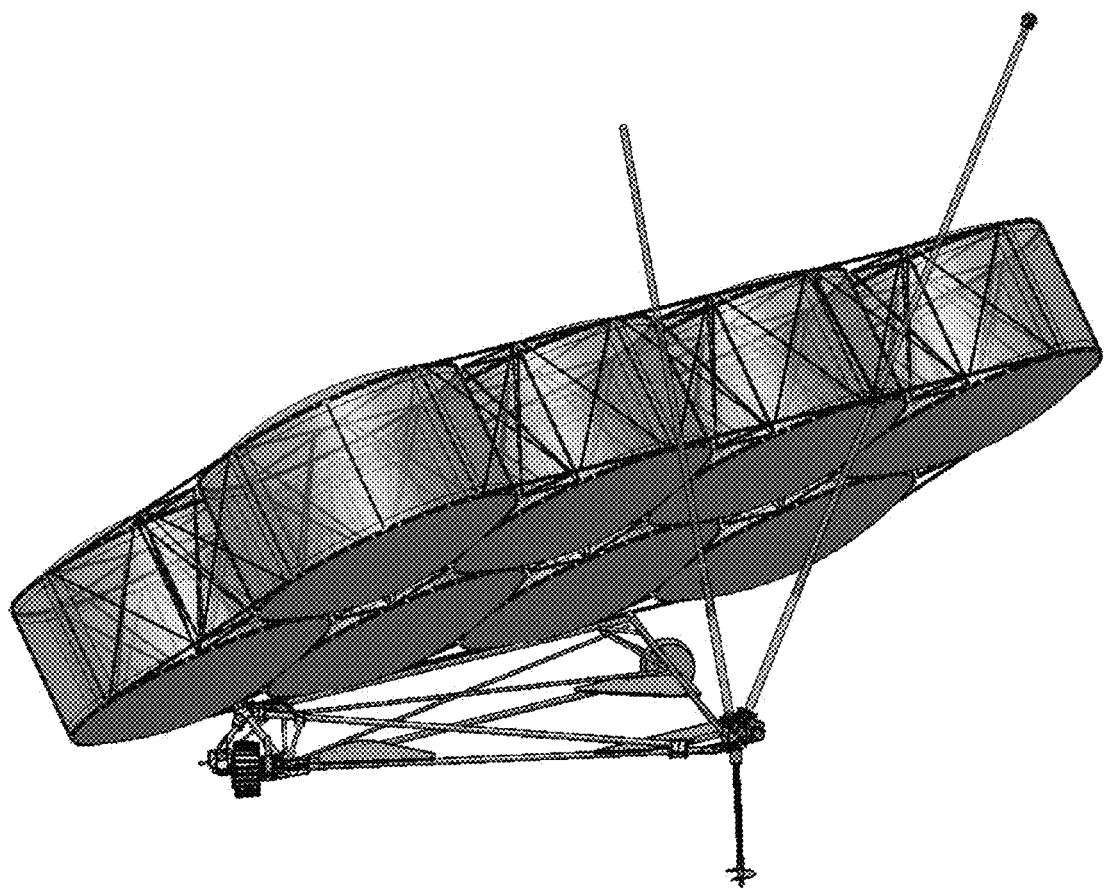
Figure 9A:
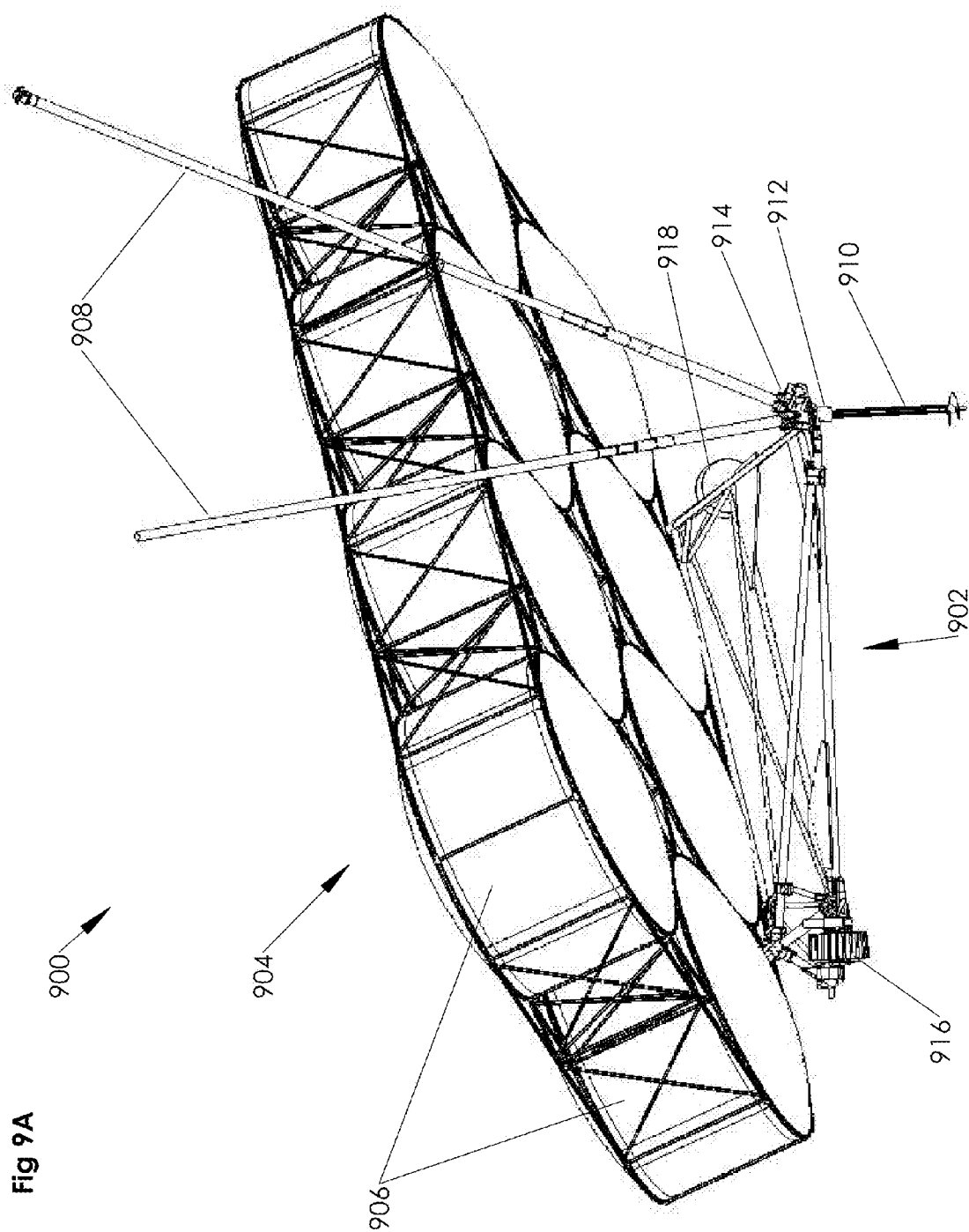

FIGS. 9 and 9A show a rear isometric view of a solar collector system 900 with a solar collector array 904 elevated to 30 degrees from the horizontal. FIG. 9A shows elevation actuator poles 908 configured to change the elevation angle of array 904 and transmit loads between array 904 and a base frame 902. Element 910 is a ground screw or anchor which is connected to frame 902 by a joint 912. An elevation actuator 914 drives poles 908. Element 918 is a passive wheel. Array 904 comprises one or more solar collectors 906.

Figure 10:
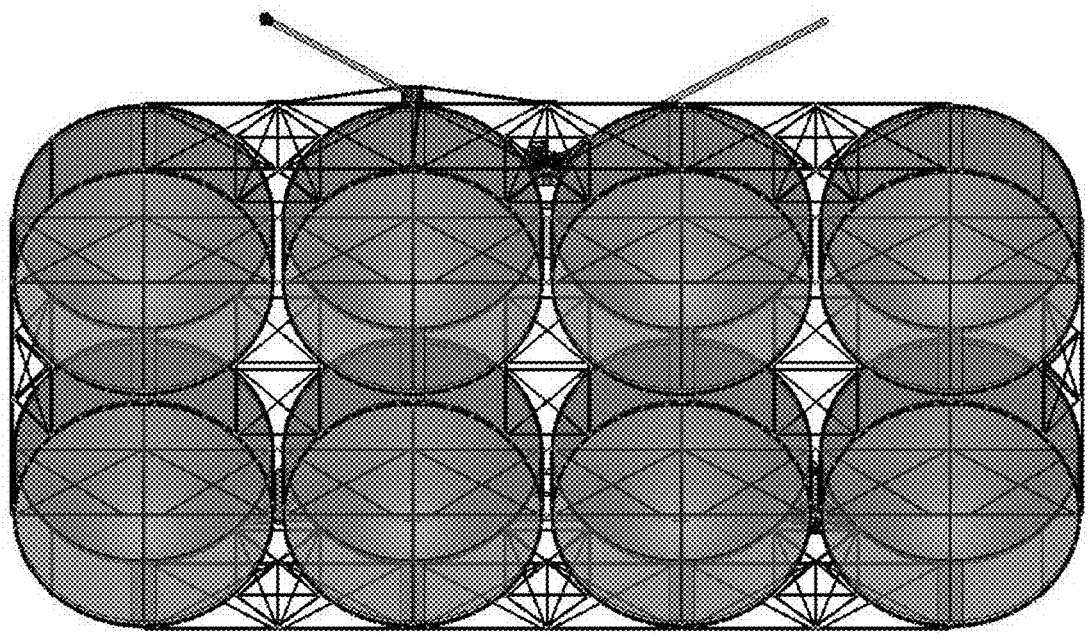
Figure 10A:
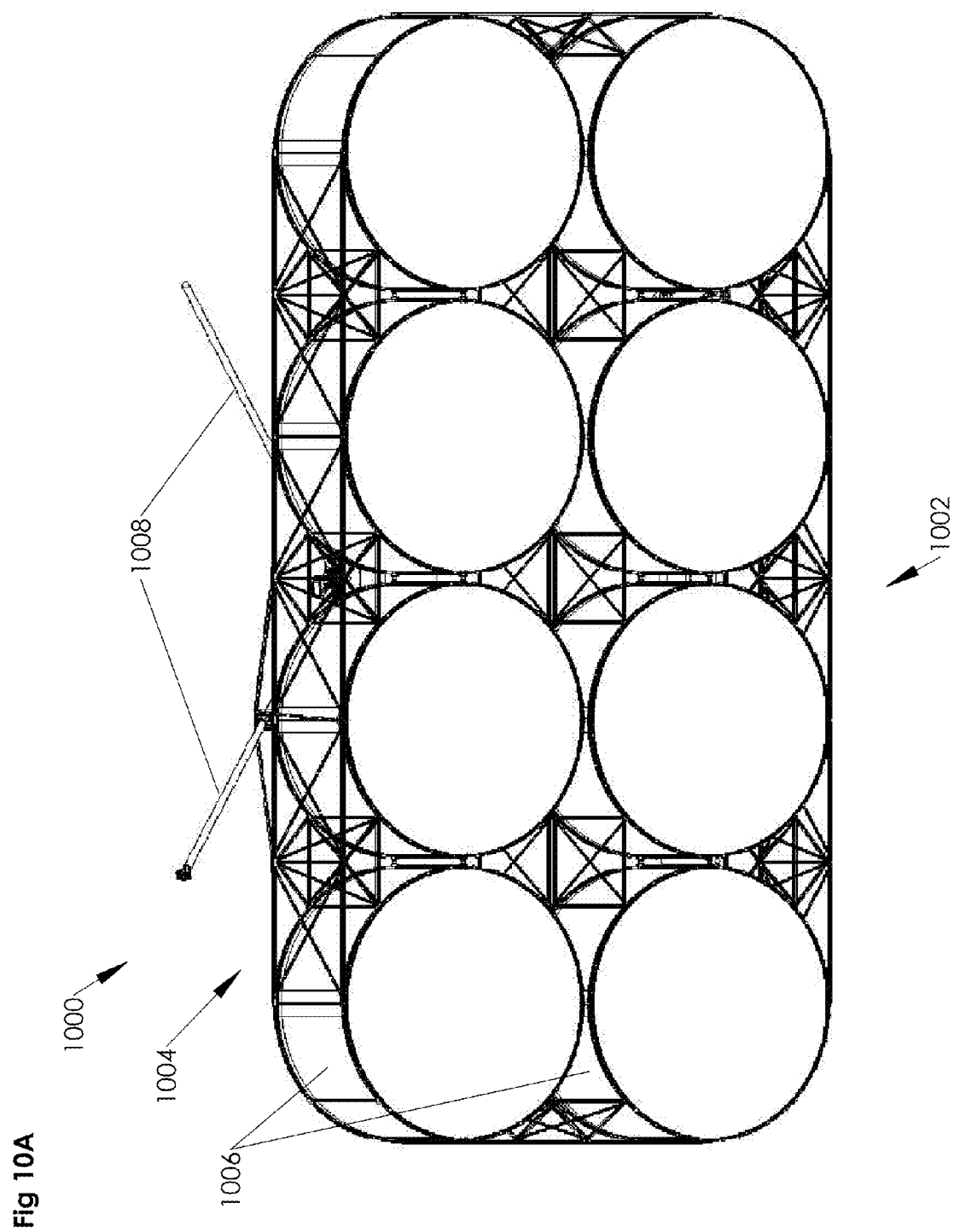

FIGS. 10 and 10A show a top view of a solar collector system 1000 with an array 1002 elevated to 30 degrees from the horizontal by elevation actuator poles 1008. Array 1002 comprises individual collectors 1006 connected by an interconnection framework 1004.

Figure 11:
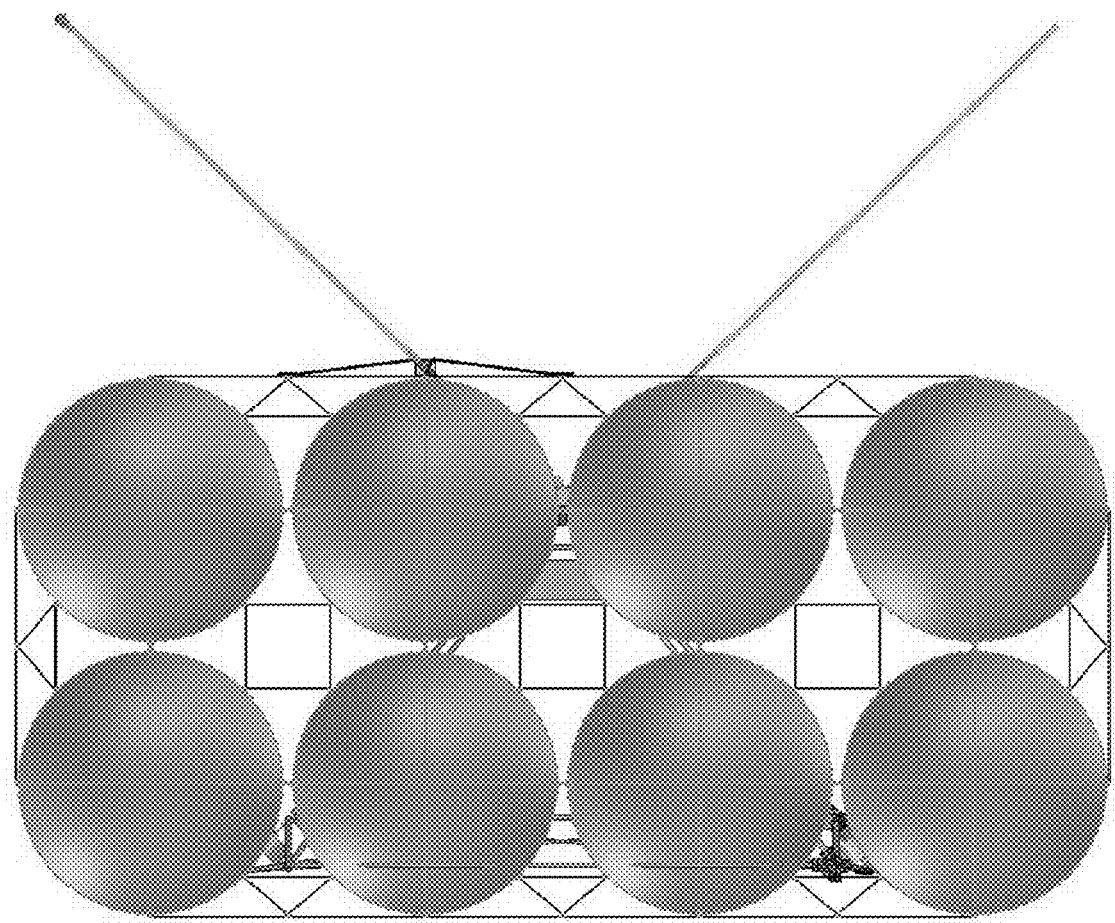

FIGS. 11 and 11A show a top view of a solar collector system 1100 with an array 1102 lowered to a horizontal position (zero degrees) so that solar collectors 1106 point directly upward. Elevation actuator poles 1108 distribute actuation loads to array 1102 via an interconnection framework 1104. FIG. 11A shows the optimal position for concentrating sunlight if the sun was directly overhead. This is also one possible stow position to minimize wind forces, and would also one possible orientation for enabling maintenance.

Figure 12:
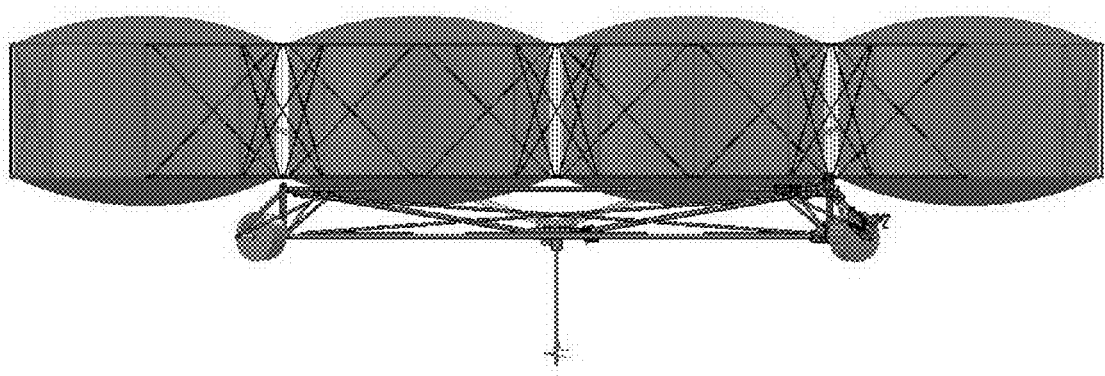

FIGS. 12 and 12A show a front view of a solar collector system 1200 with an array 1206 lowered to a horizontal position (a different view of the same orientation shown in FIG. 11A). Solar collectors 1208 point directly upward. A base frame 1202 is connected to the ground by an anchor 1204. Element 12010 is a drive wheel. Element 1212 is a passive wheel.

Figure 13:
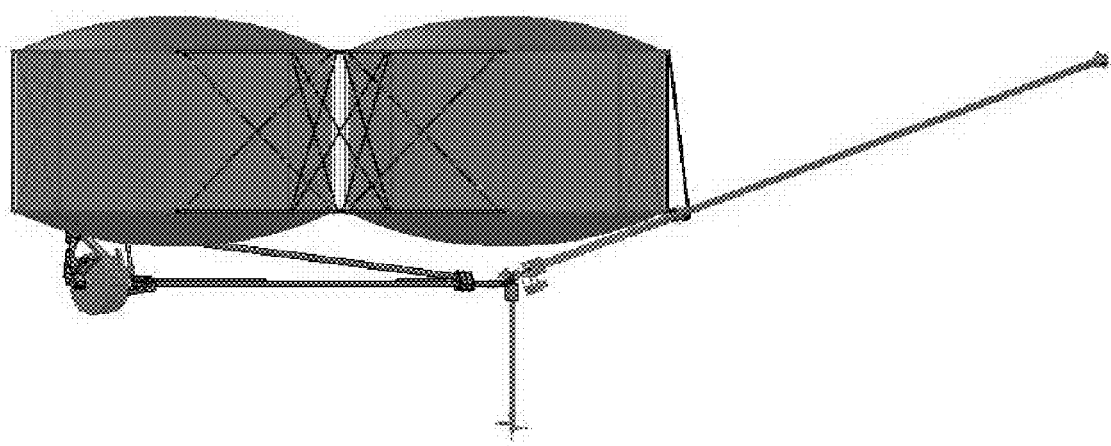

FIGS. 13 and 13A show a side view of a solar collector system 1300 with an array 1312 lowered to a horizontal position so that collectors 1314 face upward. Element 1310 is a drive wheel which is connected to a base frame 1302. Frame 1302 is connected to ball joint 1306 which is connected to anchor 1304. Array 1312 is rotated in the elevation direction by elevation actuator poles 1308.

Figure 14:
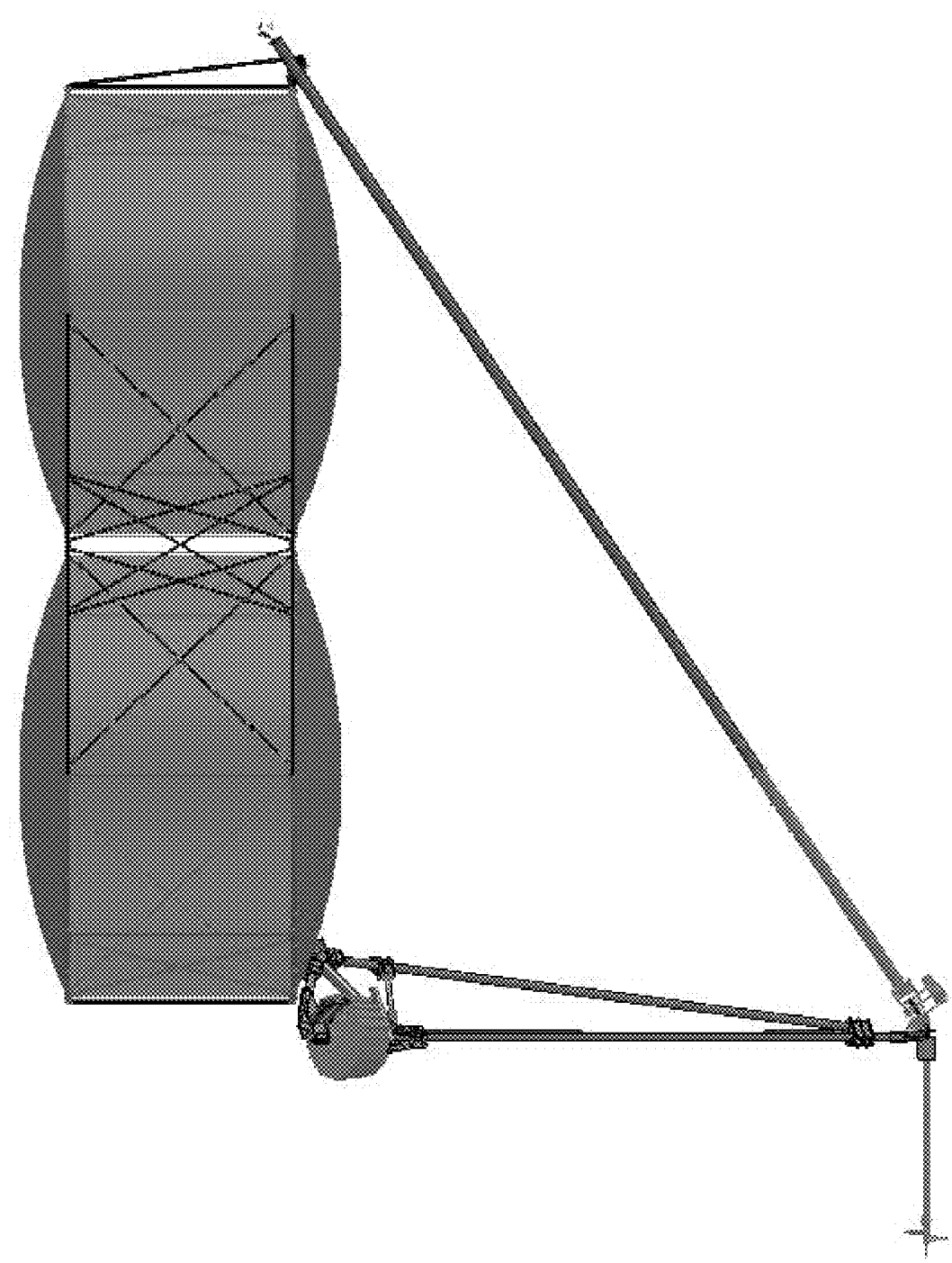
Figure 14A:
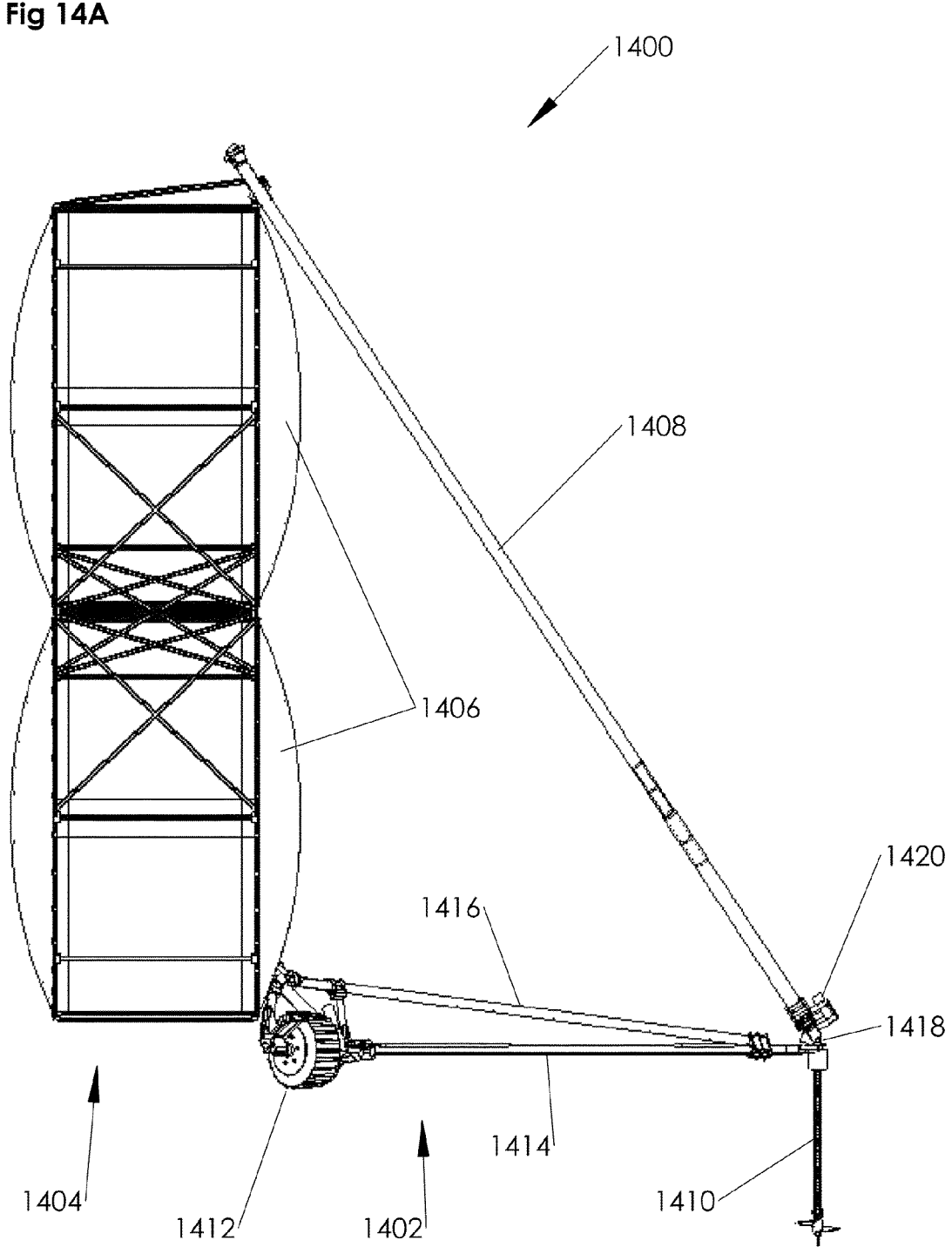

FIGS. 14 and 14A show a side view of a solar collector system 1400 with an array 1404 raised to a vertical position (90 degrees) so that collectors 1406 point to the horizon. This could be the optimal position for collecting sunlight if the sun was exactly at the horizon. This is also a possible stow position to minimize hail damage or also a maintenance position. A base frame 1402 comprises a lower triangle member 1414, an upper triangle member 1416, a joint 1418, an anchor 1410 and a drive wheel 1412. Elevation actuator poles 1408 are driven by an elevation actuator 1420.

Figure 15:
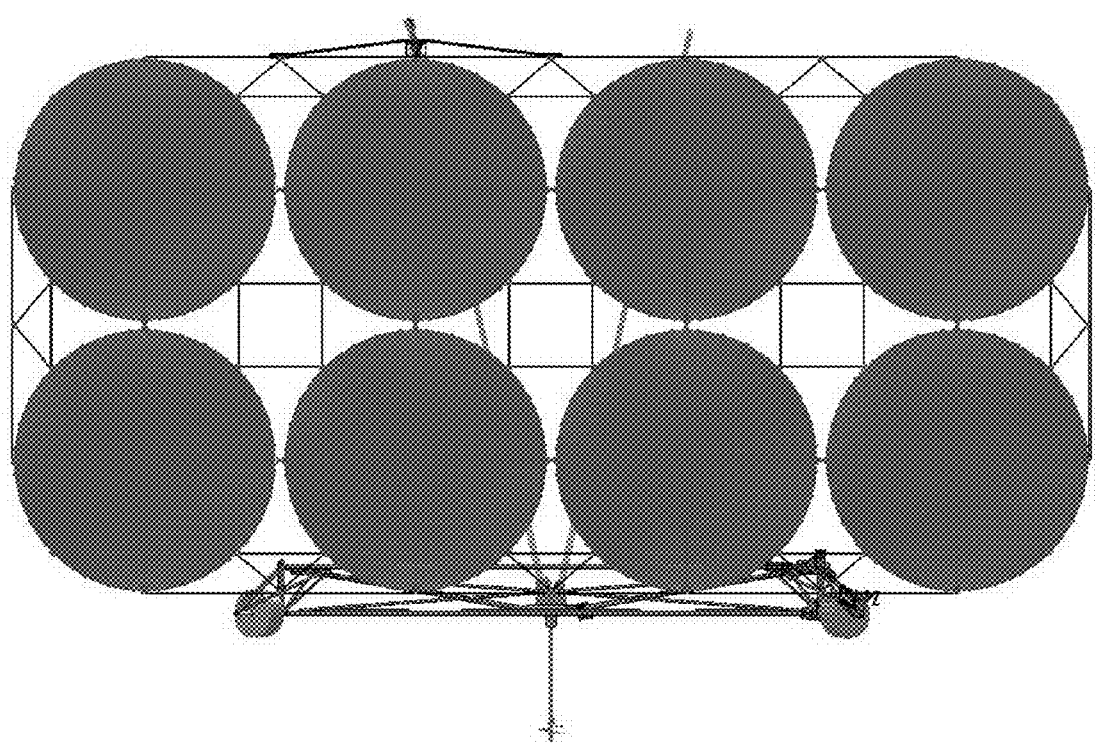

FIGS. 15 and 15A show a front view of a solar concentrator system 1500 with an array 1512 raised to 90 degrees. A base frame 1502 comprises a lower triangle member 1504, a drive wheel 1508, a passive wheel 1510, and an anchor 1506. Array 1512 comprises one or more solar collectors 1514. Elevation actuator poles 1516 serve to hold array 1512 at a desired elevation angle.

FIG. 9 shows one embodiment of a long travel linear actuator system with two actuator pole assemblies. A feature of the elevation actuator architecture is that it supports the structure or array to be elevated at more than one location, but resolves the weight, wind or other forces to the base structure or the ground in a single location.

Thus, if two actuator pole assemblies are used, they are supported by the base structure or the ground at locations with the minimum distance between them. This effectively creates a triangle (the elevation actuators form two triangle sides and part of the structure to be lifted forms a third side) and functions as a triangular structural element with a changeable elevation dimension.

In practice, a small distance between the supporting pivot points at the base for the elevation actuator pole assemblies may be present. A distance between these supporting pivot points will create a torque on the base structure when the forces on the actuators is unequal or when there are wind loads from the side of the array or structure.

Embodiments may minimize the distance between the actuator supports, in order to achieve one or more of the following goals: (1) to minimize the torque on the base and therefore minimize the material required in its construction while maximizing the stiffness of the base; (2) to maximize the stiffness of the elevation actuator side of the structure by minimizing or eliminating the need for a fourth leg in the structural polygon (that is, making it a triangle) which eliminates both extra material and a significant 4-bar mechanism flexural mode created by having a fourth side; and (3) to make coupling the motion of the two actuator poles simpler and less expensive which is possible when they meet at a common location at the base.

Other elevation actuator architectures that support the structure or matrix in a single location will incur additional deflection. For example, if a rectangular panel has two pivot locations at its lower edge, but is supported at only a single location at the center or near its upper edge by an elevation actuator, deflections due to wind loading and gravity at the upper outer edges will be greater than if the same panel is supported at two locations along the upper edge with spacing between those locations.

An embodiment of the elevation actuator employs two pole based lifting assemblies that attach to a panel or matrix at two points, with the lower end of the lifting assemblies attaching to the structure and/or transferring structural loads to the ground though a single point. Transferring forces to the base structure or to the ground through a single point can be used because it creates the greatest possible stiffness in the structure and therefore the greatest tracking accuracy.

If two lifting assemblies are attached to the base structure at points with substantial separation as well as being attached to the panel or structure being lifted at two separate points, then they form a trapezoid, parallelogram, or other four-sided structure rather than a triangle. Such a four-sided structure will tend to have an undesired flexural degree of freedom that a triangle does not have. This is because the elements of a four-sided structure are used in bending when the structure resists side loads (if the sides are connected by rigid joints). If a four-sided structure is connected with pivotable joints, or joints with some degree of play, the problem is even worse and the structure will exhibit 4-bar linkage motion. By using a three-sided structure, the need for the extra side as well as the need for the diagonal element(s) is eliminated.

In a triangular configuration as described above, lifting assemblies may be geared together or otherwise caused to lift at the same rate. Another way to do this is to drive them with separate motors which are controlled to move at the same rate, but having the lower ends connect at the same point or next to each other to facilitate gearing them together. In some embodiments, gearing can be accomplished near the point where the structure or panel attaches to each pole.

The lifting assemblies can meet at a point or transfer forces to the ground through a single location. In certain embodiments, this configuration has synergy with the base structure and rotation about the azimuth axis. Specifically, FIGS. 50 through 68 illustrate solar collector arrays and articulation systems which transfer the loads of the elevation actuators to the base at a single location, and also use this same location as the single fixed anchor point to the ground.

In these illustrated embodiments a ground screw is used to provide a fixed point to the ground. Other ground attachment methods are possible. The base frame pivots about the ground screw to accomplish azimuth motion as well as accommodating smaller angular displacements due to ground irregularity via a ball-and-socket-joint similar to a trailer hitch.

To work on uneven ground a certain amount of up and down motion or rotation of the base about axes other than the primary azimuth axis, can be accommodated. This can be accomplished via a ball and socket joint similar to a trailer hitch ball and socket, or by a multi-axis pivot joint system.

Figure 37:
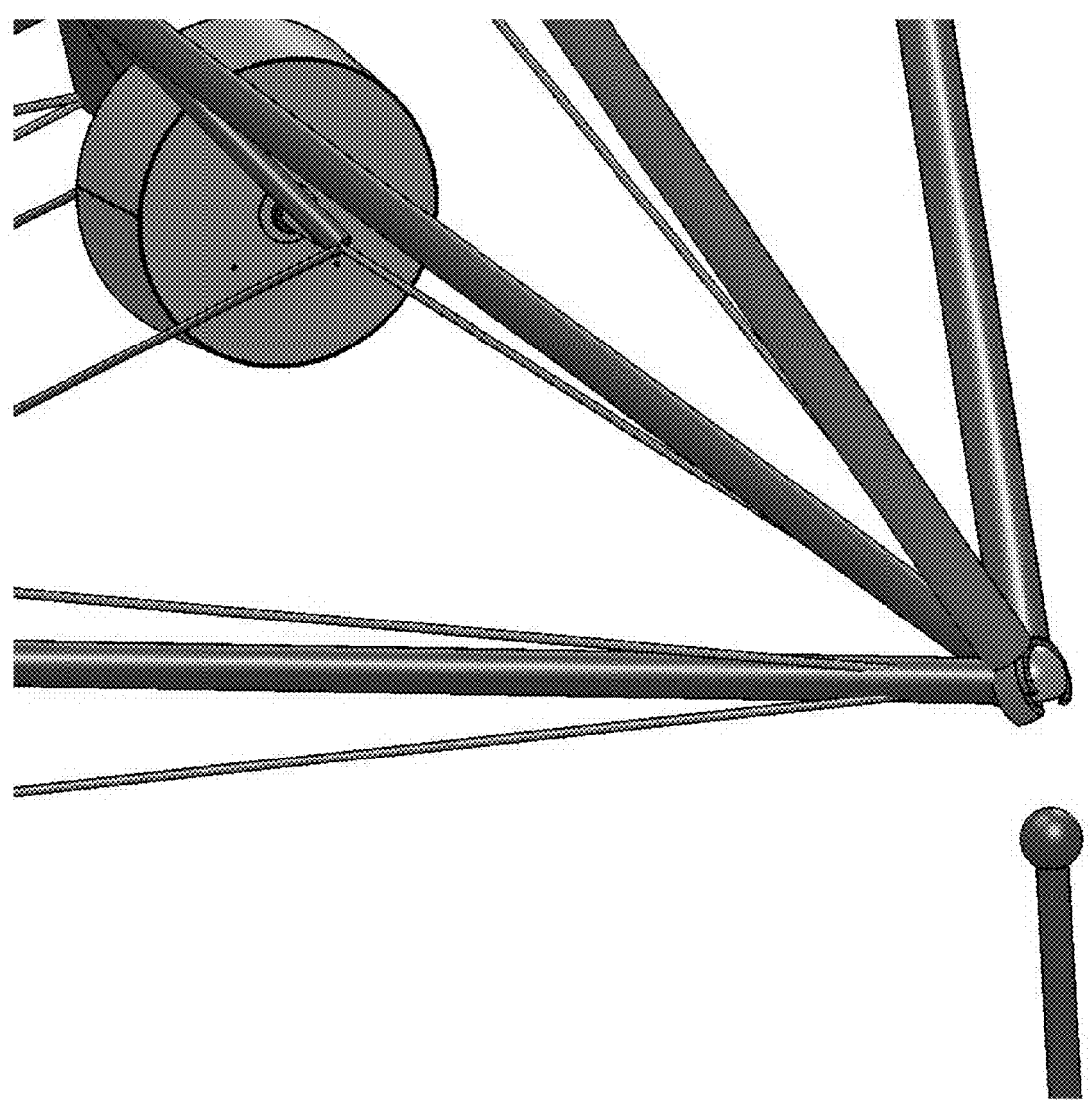
FIGS. 37 and 37A show an embodiment of a ball and socket system in which a ball is mounted on a stationary ground attachment device such as a ground screw.
Figure 37A:
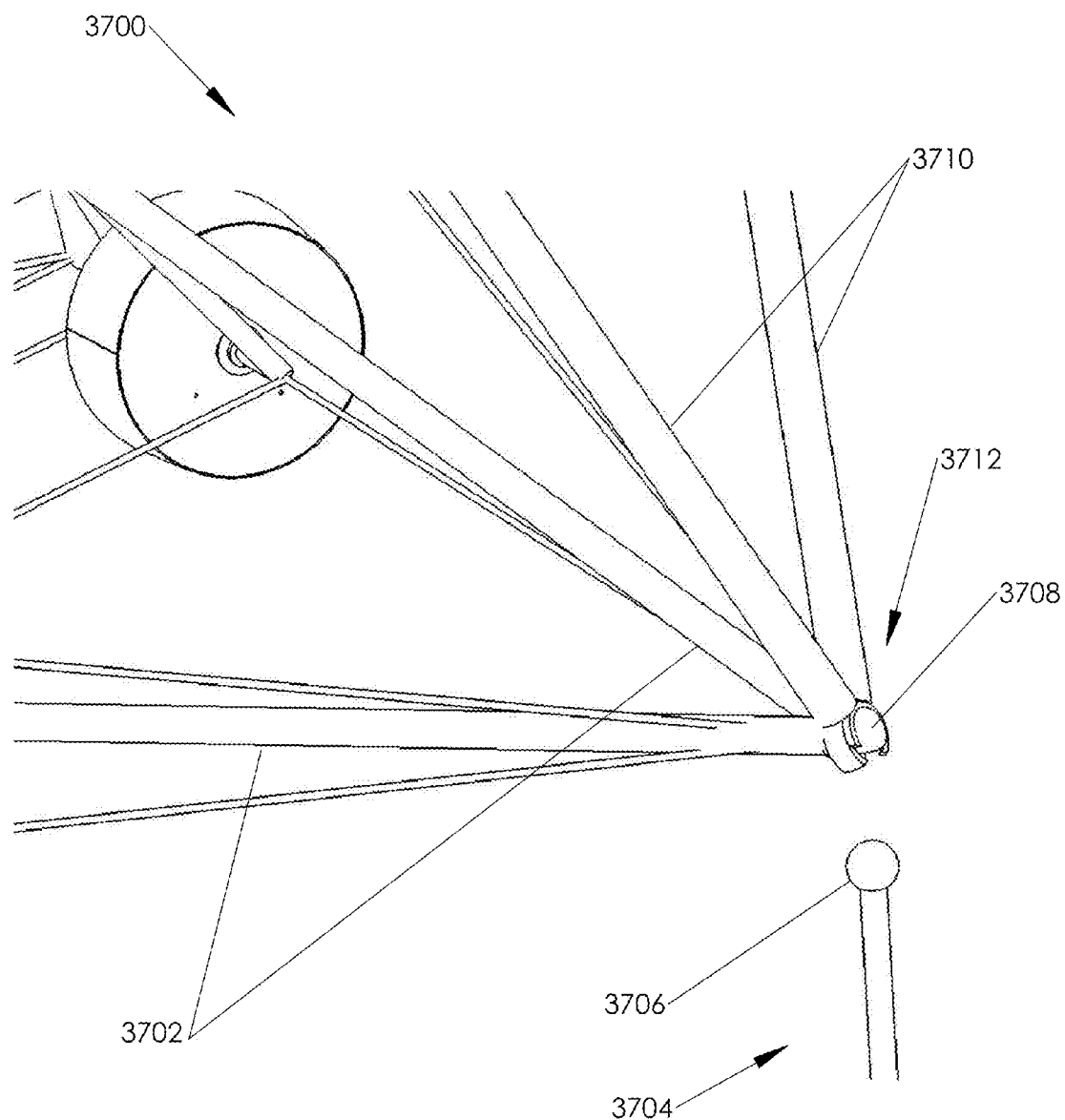
Figure 38:
FIGS. 38, 38A, 39, and 39A show various views of one embodiment of a long travel linear actuator which can be created using a thin wall hollow tube such as steel.
Figure 38A:
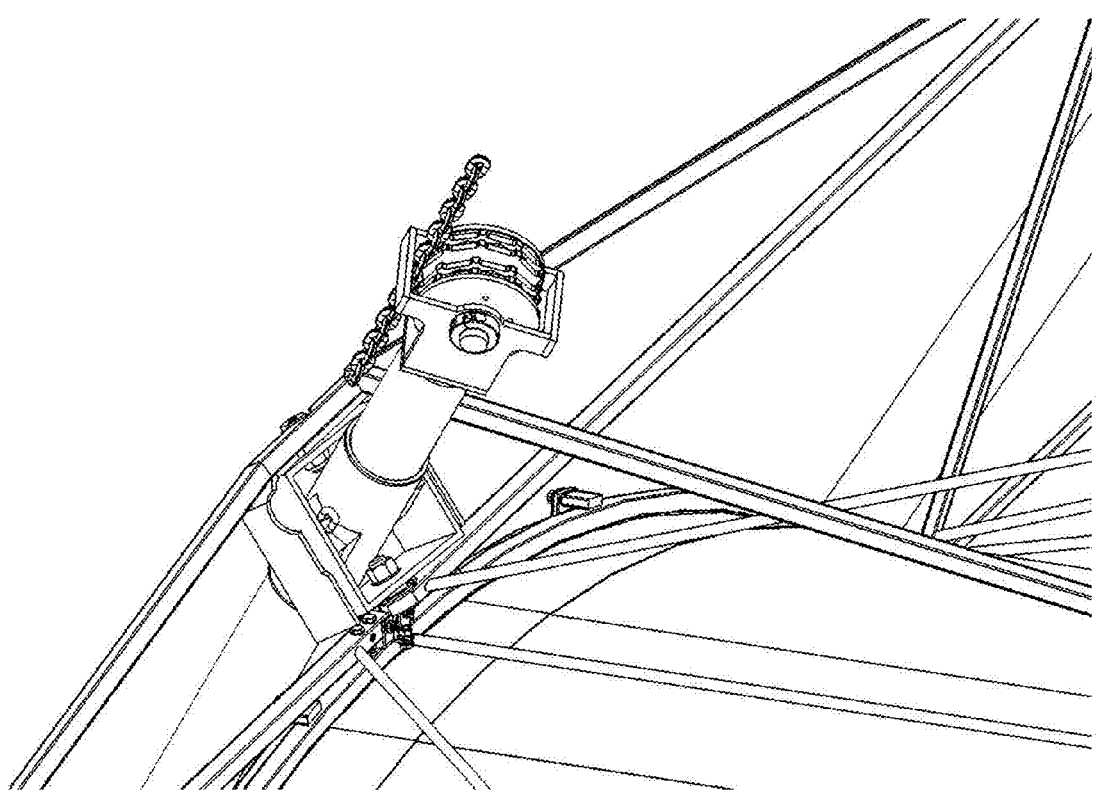
Figure 39:
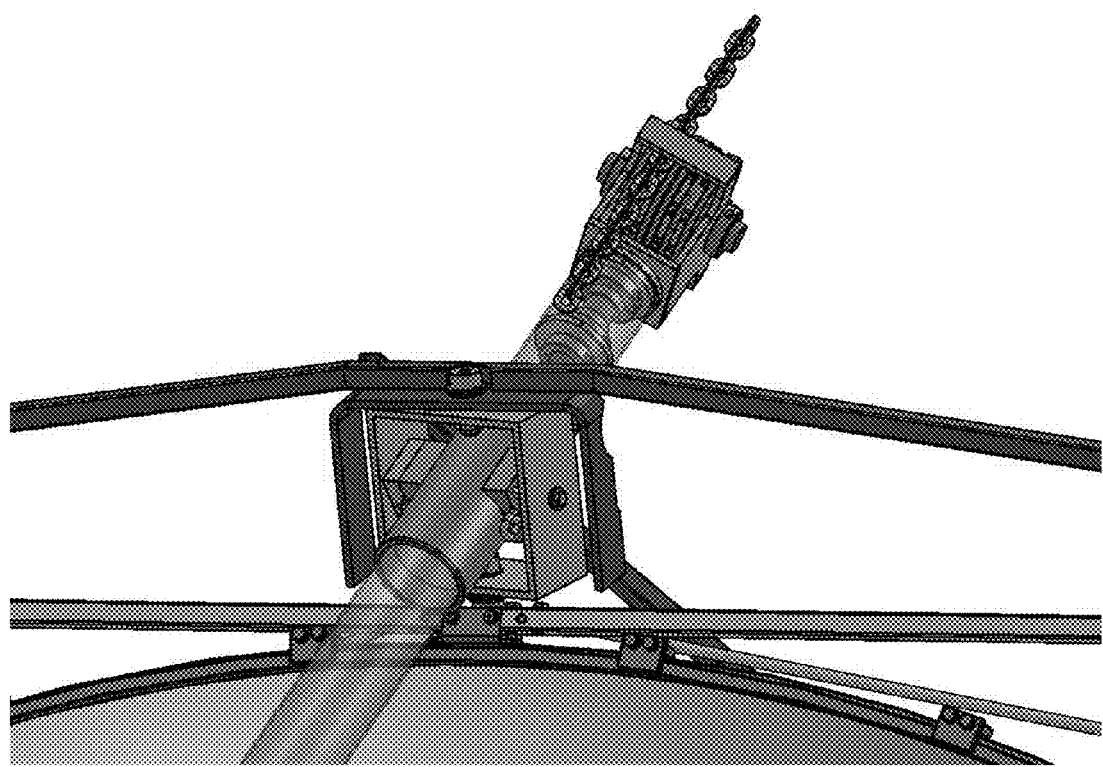
Figure 39A:
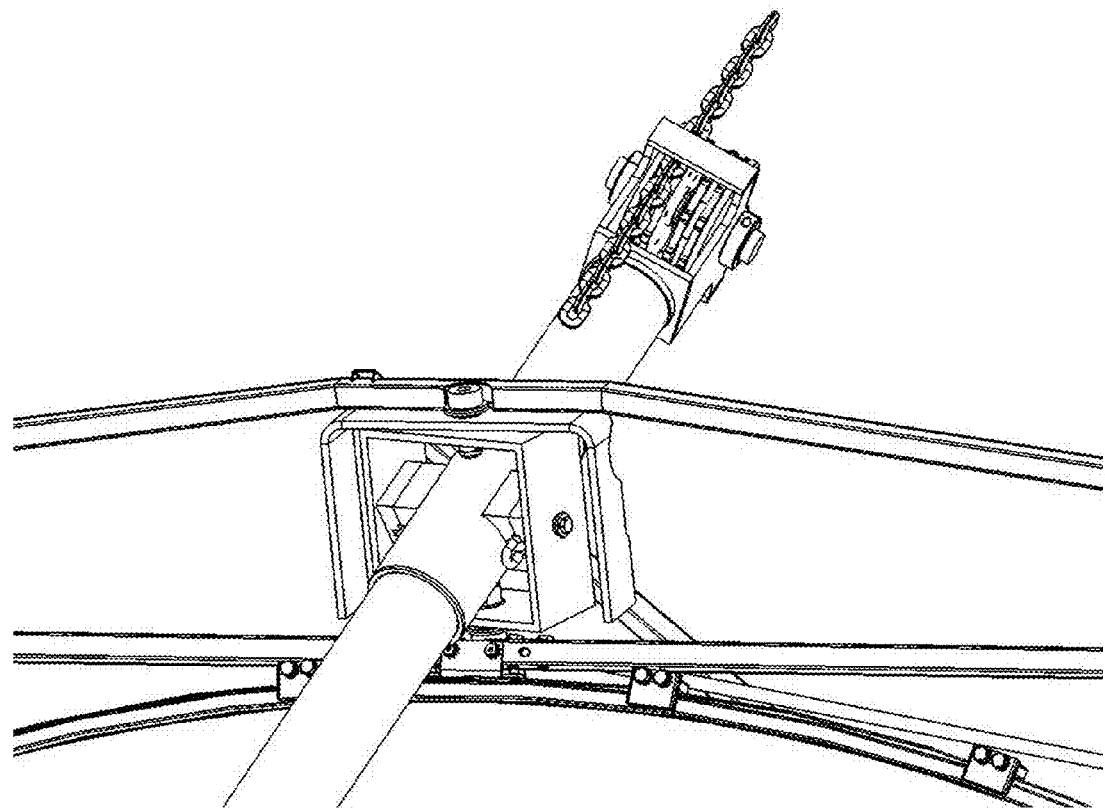

Certain embodiments use a ball and socket, but other multi-axis pivot systems are possible. FIGS. 37 and 37A show a ball and socket system in which a ball is mounted on a stationary ground attachment device such as a ground screw. The base of the frame 3712 includes frame members 3702 and has a socket feature which constrains it to the ball and allows relative rotational motion, but not translation. In particular, FIG. 37A shows a view of a solar collector frame 3700 that can be attached to a ball joint 3706 on an anchor 3704.

In the embodiment of FIGS. 37 and 37A, two optional elevation actuator poles 3710 are shown which also effectively rotate about the ball 3706, or potentially about the spherical outer shape 3708 of the socket via partial spherical restraining features 3712 attached to the end of each pole. These features allow the poles to rotate independently of the base frame while still transferring forces to the ground through a single ground interface point. This system creates maximum stiffness, eliminates the need to use any members in bending, uses the minimum structural material for the base frame and the actuators and eliminates any problematic parallelogramming motion or flexibility.

The horizontal elevation actuator pole axis may be coincident with one of the axes of the azimuth joint or with the center of the azimuth ball. This configuration would eliminate torques or bending moments in the structure. FIGS. 37 and 37A represent a structure exhibiting this characteristic.

In some embodiments, it may be impractical to have the axes line up exactly with the ball, but it may be possible to limit the structural moments and torques to a manageable level. In one approach, this can be done by utilizing geometry which places the pivot axes of the elevation actuator poles in close proximity to each other and to the ground anchor ball joint (or ground anchor motion axes if a ball joint is not used). FIGS. 41, 41A, 42, and 42A show an embodiment of a base frame, ball-and-socket joint and connection to elevation actuator pole assemblies which places the pivot axes in close proximity (with about 12 inches or less), thereby minimizing torques and moments within the structural members, and therefore minimizing the amount of structural material required.

Certain embodiments use a ground screw (earth screw) under the ball, which serves as the only fixed point to the ground. This point is also a favorable location to transfer weight, wind, and other forces to the ground. Thus, it is desirable for the elevation actuator to push against this point rather than at other points on the structure. Reacting elevation actuator forces at other points on the structure would naturally tend to create larger deflections in the structure and/or require more material in the structure.

If the elevation actuator lower axis (the pivot point that allows the lifting assemblies to rotate as needed as the elevation angle changes) is coincident with the ball or an axis of the multi-axis pivot joint of the azimuth actuator and base, the entire system may be simplified and fewer parts will be required. In addition, the structure and actuator parts will be stiffer and lighter.

Base Structure Architecture

The use of triangular structures or substructures as mentioned above also applies to base structure architectures. For example, FIGS. 29 through 36A show several embodiments of base structures which employ triangular structures or substructures to optimize stiffness while minimizing material cost, assembly cost, transportation cost and maintenance cost.

Figure 29:
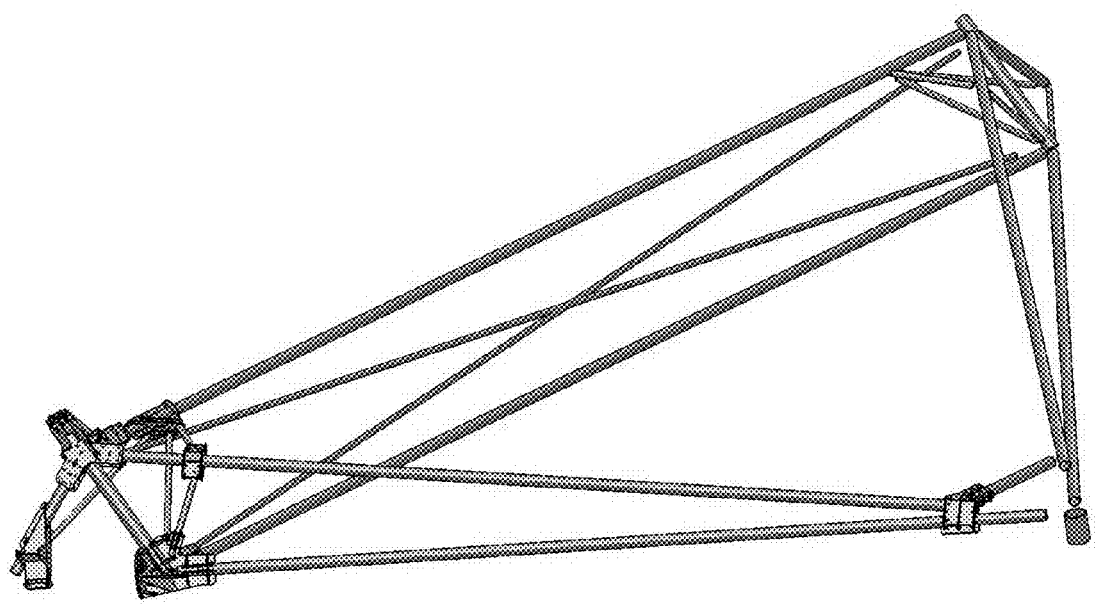
FIGS. 29 through 36A show several embodiments of base structures which employ triangular structures or sub-structures.
Figure 29A:
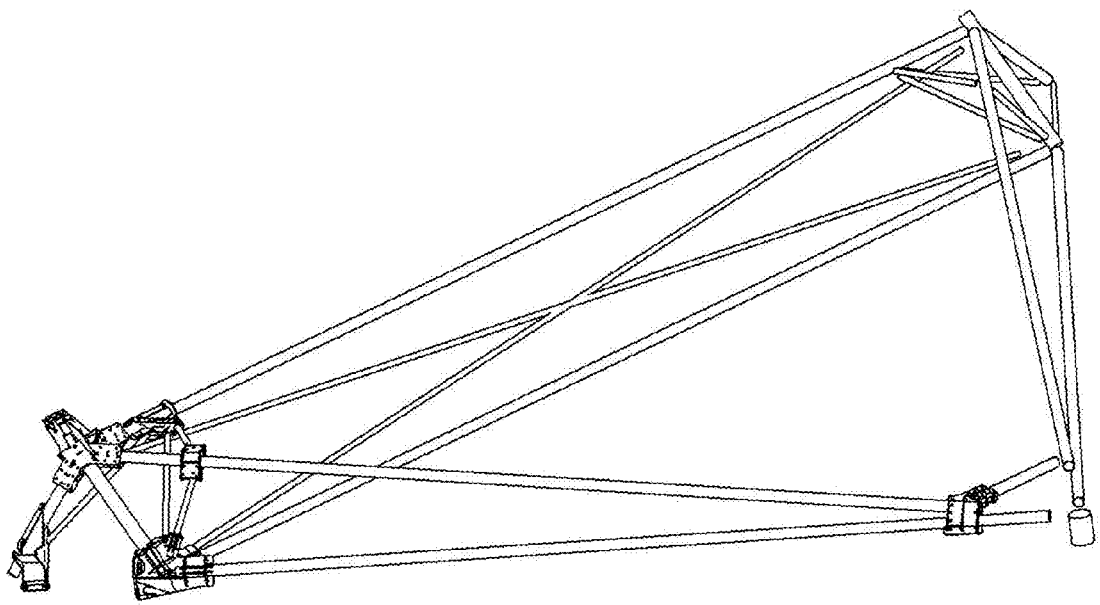

FIGS. 29 and 29A show a rear isometric view of a base structure with triangular truss architecture and a single rear connection point to a ground anchor. Except for the front cross diagonal members, other members can be used in tension or compression depending on how the structure is loaded. This structure will be referred to here as the "Compressive Truss Base". The figure omits some structural connection or joint components in order to clearly show that the structure can be made using simple, inexpensive tubes such as EMT.

Figure 30:
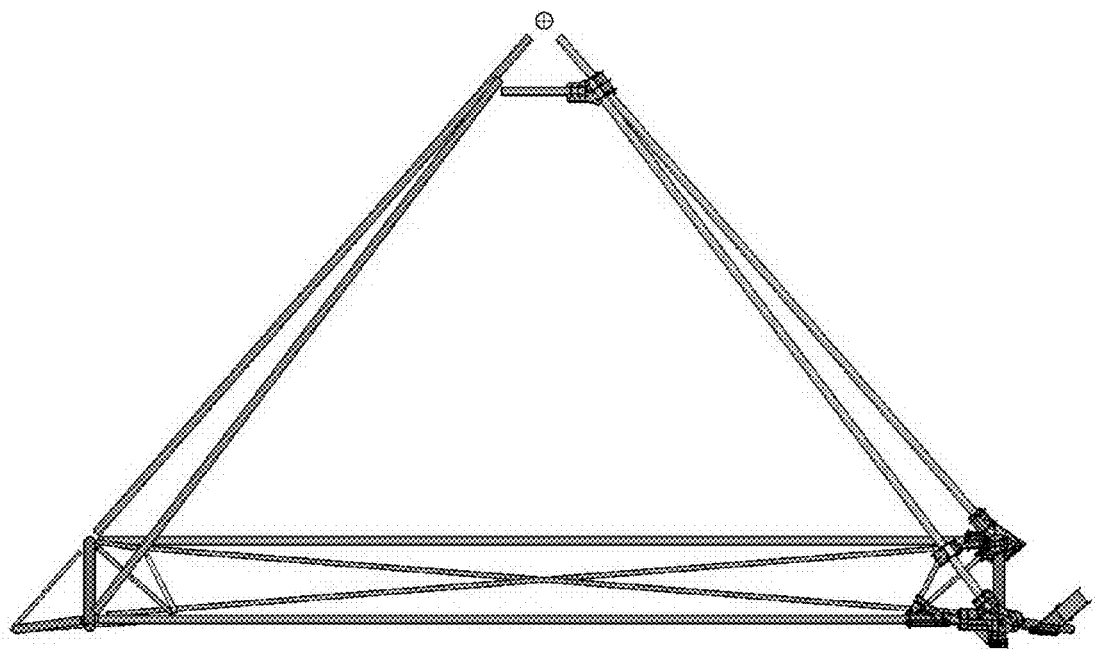
Figure 30A:
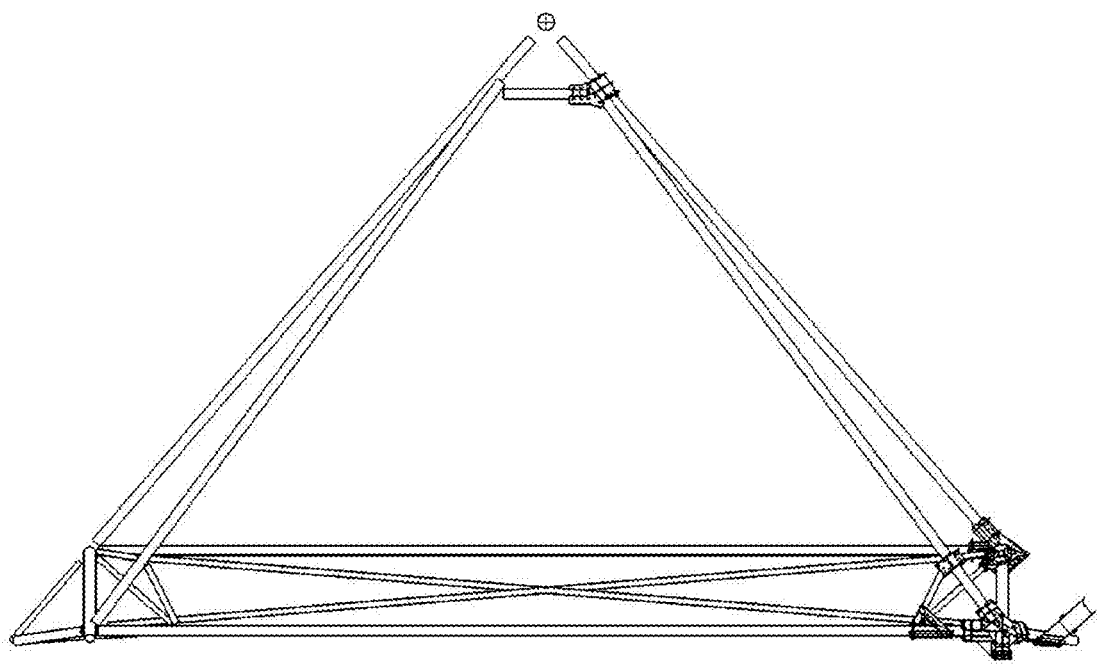
Figure 31:
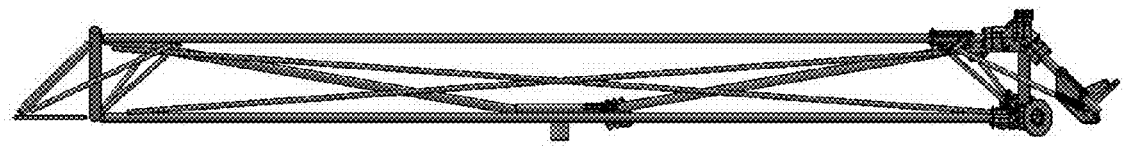
Figure 31A:
Figure 32:
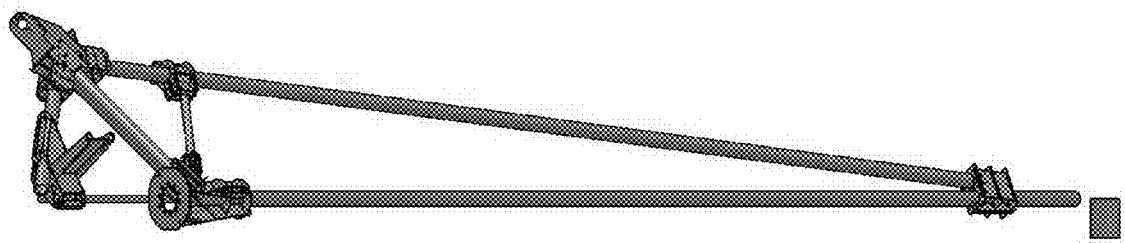
Figure 32A:
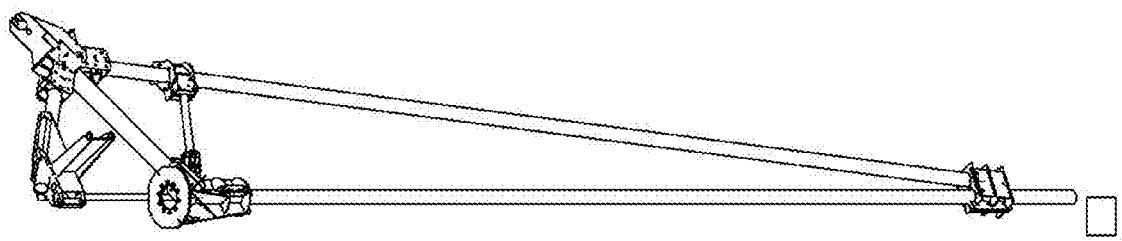

FIGS. 30 and 30A show a top view of the Compressive Truss Base. FIGS. 31 and 31A show a front view of the Compressive Truss Base. FIGS. 32 and 32A show a side view of the Compressive Truss Base.

Figure 33:
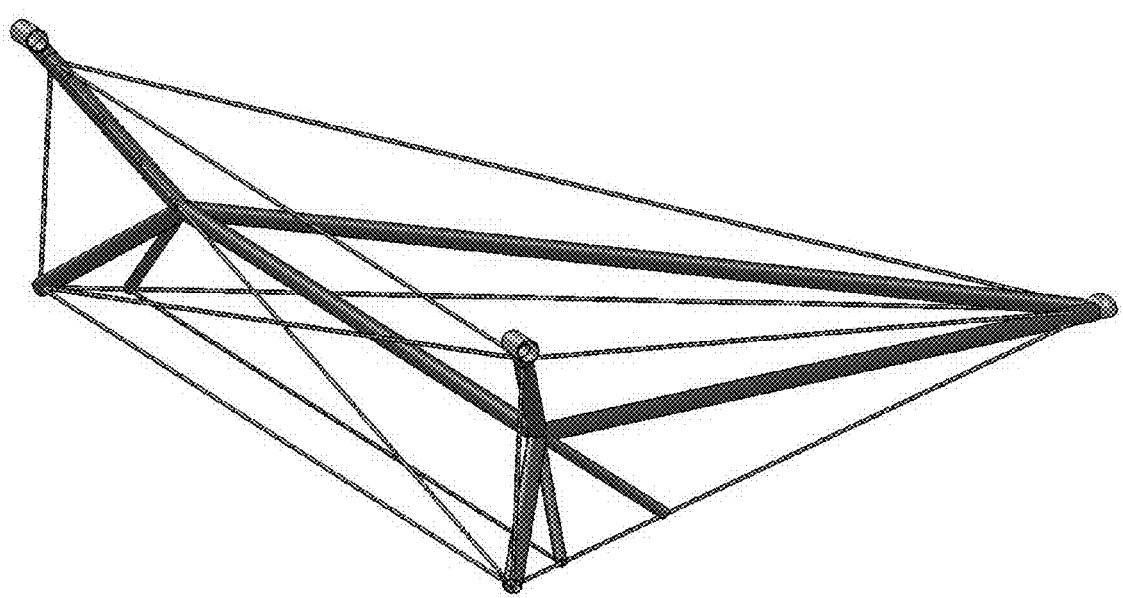
Figure 33A:
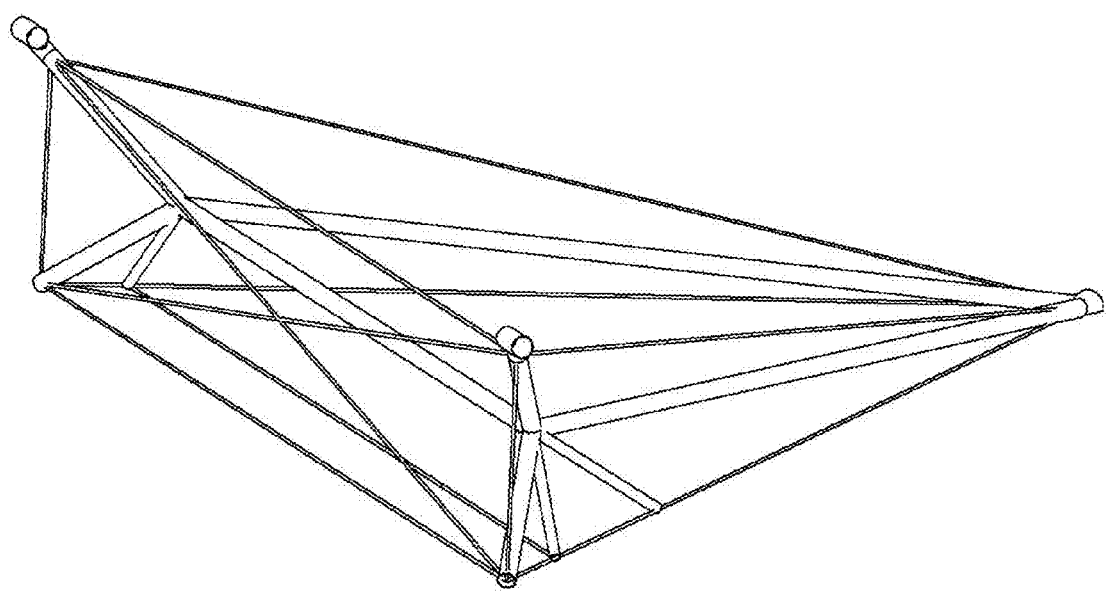

FIGS. 33 and 33A show an isometric view of a different embodiment of a base structure, which uses the minimum number of compressive elements and uses tensile elements wherever possible. This structure will be referred to here as the "Tensile Truss Base". In some embodiments, architectures which use tensile elements may be preferred because they may be more resistant to damage, are not subject to buckling because they are never under compression, may be easier to set up, and may use less material than similar compressive elements.

Optional members are shown for supporting wheels or other drive system. Optional tubes are shown that define the pivot axis for a solar collector array. A socket element is shown at the rear apex of the structure where the structure would be anchored to the ground. This socket could be part of a ball-and-socket joint (like a trailer hitch) where the ball is affixed to a ground anchor.

A ground anchor could be a ground screw, or it could simply be a large weight such as a rock, sand bags, concrete or the like. Other ground anchors are possible as well.

Another way to create a fixed anchor point is to connect the anchor point of one structure to the anchor points of other structures in a solar power plant. Because peak wind loads on a single structure tend to be instantaneous, and peak loads for different structures will tend not to happen instantaneously, tying anchor points of multiple structures together can provide sufficient anchoring capability without necessarily attaching them to the ground.

Figure 34:
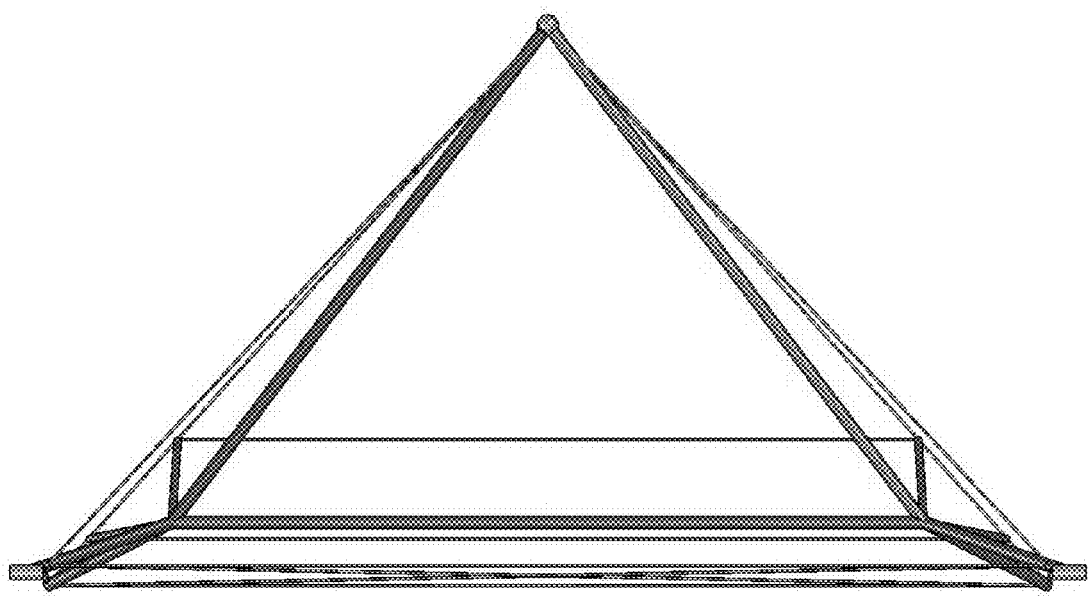
Figure 34A:
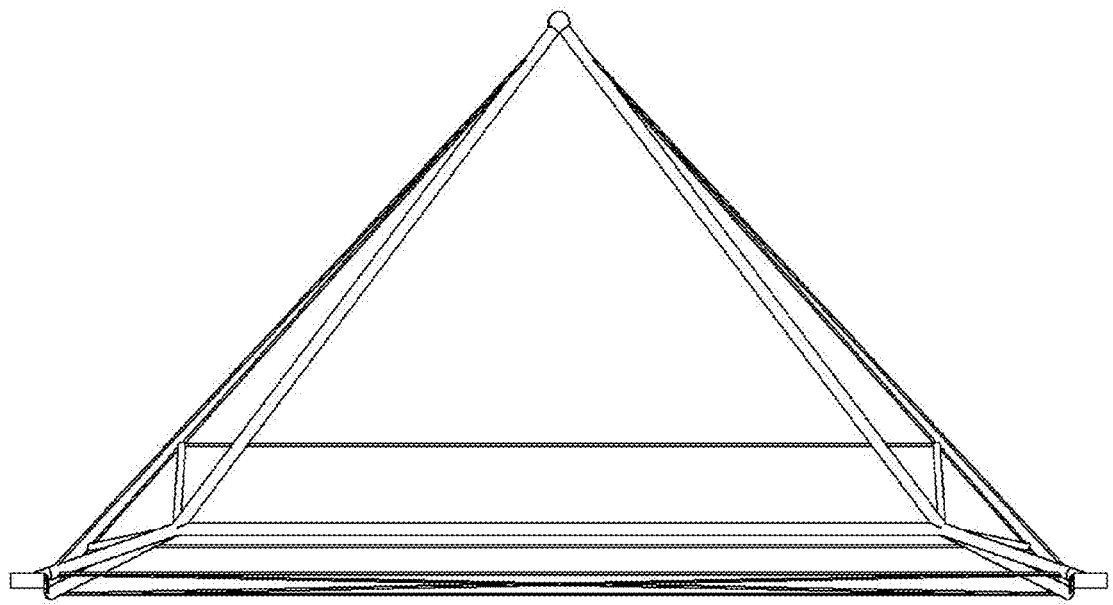
Figure 35:
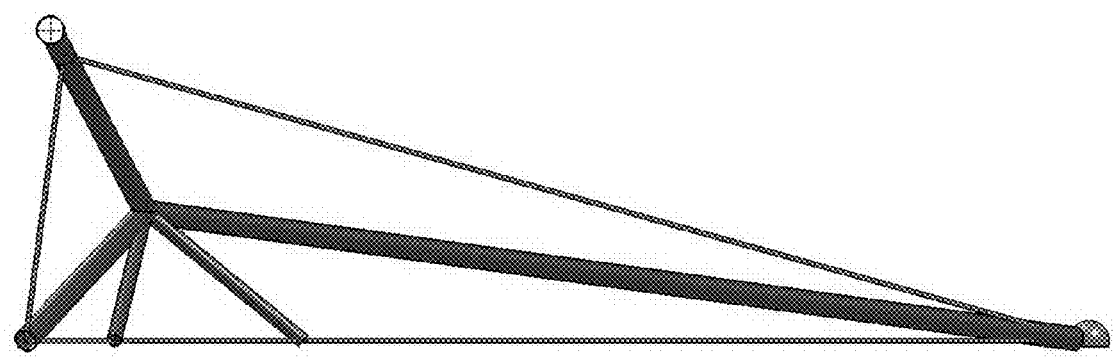
Figure 35A:
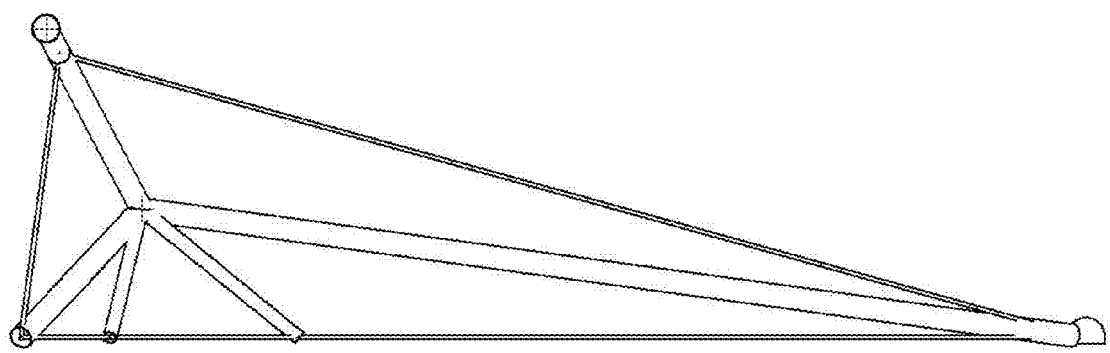

FIGS. 34 and 34A show a top view of the Tensile Truss Base without wheels. FIGS. 35 and 35A show a side view of the Tensile Truss Base without wheels.

Figure 36:
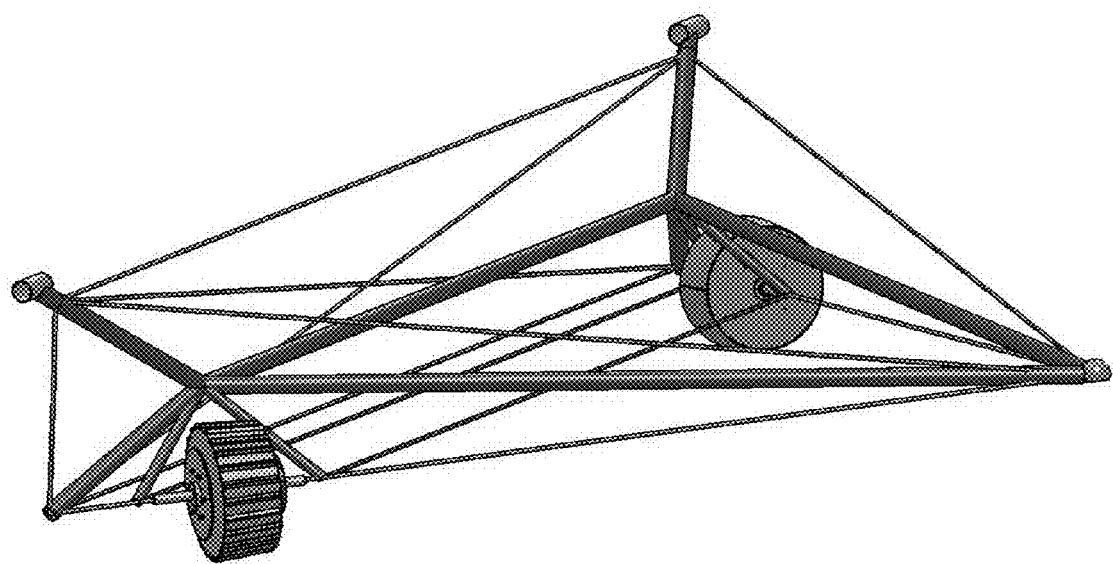
Figure 36A:
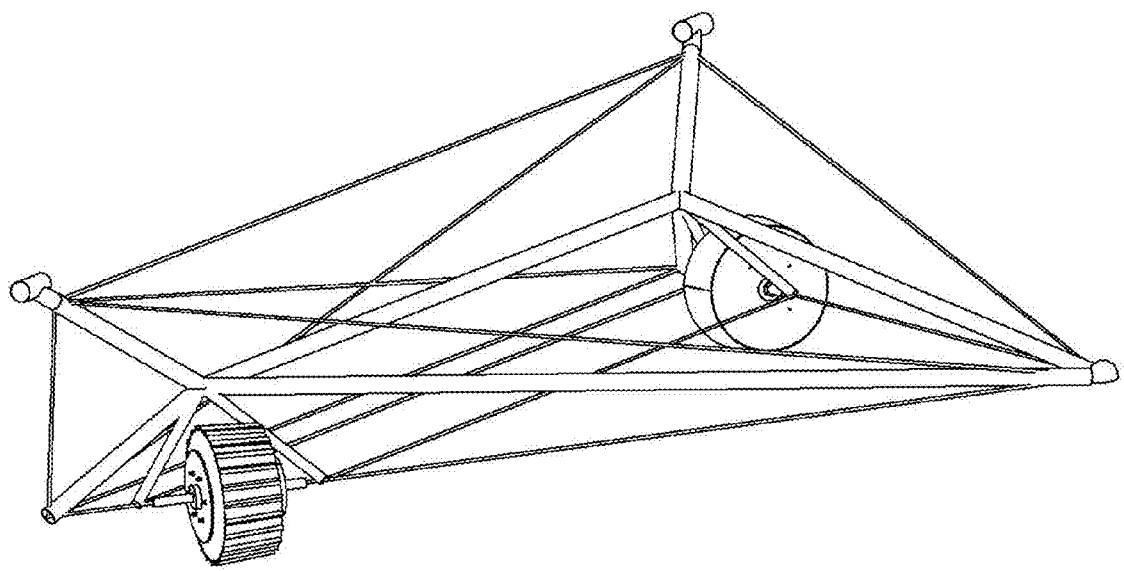

FIGS. 36 and 36A show a rear isometric view of the Tensile Truss Base with wheels. FIG. 36 shows a driven wheel with traction elements and a passive (non-driven) wheel, but other architectures that use two driven wheels or two passive wheels are possible.

In one embodiment, a base frame may have a substantially horizontal pivot axis which serves as an elevation pivot axis for a solar collector array. The base frame may be rotatably connected to the ground via a joint with a substantially vertical pivot axis (azimuth axis), at least one mechanism driving propulsion of the base frame about the azimuth axis. The joint may also allow at least some rotation of the base frame about one or more other axes, so that the base frame may tilt as needed to accommodate variations in ground surface that it encounters as it is propelled about the azimuth axis.

Additionally, the embodiment of a base frame shown in FIG. 29, may have geometry comprising two side triangles, a front rectangle and two front diagonals, with an azimuth axis located at the apex of both side triangles and at the opposite side of the base frame from the front rectangle. This base frame geometry may comprise eight main compressive frame members, two tensile diagonal stiffening members with five primary joints.

Additionally, the embodiment of a base frame shown in FIG. 33 may have geometry comprising a primary triangle made of three rigid members, an azimuth axis joint at a rear corner of the primary triangle, the primary triangle having two front corners, each of the front corners having at least one rigid stay member with one end connected to the front corner of the primary triangle and having another end which lies out of the plane of the primary triangle (out of plane end), the base frame additionally comprising one or more tensile members which lie outside the plane of the primary triangle and connect the rear corner with the out of plane ends of the stays.

Another similar embodiment of the base frame shown in FIG. 33 may have geometry comprising a primary triangle made of three rigid members, and an azimuth axis joint at a rear corner of the primary triangle. The primary triangle may have two front corners, each of the front corners having two rigid stay members. Each of the stay members may have one end connected to the front corner of the primary triangle, and have another end which lies out of the plane of the primary triangle (out of plane end). The out of plane ends of the stay members at a particular corner of the primary triangle, may project out of the plane of the primary triangle in opposite directions so that they form an upper pair of stays and a lower pair of stays and also forming a pair of left stays and a pair of right stays. The base frame may additionally comprise two or more tensile members which lie outside the plane of the primary triangle, one of the tensile members forming a triangular shape and connecting the rear corner of the primary triangle with the out of plane ends of the upper pair of stays and the other tensile member forming a triangular shape and connecting the rear corner of the primary triangle with the out of plane ends of the lower pair of stays. The base frame may additionally comprise a left and a right front tensile member, the left front tensile member connecting the out of plane ends of the left pair of stays and the right front tensile member connecting the out of plane ends of the right pair of stays.

Additionally, the base frame of the embodiment of FIG. 33 may comprise one or more front diagonal tensile members, and the out of plane ends of the stays may form four corners of a front rectangle and the diagonal tensile member(s) may connect diagonally opposite ends of the front rectangle so that the diagonal stiffness of the structure may be enhanced.

Additionally the base frame of the embodiment of FIG. 33 may comprise one or more pivot points which define an elevation axis for an array of solar collectors, the elevation axis being disposed substantially at the opposite end of the primary triangle from the azimuth axis and the pivot points also being disposed at the upper ends of the upper pair of stays.

Additionally the base frame of the embodiment of FIG. 33 may comprise one or more wheel stays connected to each of the front corners of the primary triangle, the wheel stays having out of plane ends which may serve to support a wheel or other ground interface.

Support Structure

The support structure can be used to transmit loads from collectors to the ground rigidly and efficiently while tracking the sun position across the sky. In some embodiments, collectors are ganged or arrayed such that one base serves multiple collectors.

In some embodiments, the collector comprises a light concentrator and receiver. Examples of receivers according to particular embodiments are disclosed in U.S. patent application Ser. No. 11/844,888 (the '888 application) filed Aug. 24, 2007 and titled "Rigging System For Supporting And Pointing Solar Concentrator Arrays," and U.S. patent application Ser. No. 12/720,429 (the '429 application) filed on Mar. 9, 2010 and titled "Passively Compensative Optic and Solar Receiver," both of which are incorporated by reference in their entireties herein for all purposes. In certain embodiments, the collectors must be pointed accurately at the sun for the receiver to convert solar energy efficiently.

As used herein, the "axis" of a collector is a line relative to the collector that should ideally point toward the center of the sun or substantially towards the center of the sun. This axis can in some embodiments correspond to an axis of symmetry or the crossing of two or more planes of symmetry of a collector, but this definition is not intended to be limiting and in fact any line parallel to one axis of the collector is by definition another axis. However, it is convenient to define the position of an axis relative to geometrical structure, symmetries, etc.

In some collector designs, structural elements efficiently transfer gravitational, inertial, and wind forces to substantially discrete points. These points are herein called "tie points." An upper truss for such a collector design can be used to control the location of these tie points such that the collector axis remains in alignment in spite of various loads.

In some collector designs, these tie points are disposed discretely about the perimeter of the collector. In other collector designs, these tie points lie substantially along an axis of a collector.

Figure 4A:
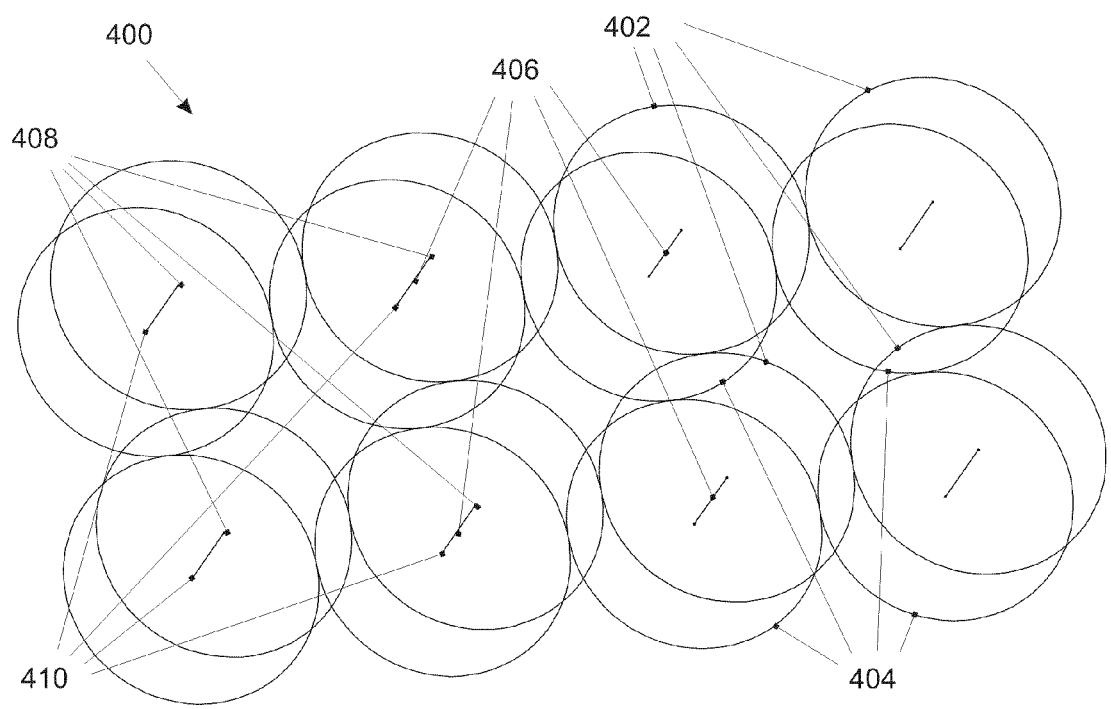
FIG. 4A shows a schematic diagram of an embodiment of a rectangular array of collectors.

FIG. 4A shows a schematic diagram of a rectangular array 400 of such collectors. The upper rings 402 and lower rings 404 suggest the extent of the collector, but are not intended to be limiting of geometry. Other favorable shapes include but are not limited to squares, hexagons, rectangles, triangles, and the like.

The lines 406 are axes of the collectors, and terminate on the top and bottom at tie points 408 and 410. The upper truss ensures that these axes are aligned sufficiently with the sun. Such alignment may be achieved by having subgroups of collectors with sufficiently parallel axes to another axis, and that this other axis is sufficiently aligned with the sun.

FIG. 4B shows a diagram of an embodiment of two sub-trusses 420, 422 intended to maintain parallel axes of the collectors. Subtruss 420 acts to maintain alignment of its four surrounding collectors with an axis 424 that can correspond with a truss member, having tiepoints 425. Subtruss 422 maintains alignment of its four surrounding collectors with axis 426, having tiepoints 427. Each truss is a collection of axially loaded elements.

FIG. 4BA shows an enlarged view of the sub-truss 420. In certain embodiments, elements (428, 430, and 432) of the subtruss 420 can further perform the function of providing coolant to the collector. In some such embodiments, the coolant can flow through or along element 428, along or through element 432, and then back along or through element 430. In other embodiments, one or more of these elements may have multiple flow conduits providing for flow both in and out along the same truss element.

The cross braces 434 are not required to maintain parallelism between the sub-truss axis and collector axis. However, these cross braces 434 provide axial support to the collectors to counteract wind, gravity, and inertial loads along the collector axis.

While cross braces 436 help to maintain parallelism between the collector axes, these alone are not sufficient since they may rotate about the axis 426 relative to their counterparts 437 on the bottom of the subtruss. At least two possible remedies that eliminate this degree of freedom are possible.

Crossbracing like that of elements 438 can be employed to resist this relative rotation. Alternatively, structure of the collector (e.g., the tangent points of rings 439) can be tied together and to the elements 436, provided the collector has the necessary stiffness.

The dashed and solid lines are intended to portray tensile and compressive elements, respectively. If the structures (428, 430, and 432) are not used to route coolant, then the elements 434 can in principle be compressive and at least the elements (428 and 430) can be tensile. However, since elements 428 and 430 directly affect how rigidly parallel the axes are, the extra material required to keep them from buckling serves extra duty in the arrangement shown.

The use of subtrusses (420 and 422) reduces the problem of aligning the collectors, to a problem of ensuring that axes (424 and 426) remain parallel. The symmetric arrangement of collectors about the subtrusses should in part reduce loads on the tie points 425 arising from wind and gravity.

Figure 4C:
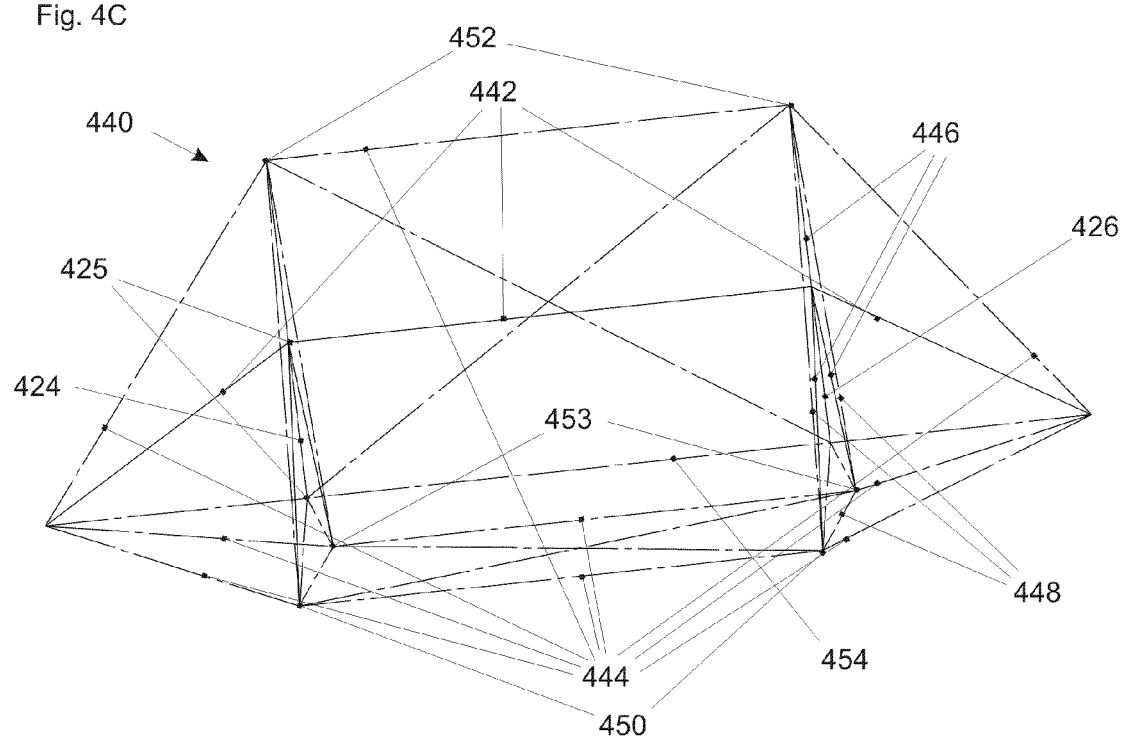
FIGS. 4C-4D are views of an embodiment of a support truss.

One goal of the design of the support structure that maintains the parallelism between (424 and 426) may be to null the first-order tilt produced by even loads on tie points 425. An embodiment of such a support truss 440 is shown in two views, FIG. 4C and FIG. 4D. For improved clarity, the subtrusses are not shown except for their axes (424, 426), and tie points 425.

The back-bone of this truss 440 are centrally disposed compressive elements 442 surrounded by opposing tensile elements 444. The secondary compressive structure 446 is radially disposed about a sub-truss tie point and opposed by a triangle of tensile elements 448.

The use of central compressive elements opposed by outer tensile elements is relatively efficient and resilient. The outer tensile elements can be pre-tensioned enough to prevent excessive sag and to maintain tension under operating conditions. This pre-tensioning can increase the required compressive strength of the central compressive element, but typically not as much as the maximum wind survival conditions.

Other embodiments may improve on material efficiency through the use of a network of smaller truss elements. An advantage of this slightly less material efficient design can be easier distribution, faster assembly, and greater resilience to unintended loads, such as hard side contacts of truss elements.

Structure 440 transmits displacements and loads to and from four points: two front pivot points 450 and two back pivot points (either 452 or 453, depending on the actuator orientation). Each pair of actuator points defines a pivot line. In this design, it is the responsibility of the base truss and actuator to ensure that these points remain coplanar.

The use of four tie points can improve rigidity and the transfer of forces to the ground, but introduces a kinematic compatibility requirement. This can be resolved by the use of a pair of separate elevator actuators. Alternatively, the truss 440 can be designed with three support points and extra truss elements to counter torques along the truss.

Figure 4D:
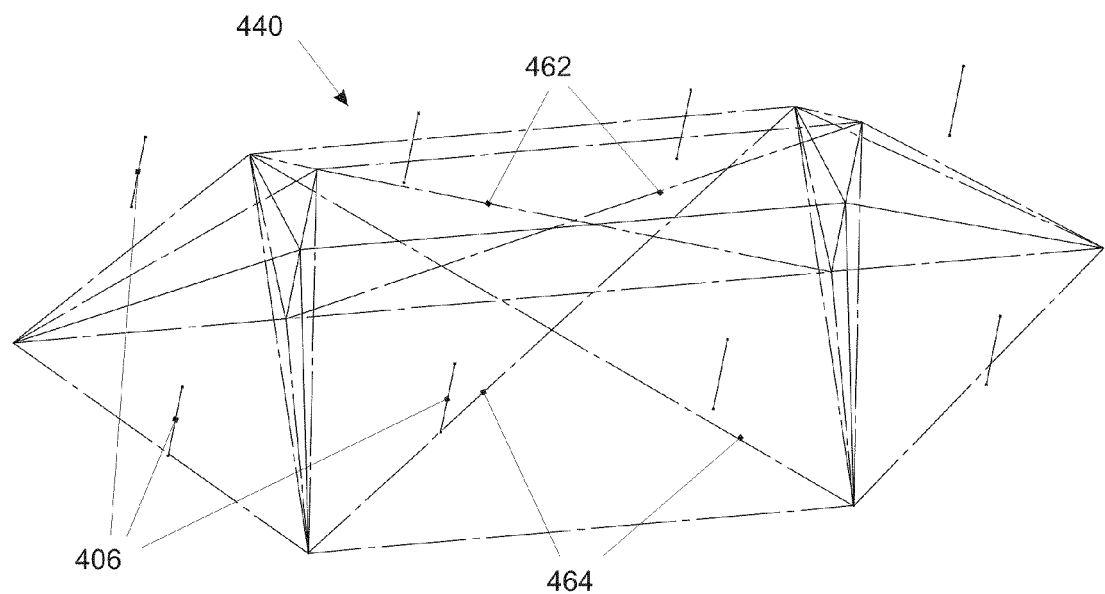

FIG. 4D shows the same truss 440 from an alternate view, showing the axes of the collectors 406. In this view the cross braces in the axial direction 462 and cross braces in the normal to the axes 464 are indicated.

Figure 4E:
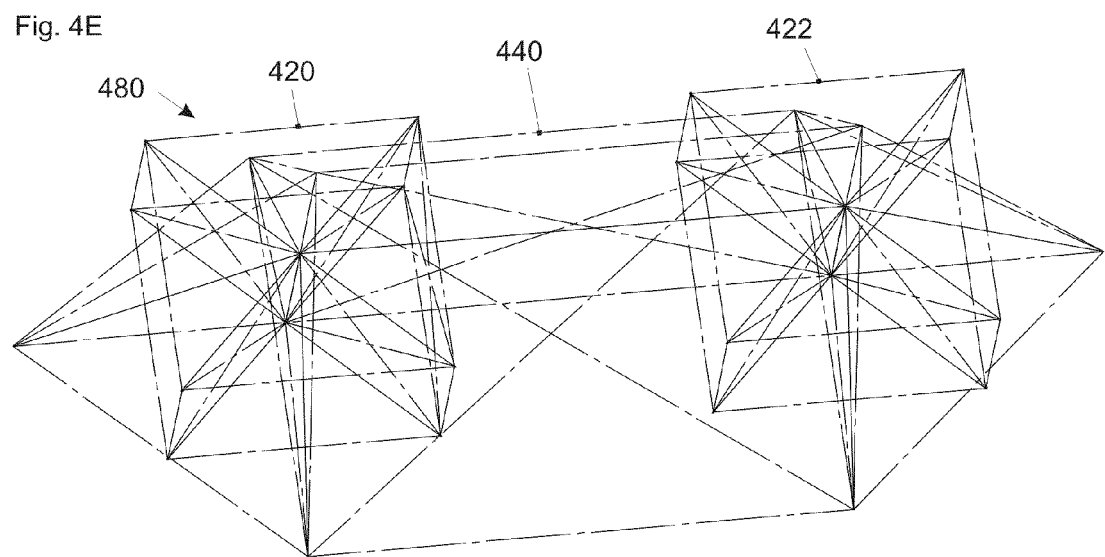
FIG. 4E shows the upper truss assembly of the truss of FIGS. 4C-4D, with subtrusses in place.
Figure 4F:
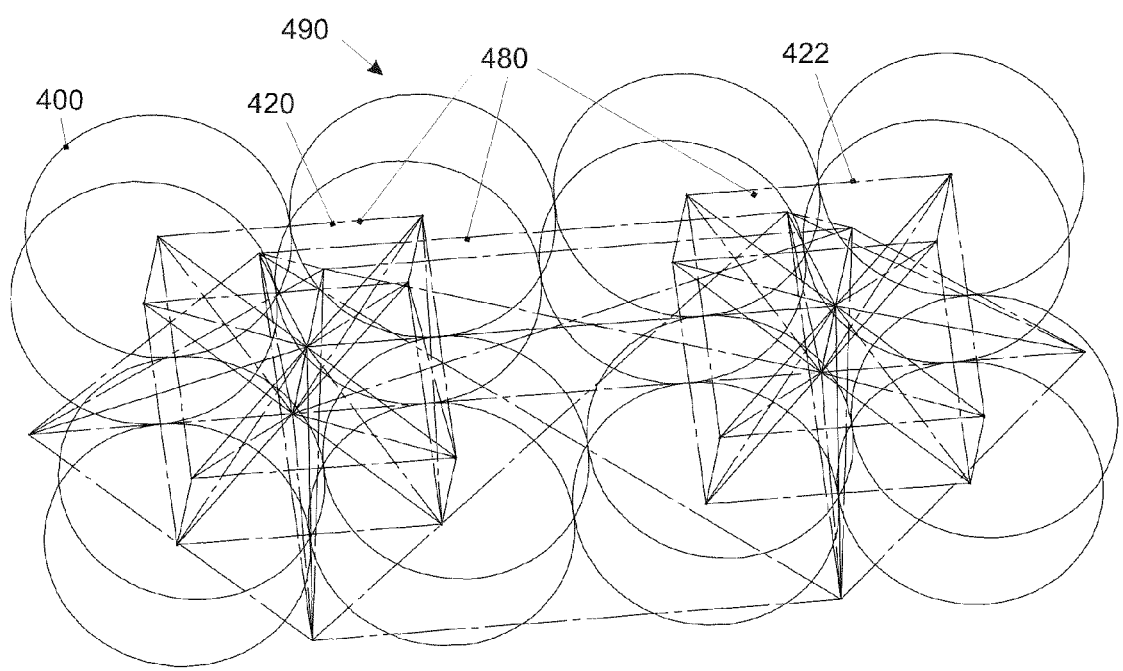
FIG. 4F shows an embodiment of a completed upper stage, including the upper truss assembly and the collector frames.

FIG. 4E shows the upper truss assembly 480 of truss 440 with subtrusses (420 and 422) in place. FIG. 4F shows the completed upper stage 490, including the upper truss assembly 480, which further includes subtrusses 420 and 422, and the collector frames 400.

Figure 4G:
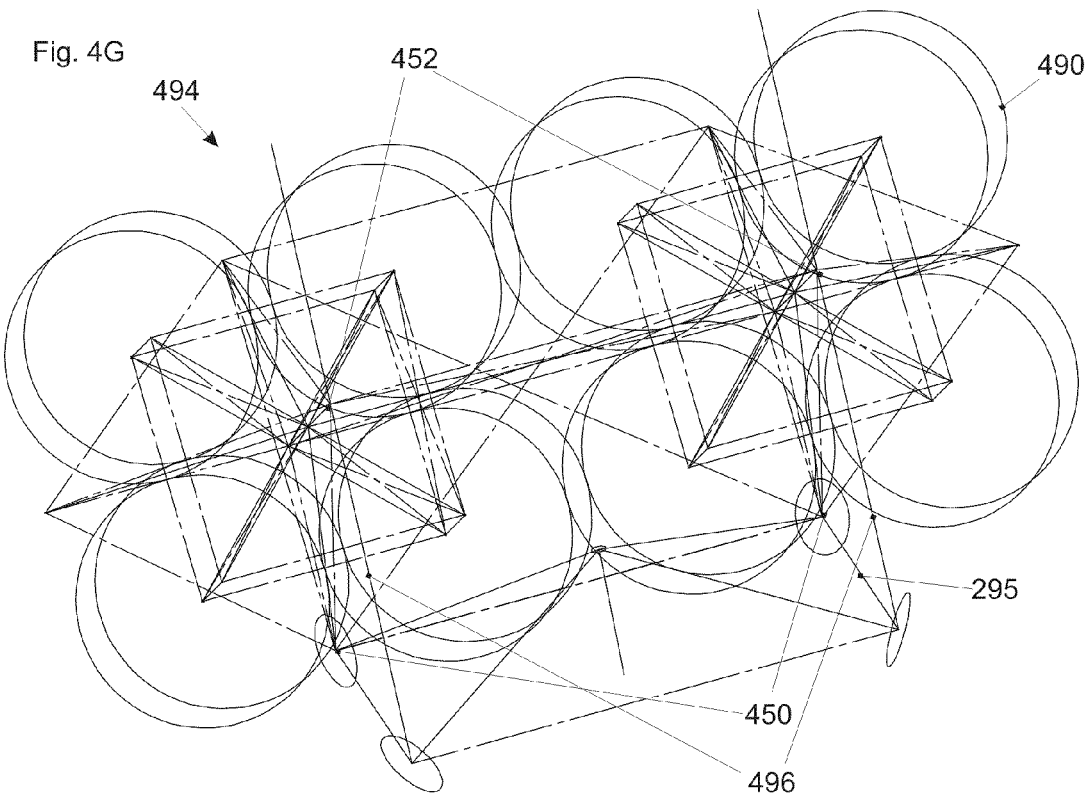
FIG. 4G shows an embodiment of a completed articulating collector assembly.

FIG. 4G shows a completed articulating collector assembly 494 comprising the upper truss assembly 490, a rectangular base assembly such as 295, a front pivot that connects at 450, and two actuated elements 496 that connect to the upper truss at 452.

The array shown in FIG. 4A, the rectangular array 400 of collectors has 2 rows and 4 columns. Such an array is favorably disposed with the wide portion horizontally to minimize the array spacing needed to mitigate shading and reduce the structure height.

Other favorable rectangular arrays to mitigate shading effects in latitudes of common interest include 2 rows and 3 columns. Still other favorable arrays from a shading perspective include one row by two columns, or a staggered 2×4 or 2×3 rectangular array in the form of a hexagonal packing. The following discussion is specific to the 2×4, non-staggered array in FIG. 4A, but the design method described herein can be translated to these other arrays.

Figure 5A:
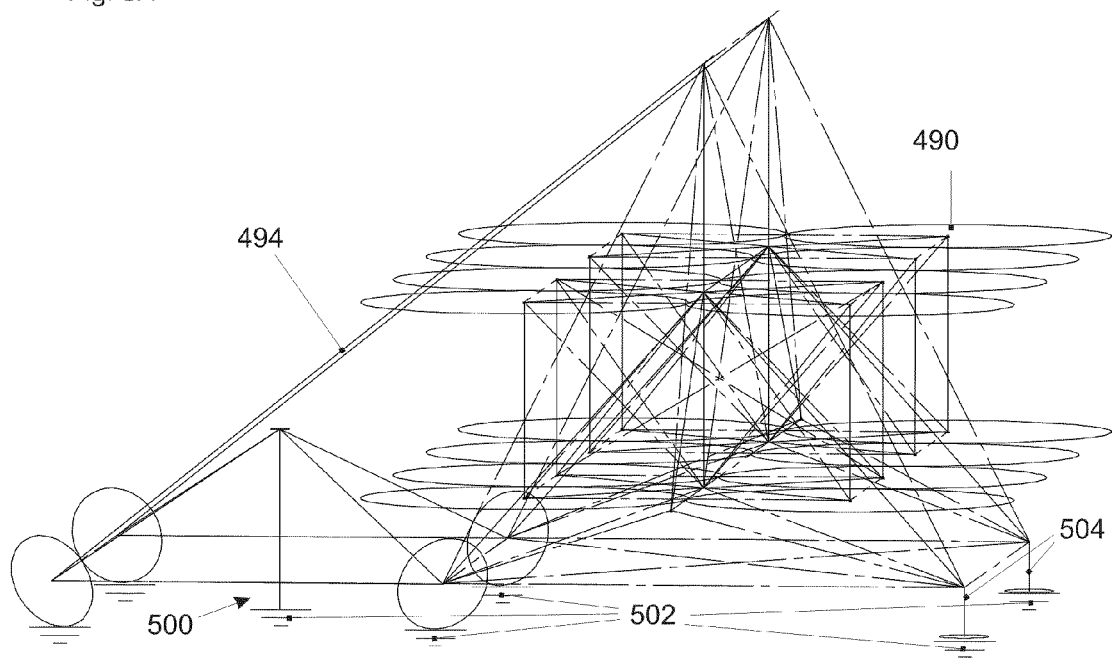
FIGS. 5A-5D show an embodiment of a composited articulating collector assembly.

FIGS. 5A-5D show the composited 500 articulating collector assembly 494 functioning with the externalized ground structural elements 502 over a range of angles. FIG. 5A shows the array at 90 degrees from horizon (vertical). This orientation can serve as a stow/servicing position for upper assembly 490. Additional ground interfaces such as 504 can be employed to reinforce the structure.

In some embodiments, the structure-mounted GIs are minimized, and ground referenced features are placed to accommodate them. These features may be portable to support maintenance or permanent to support stowage.

Figure 5B:
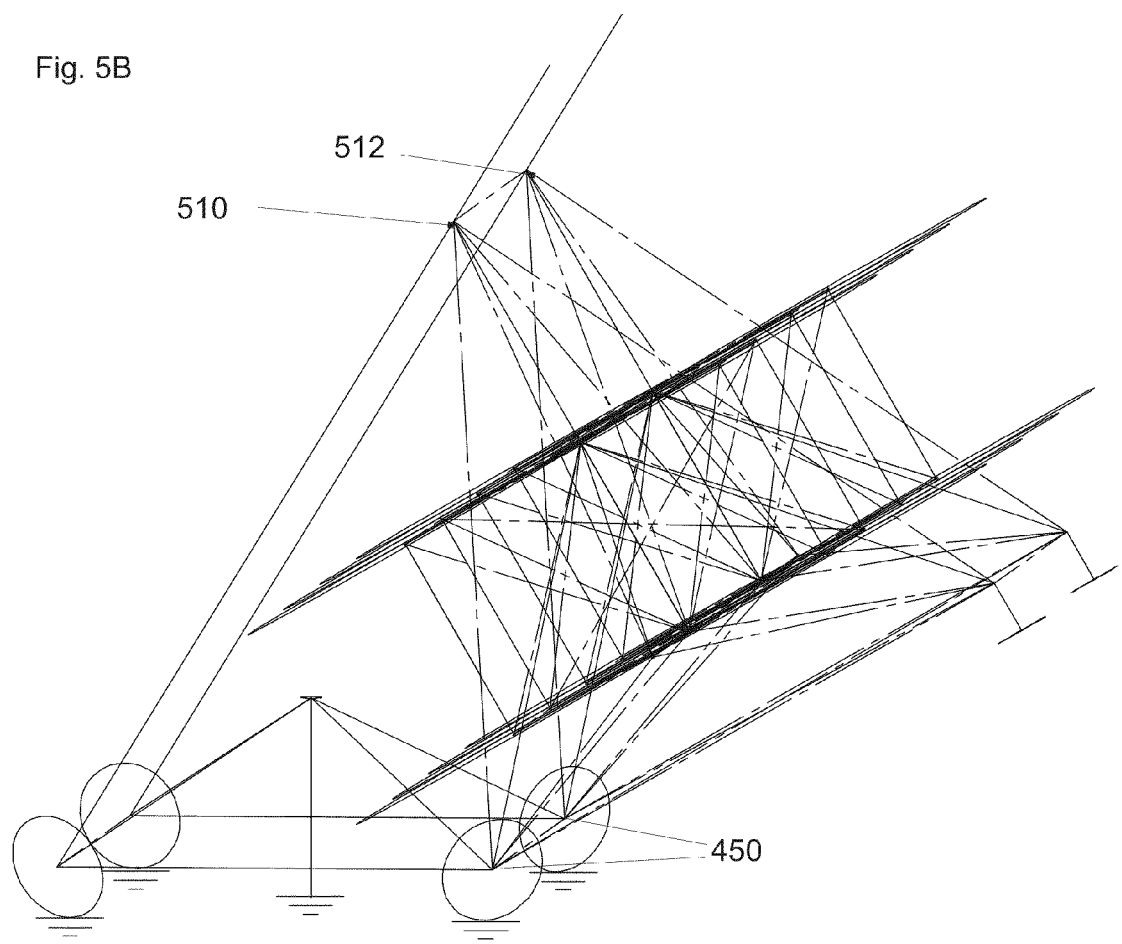

FIG. 5B shows the upper truss at 60 degrees from horizon. The elevation in the diagrammed embodiment is determined by the positions of the points (510 and 512) on the actuators. These positions must be adjusted relatively to maintain planarity with the tie points 450.

Figure 5C:
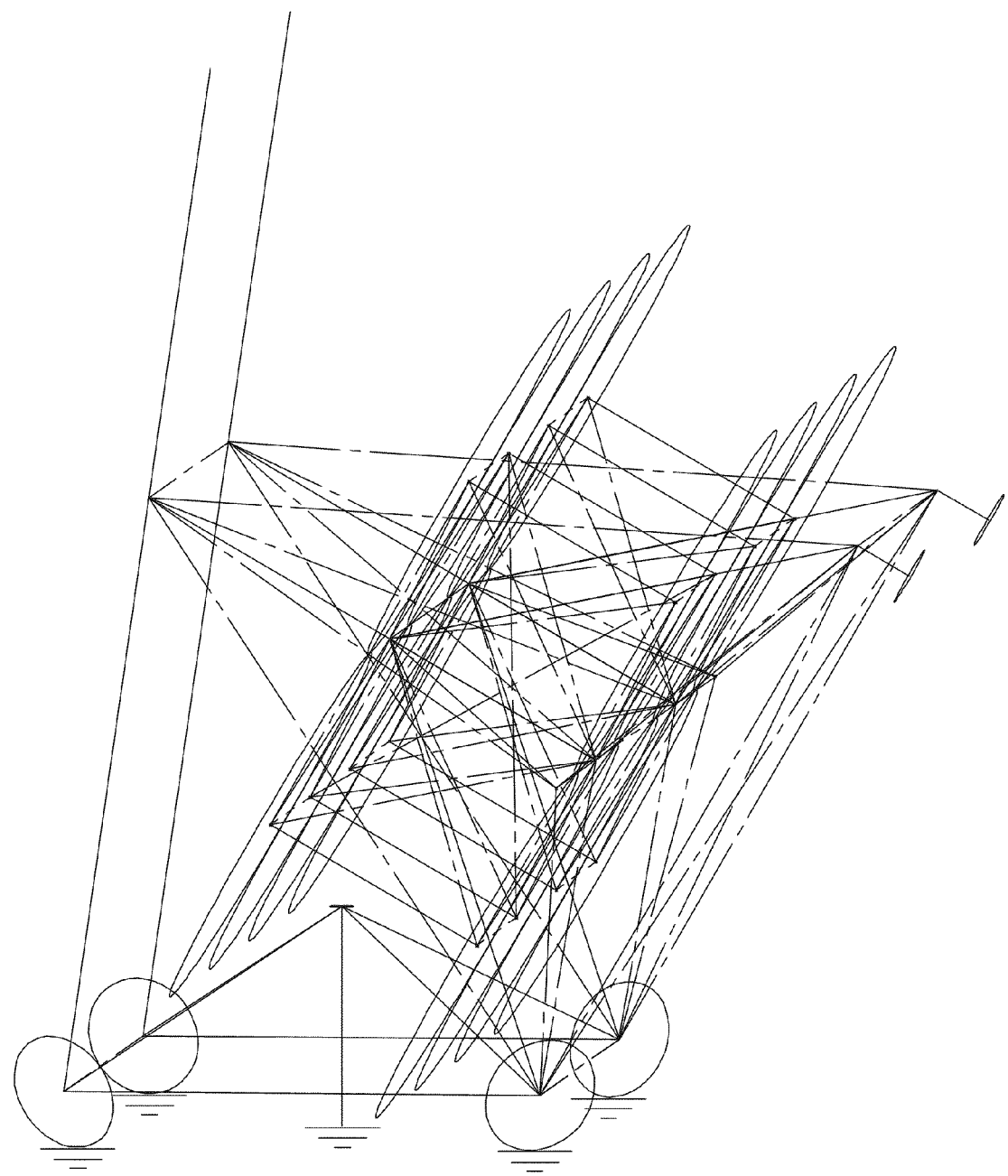
Figure 5D:
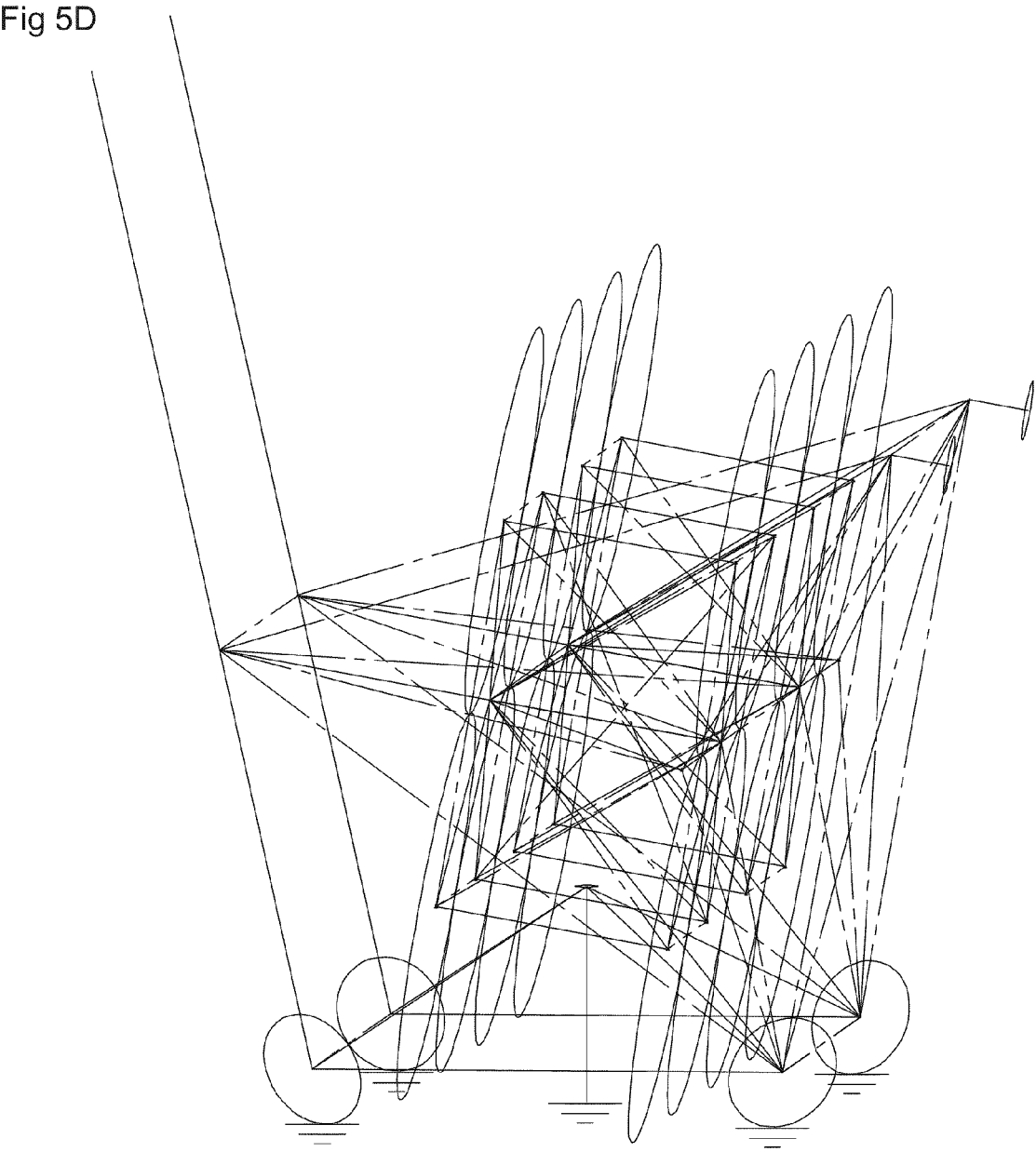

FIG. 5C shows the upper truss at 30 degrees elevation from the horizon. FIG. 5D shows the upper truss at 10 degrees elevation from the horizon.

Collector Array

Figure 17:
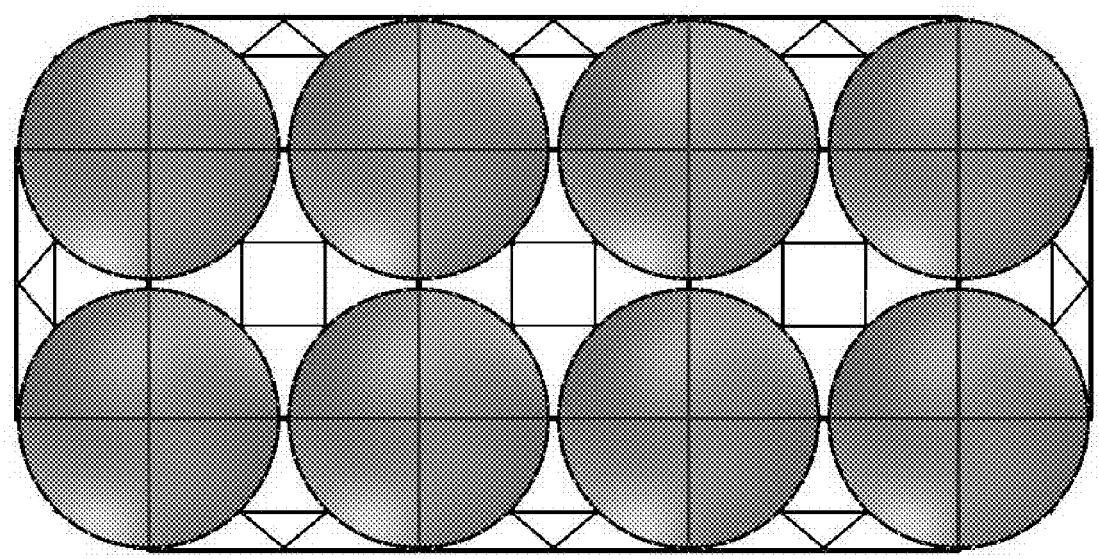
Figure 17A:
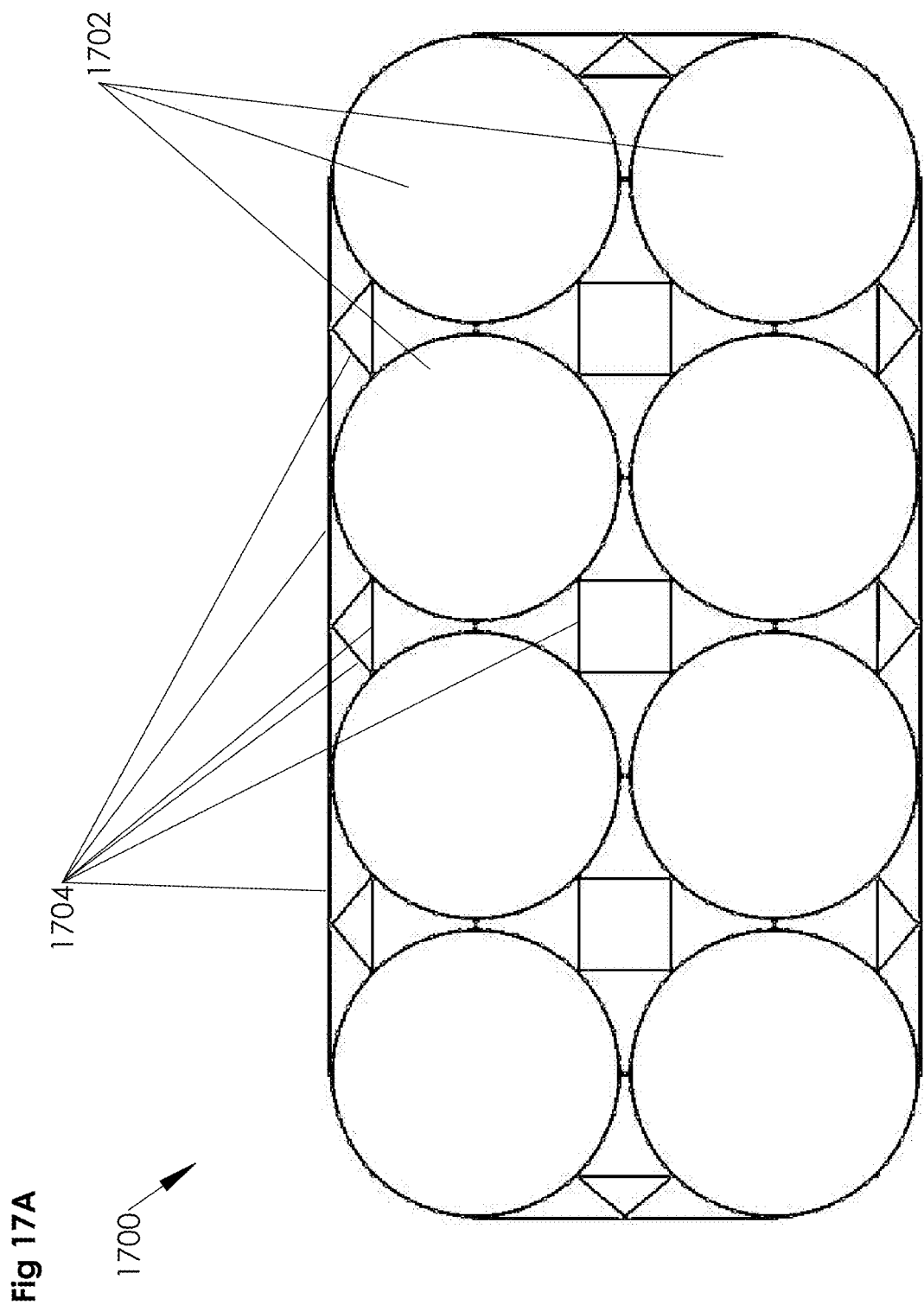
Figure 18:
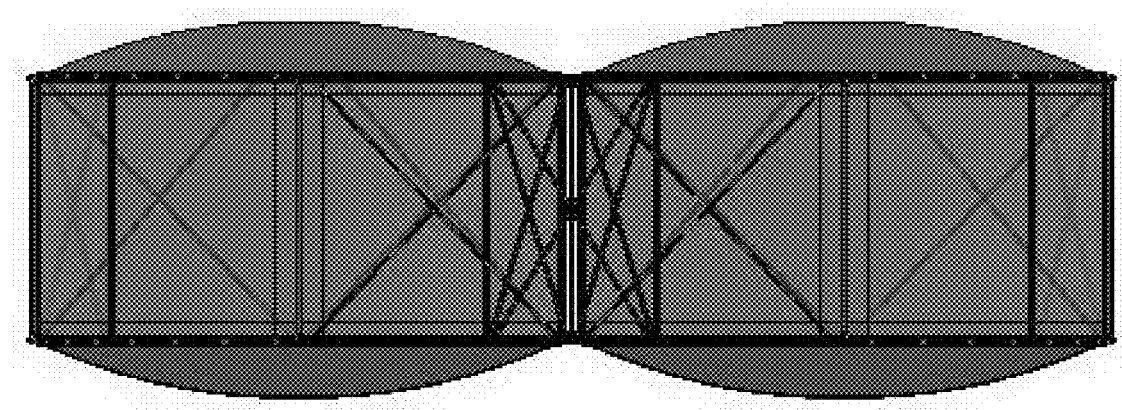
Figure 18A:
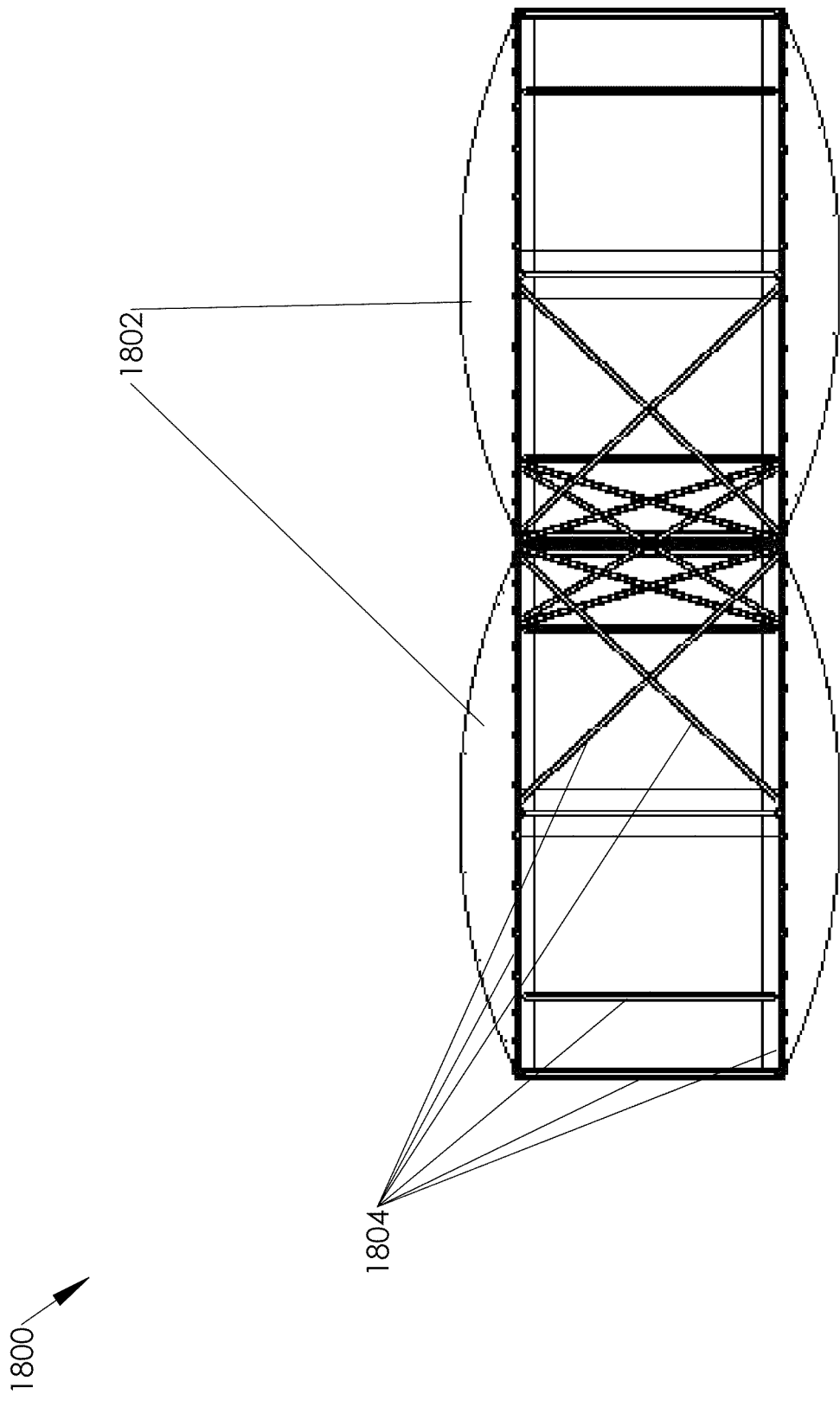

FIGS. 16 through 18A show one embodiment of a solar collector array. According to embodiments, the structure that holds the solar collectors both holds the collectors in alignment with one another despite the forces of wind and gravity, and also allows the collectors to be attached to and manipulated (moved) as a single unit. In particular, FIG. 16A shows a perspective view of an array 1600 having solar concentrators 1602 with supporting structural elements 1604 that connect the concentrators 1602 together and create rigidity in desired directions. FIG. 17A shows a top view of an array 1700 having solar concentrators 1702 with supporting structural elements 1704 that connect the concentrators 1702 together and create rigidity in desired directions. FIG. 18A shows a side view of an array 1800 having solar concentrators 1802 with supporting structural elements 1804 that connect the concentrators 1802 together and create rigidity in desired directions.

Many solar power systems, especially concentrating systems, require a high pointing accuracy to achieve optimal efficiency—typically +/−0.1 degree as an example. Many solar power systems cause multiple collectors to track the sun by moving them as a unit with one set of actuators.

Achieving high pointing accuracy of all the collectors, and sufficient structural integrity to hold these elements in alignment and withstand wind forces, typically requires a significant structure. Embodiments may substantially reduce an amount of material and a cost required to achieve the required pointing accuracy and structural integrity of an array of solar collectors.

FIGS. 19 through 21A show various views of an individual inflated solar collector that functions as a solar concentrator. FIG. 19A shows an inflated solar collector 1904 structure with stays 1908 connecting rings 1902 and 1906.

Figure 20:
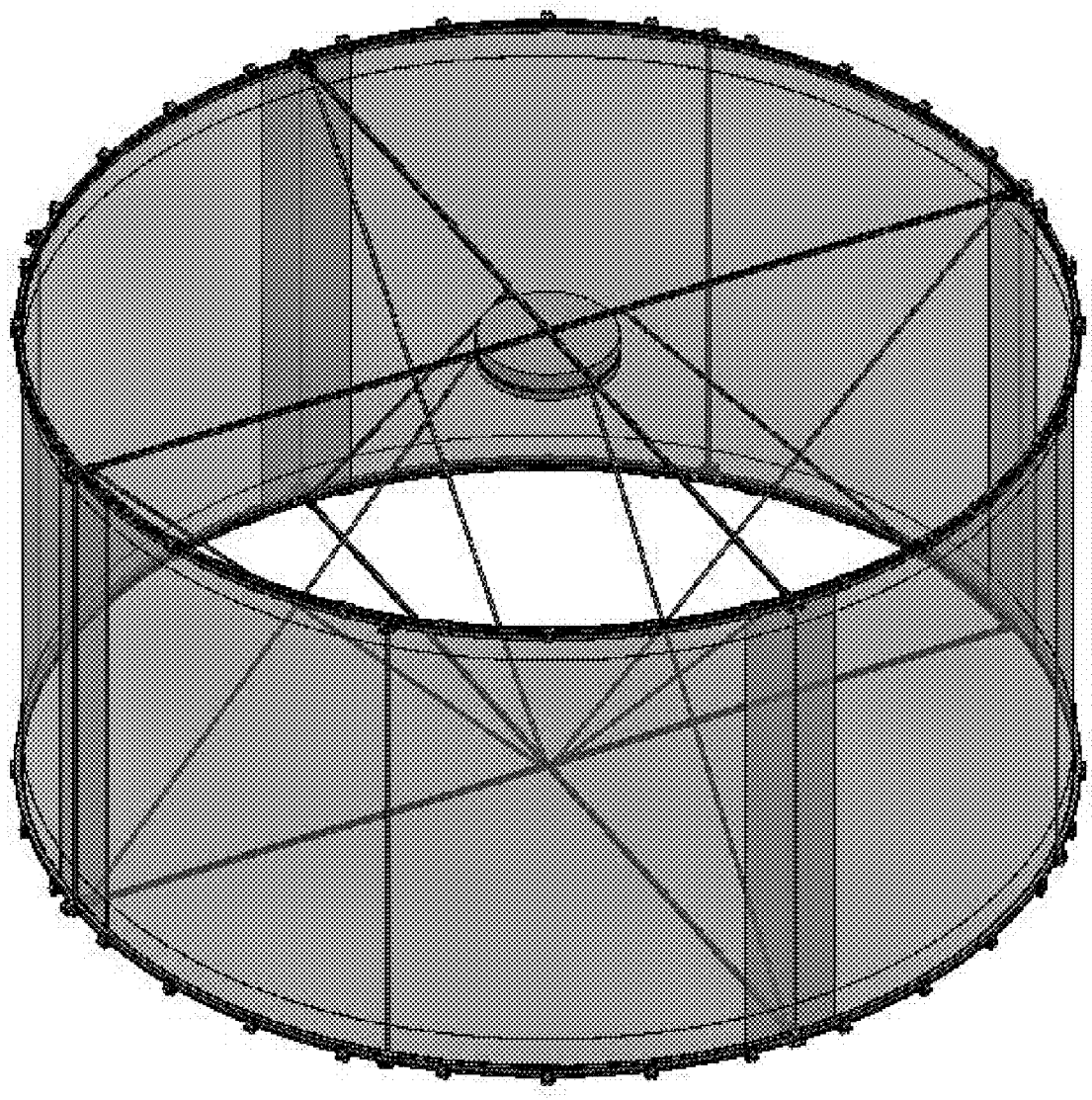
Figure 20A:
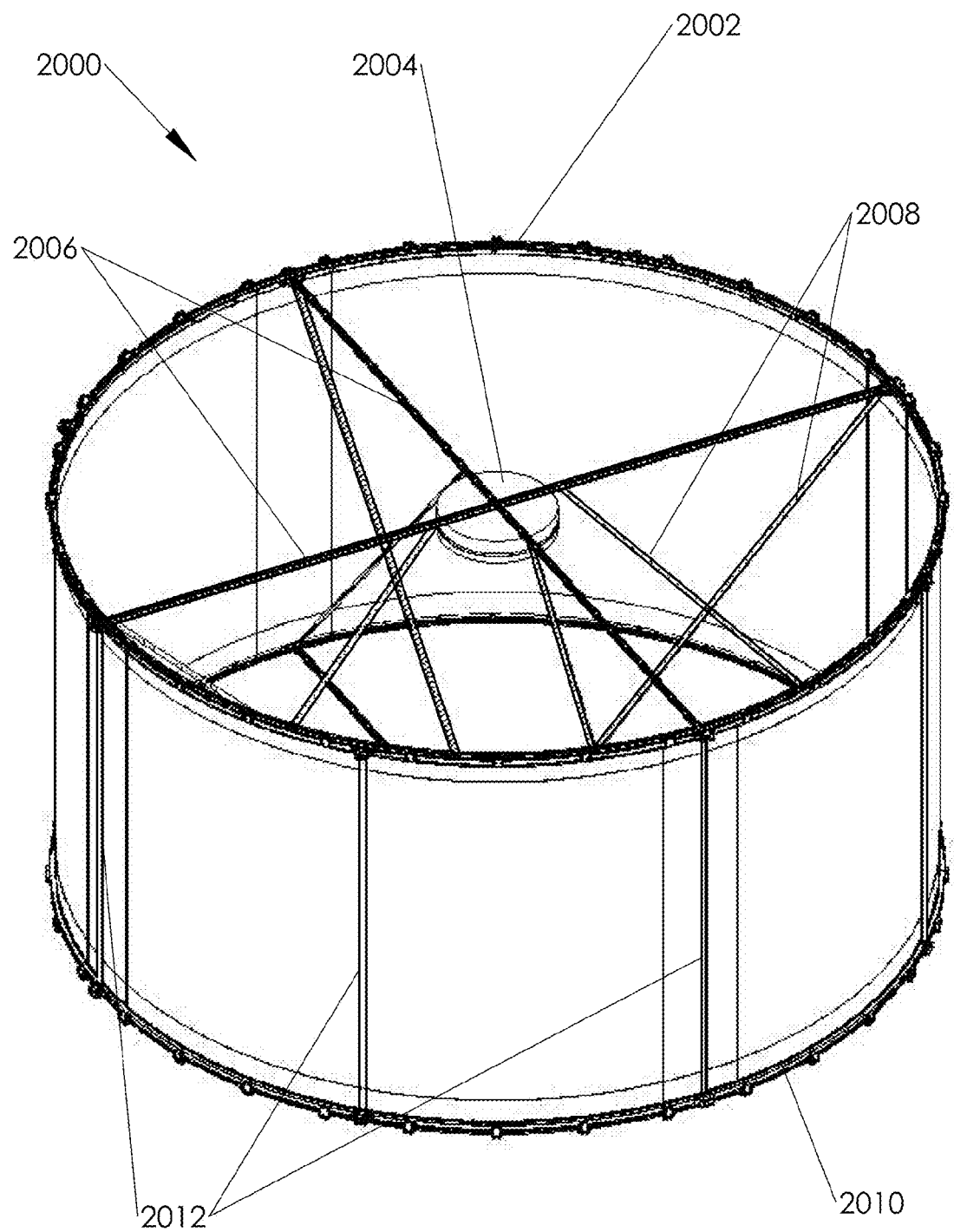
Figure 21:
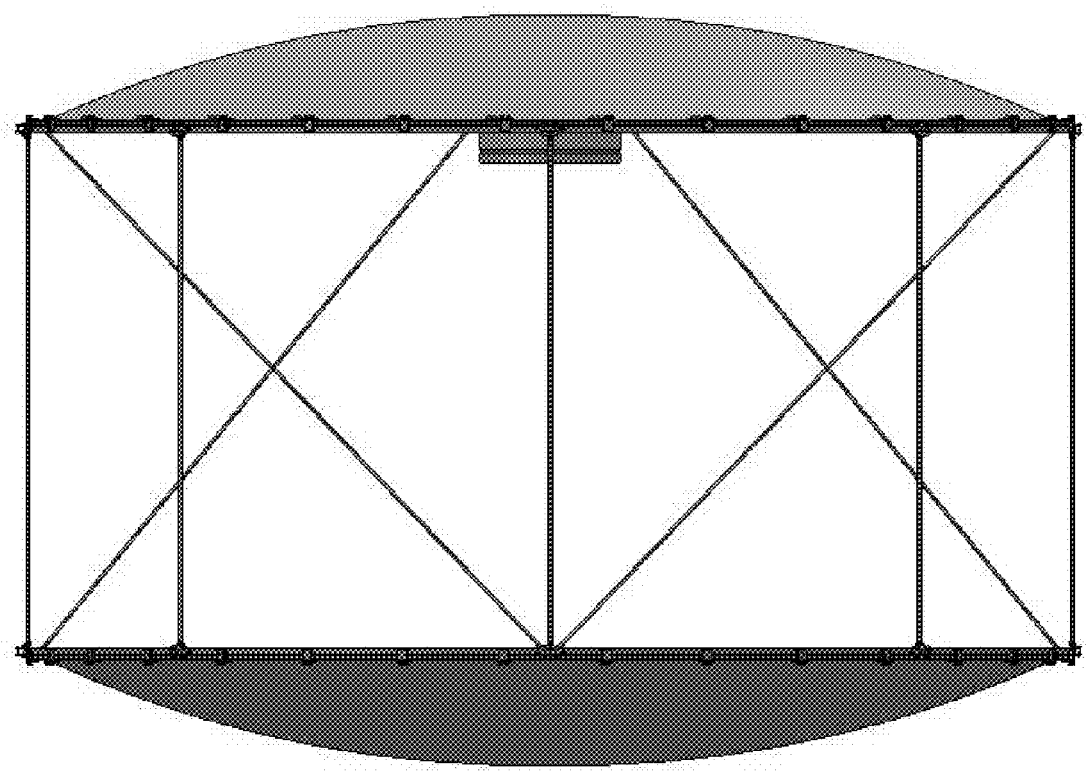
Figure 21A:
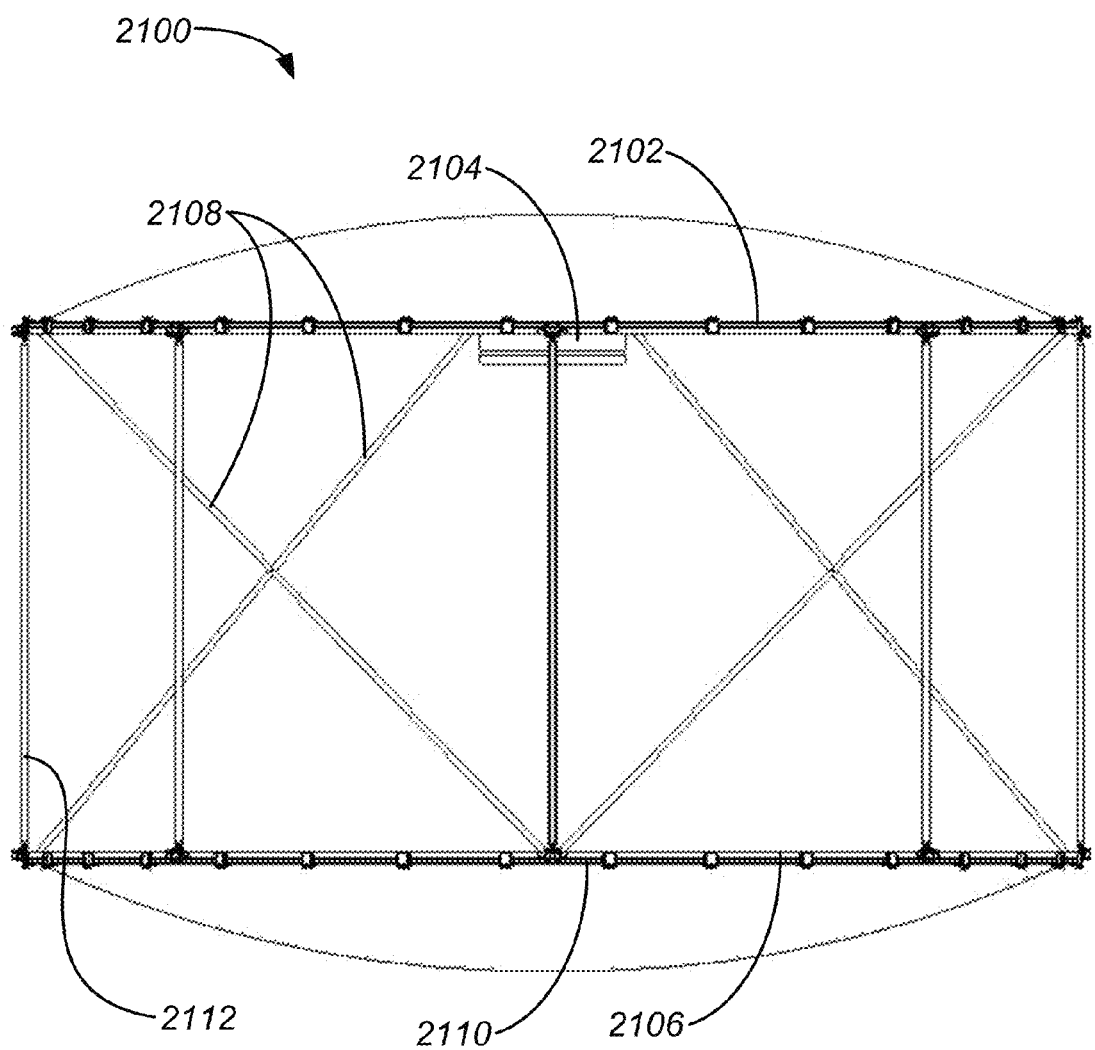
Figure 22:
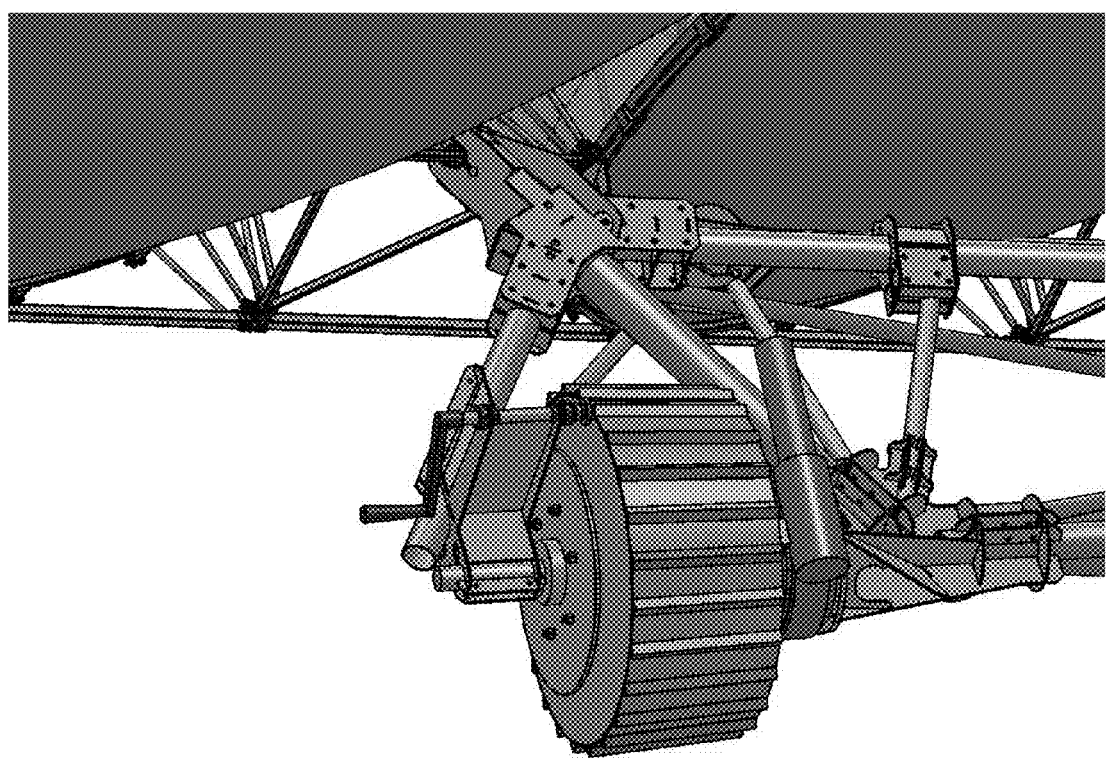
FIGS. 22, 22A, 23 and 23A show an embodiment of a drive wheel attached to a solar collector array structure.
Figure 22A:
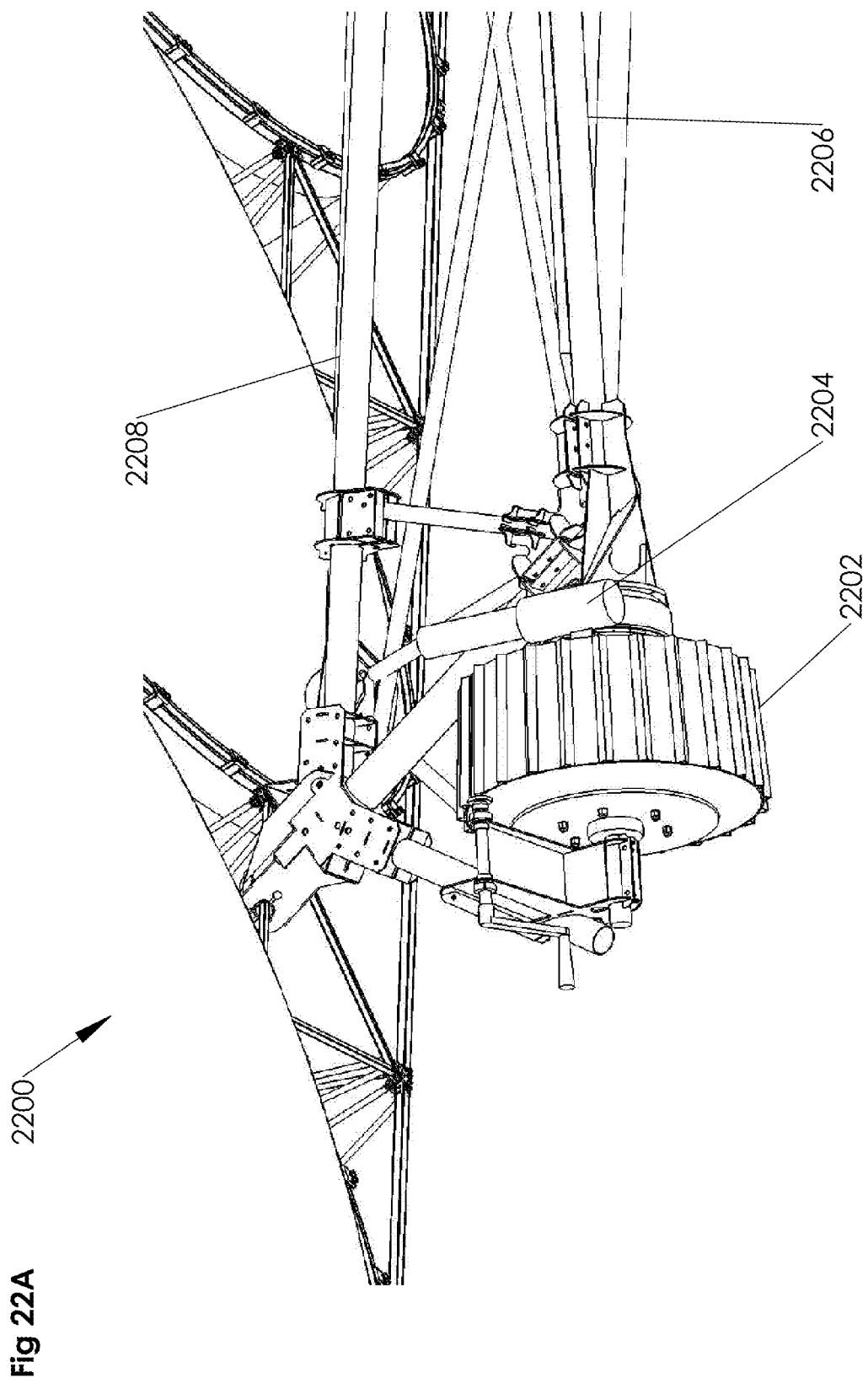
Figure 23:
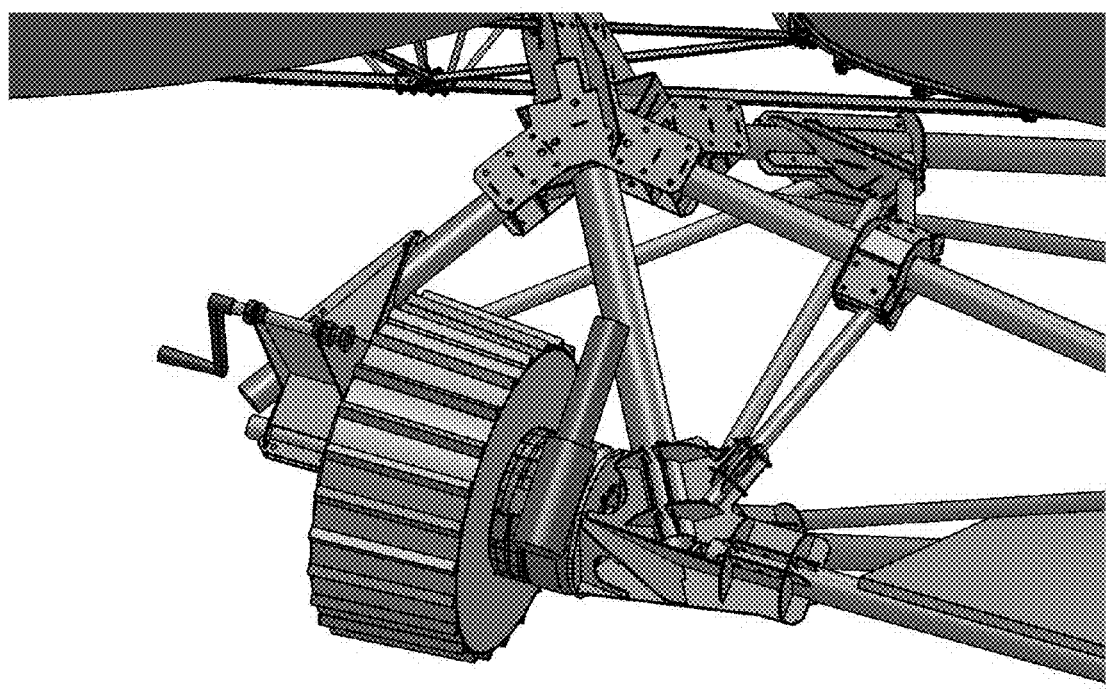
Figure 23A:
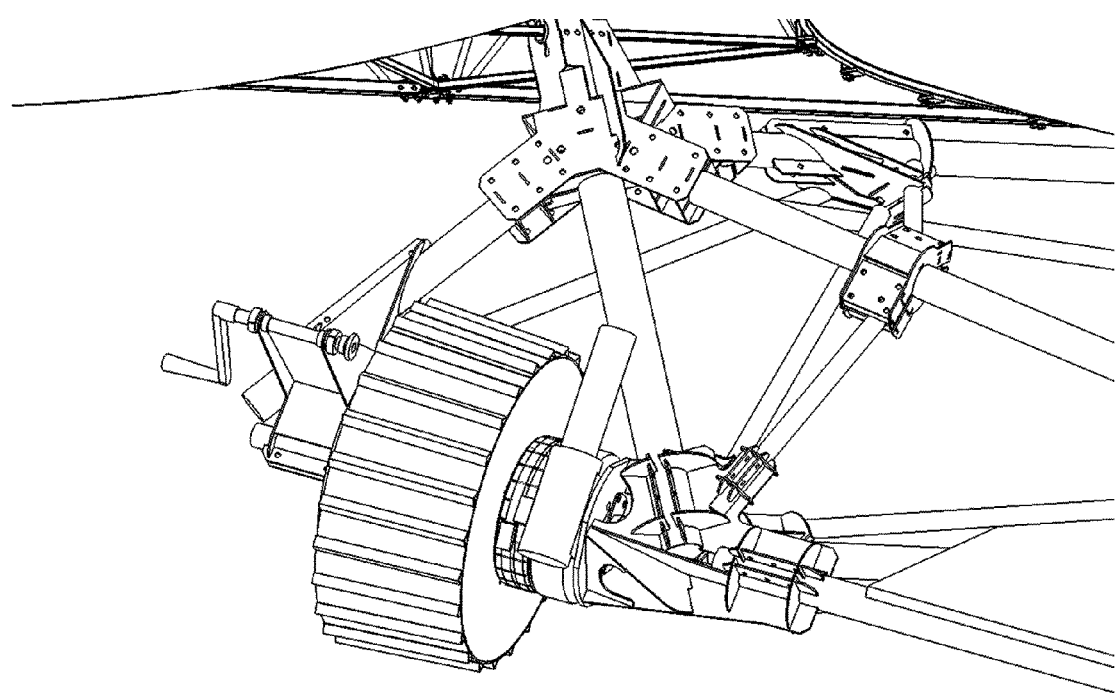

FIGS. 20 and 21 show a schematic receiver positioned inside the inflated solar concentrator, where the receiver is the disc in the center of the concentrator. The receiver is attached to the solar concentrator frame. FIG. 20A shows an inflated solar collector 2000 with films removed for clarity so that diametral frame members 2006 and 2008 are visible. A receiver 2004 is supported by members 2008. The inflated solar collector 2000 structure further includes stays 2012 that connect rings 2002 and 2010. FIG. 21A shows a side view of an inflated solar collector 2100 with films removed for clarity so that diametral frame members 2106 and 2108 are visible. A receiver 2104 is supported by members 2108. The inflated solar collector 2100 structure further includes stays 2112 that connect rings 2102 and 2110.

In certain embodiments, solar collectors uses plastic film to define the top and bottom of each collector. Reflective film on the bottom creates a primary optic and clear film on the top creating a sealed volume. These films are not shown in some of the figures for clarity.

Various embodiments may exhibit one or more design features. One design feature is that while each solar collector unit has its own structure to maintain its shape, the structures of the collectors when linked together form the majority of the frame that (1) provides sufficient stiffness to hold the collectors in relative mutual alignment, (2) allows the collectors to be actuated as a unit, and/or (3) provides sufficient strength to avoid damage during storms or other expected applied forces. Some elements in addition to the frames of the collectors themselves may be used, but the relative weight and cost of these additional members can be small. The collector structures themselves provide most of the structure needed.

A second design feature uses the inflation pressure inside inflated solar collectors, as a primary stiffening structural element to achieve the stiffness required to hold the collectors in alignment during operation, despite changing wind and gravity loads on the collectors. When the collectors are not inflated, a much lower system stiffness can be tolerated because alignment and pointing accuracy are not required when the collectors are non-operational. Round or cylindrical inflated collectors can use orders of magnitude less material (other than air) for a given stiffness.

Embodiments of an inflated collector that facilitates the design features mentioned above, uses the minimum structural material to create the shape and structure of the inflated solar collector. Certain embodiments position each structural member to both create the collector structure and to be of high utility in creating stiffness and strength for the matrix of connected collectors.

To create high utility in both the collector structure and in the matrix structure, elements are used in axial loading wherever possible. To this end, one or more structural elements are positioned substantially along one or more diameters of the collector. While such positioning may obstruct a small amount of the light coming into the collector, the structural benefits and dual duty that these members can perform in this configuration (i.e. using a structure located inside the collector volume) can outweigh the minor loss of light blocked by that structure.

Cross Collector Structure

Figure 19:
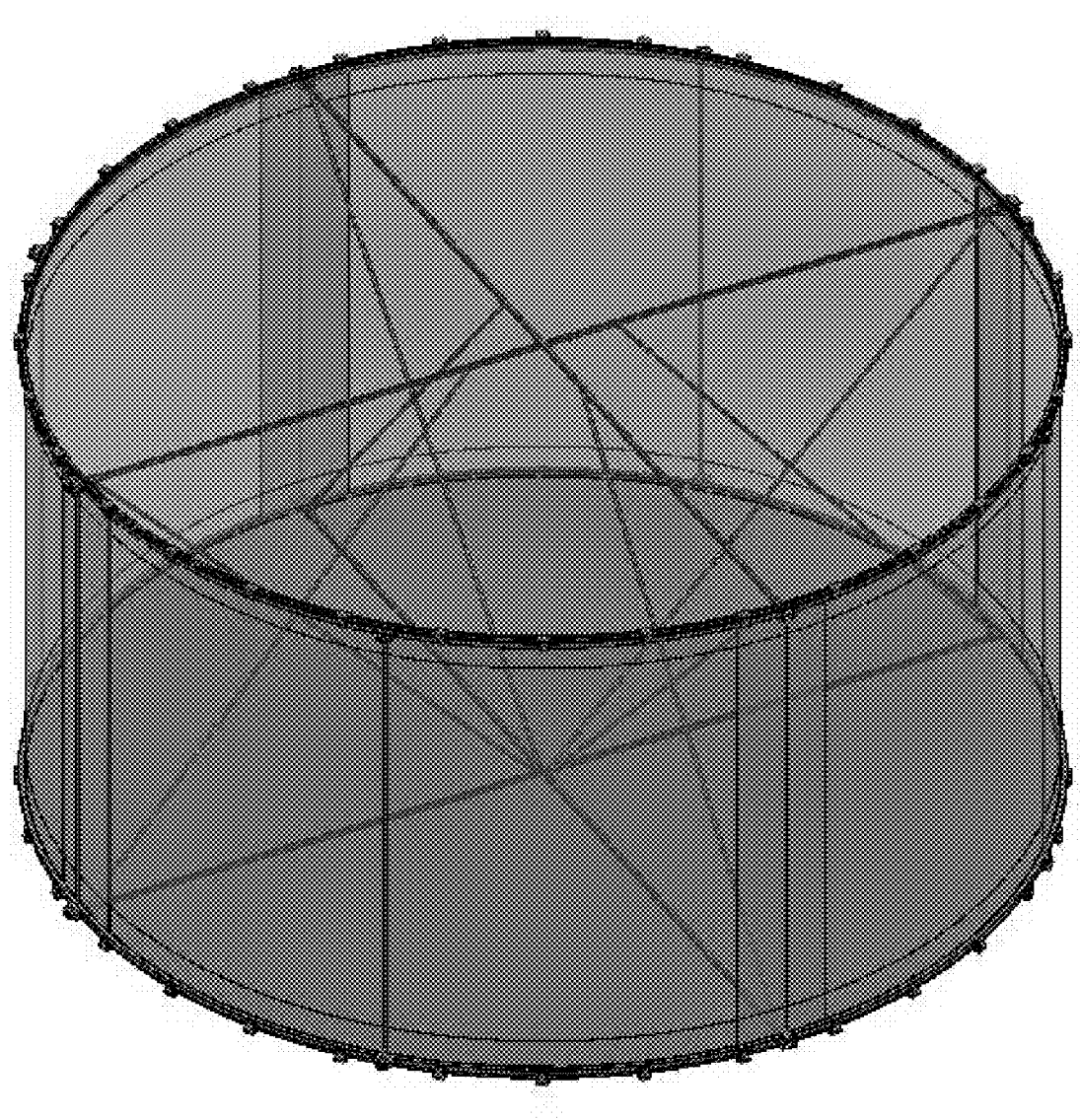
FIGS. 19 through 21A show various views of an embodiment of an individual inflated solar collector adaptable to be used with the solar collector array and articulation system illustrated in FIGS. 6 through 15A.
Figure 19A:
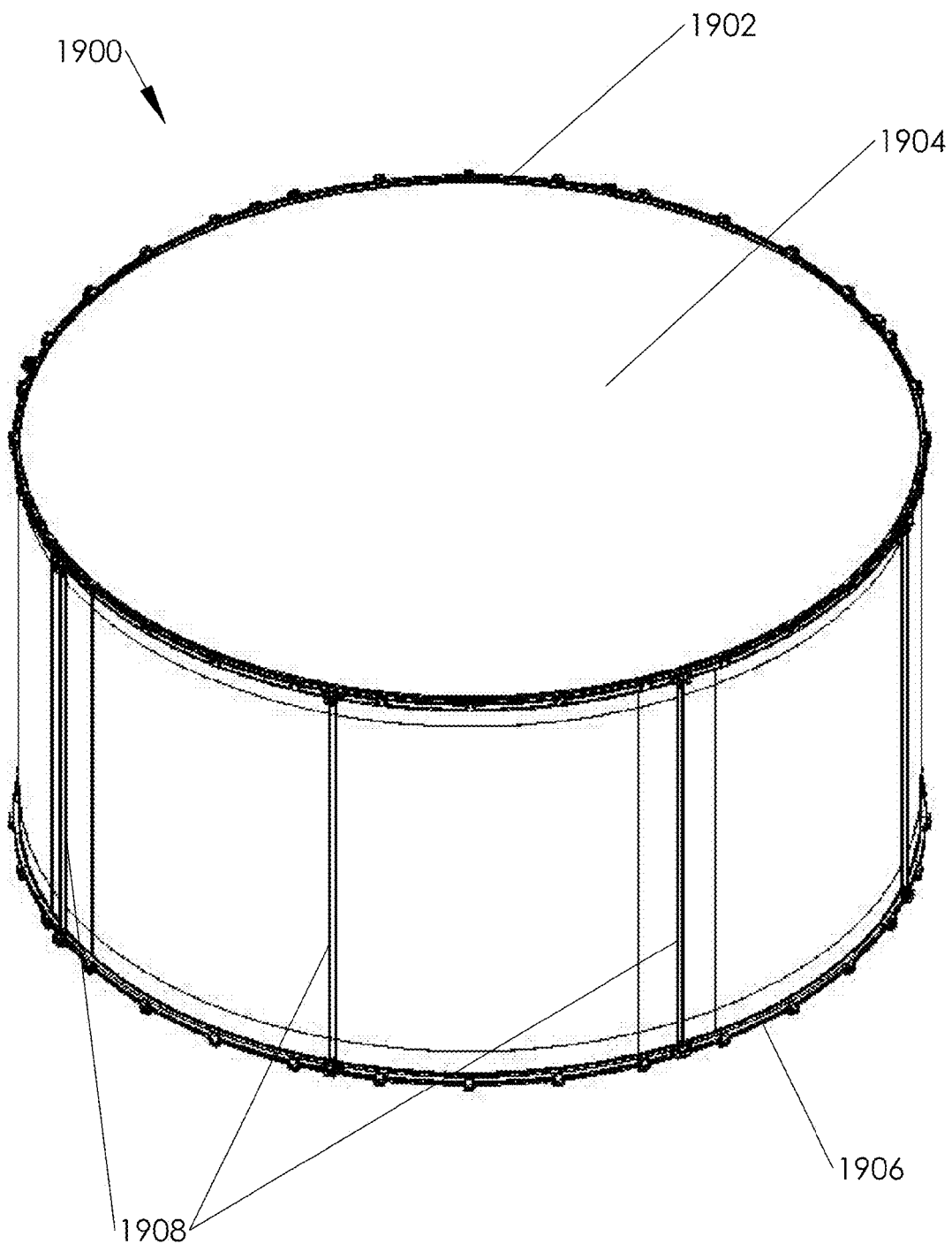

FIG. 19 shows an isometric view of one embodiment of a solar collector. This embodiment has a top and bottom circular boundary separated by some distance. In some embodiments, a reflective optic element is attached to and spans the bottom circular boundary. A side material spans the top and bottom circular boundaries and a top material spans the top circular boundary. In such embodiments, the optic element, the side material, and the top material, form a closed volume capable of containing pressurized air or gas.

Primary structural elements span orthogonal diameters of both the top and bottom circular boundaries. Ends of optional diagonal structural members can connect diametrical members. In certain embodiments all members lie in planes so as to cast overlapping shadows when the collector is pointed directly at the sun. This embodiment of collector frame will be referred to here as the "cross collector structure".

Figure 16:
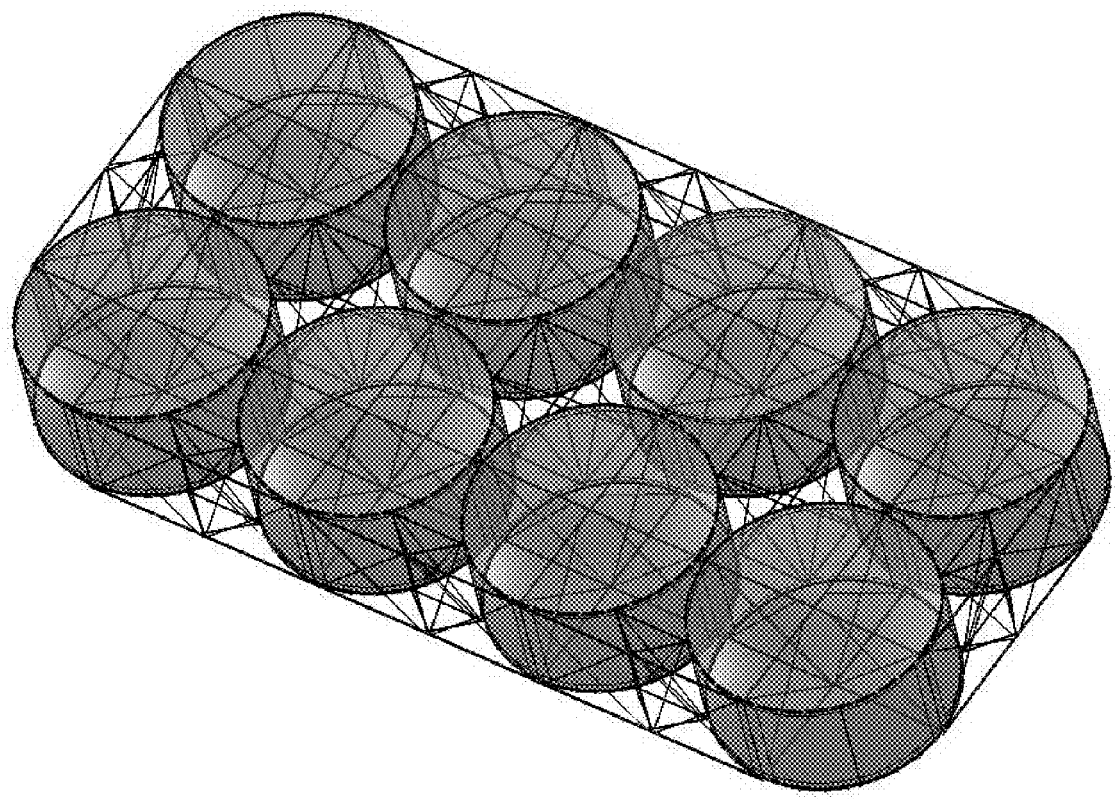
FIGS. 16 through 18A show various views of one embodiment of a solar collector array adaptable to be used with the solar collector array and articulation system illustrated in FIGS. 6 through 15A.
Figure 16A:
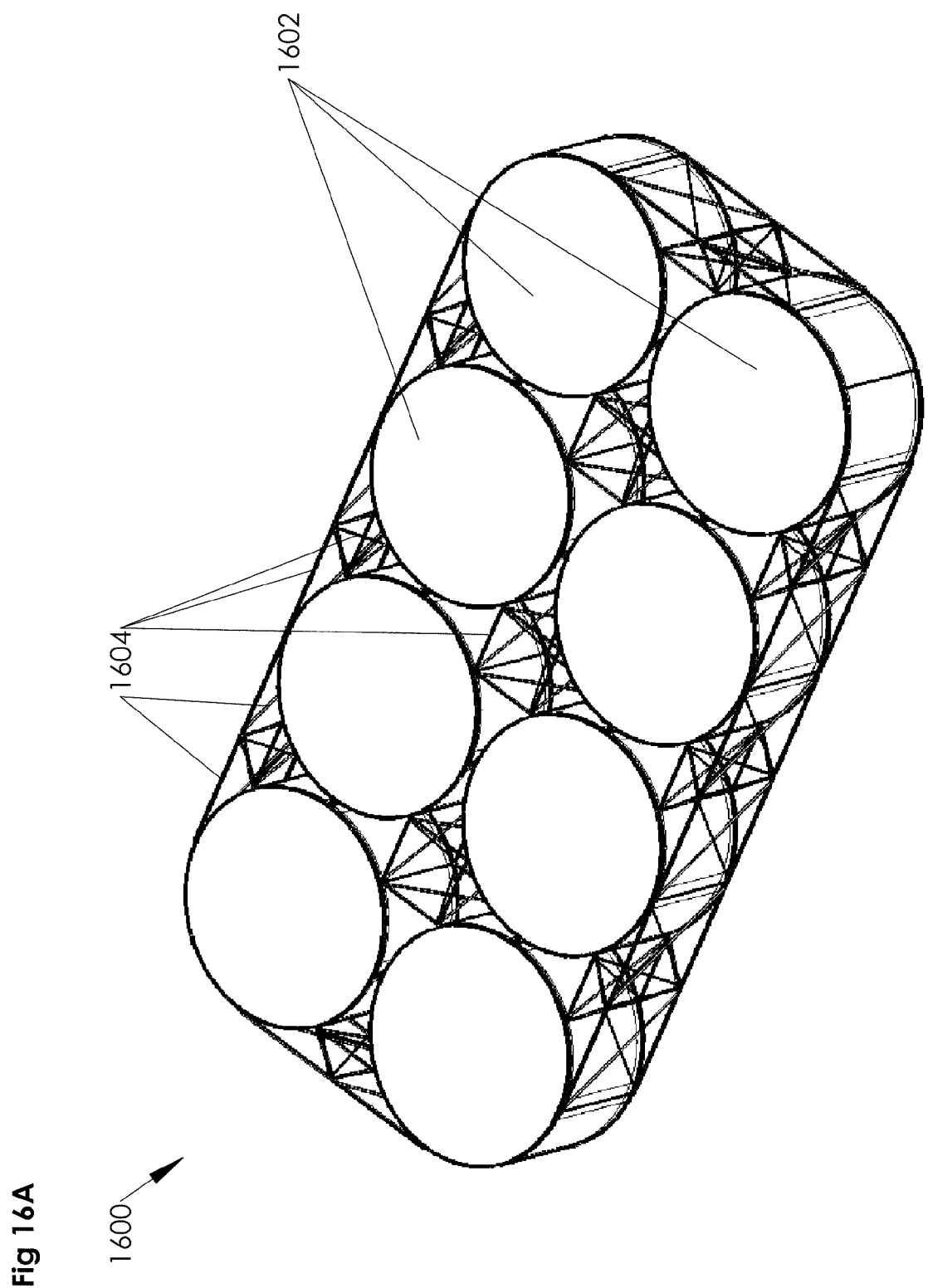

FIG. 16 shows an embodiment of an array of solar collectors with the internal cross structure of each collector visible. For certain structures, the diametrical members of each collector are aligned with 2 primary directions of the collector structure array. For example, if the array is 4 collectors wide by 2 collectors deep (i.e. 2 rows of 4 collectors), one top diametrical member in each collector frame is aligned with the row direction and the other top diametrical member in each collector is aligned with the column direction. The bottom diametrical members in each collector would have the same orientation but at the bottom circular boundaries.

When collector frames are connected together to form a collector array, a larger frame with effective top and bottom sets of longitudinal and transverse members spanning the length of the longitudinal and transverse array directions, are created. These effective longitudinal and transverse members of the array, in combination with the diagonal elements that maintain the distance between the top and bottom sets of members and resist shear forces, form a larger frame. This larger frame has the strength required to prevent damage to the collectors without the use of other members beyond the collector frames themselves.

Some relatively small members may be used in the interstices between the cylindrical collector frames to provide diagonal stiffness as needed. Additional optional diagonal diametral members may be used as part of each collector frame to create additional diagonal strength or stiffness if necessary.

The top and bottom circular members corresponding with the top and bottom circular boundaries of each collector, may be connected to the optional diagonal members in the interstices between the collector frames. This would create a moderate but sufficient level of diagonal strength for the matrix when the collectors are not inflated. Stiffness may be limited in this mode because sections of the circular members will deform more than comparable straight members, under the influence of both tension and compression forces in the diagonal structure directions. These forces would tend to shear the collector matrix along the matrix planar dimensions.

Some preferred embodiments employ inflation air to provide forces to enhance the rigidity of a collector. Examples of such structures appear in U.S. patent application Ser. No. 11/843,531 filed Aug. 22, 2007 and titled "Inflatable Solar Concentrator Balloon Method and Apparatus," the disclosure of which is incorporated by reference in its entirety herein for all purposes. Embodiments may share one or more characteristics in common with the apparatuses disclosed in that patent application.

When collectors are inflated, the sections of the circular members are much stiffer and their material may be used with a structural efficiency comparable to straight members. In particular, the inflation pressure and resulting membrane forces from the pressurized top and bottom materials, may serve to create a substantially greater bending and buckling stiffness in these curved sections of the circular members. The resulting bending and buckling stiffness in the inflated mode is comparable to the bending and buckling stiffness of a similar structure having straight members in place of the sections of the circular members.

This beneficial positive stiffening effect may be a result of using the pressurized air or gas in the collector, as a structural element that stabilizes and stiffens each collector frame as well as the whole collector array. In particular, FIGS. 64A-64C show a comparison of the behavior of a curved member plus membranes with and without the effect of inflation pressure.

Figure 64A:
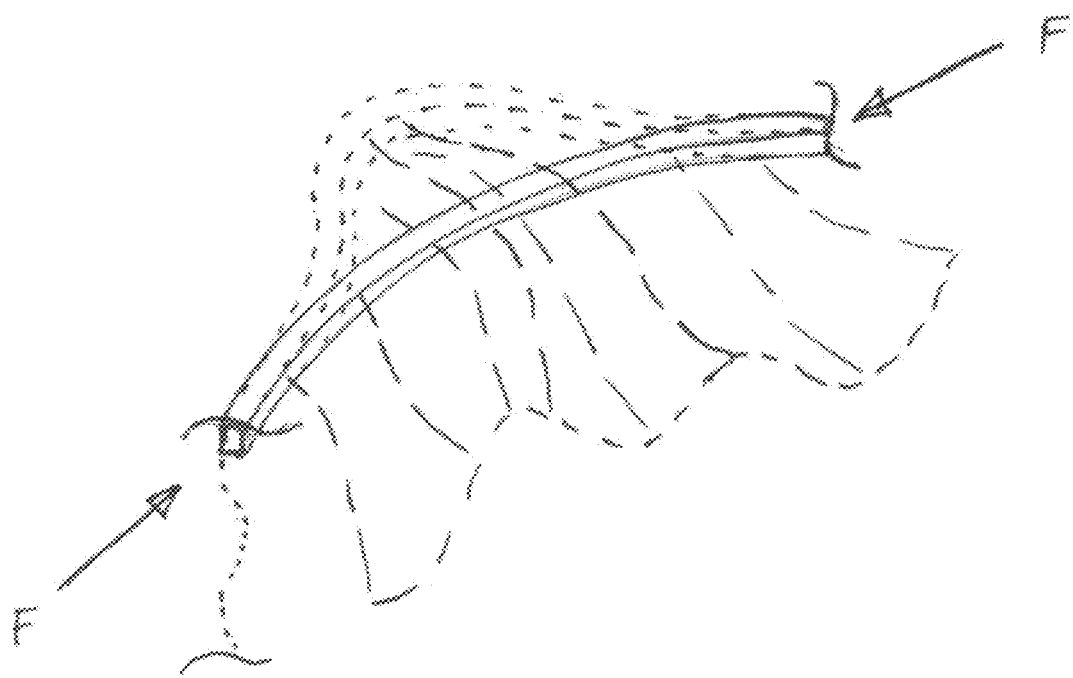
FIGS. 64A-64C show a comparison of the behavior of a curved member plus membranes with and without the effect of inflation pressure.

FIG. 64A depicts an isometric section of a curved beam with attached uninflated top and side membranes which will tend to buckle at a much lower applied force than a straight member of the same cross section. The dashed lines depict the buckled state of the beam as well as the wrinkled or buckled membranes.

Figure 64B:
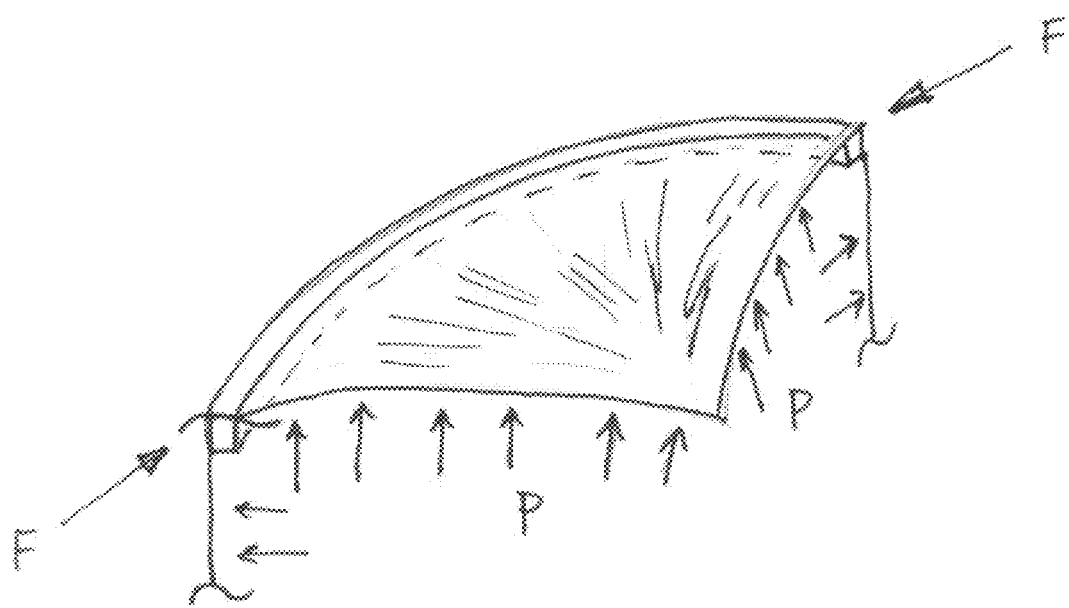
Figure 64C:
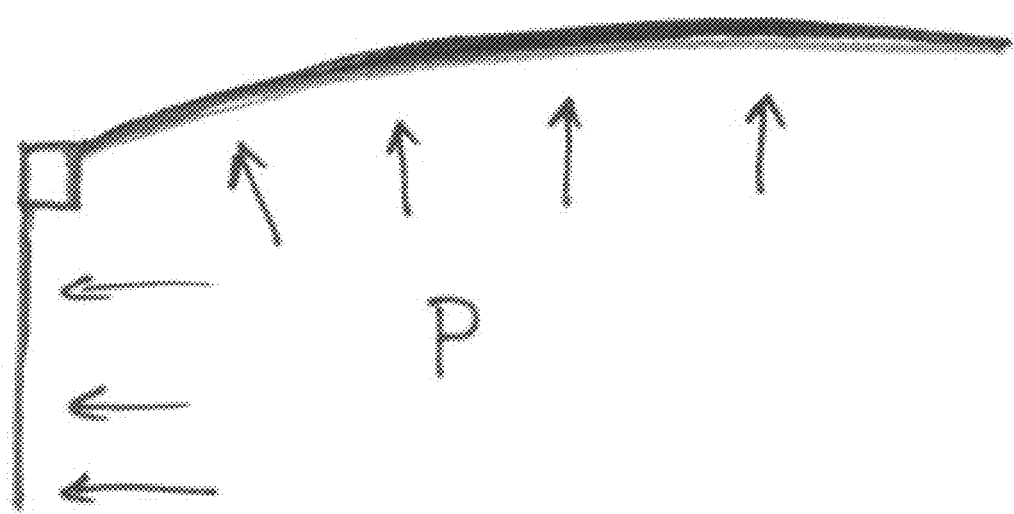
Figure 65:
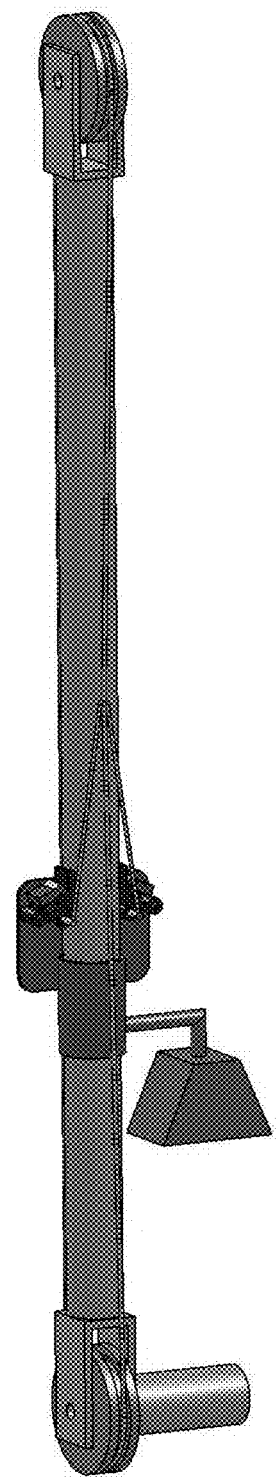
FIGS. 65-65A show an isometric view of a schematic "winch-brake" linear actuator mechanism.
Figure 65A:
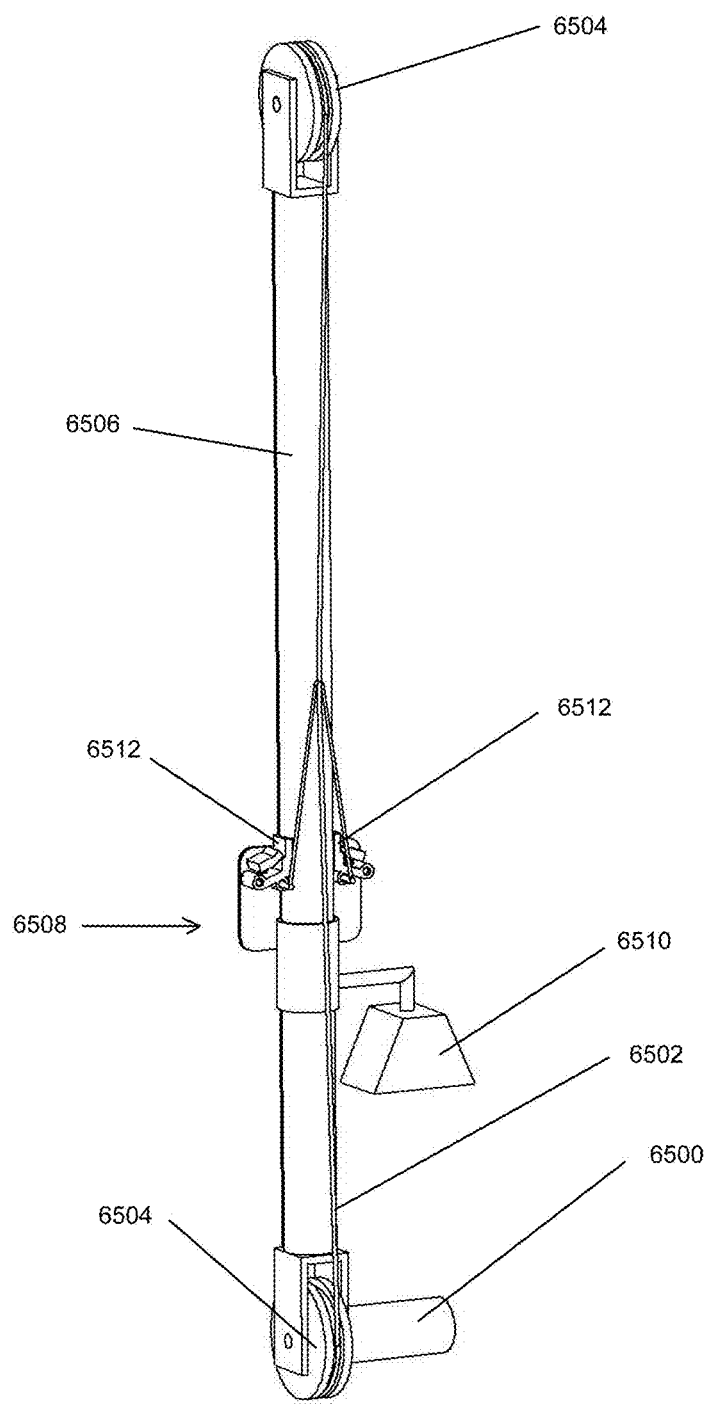

FIG. 64B depicts an isometric section view of the same curved beam and top and side membranes but with internal pressurized gas (inflation pressure). FIG. 64C depicts a simplified cross section view of the forces acting in FIG. 64B.

Under the influence of inflation pressure, the buckling behavior or bending deflection for a given axial or non-axial load can be greatly reduced. With enough inflation pressure, the attached membranes can behave like rigid webs to resist buckling, enhancing the effective moments of inertia of the beam, and increasing its effective stiffness.

Another advantage of cross collector structure in embodiments that employ inflation air is that the membrane forces in the reflective optic and the front material, will tend to pull the lower circle (the optical boundary for the reflective optic) into a round shape if it starts with any deviation from round, for example if the circular members start out imperfect. The top and bottom orthogonal diametral cross members will constrain the circular members at two diameter locations and the membrane forces will tend to create a substantially uniform radius in the arc sections in between these diameters.

In general, it may be advantageous to allow the inflation pressure and membrane forces to define the optical boundary, rather than using structural members with a predefined shape. This is because the membrane forces will create a round boundary and air is free, whereas structural members with predefined shape or lengths are expensive and can be damaged, and after any such damaging exhibit a different shape.

For large inflation-supported collectors (for example diameter greater than 6 feet), membrane forces that will force the boundary to be round, can be in the hundreds of pounds. Letting the gas pressure create the optical boundary shape has the benefits of being essentially free, consistent and predictable, whereas using structural members to define the shape can be more expensive, less consistent, and less predictable.

Another advantage of embodiments utilizing cross-collector structure in a collector matrix, is that structural members provide strength and stiffness in both tension and compression modes. This architecture creates compression members of limited length. In some embodiments, the length of the compression members may be limited to roughly ½ of a collector diameter.

Limiting compression member length may be useful to create an optimal structure design, because for a given load the minimum weight of a compression member to prevent buckling goes up disproportionately to its length. Specifically the required diameter goes up as the length increases. Therefore for a given compressive load, a compression member of length 2x will weigh significantly more than twice the weight of a compression member of length x.

Embodiments employing the cross-collector structure may not use separate compression members that run the length of the collector array. Instead, compression loads are borne by short members that are integral to the collector frames, and therefore more optimal from a weight and cost standpoint.

Collector Adjustment and Alignment System

One factor potentially affecting the function of embodiments of a collector, e.g., concentrating solar array, is the accuracy with which each collector is aligned. For example, when one collector is perfectly angularly aligned with the direction of the sunlight, all the others in the array will tend to be misaligned by some amount. For example, the others in the array may be rotated about one or more axes as compared to the reference collector. For some collector embodiments, e.g., concentrating solar power arrays, to function optimally, this misalignment should be small. One aspect of embodiments is a system for creating and maintaining the required alignment tolerances between the collectors in an array.

If collectors and their parts could be fabricated with infinitely tight (small) tolerances, a collector array could be assembled in perfect alignment. In practice, this is difficult to achieve as all parts are manufactured with some degree of dimensional tolerance range. Collectors that are fabricated as an assembly of several components will have overall tolerances to their attachment points that are roughly the sum of the tolerances of all the parts in between a tolerance stack.

This tolerance stack will result in varying degrees of angular misalignment of each collector when compared to a reference direction or another specific collector. Large collectors will tend to have particularly large variation in the tolerance stack of their components and therefore their alignment because large components tend to require larger manufacturing tolerances. Reducing the tolerances on larger parts tends to disproportionately increase their cost.

Embodiments include methods and apparatuses utilizing components for achieving the desired alignment tolerances for an array of large collectors, with only a small increase in cost. FIG. 21 shows an embodiment of a solar collector with schematic features allowing its attachment to other collectors in an array.

Assembling the collectors from their constituent components by whatever method, is most desirable. Assembly methods may include welding, bolting, mechanical snap fit, interference fit, glue, adhesives, fasteners, rivets, forming in place, or other assembly methods.

After the primary collector components are assembled, separate mounting or mating components are attached to each collector in a movable fashion, allowing the exact location of the mounting components to still be changed.

The collector assembly including the mounting components is then placed in a jig or fixture with precision features such as pins or holes, that then locate the mounting components to exact and repeatable locations with tight (small) tolerances regardless of the tolerances of the other collector components. With the mounting components held at the desired precise locations, they are then fixed in position.

Methods of fixing the mounting components in place include bolting, fastening, riveting, gluing, using adhesives, forming in place, interference fit, thermal fit, welding, soldering, or mechanical placement. The latter may be achieved by placement at one position out of many possible locations in a series of grooves or other locating features. The collector assembly with mounting components can then be removed from the alignment fixture and the mounting components maintain their relative locations and desired tolerances.

Variations are possible, and the method and apparatus would remain within the scope of the present invention. For example, the mounting components can be assembled to the collectors before or after some the major collector frame components are placed in the fixture. A robot could be used to position the mounting components rather than using an explicit fixture. In an embodiment, the robot would in effect be a fixture with repeatably changeable, controllable geometry.

In certain embodiments explicit mounting components may not be necessary. Instead, mounting features may be incorporated into other collector frame components which could be located and fixed in a fixture. In some embodiments collector frame components may have deformable geometry that can be forcibly deformed to subsequently be in the desired location with the desired tolerance and serve as a mounting feature.

In certain embodiments, collectors that are processed will have locating features or components with predictable, repeatable geometry within specified tolerances. Collectors may be connected to one another or to additional array components to form an array in which all the collectors have angular misalignment that is within a workable, predictable tolerance range.

Another variation on this process is to assemble each collector, and fix its relative angular alignment as it is being assembled into the array. Methods of fixing the alignment of a collector include but are not limited to the use of fasteners, bolts, nuts, welding, riveting, glue, adhesives, forming a feature in place, and other methods.

Tracking Control

According to embodiments, angular deviations produced by uneven ground can be removed by the use of a suitable control system using only actuators that are otherwise needed for tracking. According to alternative embodiments, additional actuators can be employed to compensate for uneven ground. Examples of such actuation include extending a truss element or rotating a cam in relation to the unevenness.

In certain embodiments, angular error indicators for this control system can be obtained from sensors that are substantially stationary in the reference frame of the ground, parts of the support structure, or elements mounted on parts of the support structure. These indicators can include the position of the sun or one or more targets relative to one or more imaging or non-imaging array sensors, such as video cameras, CCDs, CMOS sensors, or one or more photosensors, position-sensitive detectors, etc.

Targets can include electromagnetic or acoustic beacons, visual elements such as landscape or terrain features, visual features of other elements of the plant, such as poles or structures, cooperative or specifically placed visual targets, and the like. Ground-referenced targets can be ground-resting, stake-mounted, pole-mounted, etc.

Alternatively or in addition to the tracking control approaches described above, a control loop can maximize produced power, temperature, current, or voltage. A control loop can maintain an arrangement of measurement amplitude or intensity on a plurality of sensors, including heat sensors, photosensors, photodiodes, solar cells, non-imaging or imaging array sensors and the like.

Alternately or in addition to the tracking control approaches described above, angular errors can be indicated by a gravity vector based sensor such as an instrumented plumb bob or pendulum or the like, one or more accelerometers such a MEMs accelerometer gyroscope, etc. In certain embodiments, angular pointing control systems may employ multiple sensing elements.

Some embodiments may employ one mode of feedback for coarse positioning, and a higher-resolution feedback signal for fine position. In certain embodiments, this high resolution feedback signal is derived from the measured performance of one or more collectors (power output, for example). In some embodiments the high-resolution feedback signals may be derived from the total power produced by elements mounted to the structure.

In some embodiments, the angular adjustment required to compensate ground unevenness is tracked by an element of the plant control system, either remote or local to the structure. Changes in the compensation pattern can be used by the control system to identify and flag potential or actual problems with the actuation system. For example changes in the compensation pattern could be characteristic of the formation of ruts, mud caking, or other repeatable phenomena.

Fault Sensing and Automated Self-Maintenance

Embodiments in accordance may include the ability to detect, diagnose, flag, and possibly automatically correct, various problems, thereby reducing the need for excessive plant maintenance. For example, during daylight hours a structure may detect that an area is forming a sharp local dip, or that a mound has formed where a cake of dirt flaked from a wheels, etc. Subsequently, during the evening hours, the structure could transit the problem area repeatedly to even out the problem.

The next day, the control system can verify the effectiveness of its treatment. If the treatment did not succeed and the problem is severe, the control system can request service by a technician.

Similarly, slipping of wheels, excessive current, slipping of belts and chains, communication errors, excessive temperatures and the like are recorded and reported as needed to assist with the assessment of the heath of all aspects of the plant. A quantitative state of health of the system can thus be tracked and displayed and maintenance technicians dispatched efficiently to keep the plant in good operation.

High-Order Adjustments

In some embodiments, a single support structure is used to point multiple separate collectors. Because of manufacturing and assembly tolerances, gravitational, and wind loads, etc., one or more collectors may be in misalignment relative to others. Typically this misalignment is small compared to the total actuated angle.

Some embodiments provide for improving the relative alignment of collectors by the use of one or more axial truss elements of adjustable length. This adjustment can be static (applied on installation and possibly other occasions), quasi-static, or dynamic. Examples of quasi-static adjustment include but are not limited to adjustment to compensate for long-time-constant variations, such as mechanical creep and wear, seasonal variations, thermal expansion, and angular-position-dependent strain from gravity and actuator loads. Examples of dynamic adjustment include but are not limited to compensating for higher frequency loads, such as wind loads, flutter, or mechanical vibrations or oscillations.

Because the adjustment range can typically be much less than that of the structure pointing actuators, these adjustments can be compact and relatively simple, actuated or manual. Examples of manual adjustments include thread-based adjustments, for example turnbuckles, threaded rod and nut, or threaded cable or strap ends. Length adjustments may also be made by changing the helix angle of a wire rope cable by adding or removing cable twist. Length adjustments may also be made by a tensioning tool and retained by mechanical clamps, buckles, or mechanically seizing elements. Length adjustments can be made via a ratcheting mechanism such as is used for tensioning wires in agricultural fencing and trellises or for tensioning straps.

In certain embodiments, these actuators may retain their setting in spite of unloading of the element and possibly reverse loading of the element. Actuated length adjustments can include lead-screws, cable twist, cams, worm gears, and the like.

Some embodiments employ a plurality of adjustable elements to correct for misalignment. Embodiments may employ a minimum number of adjustable elements to produce sufficient relative alignment accuracy. For example, such elements can produce corrections for low-order distortions such as "warp," "twist," "sag," "bow," etc. of the structure. Some embodiments provide for actuated adjustment of some of these corrections and manual adjustment of others.

Automated Relative Pointing Assessment and Correction

Embodiments of methods for making adjustments to optimize relative pointing accuracy, determine the optimum pointing angle of different individual collectors or subgroups of collectors. For example, this may be done via determining the angles that optimize the power output of the individual or sub-grouped collectors. Deviations in these optimum angle measurements can then be used to diagnose relative pointing errors qualitatively or quantitatively.

Qualitative or quantitative remedies to relative pointing errors can be inferred, for example via geometrical calculation, and then be provided to guide manual adjustments or applied automatically via one or more actuators. In certain embodiments, these angle deviation measurements are monitored as a normal part of the active control system. If relevant actuators are available, they are employed to minimize errors. If not, the magnitude of the relative errors can be tracked and used to deploy maintenance personnel as needed to make manual adjustments to the structure and detect and diagnose mechanical problems.

The present invention is not limited to the particular embodiments shown and described above. The following describes figures showing additional embodiments that fall within the scope of the present invention.

Figure 49:
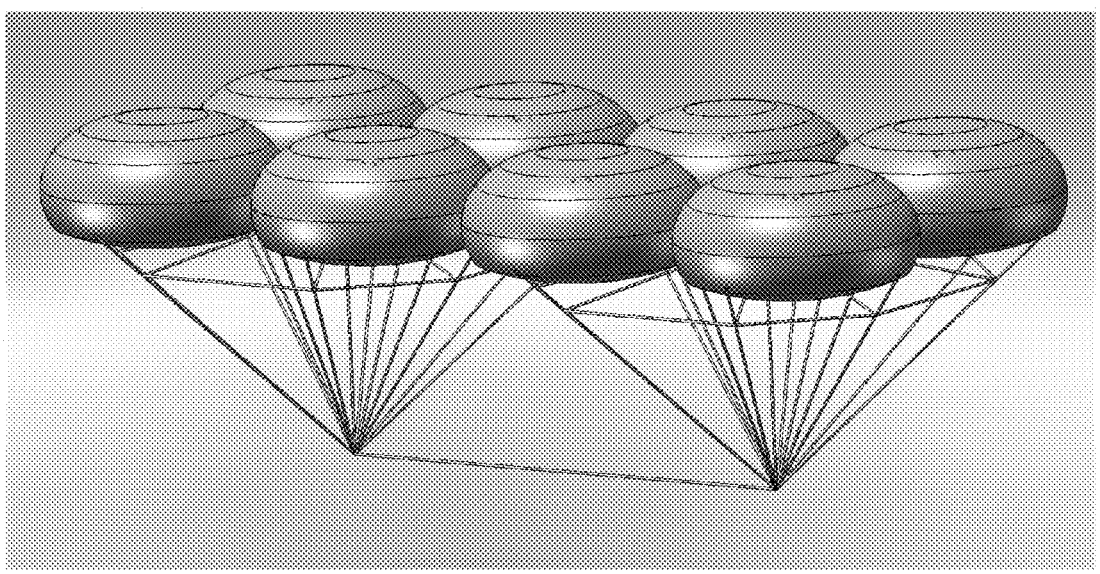
FIG. 49 shows an alternative embodiment of a solar collector array structure that uses central compressive members and external tension members.

FIG. 49 shows an alternative embodiment of a solar collector array structure with two primary connection points for connecting to a base structure and defining an elevation axis. Support members for the solar collectors radiate from these points to attach to the solar collectors at various locations. This inverted pyramid structure allows structural members to be subjected to primarily axial loads.

Figure 50:
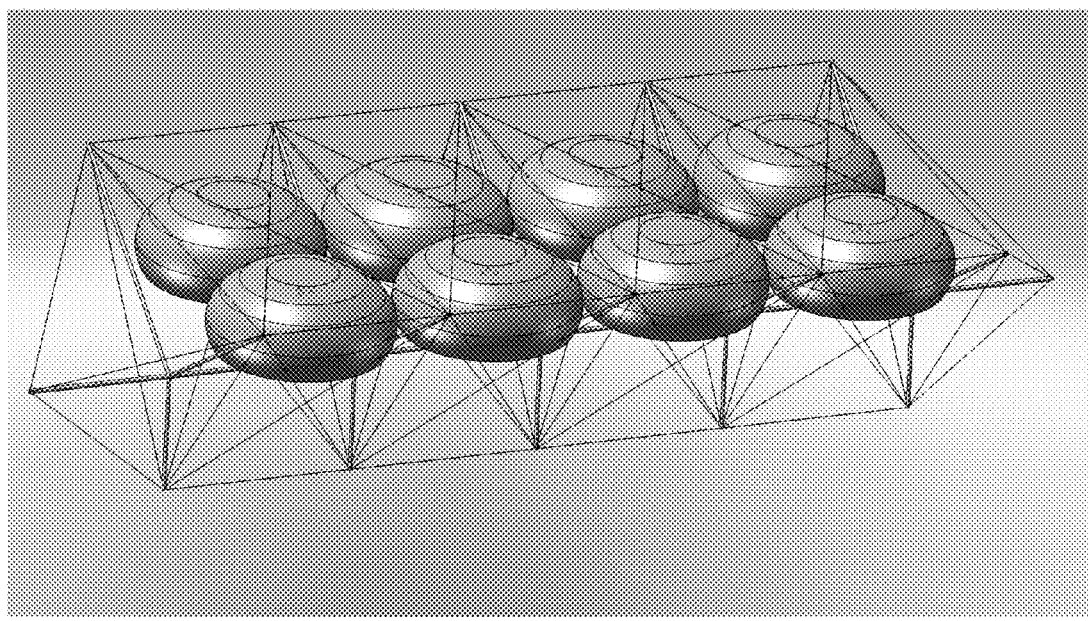
FIG. 50 shows an alternative embodiment of a solar collector array structure that uses central compressive members and external tension members.

FIG. 50 shows an alternative embodiment of a solar collector array structure that uses central compressive members and external tension members. Individual solar collectors are held inside this structure of compressive and tensile members.

Figure 51:
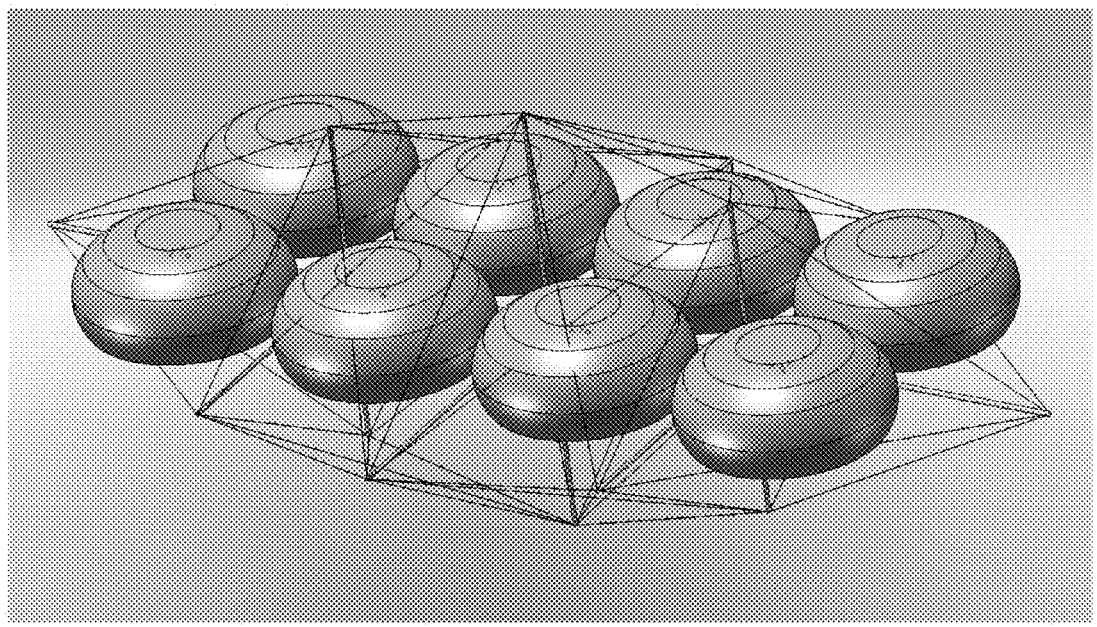
FIG. 51 shows an alternative embodiment of a solar collector array structure.

FIG. 51 shows an alternative embodiment of a solar collector array structure.

Figure 52:
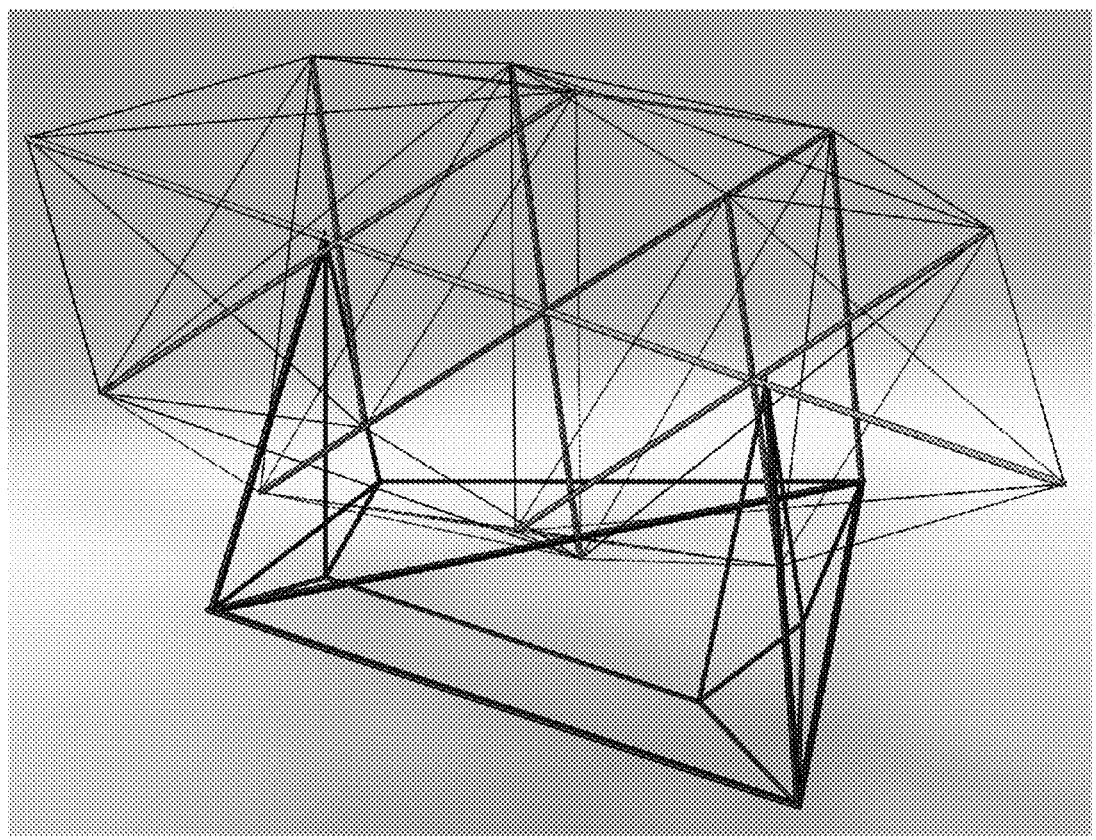
FIG. 52 shows the solar collector array structure for FIG. 51 attached to one embodiment of a base structure.

FIG. 52 shows the solar collector array of FIG. 51 attached to one embodiment of a base structure. The array can pivot at the attachment points, and the attachment points serve to define the elevation pivot axis.

Figure 53:
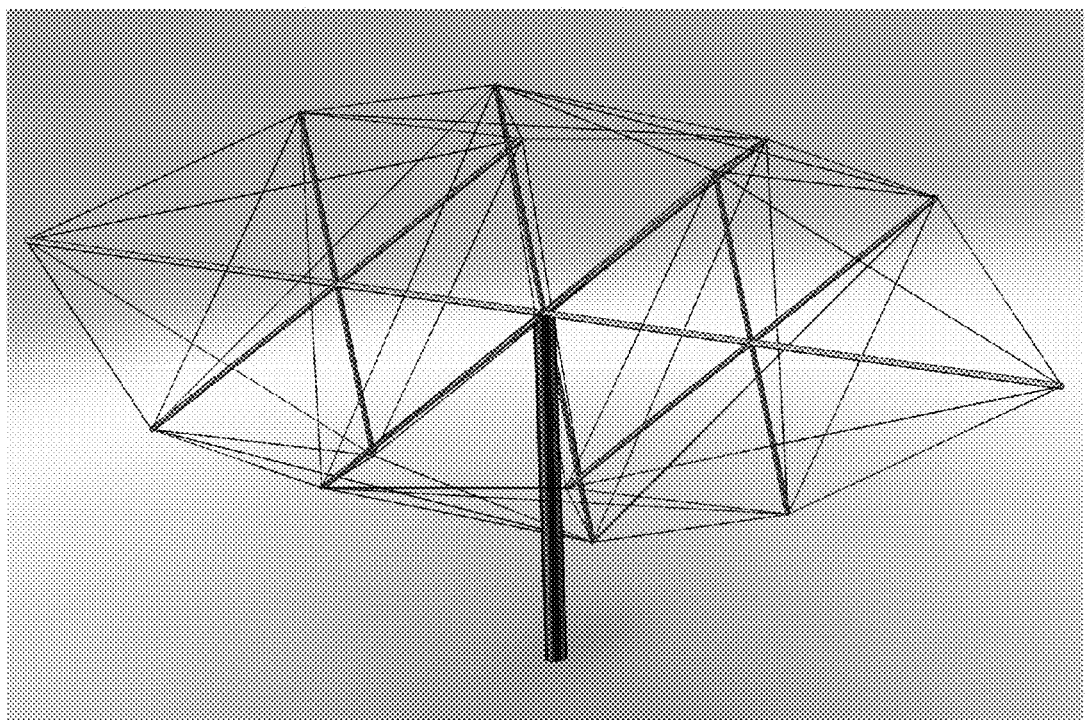
FIG. 53 shows the solar collector array structure for FIG. 51 attached to a central pole base structure.

FIG. 53 shows the solar collector array for FIG. 51 attached to a central pole base structure. This embodiment is simple in construction, but can require more material in the base structure for a given angular stiffness.

Figure 54:
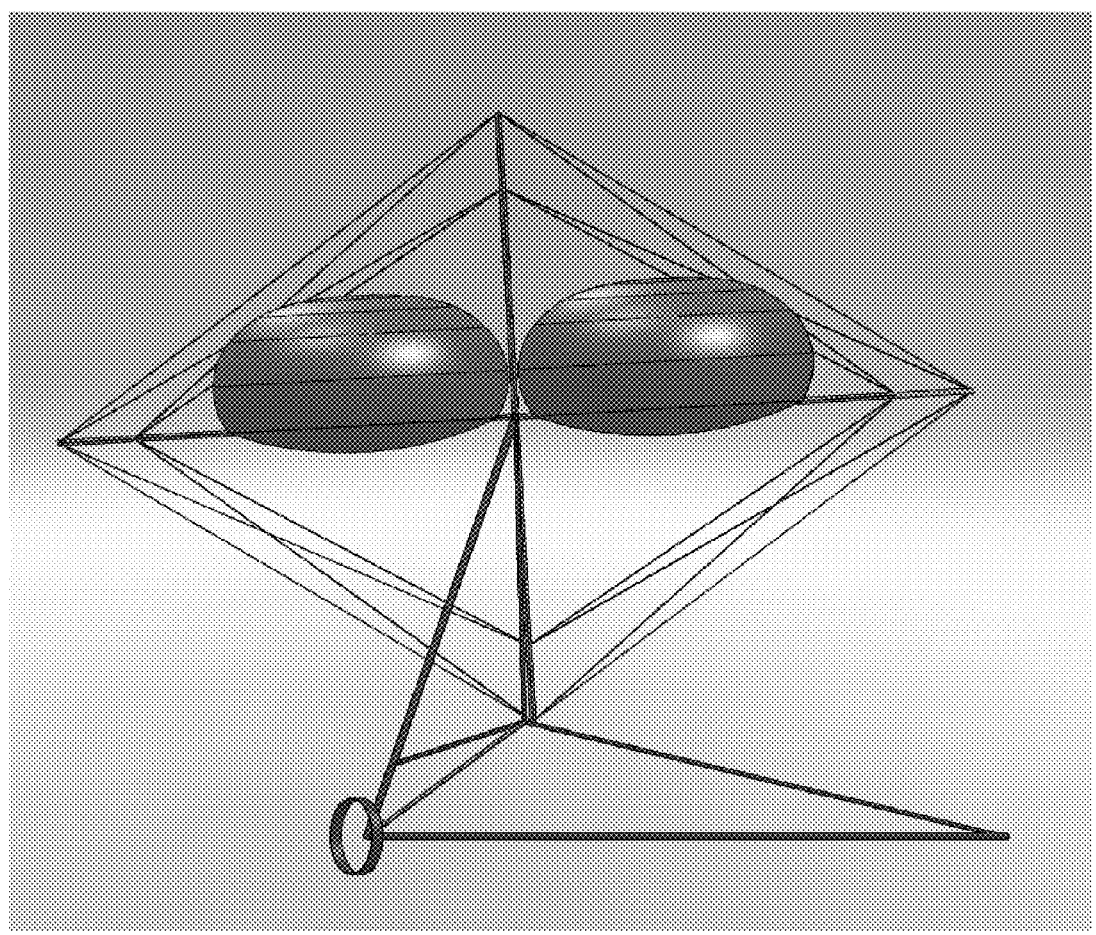
FIG. 54 shows a side view of an embodiment of a solar collector array attached to a base structure with a rear azimuth axis and ground attachment on the right in this figure and wheels at the front of the structure.
Figure 55:
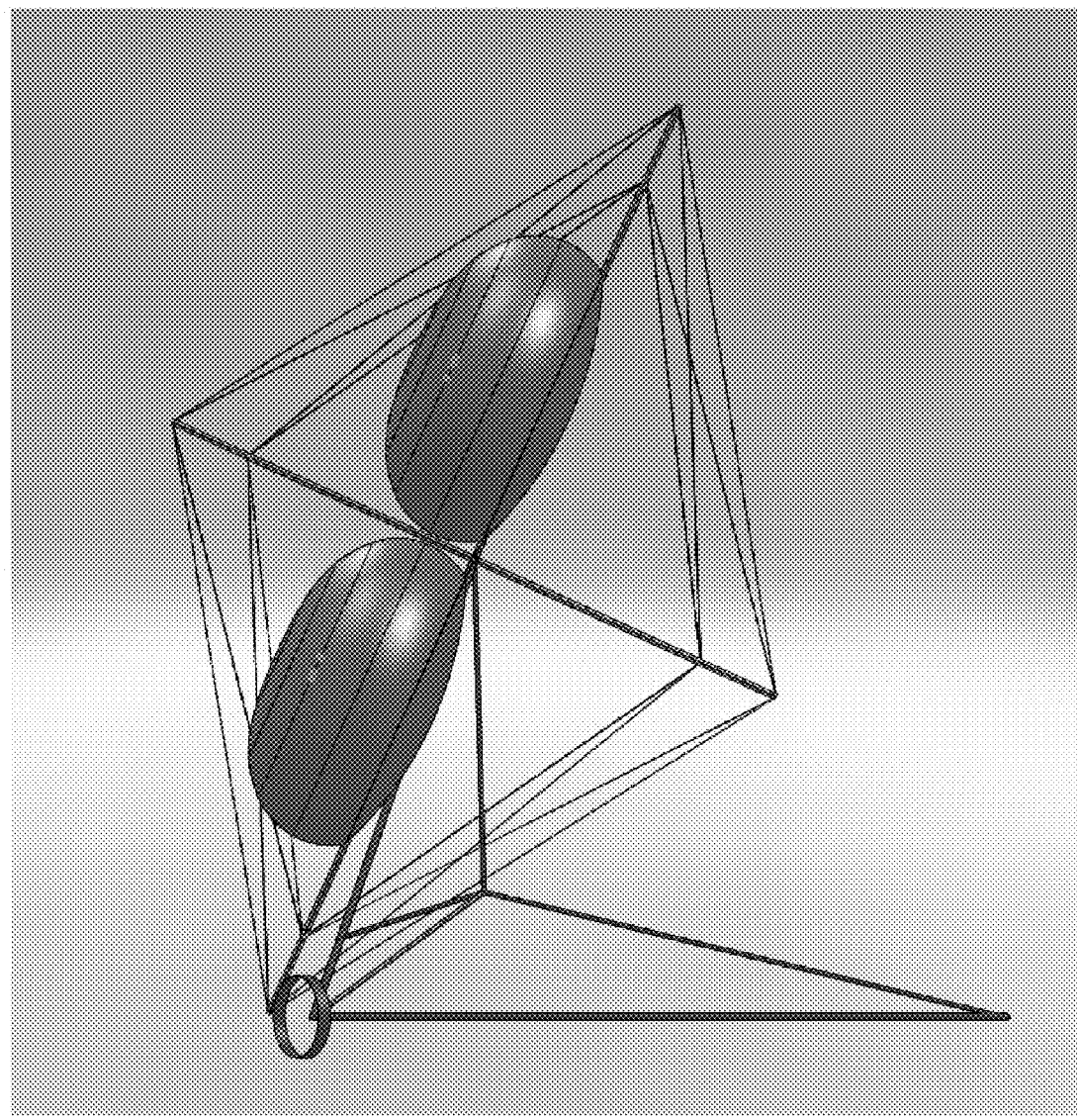
FIG. 55 shows the structure of FIG. 54 with the array aimed approximately 30 degrees up from the horizon.

FIG. 54 shows a side view of an embodiment of a solar collector array attached to a base structure. In this architecture, the rear azimuth axis and ground attachment on the right in this figure and the wheels at the front of the structure (left side) allow the entire structure to rotate about the azimuth axis. The solar array is aimed approximately 80 degrees up from the horizon in this figure. FIG. 55 shows the structure of FIG. 54 with the array aimed approximately 20 degrees up from the horizon.

Figure 56:
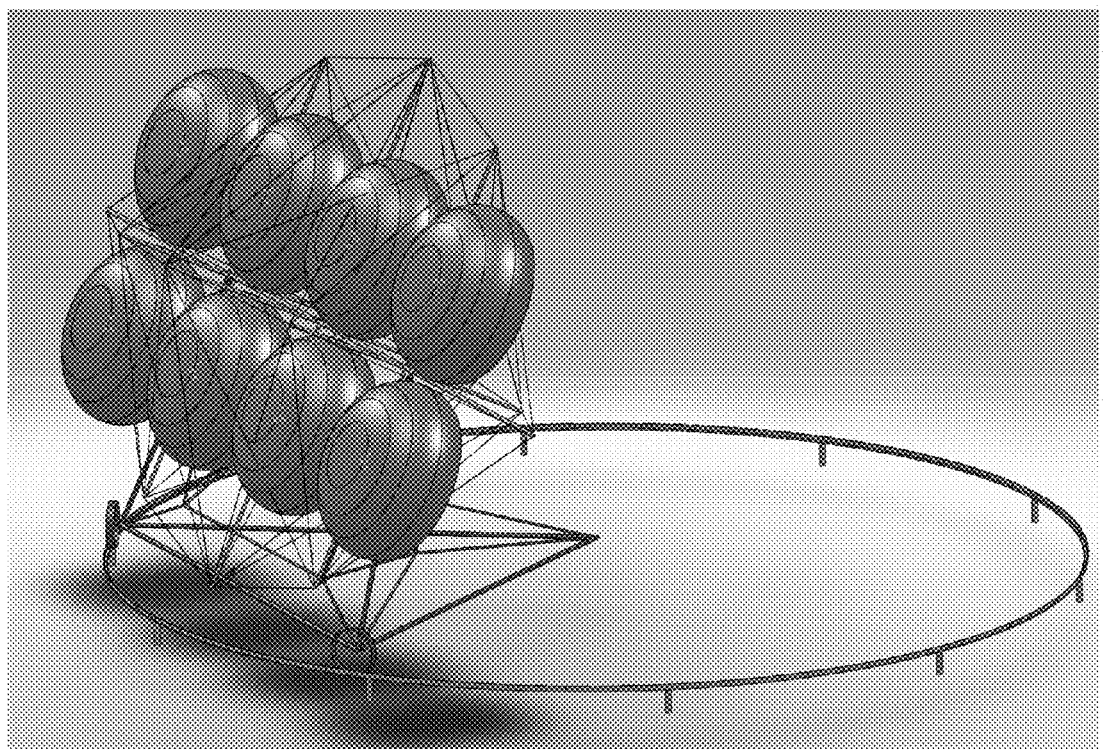
FIG. 56 shows an isometric view of the structure from FIG. 54 riding on a circular track anchored to the ground at intermittent points.

FIG. 56 shows an isometric view of the structure from FIG. 54 riding on a circular track anchored to the ground at intermittent points. While certain embodiments allow such a track structure to be eliminated, in other embodiments structures could also be used with a track if beneficial.

Figure 57:
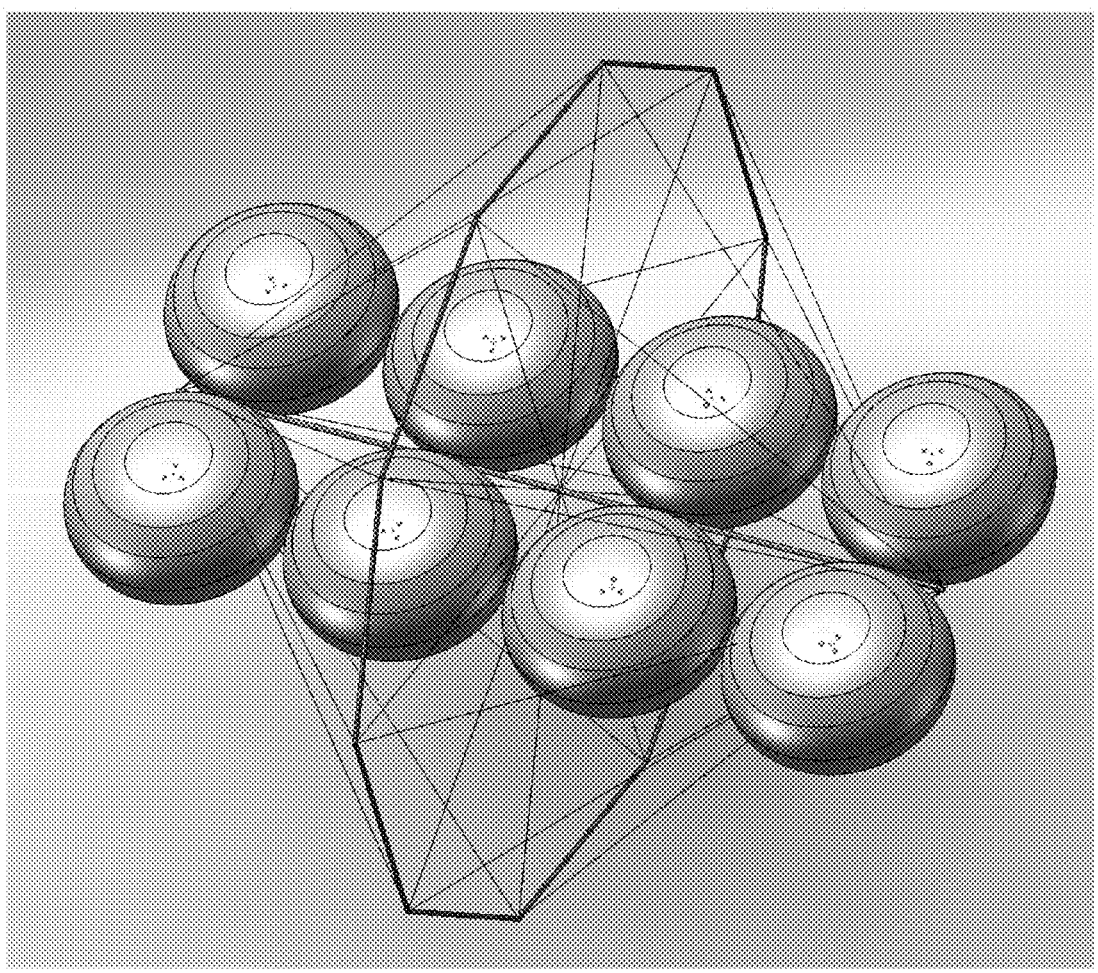
FIG. 57 shows an alternative embodiment of a solar collector array structure that uses a single straight compressive element, and a single compressive ring with the balance of the structure being made of tensile members.

FIG. 57 shows an alternative embodiment of a solar collector array structure. This embodiment uses a single straight compressive element and a single compressive ring with the balance of the structure being made of tensile members.

Figure 58:
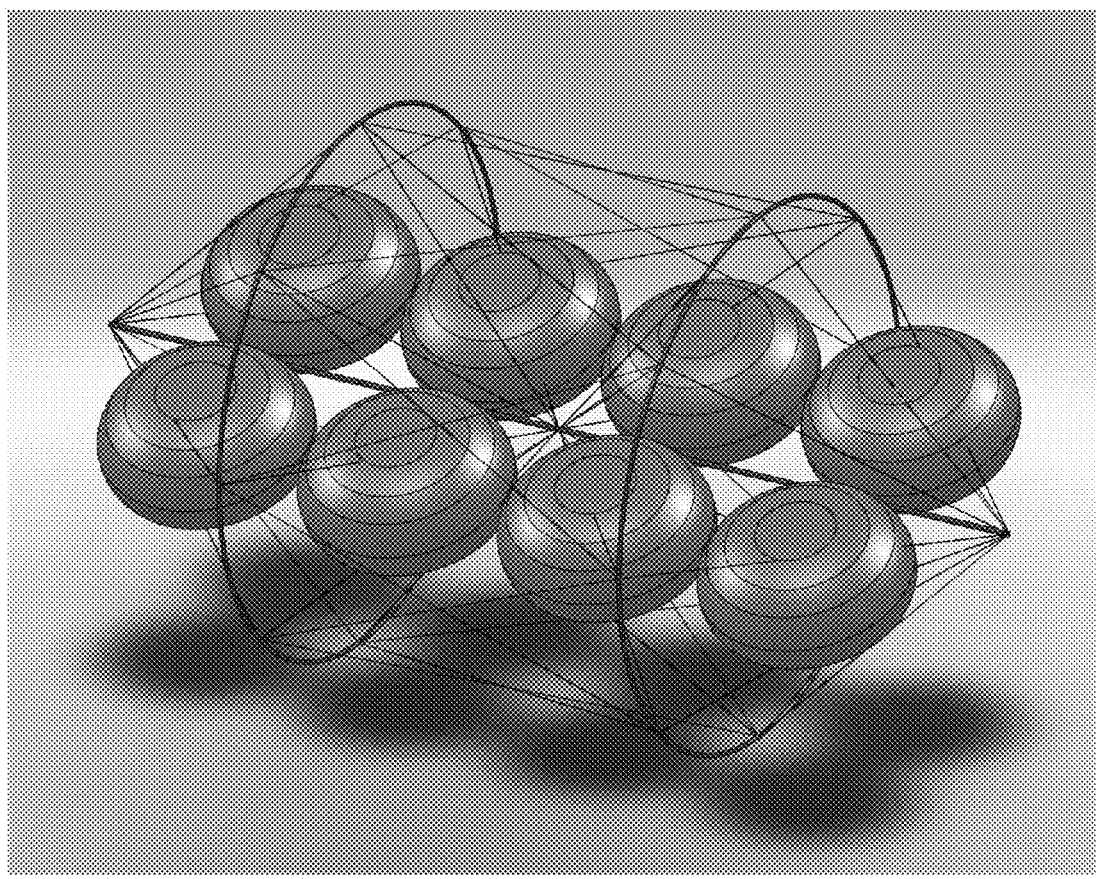
FIG. 58 shows an alternative embodiment of a solar collector array structure that uses a single straight compressive element, and two compressive rings with the balance of the structure being made of tensile members.

FIG. 58 shows an alternative embodiment of a solar collector array structure. This embodiment uses a single straight compressive element and two compressive rings with the balance of the structure being made of tensile members.

Figure 59:
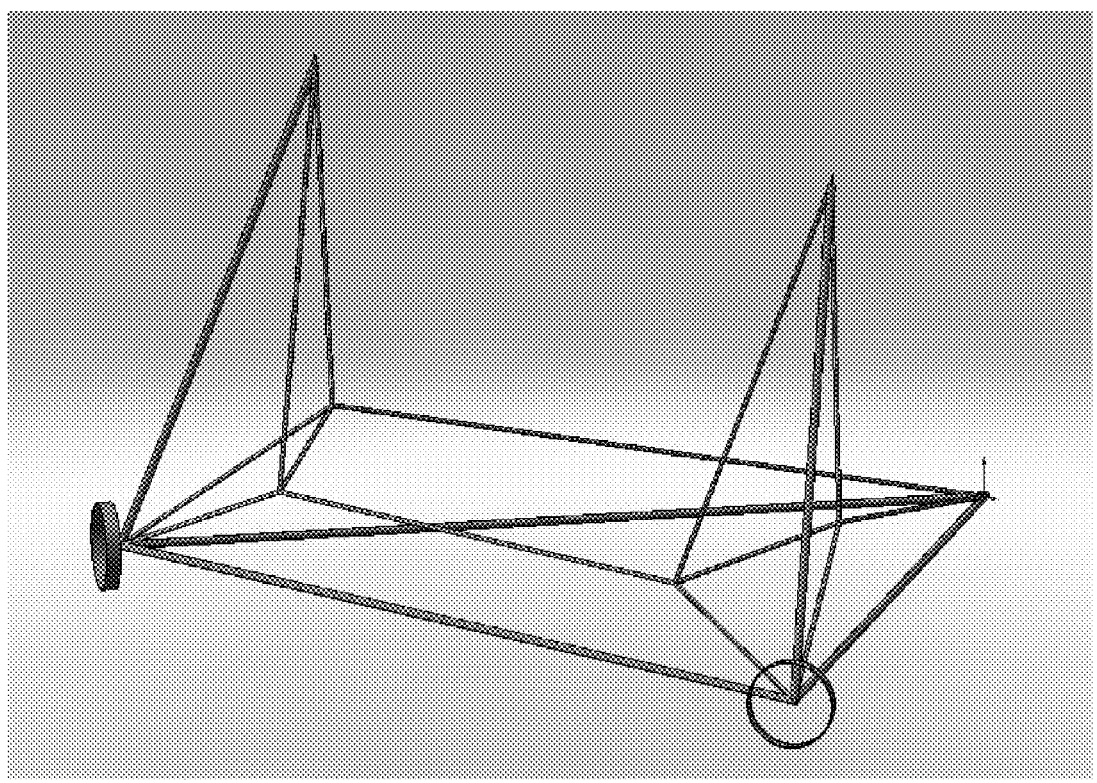
FIG. 59 shows an alternative embodiment of a base structure.

FIG. 59 shows an alternative embodiment of a base structure. This base structure utilizes a truss structure that serves to connect a rear azimuth axis pivot, two front wheels that allow the structure to rotate about the azimuth axis, and two points defining an elevation axis about which an upper structure holding an array of collectors could rotate.

Figure 60:
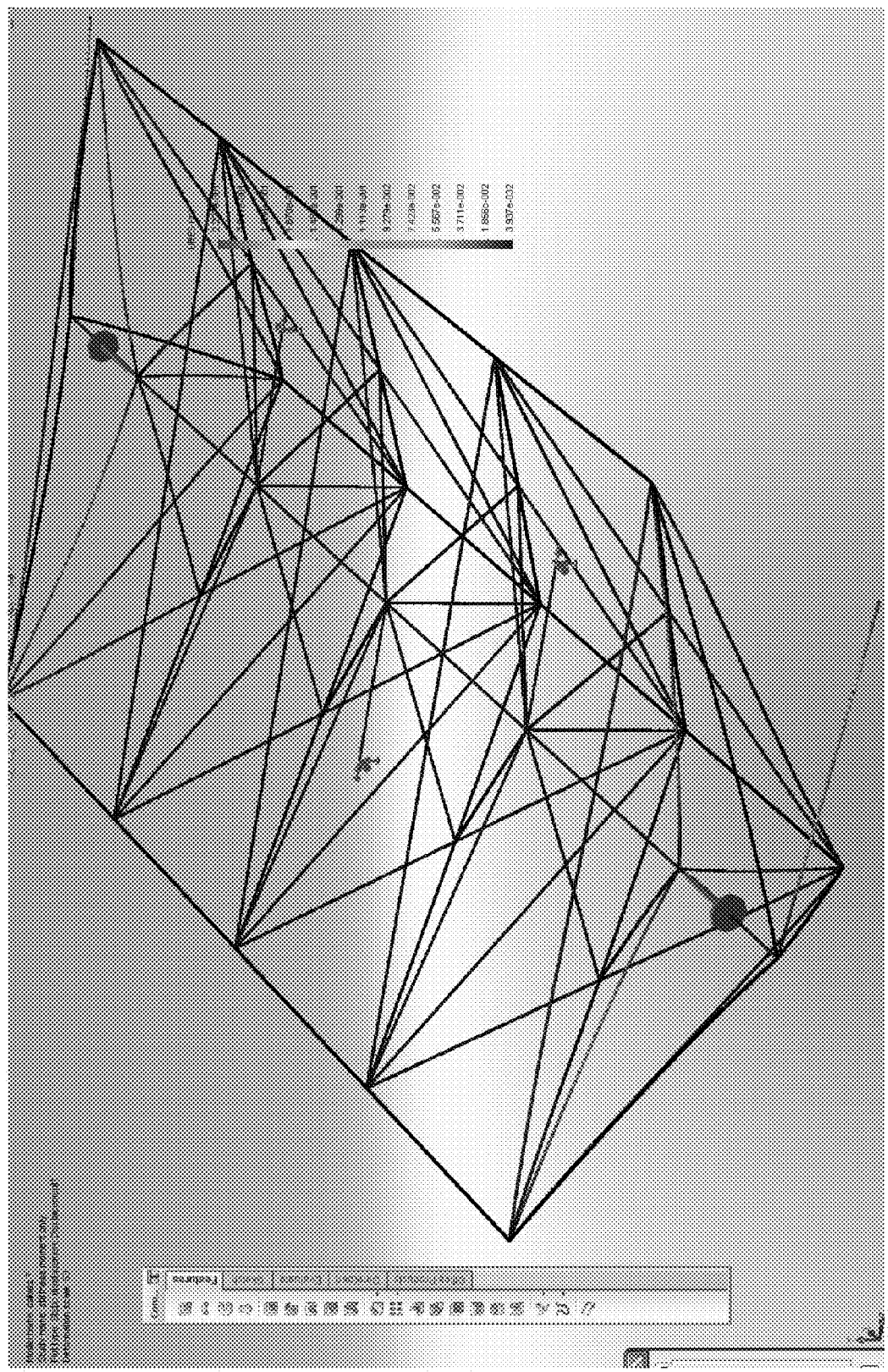
FIG. 60 shows deflection of an embodiment of an array structure under twisting loads.

FIG. 60 shows deflection of one embodiment of an array structure under twisting loads. This structure was designed to support a 2×4 array of collectors. Opposing torques were applied to the ends of the structure to determine whether the deflections would be less than with other types of upper structures.

Figure 61:
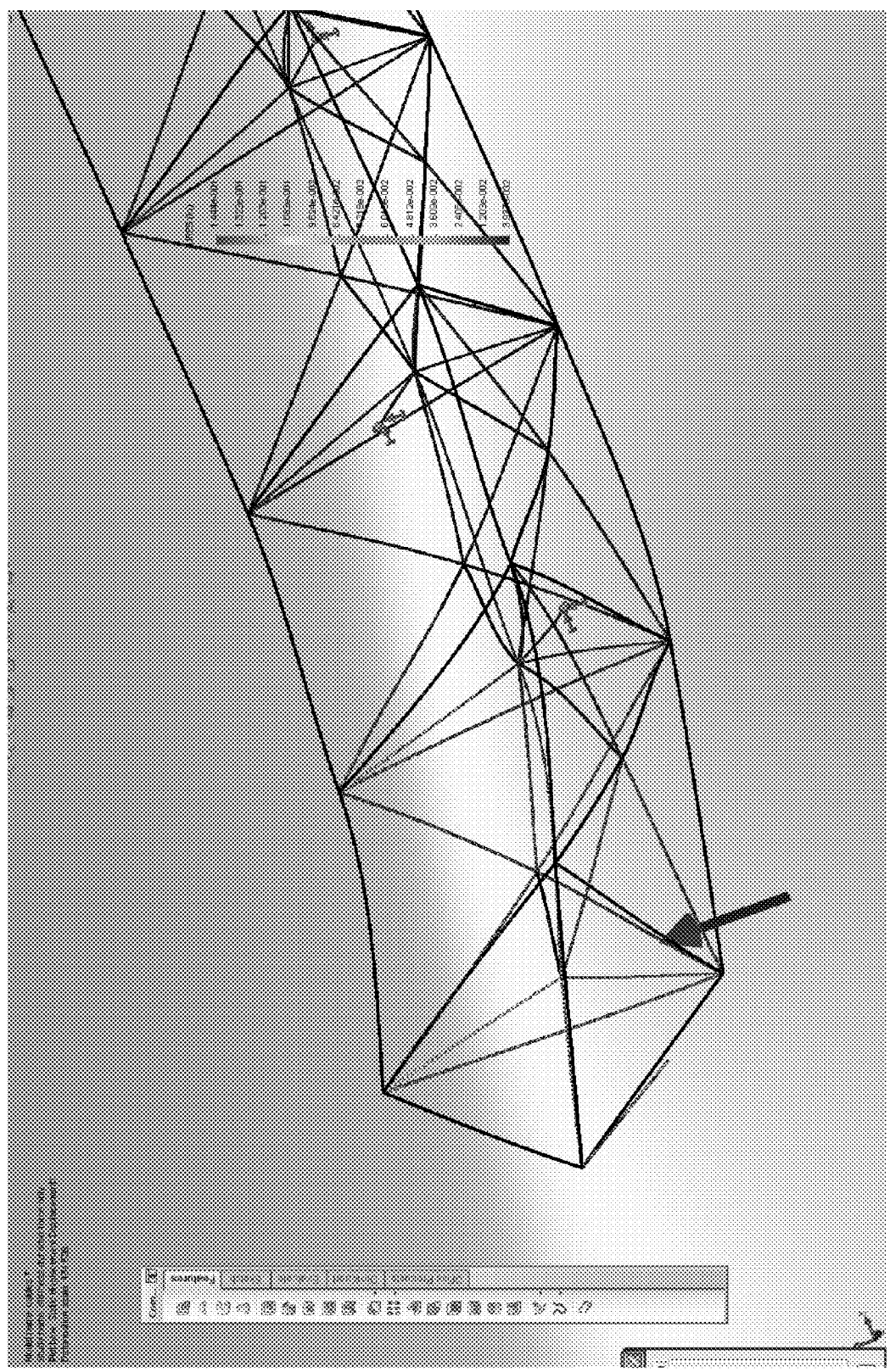
FIG. 61 shows deflection of an embodiment of an array structure under bending loads.
Figure 62:
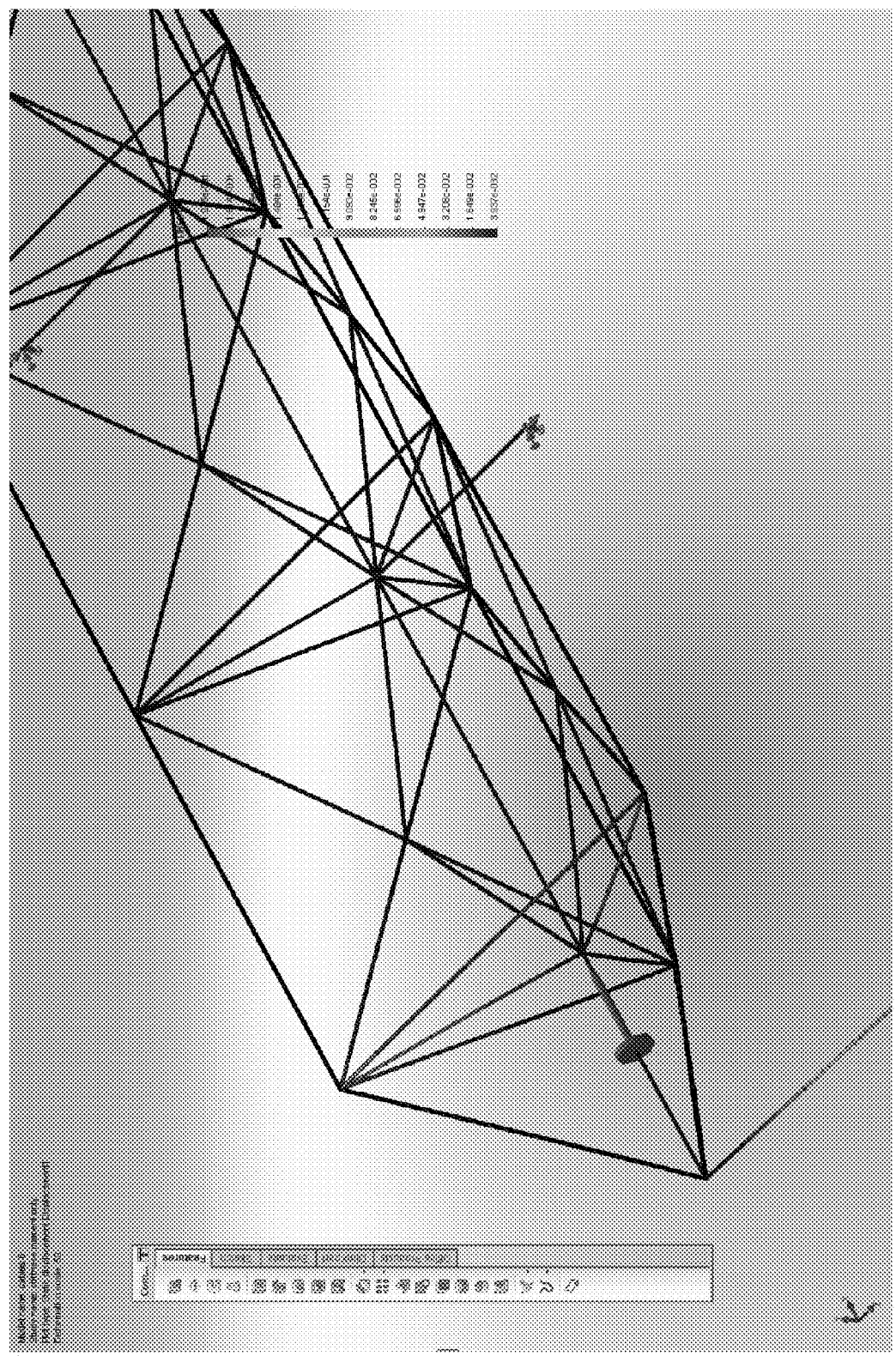
FIG. 62 shows deflection of another embodiment of an array structure under twisting loads.

FIG. 61 shows deflection of the embodiment of an array structure shown in FIG. 60 but under bending loads. One end of the structure was fixed while a bending load was applied to the other end of the structure. Deflections were simulated to determine whether the deflections would be less than with other types of upper structures. FIG. 62 shows a different view of the deflected structure of FIG. 60.

The following patent applications are incorporated by reference in their entireties herein, for all purposes: U.S. patent application Ser. No. 11/843,549 (the'549 application) filed Aug. 22, 2007, titled "Low-Cost Interconnection System For Solar Energy Modules and Ancillary Equipment."

According to an embodiment an apparatus includes a base frame having at least one interface with the ground, a solar energy collector, which is supported and moveable relative to the base frame by a support structure, an elevation actuator in mechanical communication with the base frame and with the support structure. The elevation actuator is configured to change an elevation angle of the solar collector relative to the base frame. The elevation actuator can further include a pole having an end connected to the base frame and a second end opposite to the first end, a driven pulley located at one of the first end or the second end, a free pulley located at the opposite end, a cable looped around the driven pulley and the free pulley. The cable can be in mechanical communication with the support structure, such that actuation of the cable by the driven pulley causes the support structure and the solar energy collector to move relative to the base frame. The cable can be a chain. The cable can be in mechanical communication with the support structure through a carriage slidably attached to the pole.

In yet another embodiment, the apparatus further includes a joint pivotably connecting the base frame to the ground. The pole end is connected to the base frame at or proximate to the joint. The apparatus can further include a second elevation actuator. The second elevation actuator includes a second pole having an end connected to the base frame at or proximate to the joint, a second end opposite to the first end, a second driven pulley located at one of the first end or the second end, a second free pulley located at the end opposite the first end or the second end, a second cable looped around the driven pulley and the free pulley. The second cable is in mechanical communication with the support structure at a location different from a point of mechanical communication with the first cable, such that the support structure and the first and second poles form a triangle.

In yet another embodiment, the elevation actuator of the apparatus includes a pole with an end connected to the base frame and bearing a rack, and a driven rotatable element in mechanical communication with the rack and in contact with the support structure. Actuation of the rotatable element causes the support structure and the solar energy collector to move relative to the base frame. The rack can include a chain. The rotatable element can include a chain sheave.

The rotatable element can also include a worm gear. The rotatable element can be in contact with the support member through a carriage slidably attached to the pole. The apparatus can further include a joint pivotably connecting the base frame to the ground, wherein the pole end is connected to the base frame at or proximate to the joint. The apparatus can further include a second elevation actuator. The second elevation actuator can include a second pole having an end connected to the base frame at or proximate to the joint, the second pole bearing a second rack, a second driven rotatable element in mechanical communication with the second rack and in contact with the support structure at a location different than a point of contact between the first driven rotatable element. The support structure and the first and second poles form a triangle.

In yet another embodiment, the elevation actuator of the apparatus includes a driven rotatable pole, which has an end connected to the base frame and bearing a helix, and an element fixed to the support member and configured to ride the helix. Actuation of the driven rotatable pole causes the element, the support structure, and the solar energy collector to move relative to the base frame. A surface of the element can include a corresponding feature designed to engage with the helix. The feature can be recessed and the helix can be raised. Alternatively, the feature can be raised and the helix can be recessed. The helix can include a thread.

In yet another embodiment, the apparatus further includes a joint pivotably connecting the base frame to the ground. The driven rotatable pole end is connected to the base frame at or proximate to the joint. The apparatus can further include a second elevation actuator. The second elevation actuator can include a second driven rotatable pole having an end connected to the base frame at or proximate to the joint and bearing a second helix. The second elevation actuator can also include a second element configured to ride on the second helix and fixed to the support structure at a location different than the point where the first element is fixed to the support structure. The support structure, the first rotatable pole, and the second rotatable pole can form a triangle. The first and second driven rotatable poles can be rotatably coupled by spherical gears located at their ends.

In yet another embodiment, the elevation actuator of the apparatus includes a pole, a carriage, which is in sliding communication with the pole and in contact with the support structure, pulleys disposed proximate to opposite ends of the pole, a tension element wrapped around the pulleys, a driving element in communication with the tension element, and a brake in selective communication with the pole. The brake is configured to stop movement of the support structure when tension is removed from the tension element. The brake can include a brake lever configured to pivot about a pin fixed to the carriage, and a spring, which is in contact with one end of the brake lever and configured to bias an opposite end of the brake lever against the pole.

In yet another embodiment, the apparatus further includes an azimuthal actuator configured to rotate the base frame about a ground interface pivot point. The azimuthal actuator includes a rotatable structure configured to draw and release a cable in communication with a driving element and in communication with the base frame. The cable can be looped around a fixed ground point and a guide on the base frame. The rotatable structure can be located at the fixed ground point or on the base frame. The rotatable structure and the cable can operate in measured opposition to a second cable in communication with the base frame. The second cable can be in communication with the rotatable element that is positioned at a fixed ground point.

In yet another embodiment, the solar energy collector of the apparatus includes an inflatable solar concentrator. The inflatable solar concentrator can include a bottom circular boundary and a top circular boundary separated by a distance, a side material spanning the distance between the top and bottom circular boundaries, an optically reflective element attached to and spanning the bottom circular boundary, an optically transparent element attached to and spanning the top circular boundary. The side material, the optically reflective element, and the optically transparent element form a closed volume capable of containing an inflation pressure of a pressurized gas. The inflatable solar concentrator further includes a receiver positioned within the closed volume and configured to receive concentrated light from the optically reflective element. The apparatus can further include a primary structural element positioned substantially along a diameter of the inflated concentrator. The primary structural element can include a diametrical member spanning orthogonal diameters of the top circular boundary or of the bottom circular boundary. The apparatus can further include diagonal structural members connecting first and second diametrical members that respectively span orthogonal diameters of the top and bottom circular boundaries. The first and second diametrical members and the diagonal members can lie in two orthogonal planes. The apparatus can further include an array of solar energy concentrators. Each solar energy concentrator can include top and bottom circular members corresponding with the top and bottom circular boundaries. The top and bottom circular members can be connected to the diagonal members of adjacent solar energy collectors of the array.

In yet another embodiment, the solar energy collector of the apparatus includes an array of inflatable solar concentrators. The support structure of the apparatus can include a subtruss in contact with the array of inflatable solar concentrators and a support truss. The subtruss can be configured to commonly align axes of the inflatable solar concentrators of the array. The support truss can be in contact with the subtruss and with the base frame. The subtruss can include a collection of axially loaded elements. The subtruss can include compressive elements that lie in two orthogonal planes. The subtruss can further include a tensile crossbrace between the compressive elements. The subtruss can further include a second tensile crossbrace configured to resist rotation of the tensile crossbrace. Each of the solar energy collectors of the array can include a boundary element, wherein the boundary elements of different collectors are tied together and tied to the tensile crossbrace. The support truss can include a centrally disposed compressive element surrounded by opposing tensile elements. The support truss can further include a secondary compressive structure radially disposed about a subtruss tie point and opposed by a triangle of tensile elements. The tensile elements can be pre-tensioned.

In yet another embodiment, the base frame of the apparatus is rotatably connected to the ground via a joint with a substantially vertical azimuth axis. The base frame is connected to the support structure though a substantially horizontal elevation pivot axis. The joint can permit rotation of the base frame about another axis, wherein the base frame may tilt to accommodate variation in ground surface encountered during rotation about the azimuth axis. The base frame can include two side triangles, a front rectangle, and two front diagonals, the azimuth axis located at an apex of both side triangles and at a side of the base frame opposite from the front rectangle. The base frame can include eight main compressive frame members and two tensile diagonal stiffening members with five primary joints.

Alternatively, the base frame can include a primary triangle made of three rigid members and having a rear corner and two front corners. Each front corner can have a rigid stay member with a first end connected to the front corner of the primary triangle. The primary triangle can include a second end lying out of a plane of the primary triangle. The base frame additionally includes a tensile member lying outside the plane of the primary triangle and connecting the rear corner with the second ends of the stay members. The joint is located at the rear corner. A pair of rigid stay members can be connected to each of the front corners, the second ends of the stay members at a particular front corner projecting of the plane in opposite directions to form an upper pair of stays and a lower pair of stays, and a pair of left stays and a pair of right stays. The apparatus can further include two or more tensile members lying outside the plane of the primary triangle. One of the tensile members can form a triangular shape and can connect the rear corner with second ends of the upper pair of stays. The other tensile member can also form a triangular shape and can also connect the rear corner with the second ends of the lower pair of stays. The apparatus can further include a left front tensile member and a right front tensile member. The left front tensile member can be connected to the second ends of the left pair of stays and the right front tensile member can be connected to the second ends of the right pair of stays. The base frame can include one or more front diagonal tensile members and the second end of the stays can form four corners of a front rectangle. The diagonal tensile members can be connected to diagonally opposite ends of the front rectangle. The base frame can include one or more pivot points defining the elevation pivot axis disposed substantially at an opposite end of the primary triangle from the azimuth axis. The pivot points can be disposed at ends of the upper pair of stays. The base frame can include one or more wheel stays connected to each of the front corners. The wheel stays can have ends out of the plane of the primary triangle that support a wheel or other ground interface.

In yet another embodiment, the base frame of the apparatus is rotatably connected to the ground by a first ground interface. The apparatus further includes second and third ground interfaces that are offset in a radial direction from the first ground interface. A staggered arrangement of the second and third ground interfaces can permit local resolution of actuation torques and attendant uncoupling of torsional compliance of and from an azimuthal position of the support member.

Figure 68A:
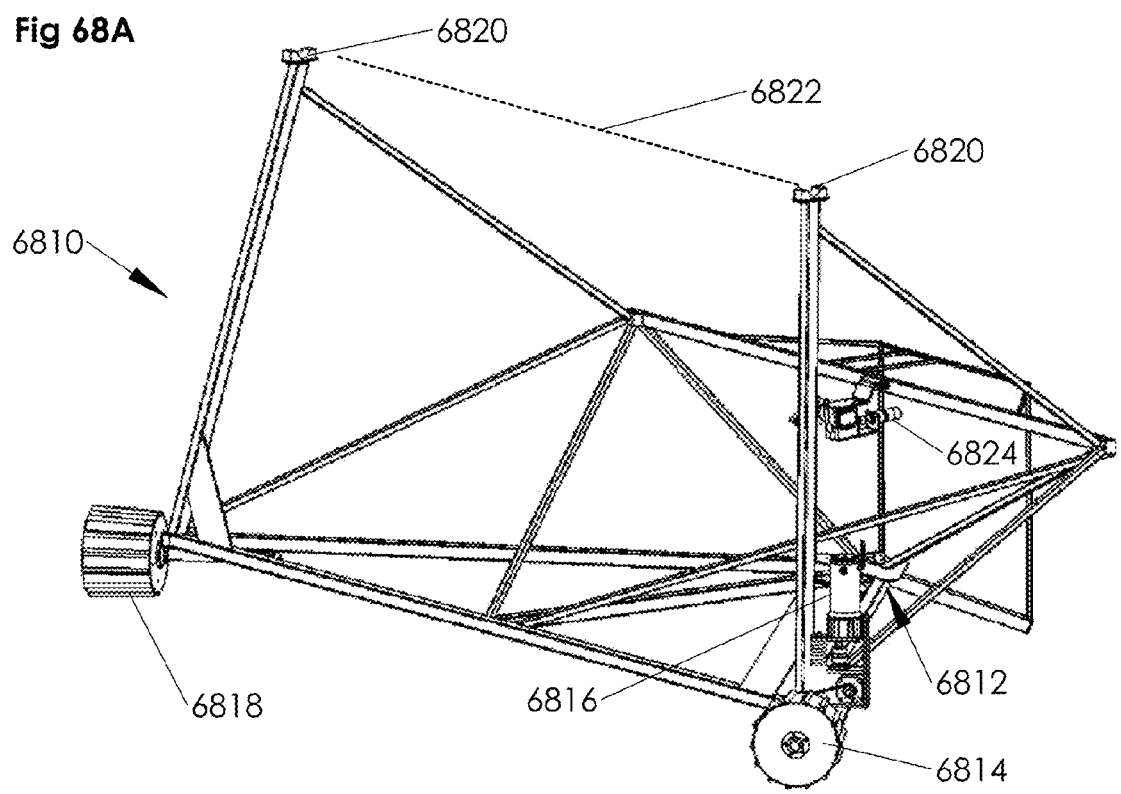
FIGS. 68A-68B show views of another embodiment of a base structure.
Figure 68B:
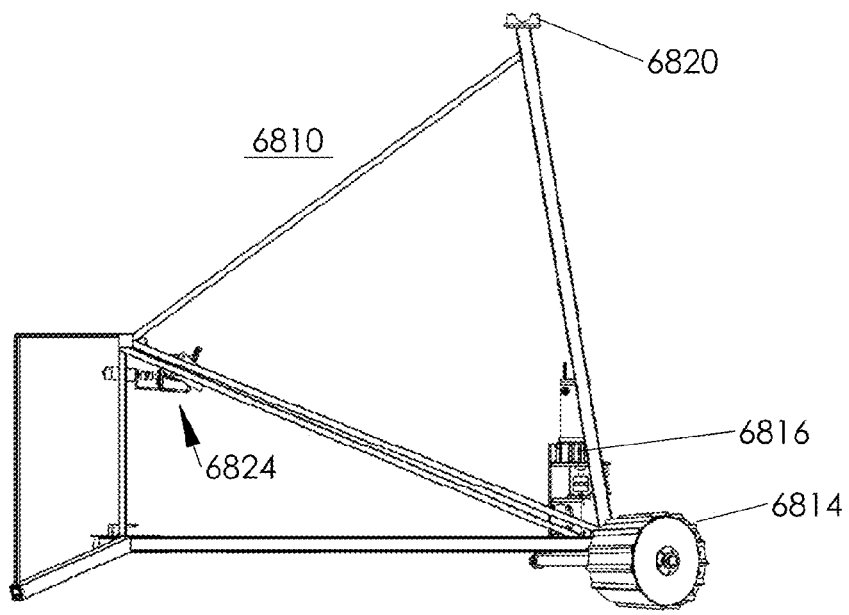

FIGS. 68A-68B show views of another embodiment of a solar concentrator tracking structure base. In particular, FIG. 68A shows an isometric view, and FIG. 68B shows a side view of the structure in FIG. 68A.

Frame 6810 is pivotably connected to the ground or other anchoring element through ball joint 6812. Frame 6810 can rotate in an azimuthal direction when wheel 6814 is driven by azimuth drive system 6816. In this embodiment the wheel 6818 may be passive, while in alternative embodiments the wheel may be driven.

Wheels 6814 and 6818 interface directly with the ground in this embodiment. In other embodiments, they may roll on a prepared surface such as prepared dirt, gravel, pavement, concrete, steel track, plastic mesh, plastic track or other prepared surface.

Bearing mounts 6820 allow a variety of solar concentrators (not shown) to be mounted and to be rotated about elevation axis 6822. Elevation drive system 6824 can provide motivating and restraining forces to create elevation motion and control.

Figure 69B:
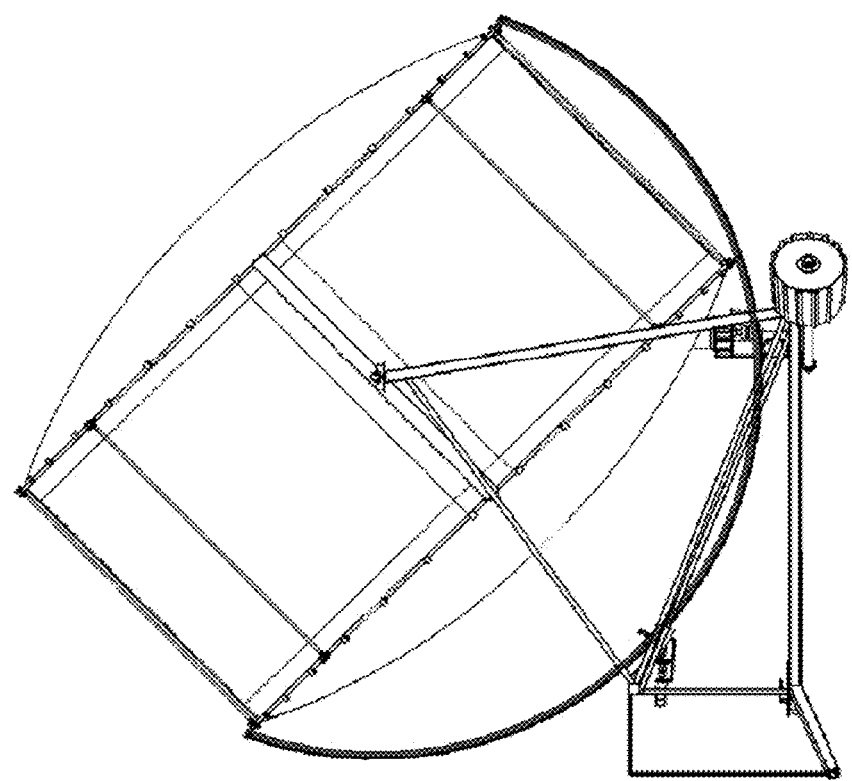
FIGS. 69A-69B show the embodiment of the inflated solar concentrator of FIG. 20 mounted on the base structure of FIG. 68.
Figure 69A:
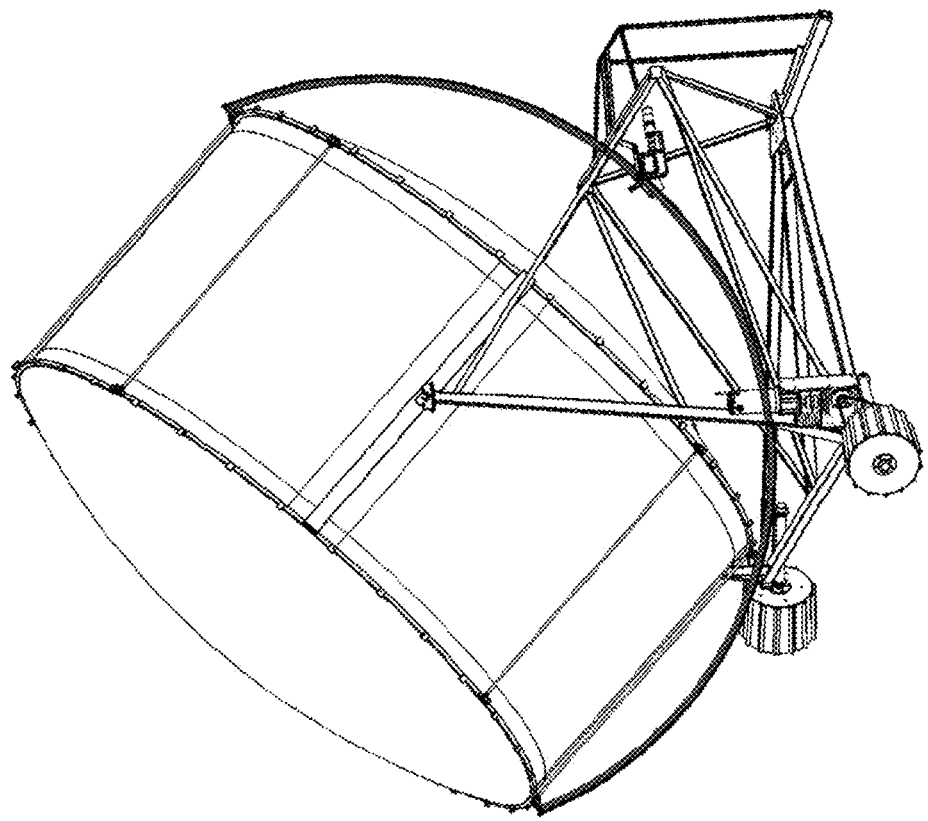

FIGS. 69A-69B show various views of the embodiment of the inflated solar concentrator of FIG. 20 mounted on the base structure of FIGS. 68A-B. In particular, FIG. 69A shows an isometric view of the embodiment of a solar concentrator of FIG. 20, mounted on the tracking base structure of FIG. 68A. FIG. 69B shows a side view of the structure and concentrator of FIG. 69A.

Figure 70A:
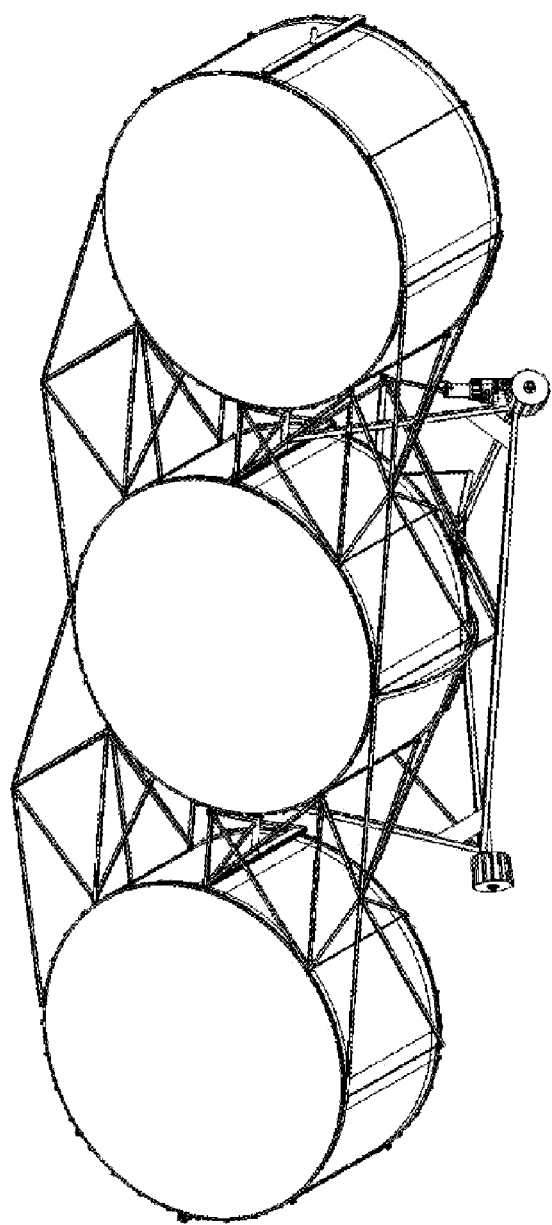
FIGS. 70A-70B show a 3×1 array of inflated solar concentrators of FIG. 20 mounted on the base structure of FIG. 68.
Figure 70B:
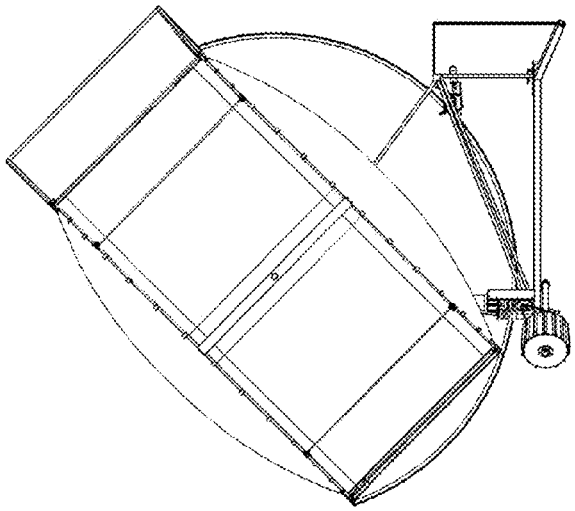

FIGS. 70A-70B show views of a 3×1 array of inflated solar concentrators of the embodiment of FIG. 20 mounted on the base structure of FIGS. 68A-B. In particular, FIG. 70A shows an isometric view of a 3×1 array of the concentrators of the embodiment of FIG. 20, mounted on the structure of FIG. 68A. FIG. 70B shows a side view of the concentrators and structure of FIG. 70A.

Figure 71A:
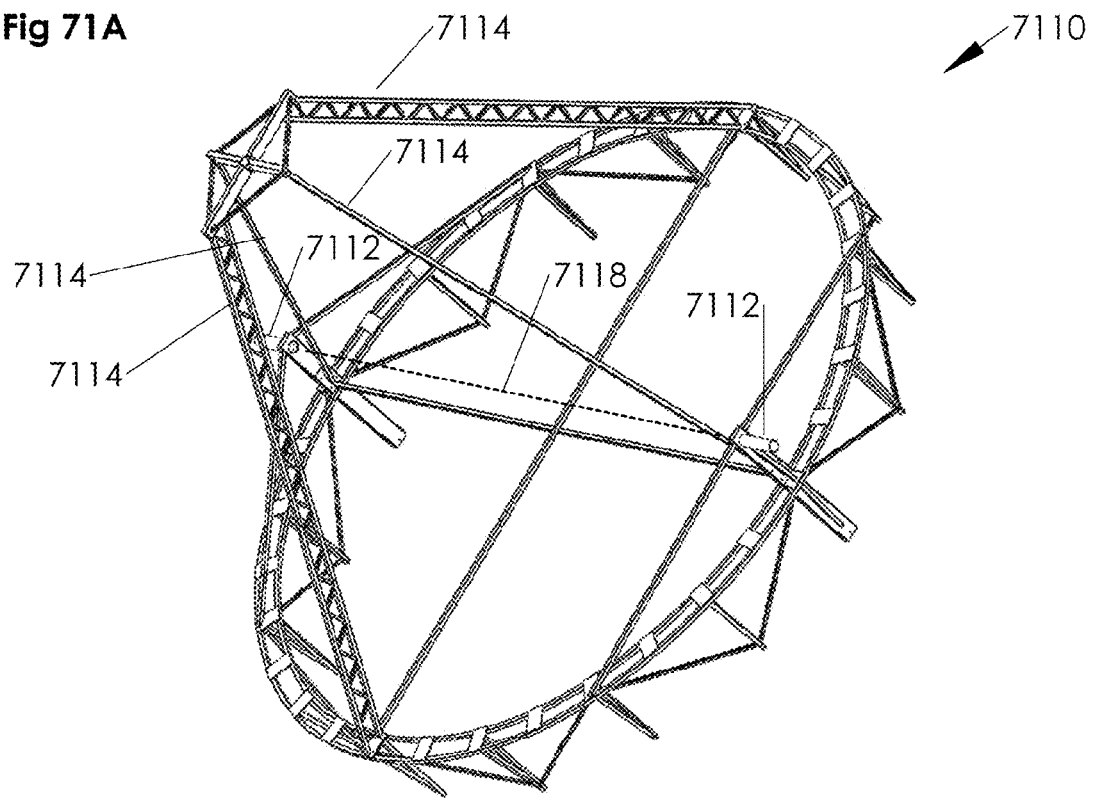
FIGS. 71A-71B show another embodiment of an inflated solar concentrator structure.
Figure 71B:
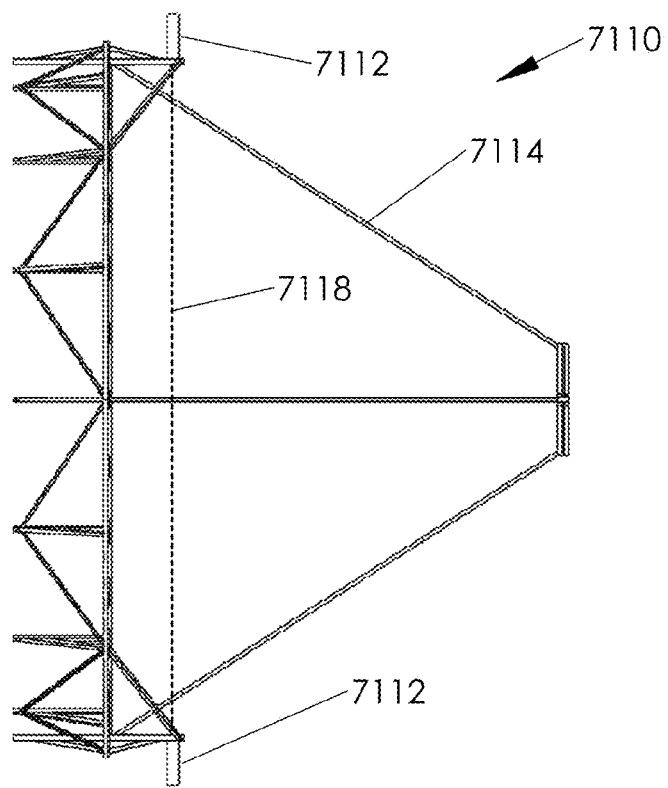

FIGS. 71A-B show views of another embodiment of an inflated solar concentrator structure. In particular, FIG. 71A shows an isometric view of solar concentrator structure embodiment 7110. FIG. 71B shows a top view of the solar concentrator structure of FIG. 71A.

This structure may support a lenticular solar concentrator as shown and described in connection with FIG. 103 below.

Mounts as previously shown allow mounting of such a lenticular solar concentrator. Arms 7114 allow mounting a receiver (not shown) at a predetermined distance from a solar concentrator. Pivot axles 7112 define an elevation axis 7118 and allow structure 7110 to be rotatably mounted to a base structure (not shown in this figure).

Figure 72B:
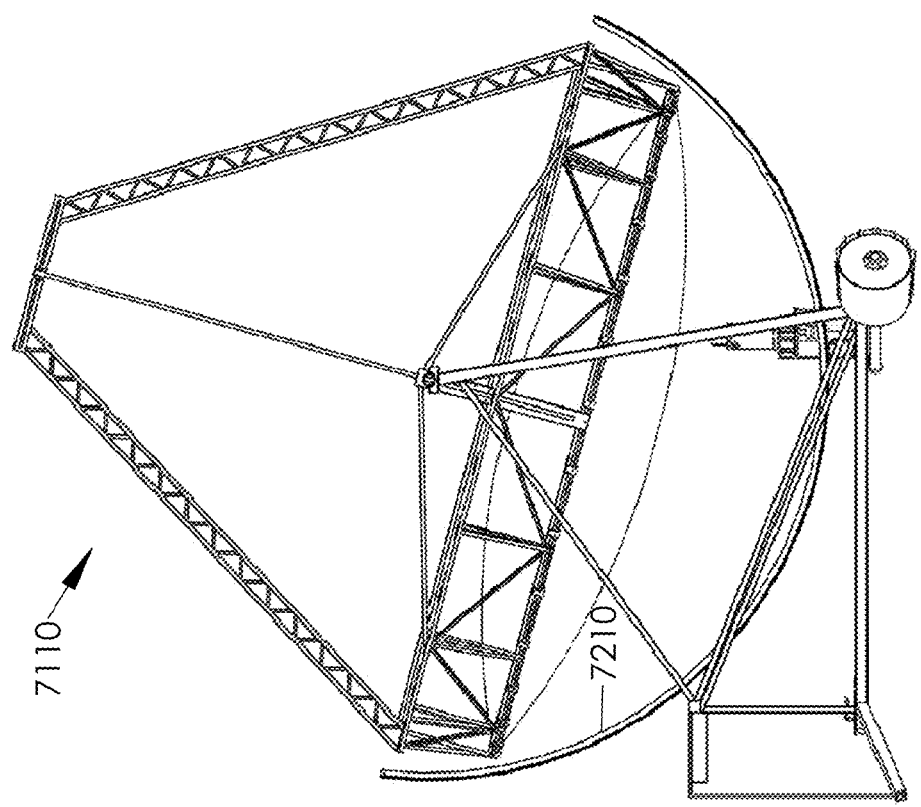
FIGS. 72A-72B show the embodiment of the inflated solar concentrator of FIG. 71 mounted on the base structure of FIG. 68.
Figure 72A:
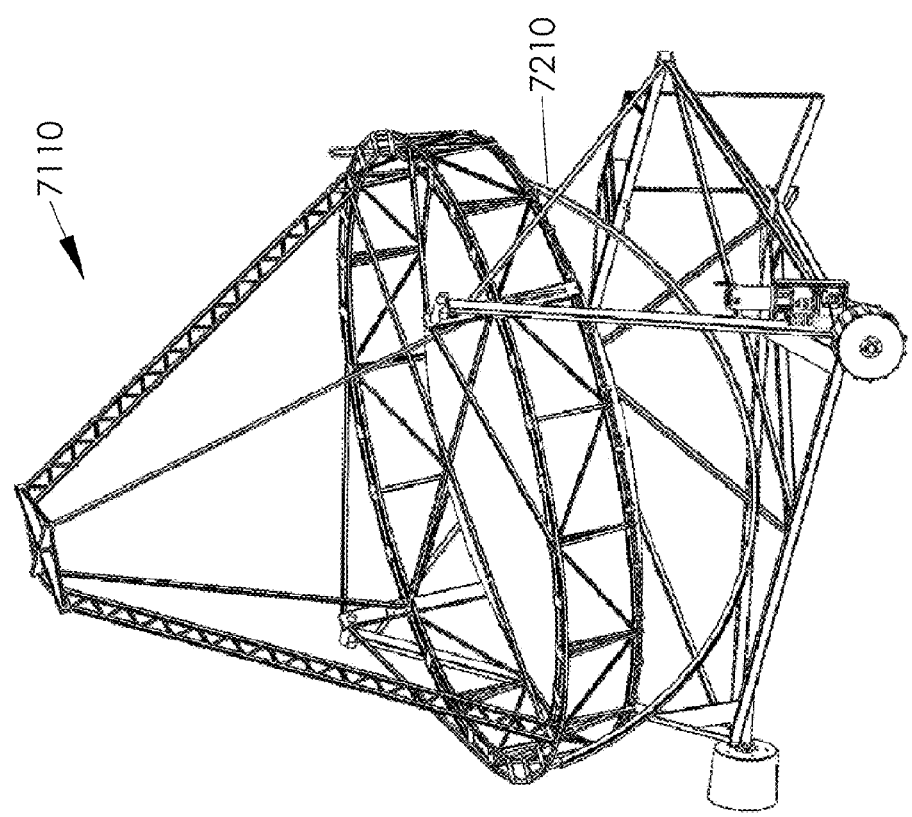

FIGS. 72A-72B show views of the inflated solar concentrator of the embodiment of FIGS. 71A-B, mounted on the base structure of FIG. 68. In particular, FIG. 72A shows the solar concentrator structure of FIG. 71A rotatably mounted to the base tracking structure of FIG. 68A. FIG. 72B shows a side view of the structures and elevation actuation system of FIG. 72A.

Elevation rack 7210 is attached to structure 7110. Elevation rack 7210 transmits elevation drive forces created by the elevation drive system to allow precise elevation control.

The elevation actuation system shown in this embodiment of a tracking structure transmits both elevation and azimuth tracking forces via the largest possible radius. Specifically, this embodiment transmits tracking forces via a drive system radius that matches or is larger than the size of the structures to be moved. This approach maximizes the possible tracking accuracy while minimizing tolerance requirements of components and minimizing costs.

Such an approach stands in contrast with conventional solar tracking structures, which commonly actuate large panels or concentrators by transmitting actuator forces through attachment points at a radius which is a small fraction of the size of the panel or concentrator. This increases stiffness requirements and expenses and limits practical tracking accuracies.

FIGS. 73A-73B show views of a 3×1 array of solar concentrator structures of the embodiment of FIG. 71. In particular, FIG. 73A shows a 3×1 array of the solar concentrator structure of FIG. 71A. FIG. 73B shows a front view of the concentrator array of FIG. 73A.

The concentrator structure of FIG. 71A may also be combined into array structures of other numbers of rows or columns, for example 1×4, 2×3, 2×4, 3×6, 3×9, and many other arrangements of rows and columns. Array structures may have shifted rows to take advantage of hexagonal close packing or other packing arrangement.

Figures 74A, 74B:
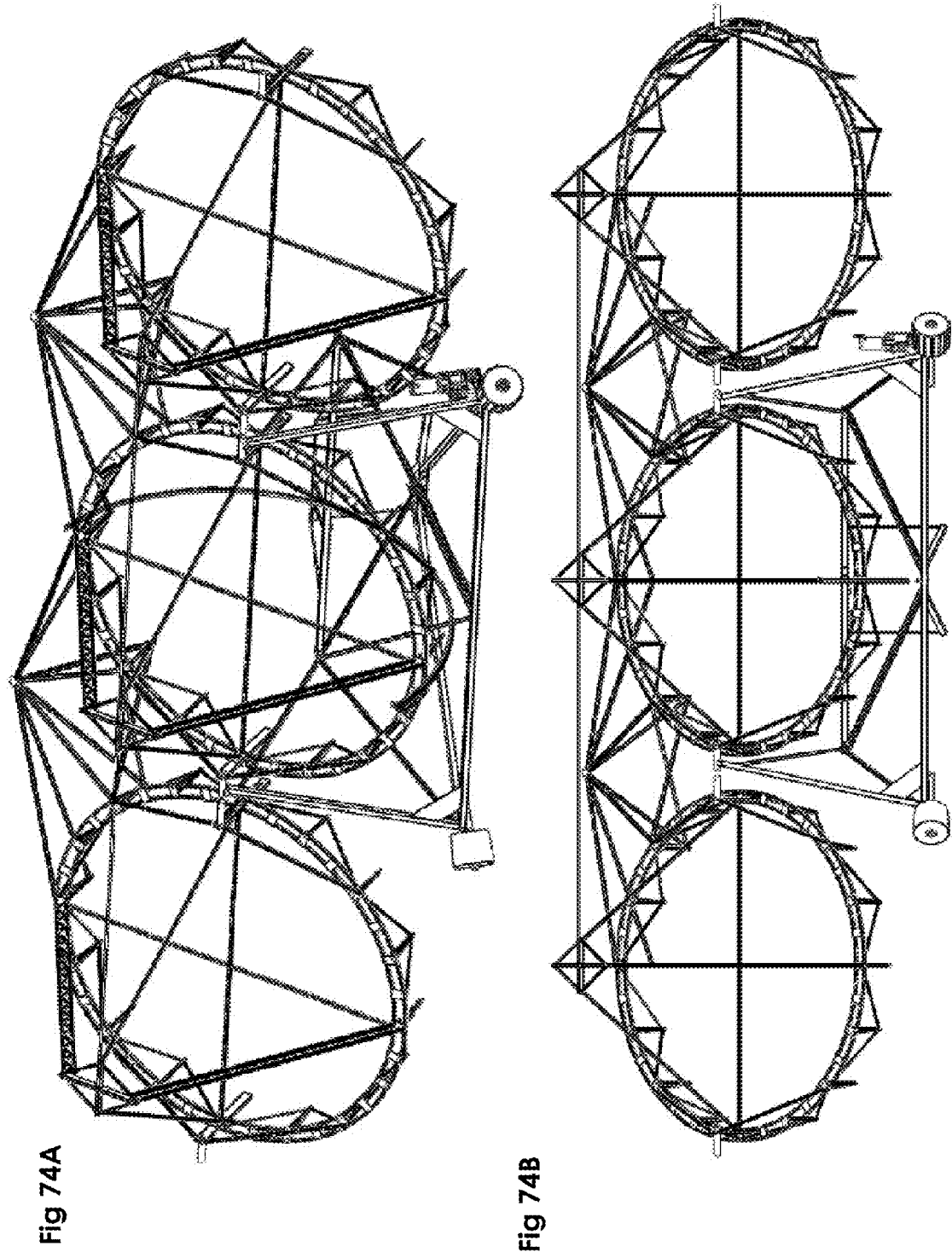
FIGS. 74A-74B show the solar concentrator array of FIG. 73 mounted on the base structure of FIG. 68.

FIGS. 74A-74B show the solar concentrator array of FIG. 73 mounted on the embodiment of the base structure of FIG. 68. In particular, FIG. 74A shows an isometric view of the concentrator array of FIG. 73A rotatably mounted to the base tracking structure of FIG. 68A. Elevation rack 7210 and elevation drive system 6824 rotates the array of FIG. 73A as a unit. FIG. 74B shows a front view of the structure.

Figure 75A:
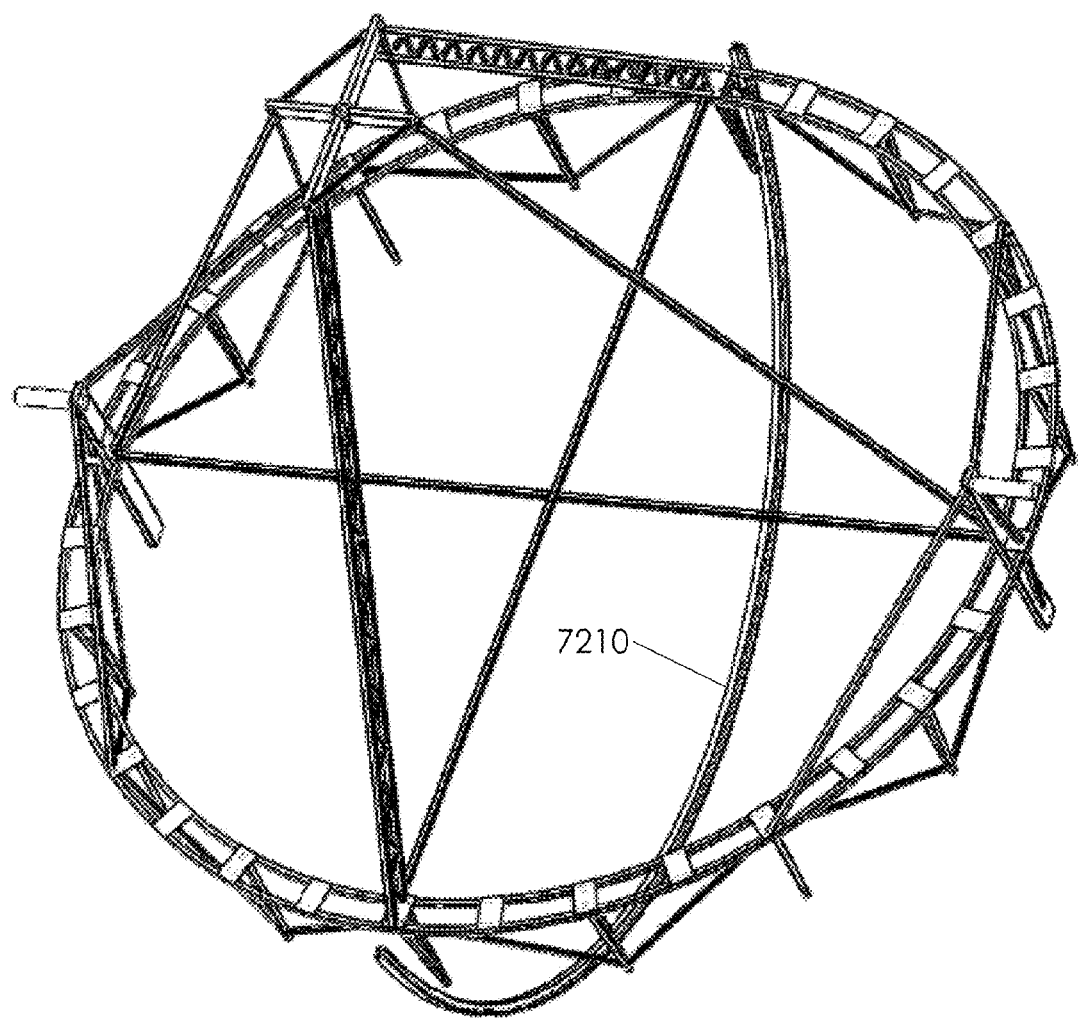
FIG. 75A shows a solar concentrator with an elevation actuator rack component.
Figure 75C:
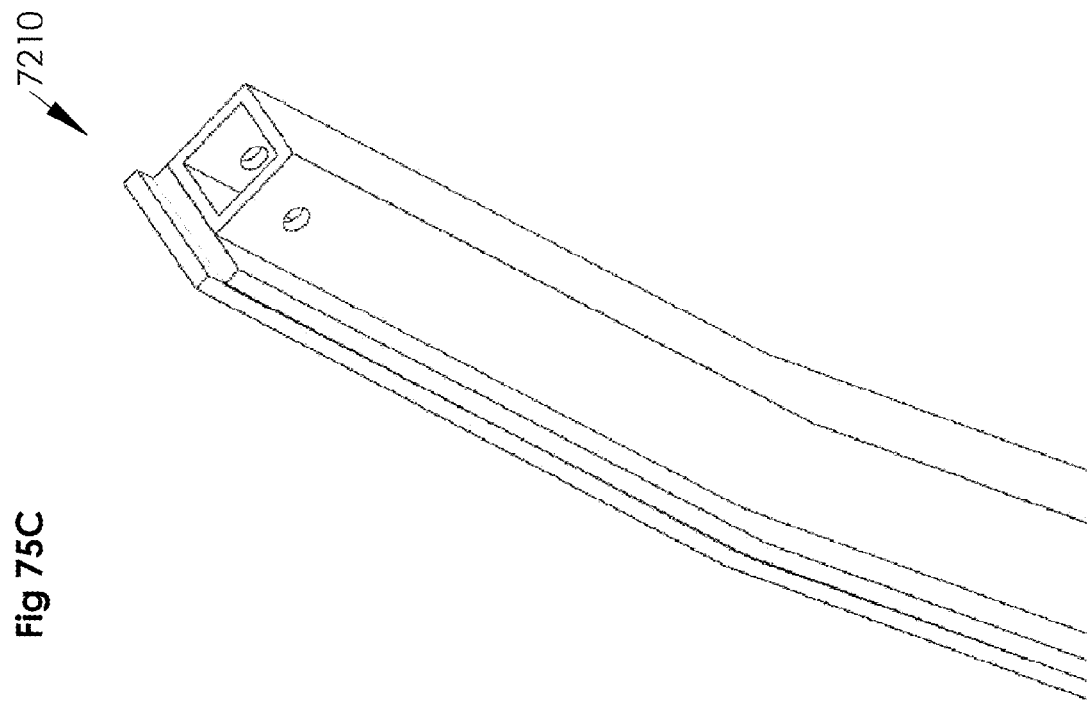
FIG. 75C shows an enlarged view of the actuator rack.
Figure 75B:
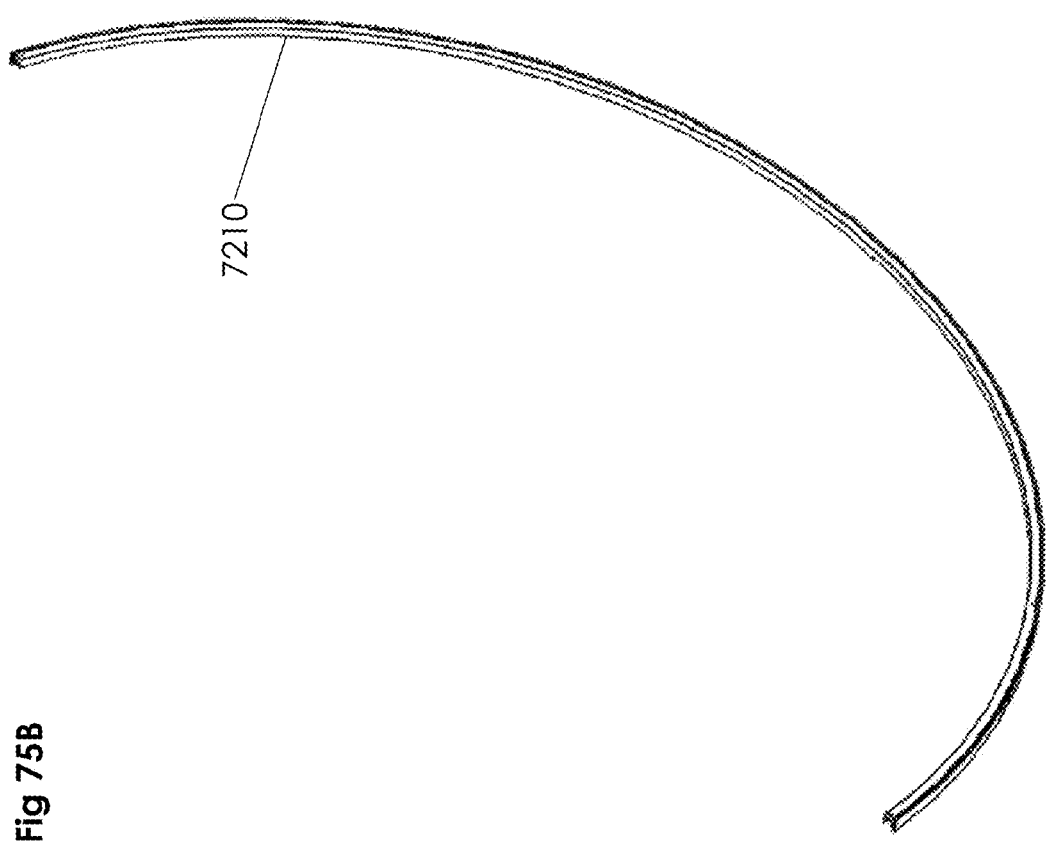
FIG. 75B shows just the actuator rack from FIG. 75A.

FIGS. 75A-E show embodiments of a solar concentrator with an elevation actuator rack component. In particular, FIG. 75A shows only the concentrator structure of FIG. 71A with the elevation rack 7210 for clarity. FIG. 75B shows elevation rack 7210 alone.

FIG. 75C shows a closeup cut-away view of elevation rack 7210. This embodiment of an elevation rack retains a curved shape because of the rigidity of the structural element. The drive interface with this rack may have teeth or serrations to prevent slippage when engaged with drive system 6824. It may be a flexible toothed belt such as a timing belt, or it may be teeth or serrations formed, molded or machined as an integral part of element 7210.

Figure 75D:
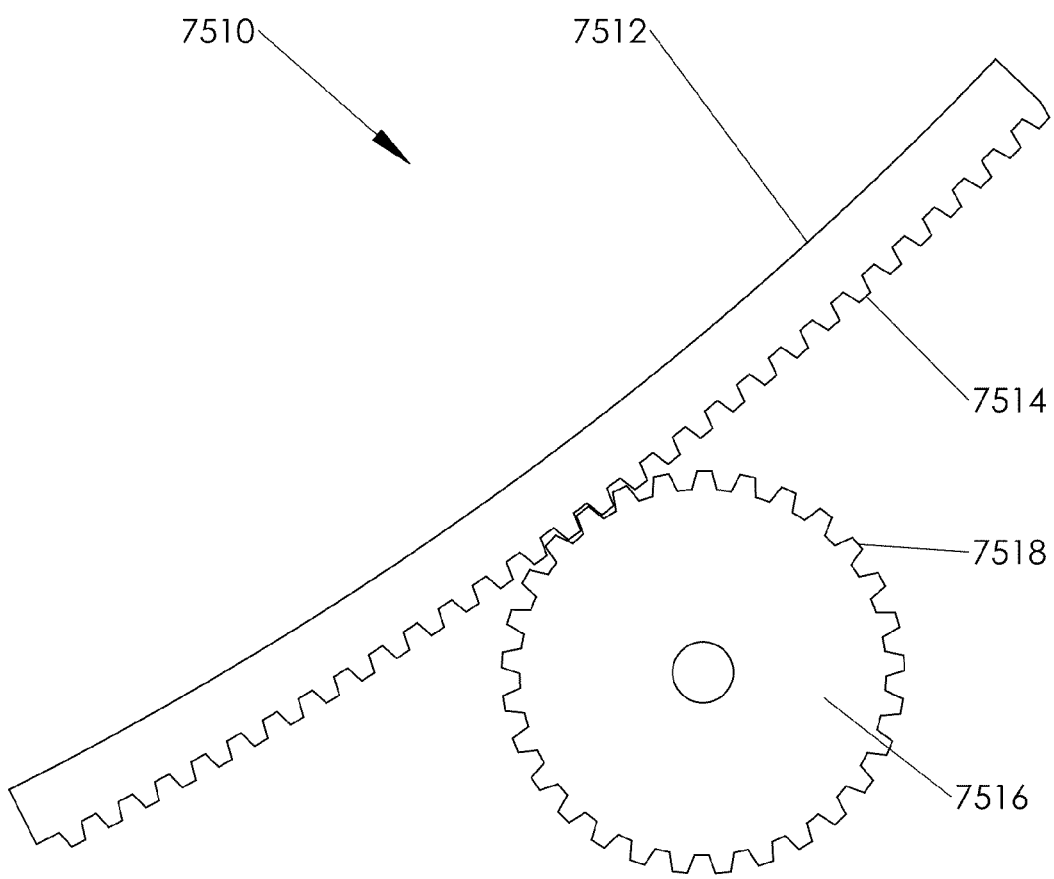
FIG. 75D shows one example of a particular embodiment of an elevation actuator rack assembly.

FIG. 75D shows a section of an elevation actuator rack assembly for a solar tracking system 7510. Rack 7512 is one possible embodiment of a rack 7210. In this particular embodiment, drive pulley 7516 has teeth 7518 which engage positively with rack teeth 7514 to prevent slippage of the elevation actuator.

Figure 76A:
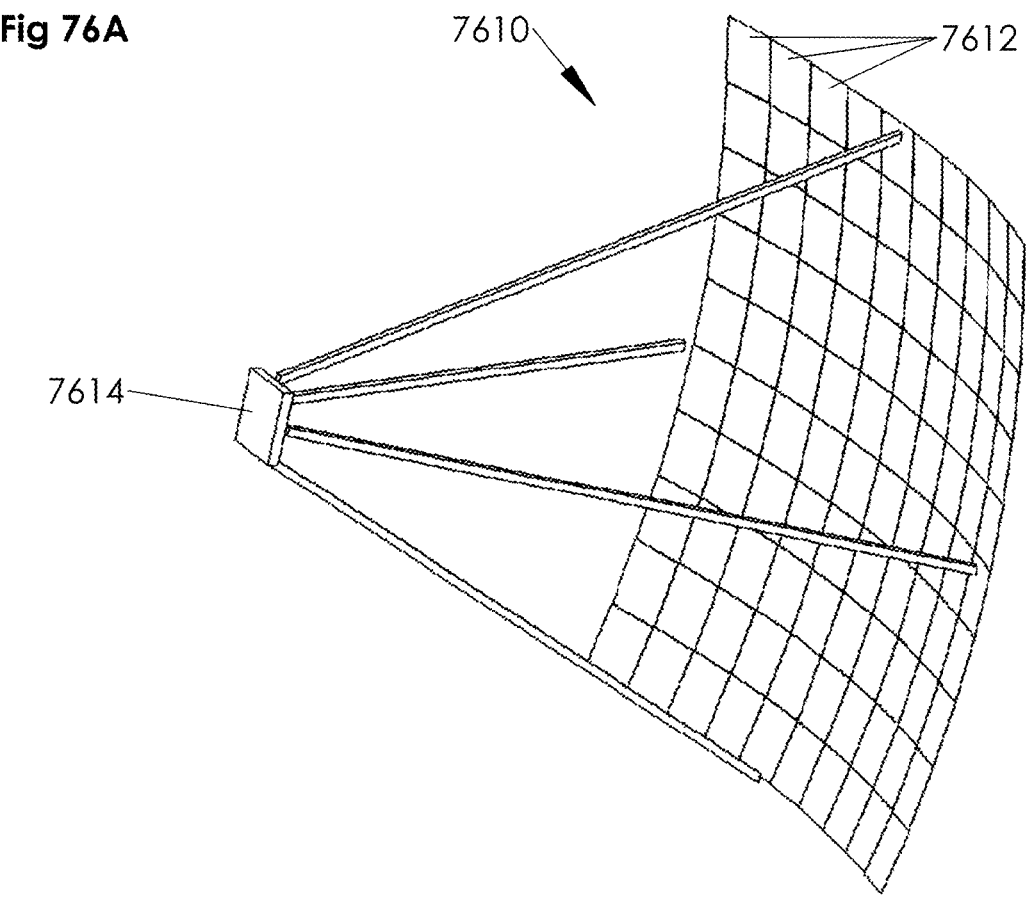
FIGS. 76A-76B show views of another embodiment of a solar concentrator that utilizes a faceted reflector.
Figure 76B:
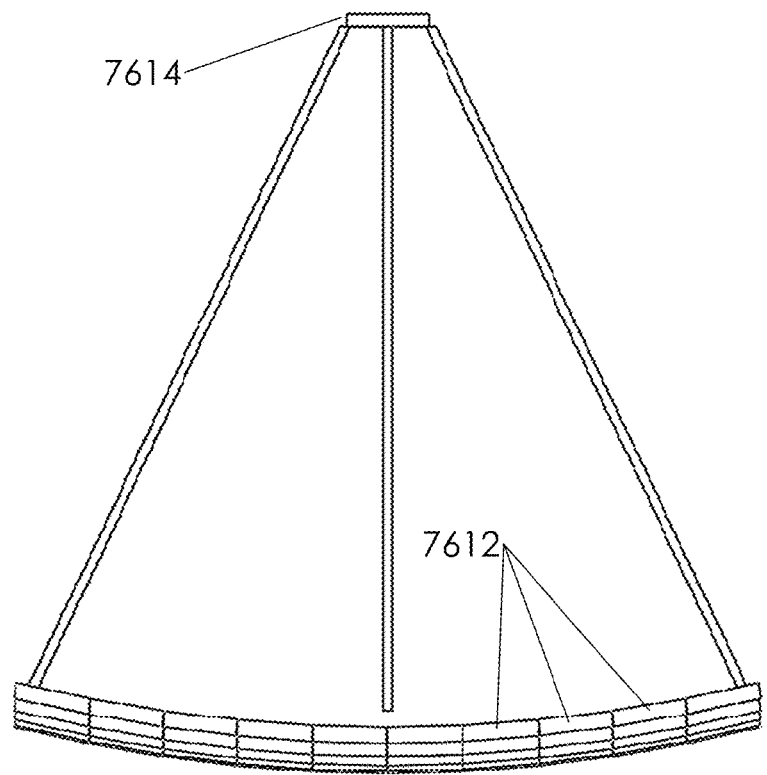

FIGS. 76A-76B show another embodiment of a solar concentrator that utilizes a faceted reflector. In particular, FIG. 76A shows a faceted solar concentrator 7610. Facets 7612 are arranged and mounted together such that sunlight reflected from each mirror is directed to receiver 7614 such that the reflected rays from each facet are superimposed at the surface of receiver 7614 to create a concentration factor roughly equal to the number of facets 7612.

Figure 77A:
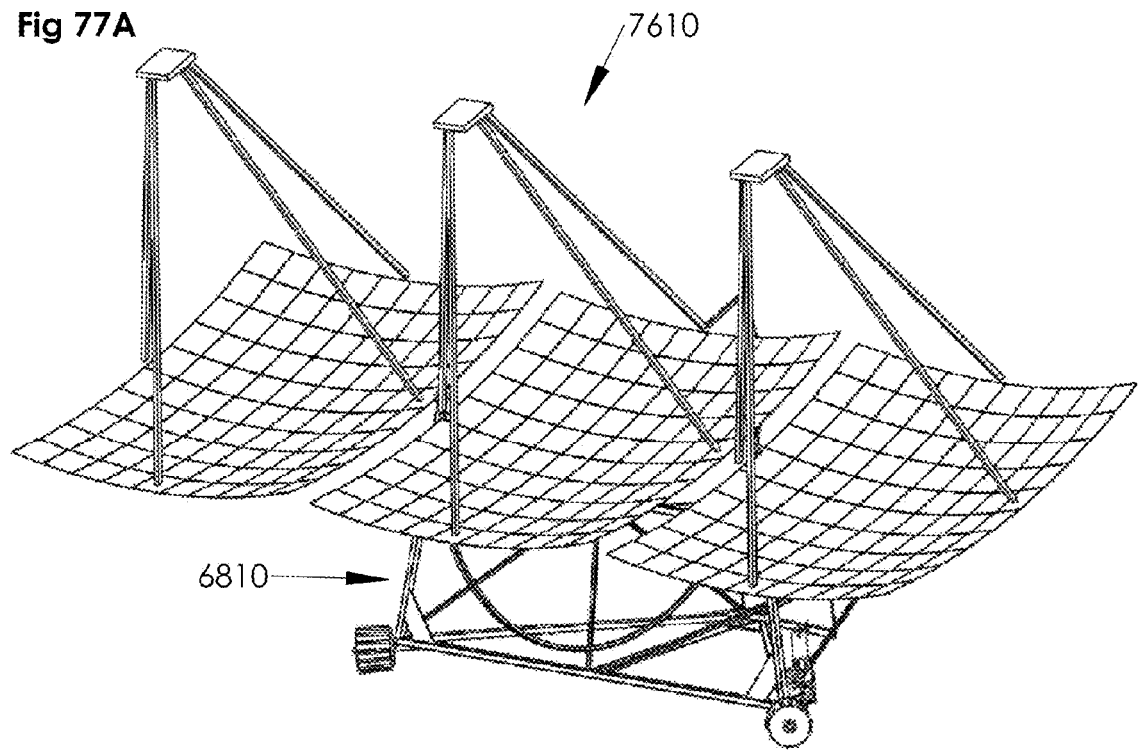
FIGS. 77A-77B show a 3×1 array of the solar concentrators of FIG. 76 mounted on the base structure of FIG. 68.
Figure 77B:
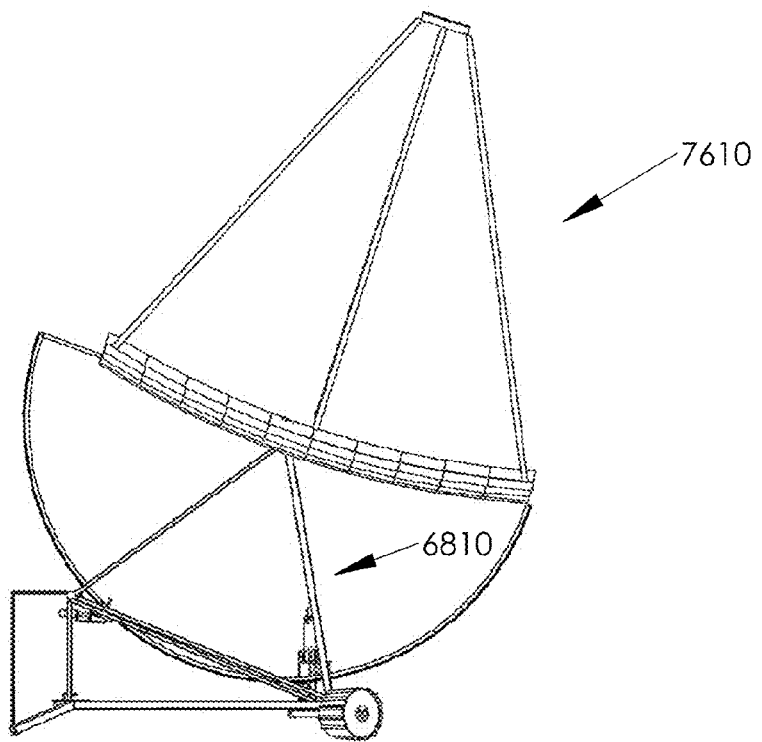

FIGS. 77A-77B show perspective and end views, respectively, of a 3×1 array of the solar concentrators of the embodiment of FIG. 76 mounted on the base structure of FIG. 68. In particular, FIGS. 77A-77B show a 3×1 array of solar concentrators 7610 rotatably mounted to base 6810.

Embodiments relate to solar energy concentrators. In certain embodiments, a collector comprises a clear cover film and a reflective optical film retained by rings. The concentrator may be inflatable, and may include a shroud between the rings to provide a seal to maintain inflation pressure and assist in maintaining a desired shape. The collector may further comprise a stiffening truss having radial elements, cross-radial elements, and/or axial elements. These elements may transfer loads from the films and the shroud, to hubs providing rigid points for attaching the concentrator to other elements such as rigging and/or a pointing apparatus. In some embodiments, the films may be configured in a manner that reduces net torsional forces on the rings. Circumferentially varying torsional deflections can be reduced by engineering the interface between the ring and wires, to distribute forces more continuously across the ring. Some embodiments may minimize torsional deflection by coordinating pairs or multiples of elements to balance forces.

One challenge faced by large-scale solar power collection, is the diffuseness of the solar resource. Such diffuseness may result in a utility-scale solar power plant occupying large areas from tens of acres to over thousands of acres.

The free-market value of electricity produced per acre may be one-and-a-half orders of magnitude greater than that of agricultural staples. However, the free-market value of the electricity produced may not be sufficient to justify the expense of conventional one-sun photovoltaic converters.

Concentrated photovoltaics (CPV) and concentrated solar power (CSP) technologies improve the economic realization of solar power harvesting, by collecting light into a concentrated zone where the solar energy is converted to electricity and heat, respectively. In certain embodiments, a goal of these approaches is to perform this collection of solar energy employing a smallest amount of low cost materials.

U.S. patent application Ser. No. 11/843,531, which is incorporated by reference herein, discloses the use of inflated structures for solar energy collection. The structures disclosed in this patent application utilize air as a majority structural element, employing air pressure and film-membrane forces to shape solar energy collectors and resist deformations arising from forces such as gravity, wind, and inertia.

Embodiments employ solar energy collectors that minimize a material cost and a cost of consumables in maintaining and orienting a reflector of a given area. In certain embodiments, such a solar energy collector may be created by making an optimal use of inflation air and mechanics to create and direct the structure.

Embodiments of collectors include a plastic optical film herein called the "optical film," and a clear film cover herein called the "cover film." The optical film acts as a primary concentrator, and may have a thin metallization which confers the ability to reflect light efficiently. In some embodiments such a reflective coating may work in concert with reflective, diffractive (e.g., holographic), and/or refractive structures on a surface of the optical film. In some embodiments, these reflective, diffractive, or refractive structures may be embossed, stamped, etched, printed, or applied onto the optical film.

The cover film seals the collector structure, and may absorb UV and otherwise protect an interior of the collector from the environment. In some embodiments, this cover film provides additional functions, such as diffraction, refraction, and reflection and/or absorption of unwanted spectral components. Other functions which may be performed by the cover film include but are not limited to reducing reflections, promoting water shedding via hydrophobicity, and/or promoting water sheeting via hydrophilicity.

An advantage of inflated structures is the ability to create large-scale structures from small amounts of material. The use of simple optical films (e.g. reflective films) may impose certain requirements on the shape and shape consistency of an inflated film. The use of engineered structures to tailor the optical film may provide additional design flexibility. In some embodiments, it may prove beneficial to introduce structures that modify the inflated shape of a collector.

Some embodiments of collectors may employ a ring or a plurality of rings in communication with the optical film. As used herein, a "ring" is a structural element that resists deflection under film membrane forces by converting such forces into substantially circumferential forces.

Some embodiments of a collector may employ a plurality of rings that are substantially concentrically disposed and in mechanical communication with an optical film. In such a configuration, membrane forces in the optical film arising from inflation impose a radially inward force on the one or more rings. A circumferential compressive force prevents the possibility of buckling of the ring.

According to certain embodiments, a tendency to buckle may be resisted by use of a ring offering sufficiently large resistance to bending to avoid low-order buckling phenomena. Such an embodiment may require large amounts of ring material.

Accordingly, some embodiments may employ a ring supported at a plurality of points by a structure herein called "stiffening truss," that resists low-order bucking modes. Such a stiffening truss allows the use of a less-massive ring that resists only high-order buckling instabilities.

Moreover, optical films may strain and creep in a non-biaxial manner. As used herein, the term "creep" refers to accumulated plastic deformation of a film, or a change in length of a film, that does not reverse or disappear when forces that act to stretch the film are removed.

Thus, an embodiment of a stiffening truss may mitigate the effect of non-biaxiality on collector optics, particularly as films age. While such a stiffening truss may be useful, embodiments may seek to minimize the material present in such structures to enhance inflated solar collector optics.

In certain applications, a collector follows guidance of a solar-tracking apparatus. In some instances, tethering directly to an inflated structure can create issues. For example, forces may be overly-localized, and local inflation and membrane forces may poorly communicate positions imposed by a tracking apparatus to the rest of the collector.

Thus, in some embodiments, structures in mechanical communication with one or more rings may converge substantially at one or more zones, herein called "hubs." Such hubs may offer effective points for attaching the collector to a solar pointing and tracking apparatus (herein called the "pointing structure") either directly, or via an assembly of structural elements as described in the '877 application. The '877 application describes approaches for attaching an inflatable concentrator to external elements.

In some embodiments, one or more hubs are located in the interior of a collector. In some embodiments, these hubs lie near the central axis of the collector. In other embodiments, the hubs may be off-center from the central axis. In other embodiments, the location of the hubs may approximately coincide with the position of a ring.

Some structural elements attaching rings to hubs, may lie in the optical path and occlude light, thereby reducing the light-gathering capacity of a collector. In some embodiments, these structural elements that tie rings to hubs, are substantially tensile elements such as hardened steel wires or straps.

As used herein, the term "wire" generally includes any element exhibiting an axial stiffness in excess of its bending stiffness. Examples of wire elements include single stranded extrusions, multiple-stranded extrusions, fibers, chains, ropes, threads, straps, tapes, tubes, poles, bars, and the like, which may typically be made of metal, glass, plastic, or composites.

In some embodiments, wire may include materials having a high ultimate strength and corrosion resistance, for example piano wire. Corrosion resistance can arise from anti-corrosive coatings, such as zinc, aluminum, chromium, phosphor bronze, and the like, or from bulk material corrosion resistance. Corrosion resistance can be augmented electrolytically, anodically, through an impervious coating, or using other approaches.

Certain embodiments may position an object, herein called a "receiver," that is configured to intercept light from the primary optic. Certain embodiments of receiver structures which may be utilized in embodiments are described in the '888 application. Placement of the receiver in the interior of the inflated structure can avoid losses and accelerated film degradation associated with passing light more than once through a film.

Embodiments employing such an internal receiver may also utilize an additional feature herein called a "shroud." Such a shroud element seals a region between the cover film and the optic film. In some embodiments, the shroud has a substantially circular cylindrical shape.

Couplings between films, rings, and a shroud can take different forms. Various embodiments may utilize adhesive bonds, friction seals, mechanical clamps, gaskets, or other types of couplings.

The films of a collector may generally require replacement on a routine basis. Embodiments may thus form seals between the films and the remainder of the structure, in a manner facilitating replacement.

In some embodiments, a physically distinct element herein called a "film clip," may link a film with a ring. In some embodiments, a physically distinct element herein called a "shroud clip," may link a film with a shroud.

Embodiments may utilize tradeoffs between certain features to achieve a desired result. For example, optimization of certain embodiments may involve trading off complexity of the stiffening structure, with material reduction of the rings and shroud. Another example of a possible tradeoff is between precision factory assembly and efficient distribution and field installation.

Still other instances of optimization may trade a long baseline distance between hubs, with minimization of shroud and stiffening-truss materials. Another possible tradeoff includes a degree of distribution of film processing (such as efficient transport of films), versus an expected sophistication of precision film processing at the site of the power plant.

According to certain embodiments, it may be possible to reduce or eliminate film creep and maintain overall control over the inflated film shape, where the film is reinforced with fibers or other long reinforcement elements. Yarns of glass fiber, carbon fiber, ceramic fiber, plastic, steel, composite or other materials, could be used.

Such reinforcing elements could be adhered to the film, or incorporated into the film during its manufacture. Fibers can be arranged in patterns that are radial, annular, or concentric, or oriented in a rectangular or hexagonal grid or some other crossing arrangement that creates predictable facets or bounded areas of film.

An inflated film with facets formed by an arrangement of fibers could be made to distribute light more evenly over a focal region. An inflated film could be made to take on a certain shape by controlling the placement, orientation and spacing, thickness and stiffness of the fibers.

In certain embodiments, a cost and complexity of film reinforcement and film-bonded retention features, may be traded-off against factors such as reduced film lifetime and optical accuracy and increased clip material and installation difficulty. When possible, embodiments may employ reusable application-specific tools, machines, and fixtures to reduce a severity of design tradeoffs.

The cover film and the optical film, along with any associated single- or limited-use components, may comprise the highest cost consumables. One measure of the economic efficiency of a solar collector structure is the total electrical energy produced per consumable cost. This parameter may be maximized by making use of the fullest extent of the film, and by maintaining collector shape and pointing of the film within narrow tolerances to achieve the best receiver efficiency.

The lifetime of a film may be dictated by at least three factors: 1) creep, 2) UV and environmental damage to the bulk material, and 3) environmental damage to the material surface. A collector design may be configured such that these three factors result in similar lifetimes for the balloon.

Material creep forces the balloon inflation pressure to be reduced over time. When this inflation pressure is insufficient to resist wind acceptably, the creep-related film lifetime is reached. In some embodiments, the structure of the collector is intentionally engineered to be able to compensate for creep and plastic balloon deformation, thereby providing for a sufficient inflation pressure for a longer time period.

In such a design, one such possible configuration involves determination and utilization of the film thickness. Specifically, films exhibiting a greater thickness may survive longer in the environment and operate at relatively high pressures. However, such thick films may be as sensitive to surface damage as are thinner films.

Certain embodiments may reduce rates of surface damage through the use of techniques including but not limited to polymer film composites, laminates, graded extrusions, or surface modifications. Examples of such surface modifications include but are not limited to diffused molecules, molecules such as solvents that affect surface polymer morphology, grafted polymers and molecules, and the like. Such surface modifications may achieve damage-resistant surface properties that are different than the load-bearing bulk. However, the use of thicker or complex films may increase a cost of consumable materials.

Inflated collector structures may be classified based upon a number of regions a structure produces concentrated light. For example, a film may be partitioned or mechanically restrained via an internal and or external frame to produce a plurality of concentrated regions. Such an arrangement could have the basic geometry of an egg-crate, bubble wrap, or air-mattress, in which each concave pocket forms a separate concentrated zone. Such an arrangement may be advantageous for providing for enhanced fill factor or packing density (for example via hexagonal packing).

A further advantage offered by certain such embodiments is an ability to separate the size of the inflated structure from the power in each individual zone. This may allow for simpler receiver structures. For example, receivers having one or only a few (such as 4) cells to connect in series, can avoid difficulties in obtaining optimal performance from dense-array receivers.

Alternatively, structure having multiple-elements could simplify simultaneous film replacement for multiple collectors. For example, a fresh film could be unrolled over multiple collector structures.

The following discussion relates to examples of a concentrator structures that produce a single or small number of closely space concentrated zones. However, the present invention is not limited to these particular examples, and the principles described herein may also apply to an inflated collector having multiple-regions.

Moreover, while the following examples describe a collector which maintains its shape substantially through inflation forces, the present invention is not limited to such structures. Various embodiments may use a tensile stiffening truss having general application for solar collectors with or without reliance upon inflation air to provide structure.

Figure 78A:
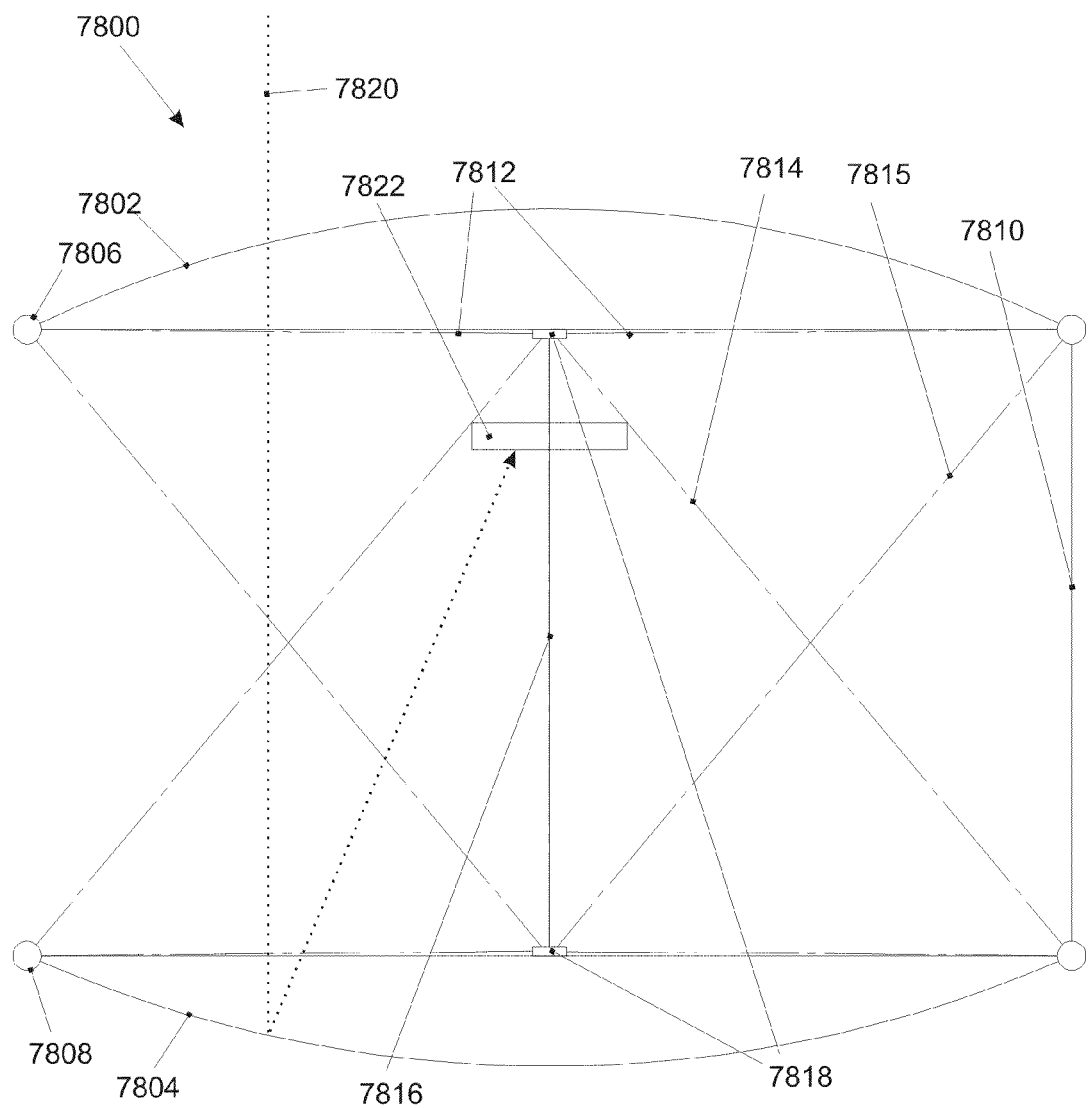
FIG. 78A shows a simplified cross-sectional view of an embodiment of a reflector-based collector in accordance with an embodiment.
Figure 78B:
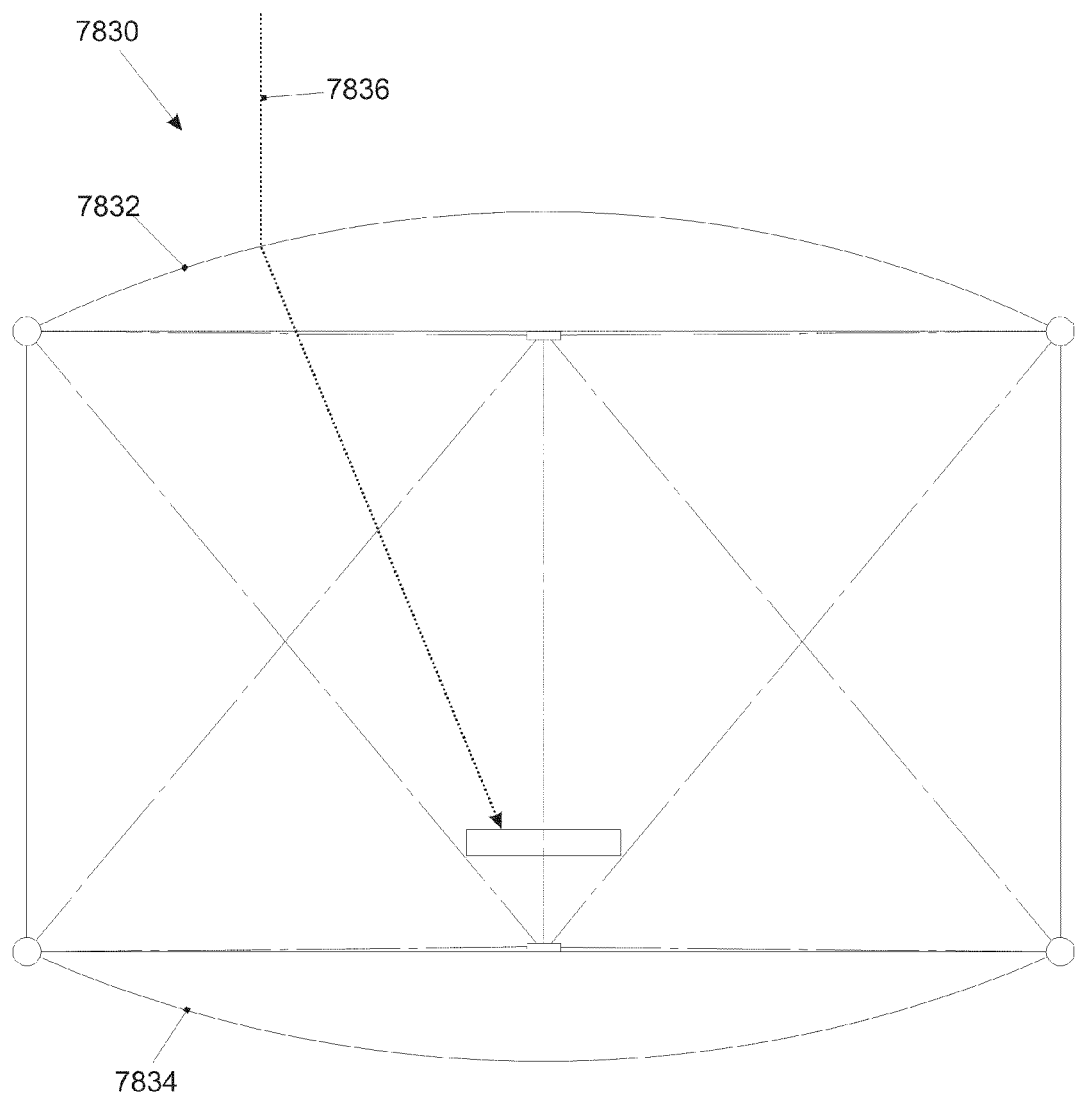
FIG. 78B shows a simplified cross-sectional view of an embodiment of a reflector-based collector in accordance with an embodiment.
Figure 78C:
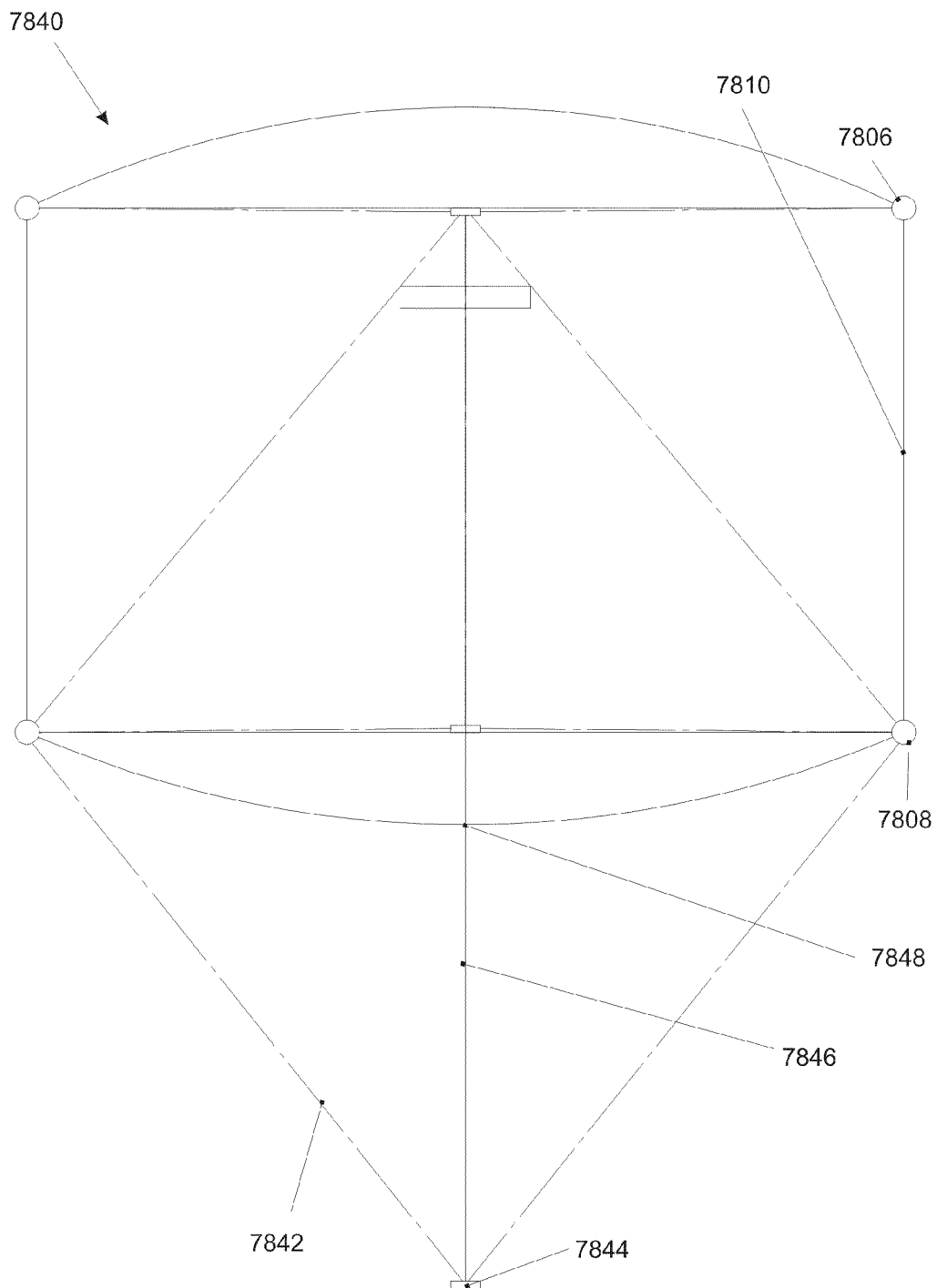
FIG. 78C shows a simplified cross-sectional view of an embodiment of a reflector-based collector in accordance with an embodiment.

FIGS. 78A-C show embodiments. Structural elements that may always be in tension and can comprise wires as described herein are shown as broken lines.

FIG. 78A shows a simplified cross-sectional view of an embodiment of a reflector-based collector 7800. This collector comprises a clear cover film 7802 and a reflective optical film 7804. The cover and reflector films are retained by rings 7806 and 7808, respectively. A shroud, 7810 between rings 7808 and 7806 can provide a seal to maintain inflation pressure and assist in maintaining a desired ring shape.

Elements of a stiffening truss include substantially radial elements 7812, cross-radial elements 7814 and 7815, and axial element 7816. These elements transfer loads to/from the films and shroud 7802, 7804, and 7810, via the rings 7806 and 7808, to the hubs 7818. These hubs provide rigid points for attaching the collector to a mounting and pointing structure (not shown in this figure, but shown and described below).

The arrangement of wires in FIGS. 78A-B avoids passing the wire 7814 through the highly concentrated region. The wire 7815 may be illuminated with less than one sun from above, as a result of its angle and with a comparatively modest concentration from below.

The embodiment in FIG. 78A features hubs internal to the collector. As a result, couplings with the pointing structure pass through a feed-through in at least one of the elements 7802, 7804, 7810, 7806, or 7808.

A coupling from the exterior to the interior of the collector can be made, such that the pointing structure element remains unbroken or is broken near the interior-to-exterior boundary. In the latter case, an interior element having the load capacity required of the pointing system may communicate pointing forces to a hub. The coupling between this external and internal element may be made via a mechanical intermediary, herein called a "mechanical feedthrough" that prevents inflation air leakage. A mechanical feedthrough can be located on a ring, film, or shroud. The feedthrough may be designed so that its presence does not introduce excessive localized forces, result in fatigue or abrasion of adjacent material, or adversely influence the collector optics.

An advantage of the arrangement in FIG. 78A is relatively unfettered access to the cover and optical films during film replacement. One or more adjustments on the effective lengths of the stiffening-truss elements, e.g., at the rings may provide for compensation of film or mounting irregularities.

Other possible types of feedthroughs can include, for example, moderate to high-temperature liquid, air, and, electrical feedthroughs. Where possible, it may be favorable to physically combine multiple feedthroughs and to perform multiple functions with one feedthrough, as each feedthrough may add expense and offer a potential point of leakage or failure.

In the particular embodiment of a collector 7800 shown in FIG. 78A, a light ray such as 7820 passes through the clear cover film 7802, and reflects off the optical film 7804 to a receiver, schematically shown as element 7822. FIG. 78B shows an alternative embodiment of a collector 7830 in which the optical film 7832 is refractive or diffractive.

Specifically, the refractive or diffractive optical film 7832 may include one or more elements such as Fresnel lens features, holographic features, diffraction features, lenslets, lenses, including liquid lenses, and the like, in such a way that the optical film bends a light ray 7836 toward a concentrated zone. In this embodiment the cover film 7834 may not experience light, and can in general be transparent, translucent, or opaque.

Possible advantages offered by the configuration of the embodiment of FIG. 78B include avoidance of losses from reflection and reduction in angular pointing accuracy, as compared with the embodiment of FIG. 78A. In the embodiment of FIG. 78B, however, the front film may be more complicated and require more material than a simple reflective film.

FIG. 78C shows an alternative embodiment of a reflector-based collector having both internal and external elements (7842, 7846) of the rigidizing truss, and an external hub 7844. The axial shape of ring 7808 is established in part by elements 7842. This axial shape of ring 7808 may be communicated by shroud 7810 to ring 7806.

A possible advantage of the arrangement of elements in the embodiment of FIG. 78C is the provision of fewer truss elements in the optical path. Another possible advantage of this embodiment may be a greater baseline between hub points, thereby possibly reducing the material or pointing accuracy requirements of the pointing structure.

The embodiment of FIG. 78C employs a mechanical feedthrough passing through the film at position 7848. This feedthrough may need to allow relative motion between the film surface and element 7846.

In the arrangement of the embodiment of FIG. 78C, truss elements 7842 and 7846 may complicate film replacement. Some embodiments may alleviate this by providing for removal and reinstallation of multiple elements with the film at a time of film replacement. This procedure could allow better control and adjustment of the optical film, potentially compensating for film irregularities and other factors. Such adjustments could be made in an automated fashion at the time of film mounting or afterward.

U.S. Provisional Patent Application No. 61/299,124 (the '124 application) filed on Jan. 28, 2010 and titled "Structure and Articulation System for Solar Collectors," which has been incorporated by reference, describes mounting of a concentrator to a pointing structure according to certain embodiments.

Figure 78D:
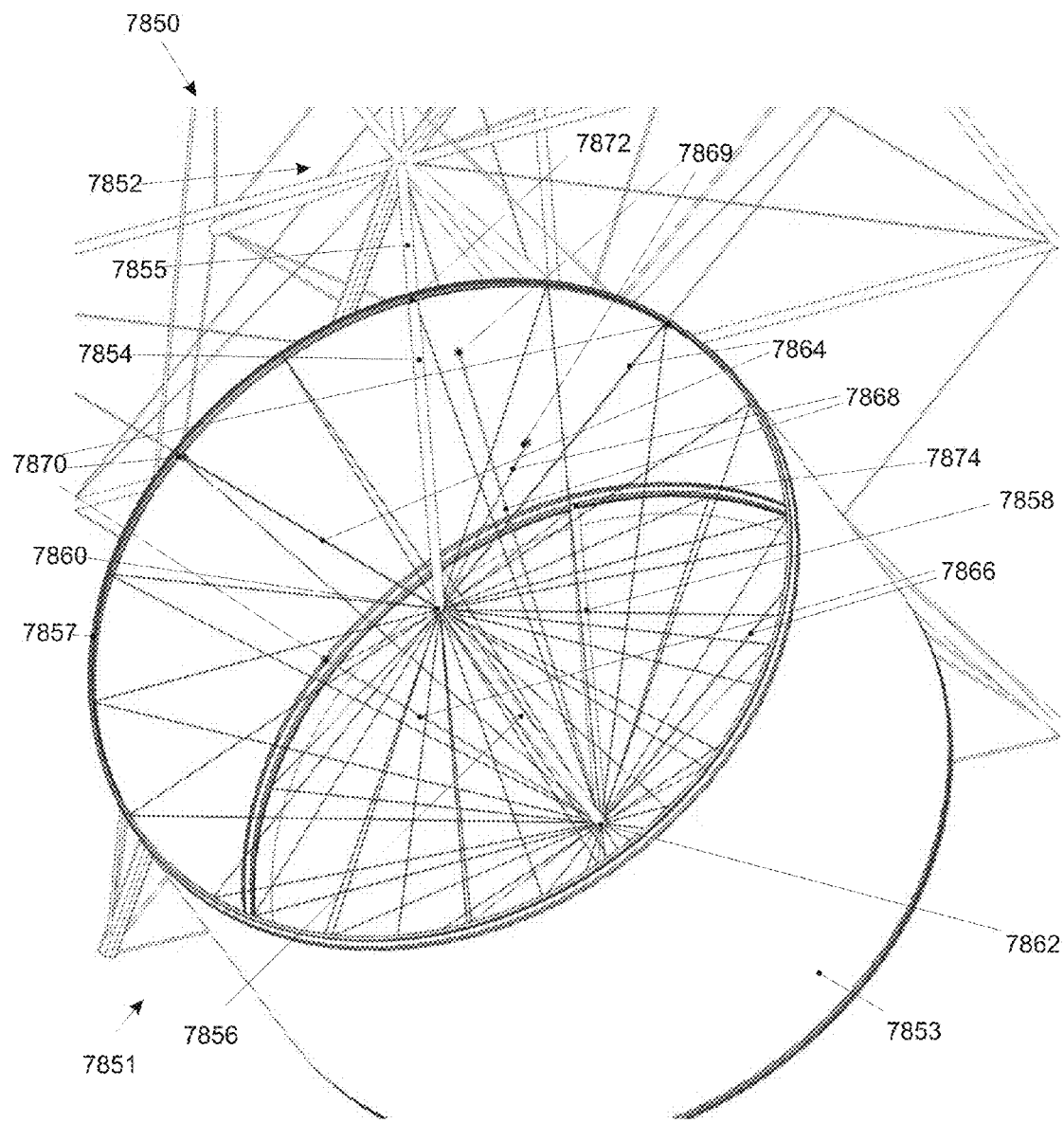
FIG. 78D shows an embodiment of a collector in accordance with the present invention mounted in a pointing structure.

FIG. 78D shows an embodiment 7850 of an inflated concentrator 7851 mounted in a structure 7852. For clarity, other inflated concentrators in the structure are not shown.

In this embodiment, element 7854 is a compressive structural element interior to the concentrator, which transmits forces between the pointing structure and hub 7860. Element 7855 is a collinear compressive structural element exterior to the concentrator.

These two elements 7854 and 7855 meet at a feedthrough on the side of the collector 7872. In some embodiments, this feedthrough lies on the shroud 7853. In other embodiments this feedthrough lies on the ring 7857.

In some embodiments elements 7855 and 7854 are a single member and the feedthrough 7872 is a sealed port. In other embodiments, elements 7855 and 7854 are distinct and 7872 is a sealed fitting that couples them.

In the embodiment in FIG. 78D, element 7856 is a compressive structural member that maintains the spacing of hub 7860 and hub 7862. Element 7858 transmits loads between the pointing structure and hub 7862.

In some embodiments, elements 7854, 7856, and 7858 can further comprise elements to route coolant to and from a receiver. In some embodiments, coolant may flow along element 7854. In some embodiments coolant flows along elements 7858 and 7862, and/or along elements 7854 and 7862.

In some embodiments, element 7856 comprises a plurality of conduits for cooling water. In some embodiments these conduits are disposed to have an inner and outer conduit. In some preferred embodiments, the outer chamber passes the coolant return such that additional heating of this coolant from light falling on the surface of element 7856 does not increase the temperature of the coolant in the receiver.

In some preferred embodiments, the element 7856 further comprises a conduit or conduits for electrical power and electrical signaling and sensing wires.

In some embodiments routing of elements that would otherwise cast significant shadows is performed substantially in the zone of shadow cast by the receiver, such as along element 7856.

In some embodiments, tensile elements, such as 7864, 7866, and 7868 comprise straps oriented to cast minimal shadows onto the receiver. In some embodiments, these straps contain a plurality of fiberglass filaments, threads, or yarns disposed along the straps' axial directions so as to achieve a high rigidity.

Elements 7864 transmit loads between the pointing structure and hub 7860. In the specific embodiment in FIG. 78D, elements 7864 are tensile elements such as wires or cables that act in opposition with compressive element 7854 to prevent in-plane motion of the hub 7860. Similarly elements 7866 oppose element 7858 to prevent in-plane motion of hub 7862. The forces from these tensile elements may pass through the shroud or ring at points 7870.

In some embodiments, these elements are unbroken and points 7870 are sealed ports. In other embodiments, these elements terminate at 7870 and provide exterior tie points to hold the concentrator rigidly.

Elements 7868 are cross-radial couplings to the pointing structure that oppose 7854 and 7858 to prevent axial motion of hubs 7860 and 7862. In the particular embodiment in FIG. 78D, these elements 7868 can comprise cables or wires that terminate in tie points 7869 or pass through sealed ports at 7869.

Figure 78E:
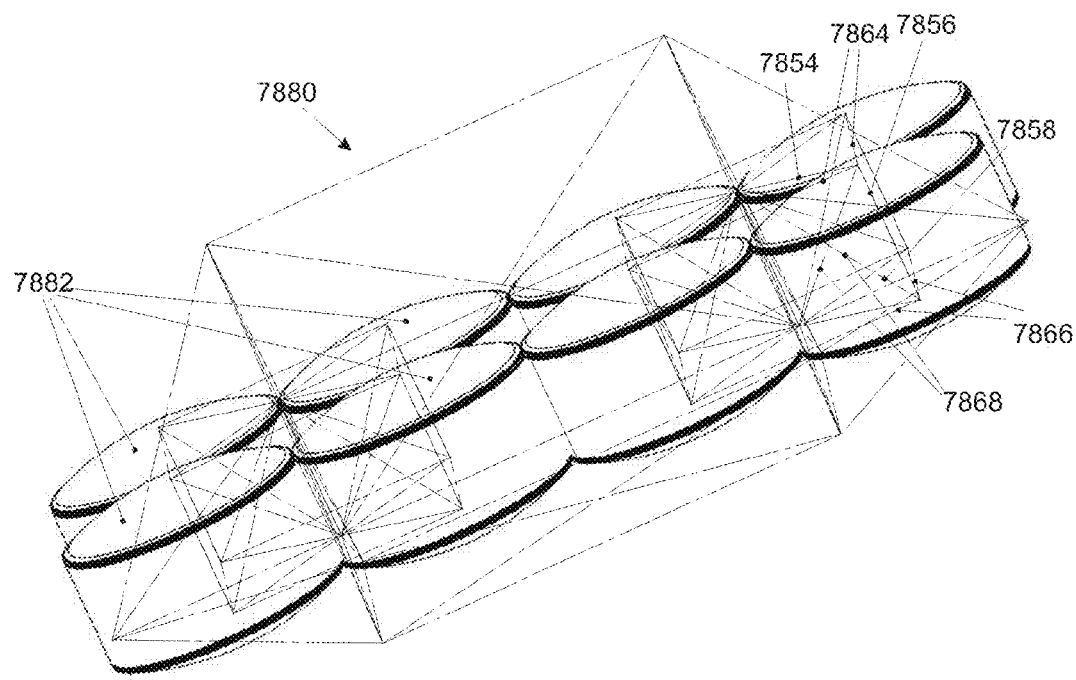
FIG. 78E shows a simplified view of an array of collectors mounted to a pointing structure.

FIG. 78E shows a simplified view of a mounted array 7880 of collectors 7882, clarifying how the elements of the embodiment shown in FIG. 78D relate to the pointing structure.

Figure 78F:
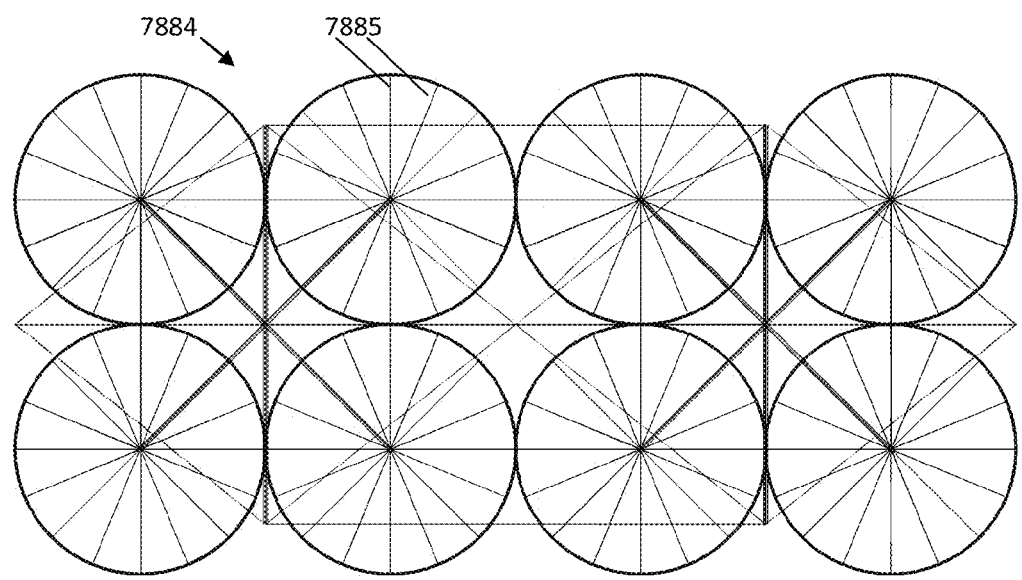
FIG. 78F shows a top view of an array of collectors mounted to a pointing structure with stiffening-truss elements revealed.
Figure 78G:
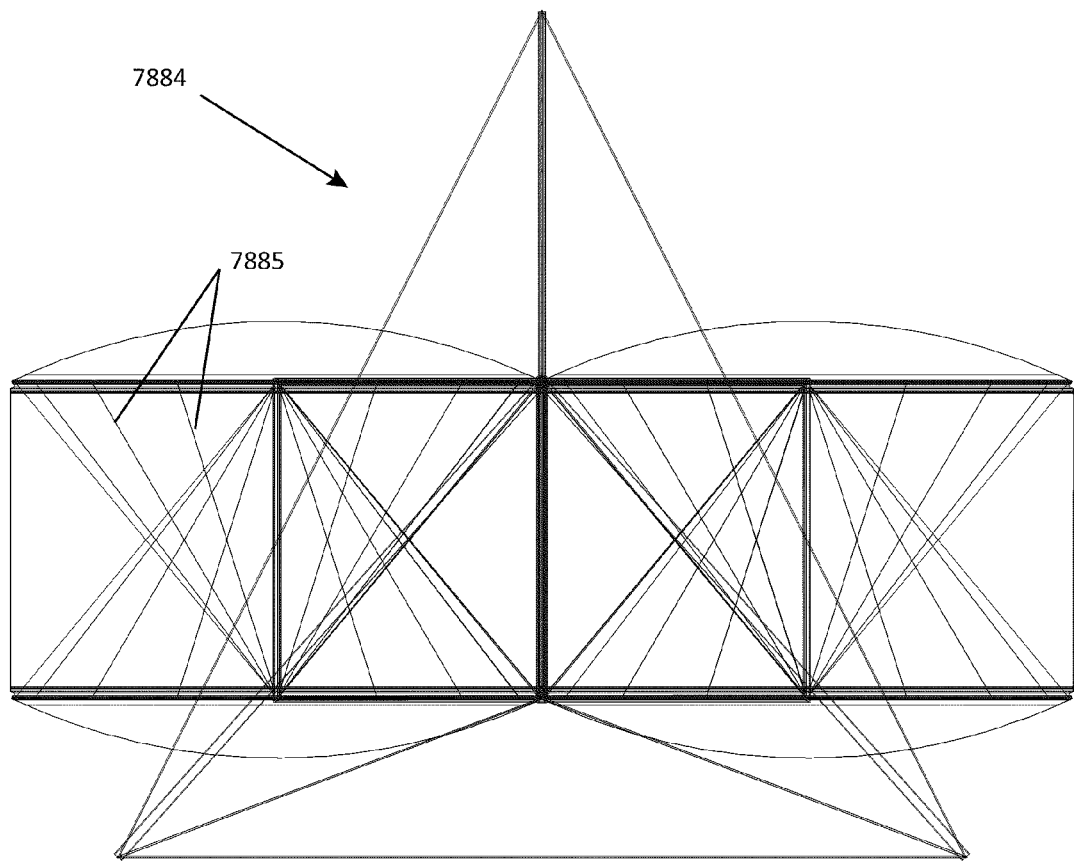
FIG. 78G shows an end view of an array of collectors mounted to a pointing structure with stiffening-truss elements revealed.

FIG. 78F shows a top view of collectors mounted in an array to a pointing structure 7884, with stiffening-truss elements 7885 revealed. FIG. 78G shows an end view of an array of collectors mounted to a pointing structure with stiffening-truss elements revealed.

Figure 78H:
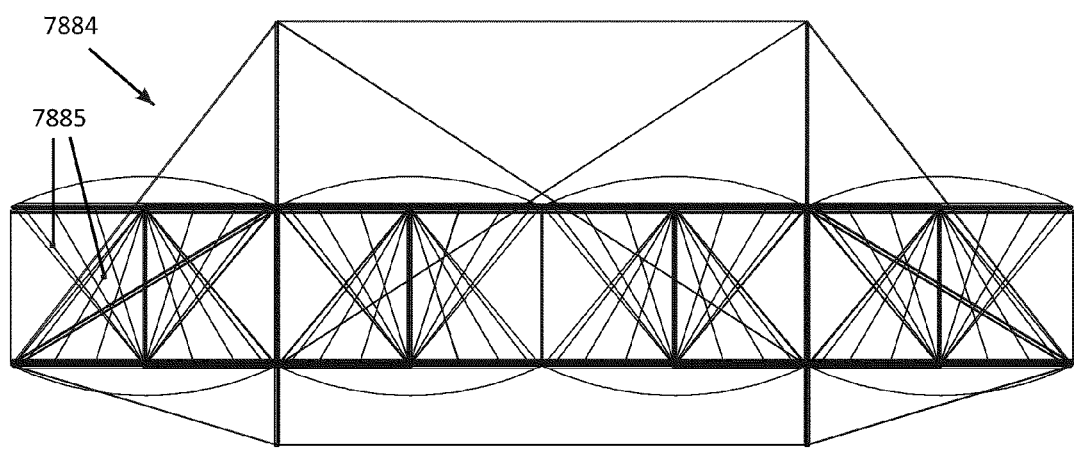
FIG. 78H shows a side view of an array of collectors mounted to a pointing structure with stiffening-truss elements revealed.
Figure 78I:
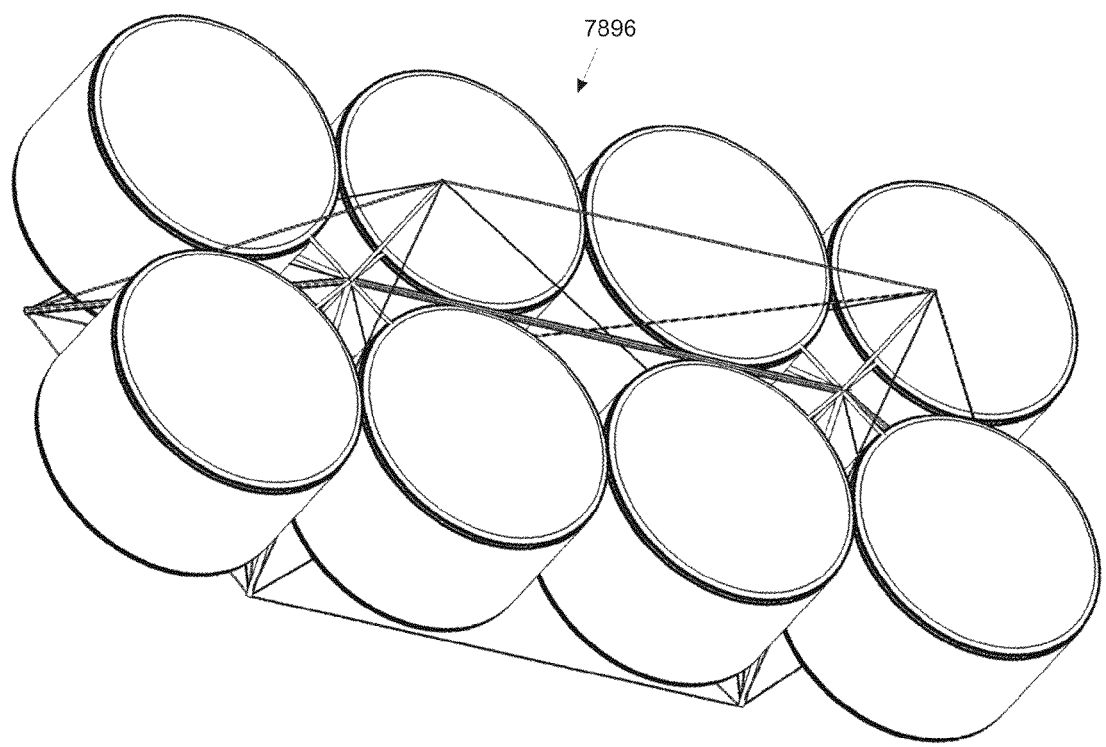
FIG. 78I shows a perspective view of an array of collectors mounted to a pointing structure with stiffening-truss elements hidden.

FIG. 78H shows a side view of collectors mounted in an array to a pointing structure with stiffening-truss elements revealed. FIG. 78I shows a three-dimensional view of collectors mounted in an array 7896 to a pointing structure with stiffening-truss elements hidden.

Figure 84A:
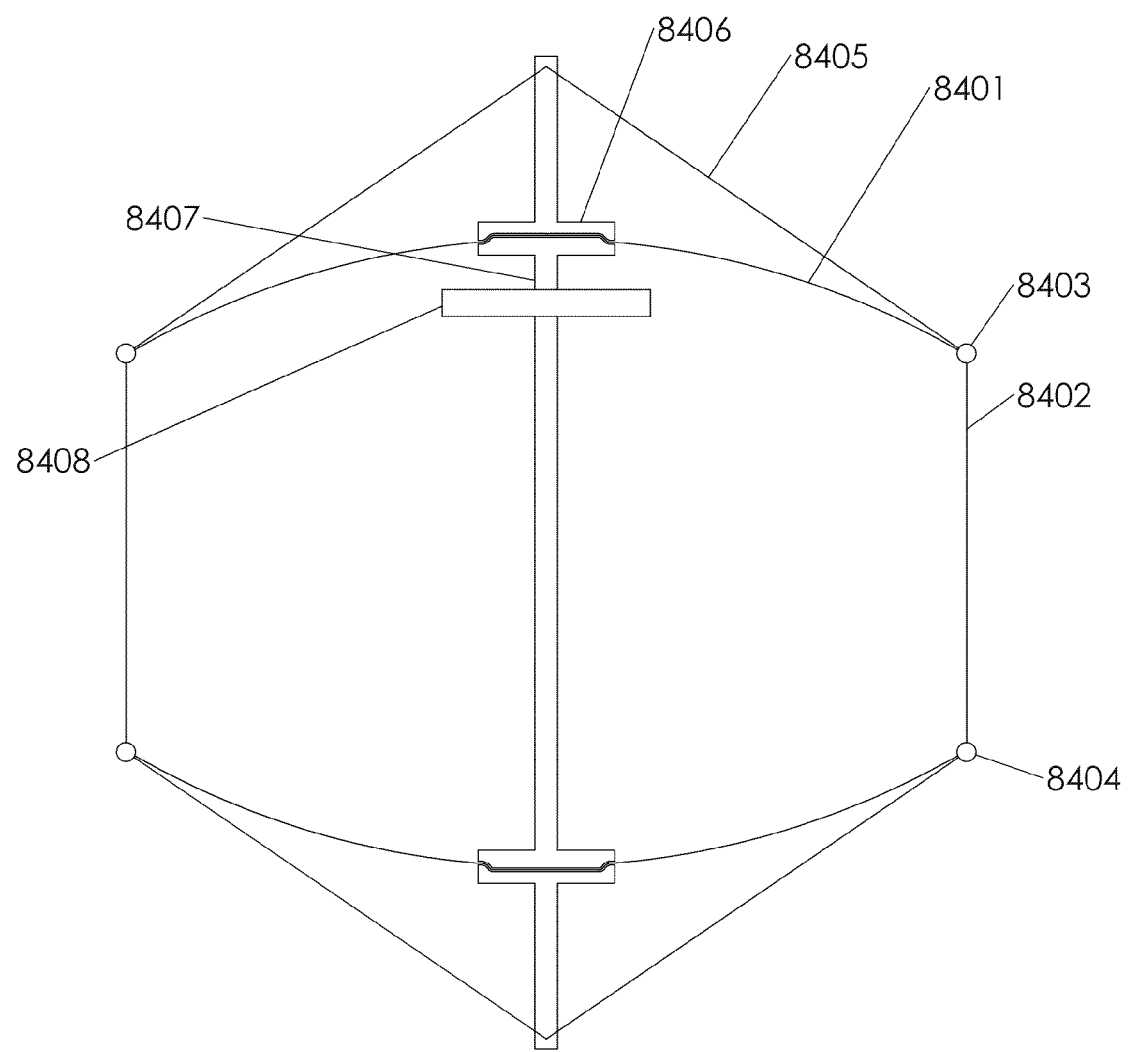
FIG. 84A shows an alternative embodiment of a concentrator structure with external spokes, in which a mechanical feedthrough is not required.
Figure 84B:
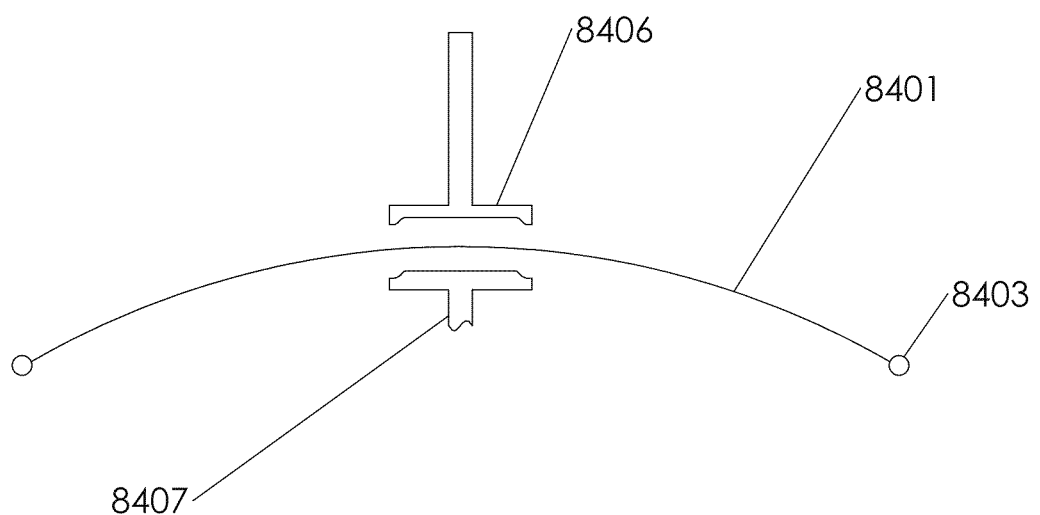
FIG. 84B shows an exploded view of some of the elements of the embodiment of FIG. 84A.

While the embodiment of FIG. 78C shows an embodiment of a concentrator having a through post and a corresponding feedthrough, this is not required by the present invention. FIG. 84A shows an alternative embodiment of a concentrator structure with external spokes, in which a mechanical feedthrough is not required. FIG. 84B shows an exploded view of some of the elements of the embodiment of FIG. 84A, with certain elements omitted for clarity.

In the embodiment of FIG. 84A, film 8401 passes between structural elements 8406 and 8407. Spokes 8405 lie outside the volume of film 8401 and shroud 8402, and couple ring 8403 to structural member 8406.

Structural elements 8406 and 8407 are compressed together with film 8401 disposed in between elements 8406 and 8407. Since elements 8406 and 8407 are in compression, film 8401 can be continuous. Elements 8406 and 8407 may have mating grooves and/or bosses for stabilization, potentially avoiding the need for additional fasteners. Optional magnets can also be used ease assembly and ensure stability even when spokes 8405 are not pre-tensioned.

Film 8401 may be stretched between elements 8406 and 8407. However, film 8401 will be held tightly, so this stretching will have little effect on the optical shape of the film.

A layer of rubber or other compliant material may be used to distribute forces between elements 8406 and 8407, and film 8401. It is also possible to use a temporary jig or tool to hold various structure elements in place during assembly or film replacement. The tool can then be removed.

Optical Performance Enhancing Elements

The inflated shape of the optical film can influence collector performance. FIGS. 79A-D show simplified cross sectional views of examples of embodiments of the optical film, and associated contour-enhancing apparatuses.

In some embodiments, the optical film may be prestressed. Attachment of the film may compensate for non-biaxiality to achieve a specific illumination profile characteristic (for example radial symmetry). Moreover, the inflation pressure and receiver location can be co-optimized in order to achieve a desirable illumination profile.

Figure 79A:
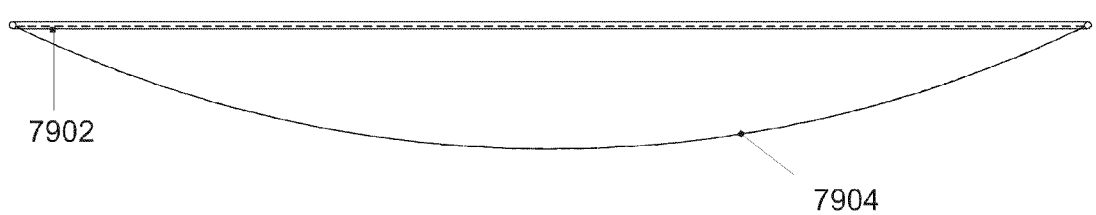
FIGS. 79A-79D show simplified cross sectional views of examples of embodiments of an optical film and associated contour-enhancing apparatuses.

However, compensation and active pressure regulation alone may not be enough to achieve repeatable and desirable illumination profiles, either statically or over time. FIG. 79A shows an arrangement 7900 in which the optical film is supported by a simple ring 7902 that resists radial forces from the film 7904.

Such an arrangement offers the possible advantage of simplicity and the avoidance of potential chafe locations. However, it may rely upon the optical profiles spontaneously formed under that simple support at different inflation pressures or plasticity. For example the optical profiles could be those resulting from a prior inflation pressure history, or can be created by engineering of the film. This may add expense to the consumable element.

Figure 79B:
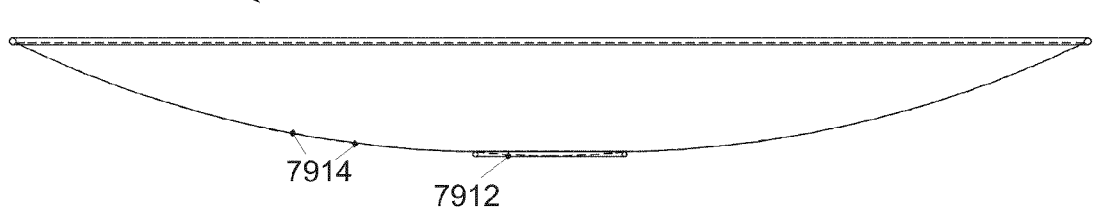

FIG. 79B shows an alternative embodiment in which arrangement 7910 provides an additional degree of freedom for the film optics. Specifically, a ring, a plate, or other object 7912 reduces the slope of the film 7914 over its free-inflation profile 7904. Such a configuration may be useful for obtaining a substantially uniform or annular inflation profile.

Figure 79C:
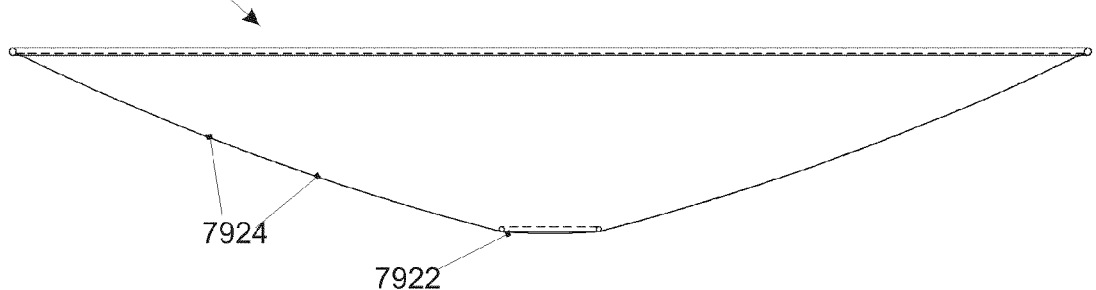

FIG. 79C shows an alternative embodiment which includes an arrangement 7920 that employs an object 7922. Object 7922 serves to steepen a profile of slope 7924 over its free-inflation profile.

Figure 79D:
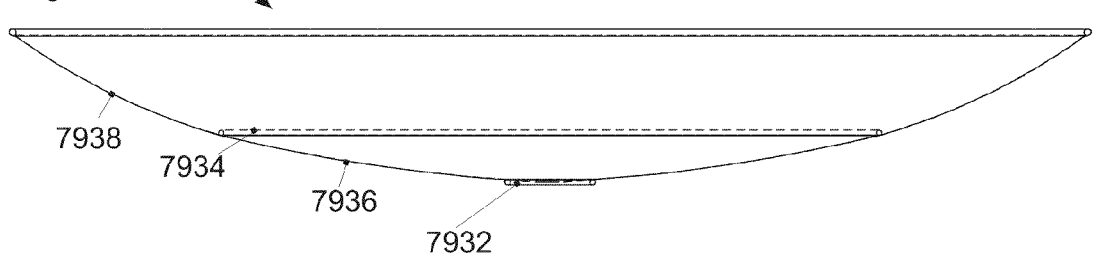

FIG. 79D shows a simplified cross-sectional view of another embodiment 7930 employing a plurality of objects (7932, 7934) to obtain more degrees of freedom in engineering the optical profile. In some embodiments, the annular rings shown in FIG. 79D could be replaced by more general structures.

The optic-enhancing structures could be held rigidly by the stiffening truss, supported by the film, held by the pointing structure, and/or held by a separate or coupled set of elements. These elements could comprise a surface, such as a web, mesh, screen, cloth or more general surface, a frame such as a truss, a deployable structure, or a more general structure.

A purpose of these elements may be to produce a controlled illumination profile. For example, the illumination profile may be controlled to achieve one or more of the following: reduction in illumination pattern variations with film age, reduction or manipulation of illumination gradients, production of a smaller or larger illumination pattern, reduction or production of a desired circumferential variation in illumination, providing multiple illumination regions, and/or other goals.

Embodiments can employ such composite layers to produce a well-controlled, low-consumable-cost optical film. The use of such structures on the cover film may potentially confer certain advantages, such as longer life, lower stress, reduced film uniformity, biaxiality, or performance requirements.

Stiffening Truss

FIGS. 80A-80G show various embodiments of a stiffening truss. These figures are not intended to be limiting, and various alternative embodiments are possible.

Figure 80A:
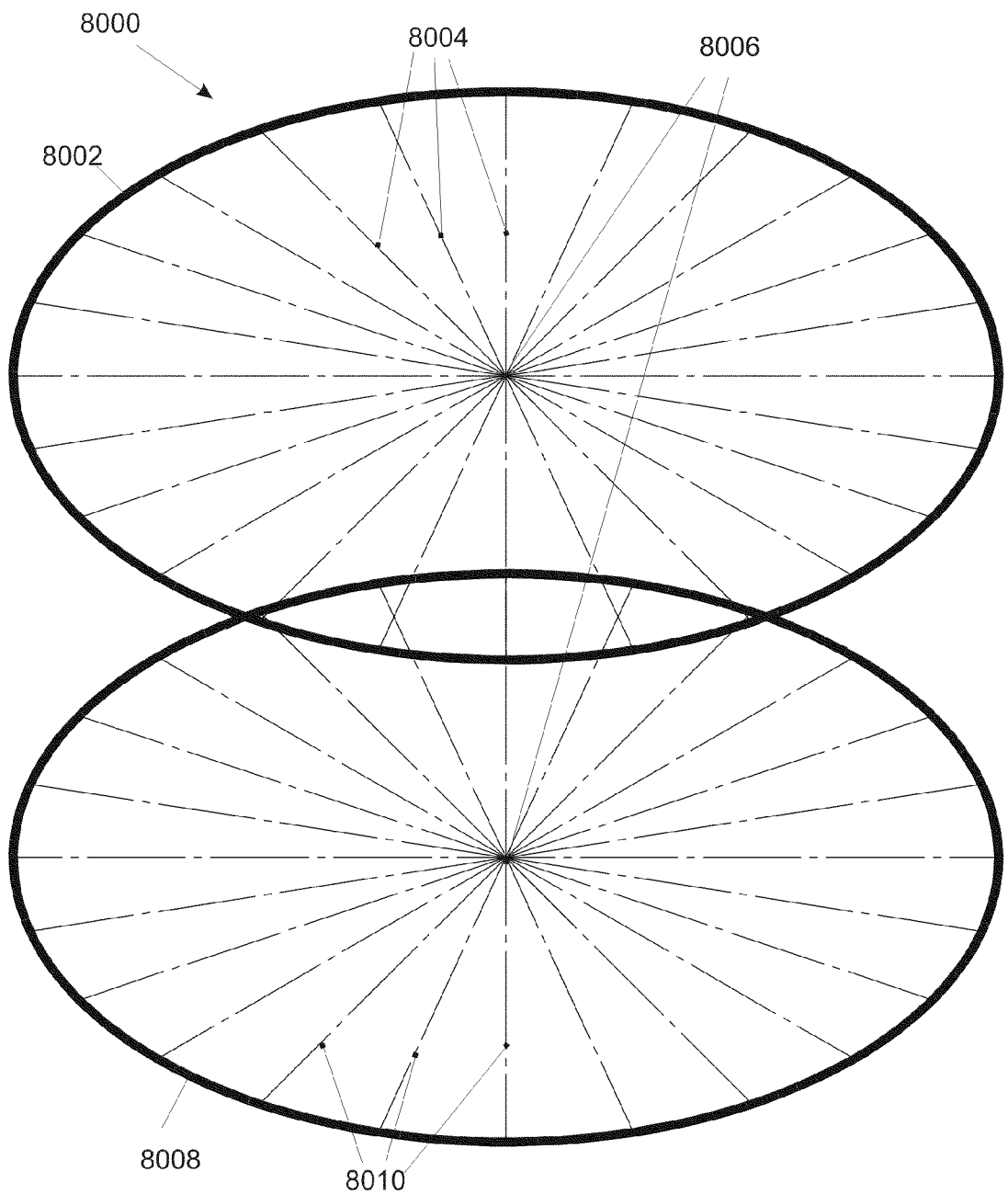
FIGS. 80A-80G show various embodiments of a stiffening truss in accordance with an embodiment.

Substructure 8000 in FIG. 80A shows substantially radial elements 8004 and 8010 that respectively support ring 8002 and ring 8008 at multiple points. Like spokes of a wheel, these radial elements can communicate forces between hub locations 8006 and rings 8002 and 8008 that are substantially in the plane of the elements.

Moreover, these radial elements 8004 and 8010 can constrain an overall shape of a ring (for example to circular), in opposition to forces such as gravity, wind, film non-biaxality, and film-creep non-biaxality. These substantially radial elements can thus function alone or in accord with other techniques described herein, to achieve consistent and desirable illumination patterns.

Alternatively, the substantially radial elements may couple to a hub at a point skew to the hub axis. The angle of the hub with respect to the ring may be adjusted to adjust the tension of elements.

Alternatively, the substantially radial elements may couple to a hub that is located significantly outside the plane of the ring. A distance from the hub to the plane of the ring may be adjusted to adjust the tension of elements.

Figure 80B:
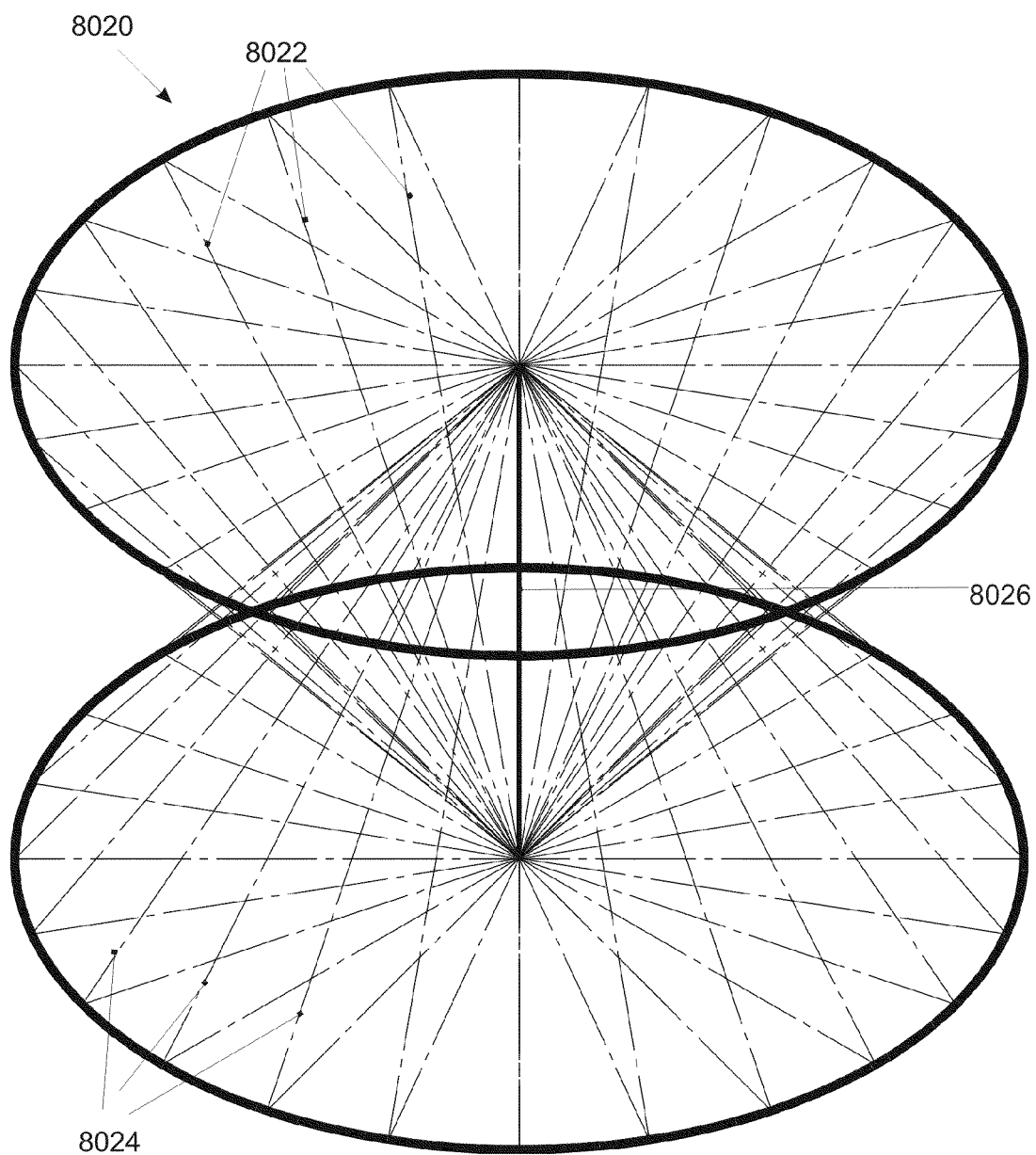

FIG. 80B shows an embodiment of a substructure 8020 that comprises not only substructure 8000 of FIG. 80A, but also additional cross-radial elements 8022 and 8024. These elements work in concert with either an axial element 8026 or other elements or a structure that resists tension in the elements 8022 and 8024, to maintain the overall shape of rings. The overall ring shape is maintained both in the radial and axial directions, against mechanical instabilities, wind loads, gravity loads, forces arising from film biaxiality and creep biaxiality, and/or other forces.

Figure 80C:
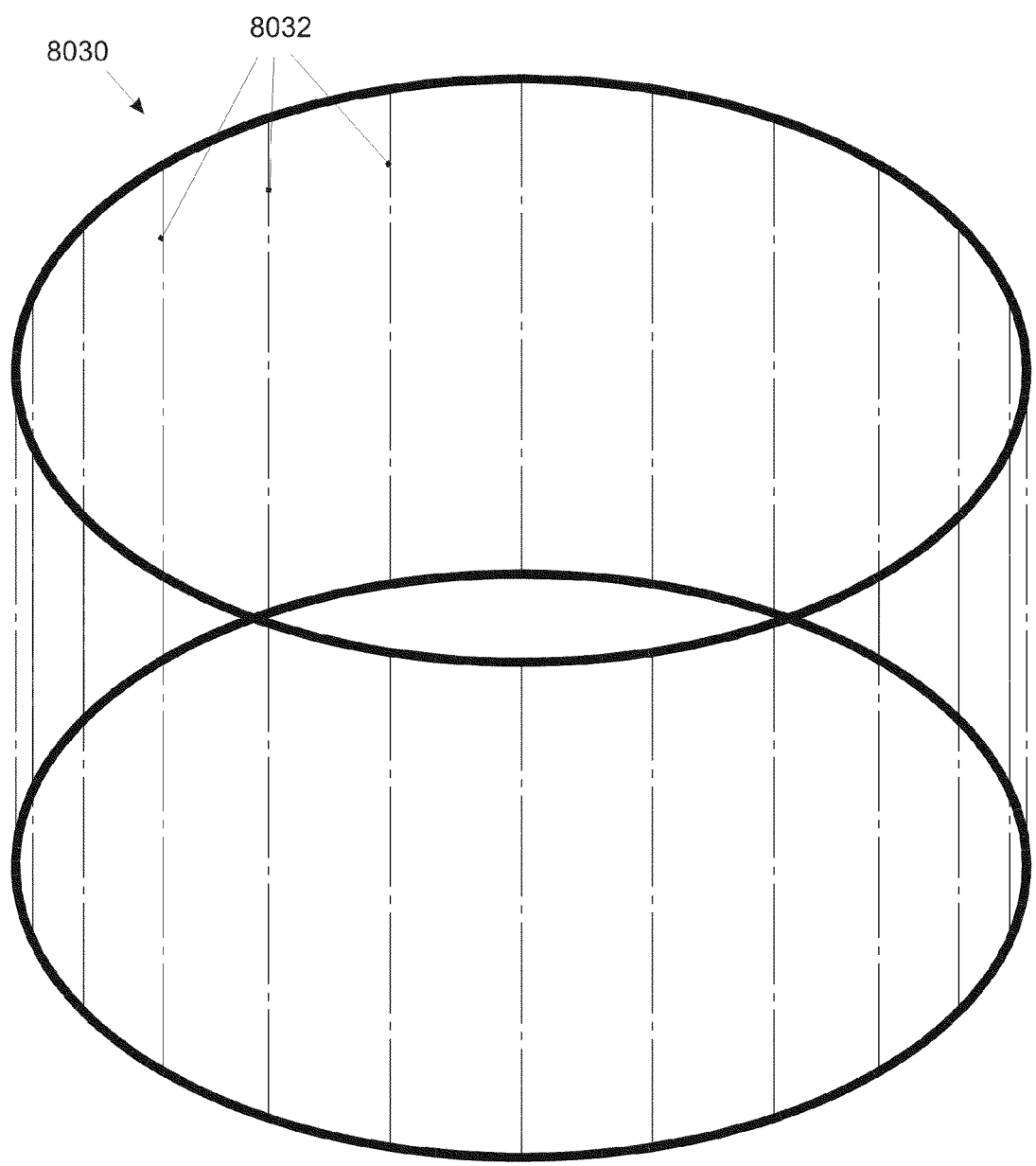

FIG. 80C shows an embodiment of a substructure 8030 comprising elements 8032, that may be used to maintain the local axial spacing between rings. In some embodiments, these elements may be provided by, obviated by, or augmented by, the shroud. The shroud may be engineered specifically to incorporate elements 8032.

The support elements may comprise threads or yarns arranged in a weave, in an overlay, or in an array. In some embodiments, the spacing of the elements is sufficiently small that the rings are relatively constrained in an effectively continuous fashion.

Some embodiments of shrouds include an assembly which resists outward bowing of elements 8032 under internal pressure. In such embodiments, the shrouds may provide a separate outer material that resists circumferential loads created by resisting the internal air pressure.

Other embodiments of shrouds may maintain a straightness of support elements 8032 by the use of circumferential reinforcement. An example of such an embodiment employs circumferential reinforcement via an orthogonal set of threads or yarns.

In other embodiments, the shroud may comprise a continuous sheet that performs the multiple functions of supporting the spacing between the rings, and holding in inflation air.

In some embodiments, the threads or yarns in such a shroud may comprise glass fibers, polymer fibers (such as polyester, polyamide, or polyaramid fibers), metal wires, multiple-stranded metal wires, metal straps and the like. Such a shroud may comprise a combination of yarns or threads of different types, for example one thread type in weft and another in warp.

Figure 80D:
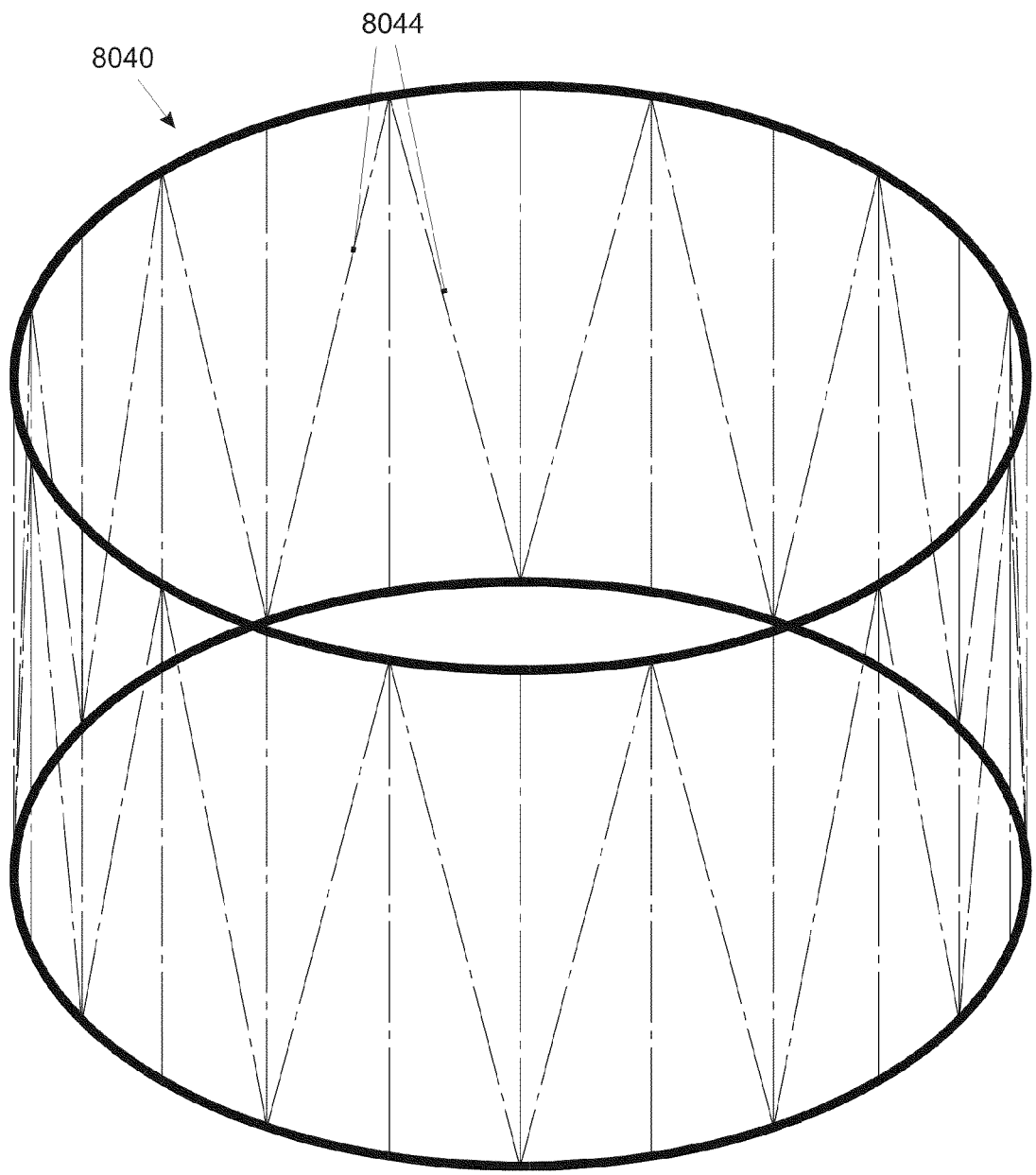

FIG. 80D shows an embodiment of a substructure 8040, comprising a combination of the elements of substructure 8030 of FIG. 80C and cross-circumferential supports 8044. These cross-circumferential supports work in concert with elements 8032 to provide resistance to ring bending. For stiffness, elements can be substantially straight and inscribe or exscribe a polygon or series of chords about the ring.

In certain embodiments, the elements of FIG. 80D may be incorporated into a shroud assembly. Such a shroud assembly can be complicated by the need to tension elements 8044 and 8032 simultaneously.

Other embodiments may employ a cloth, weave, mesh, or laminate oriented along the bias. Because the elements in such a curved shroud would follow an arc rather than a line, such an arrangement may confer less rigidity than straight chordal links. However, the simplicity and reduced shading may compensate for this lower stiffening performance.

Figure 80E:
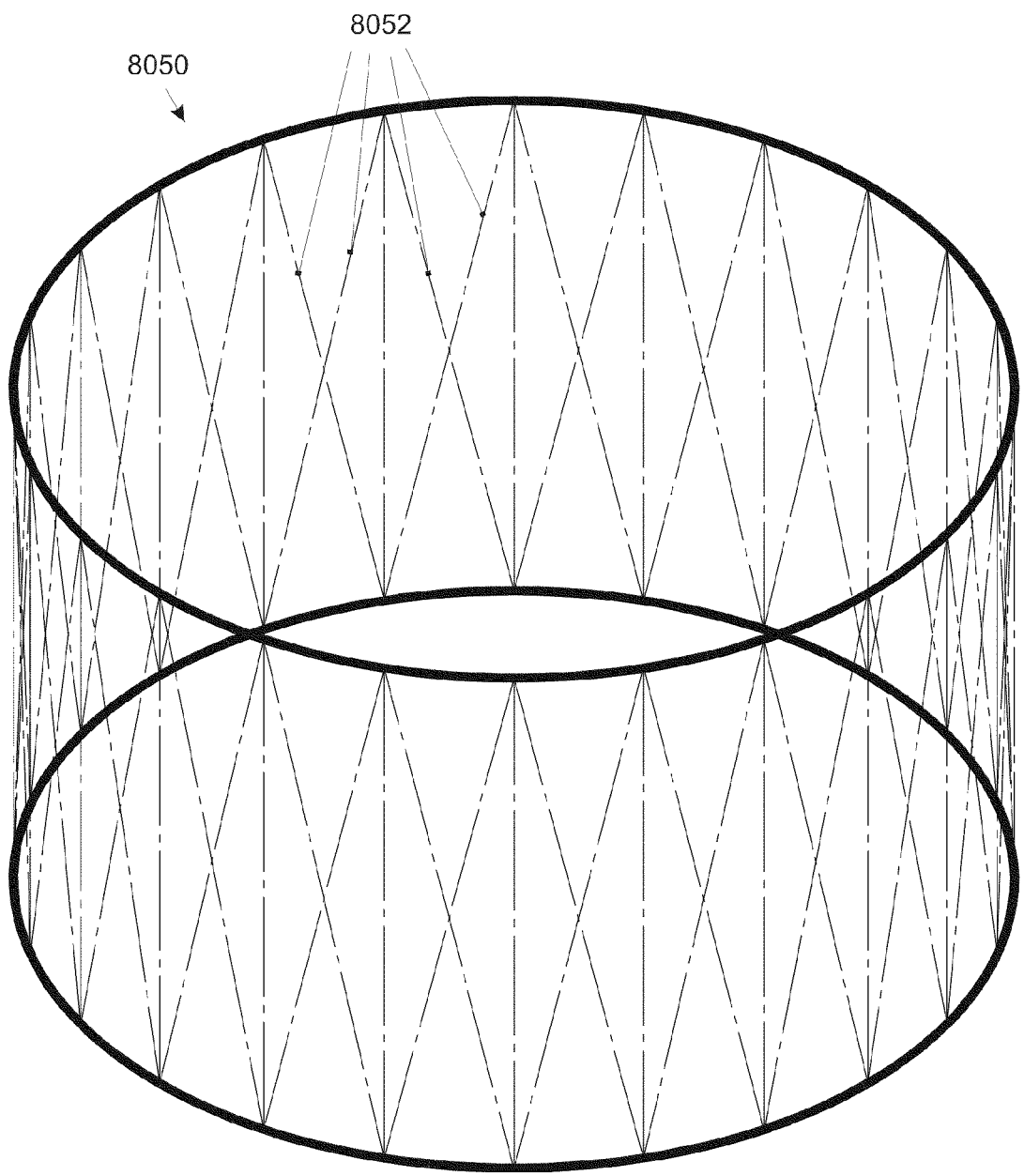

FIG. 80E shows another embodiment of a substructure 8050 that combines the substructure 8040 with opposing cross-circumferential supports 8052. In some embodiments cross supports 8052 may be joined as a node at an interior crossing point. In certain embodiments, cross supports are alternatively arranged such that they cross at a plurality of sites, and in some embodiments more than one crossing point is joined as a node.

Figure 80F:
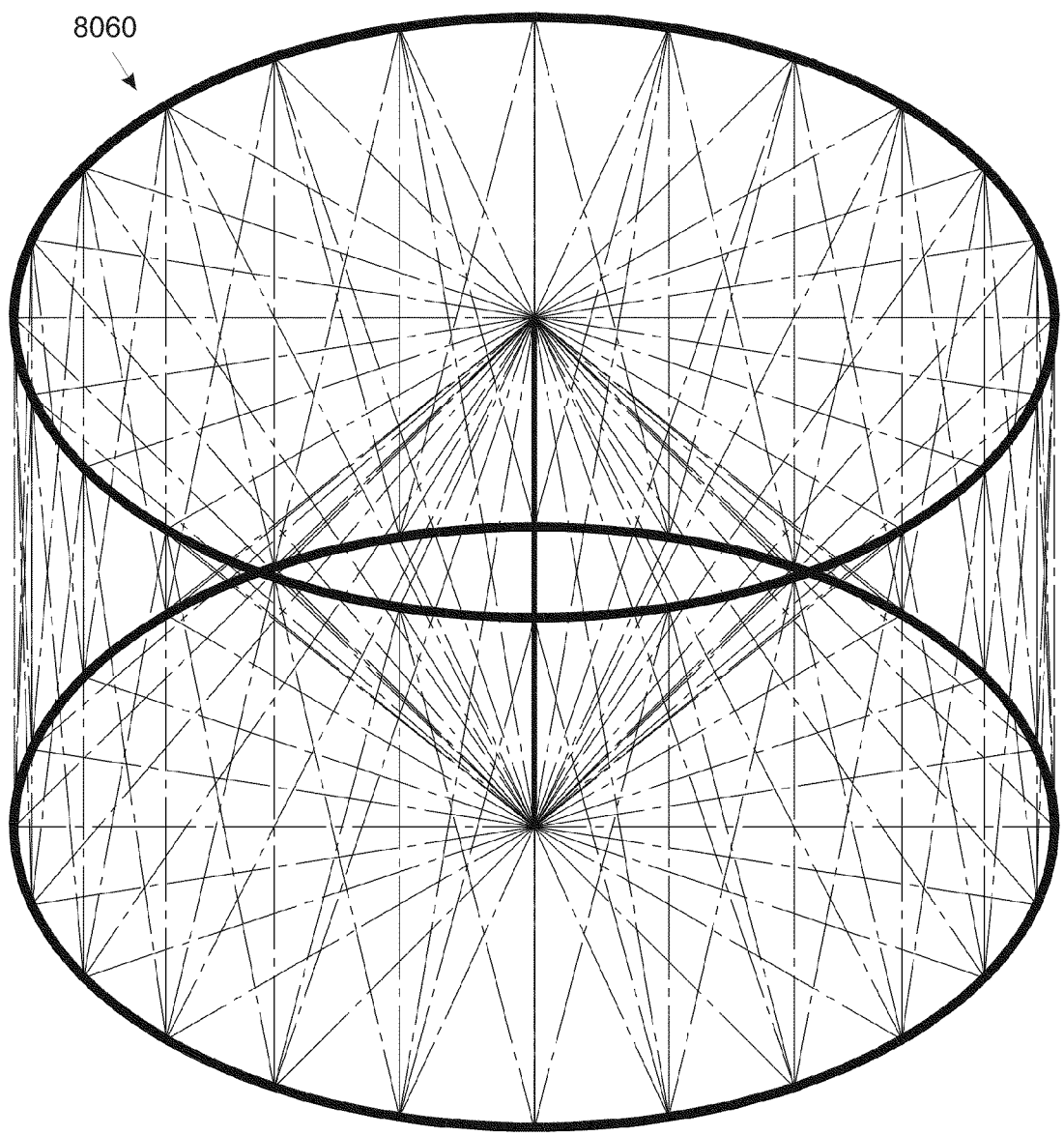

FIG. 80F shows another embodiment of a stiffening truss 8060. Truss 8060 is comprised of the combination of substructures 8050 (FIG. 80E) and 8020 (FIG. 80B).

The embodiment of the stiffening truss shown in FIG. 80F has redundant stiffening elements. For example, the cross-diagonal elements of substructure 8050 can provide first-order restoring forces to axial ring distortions, as can the cross-radial stiffening elements of the truss 8020. In some embodiments, the redundancy may be used to enhance stiffness.

Other embodiments may eliminate one or more redundant sets of elements in favor of overall simplicity. Thus while FIG. 80F shows an embodiment in which the nodes of 8050 and 8020 coincide, in other embodiments the nodes of 8020 and 8050 may have an alternate arrangement. For example, the nodes may be staggered, unrelated, differ in count by a multiple or ratio of integers, etc.

Figure 80G:
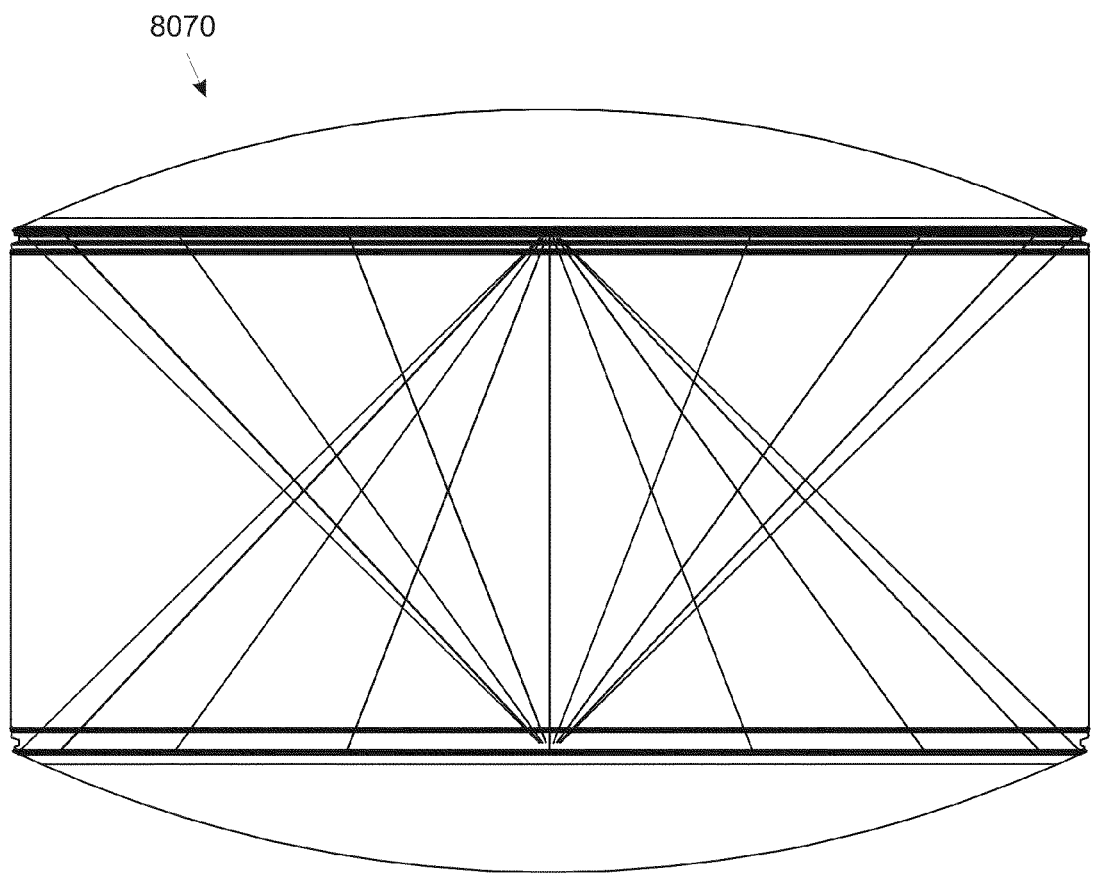

In some embodiments, substructure 8020 is augmented with an effectively continuous ring-to-ring support 8030, but without cross-circumferential bracing. FIG. 80G shows a simplified side view of such an embodiment 8070.

Embodiments according comprise a number of materials, for example metals. Other potentially suitable materials include but are not limited to, glass fiber, carbon fiber, ceramic, and/or alumina fibers (aluminum oxide).

Certain materials may offer increased stiffness, lower thermal expansion, reduced flammability, and/or higher heat tolerance. Glass, carbon, or ceramic fibers, can be practically made much thinner than steel, so a tiny fiber bundle can tolerate a tighter bend radius without experiencing damage. Other materials may also be useful for shipping.

In some embodiments, the hubs could come with one or more spokes pre-attached. The spokes could be wound or folded by a machine or by hand during careful and efficient factory preparation.

In general, complex solar concentrator structures can be quickly and practically assembled or adjusted by the use of robotic or automated jigs. Such jigs may attach to the concentrator structure either in the factory, or at installation site.

A robotic jig could be quickly attached, perform simultaneous preload and shape adjustments of multiple concentrator elements such as spokes, and then be quickly removed. This process could allow optimization of shape and pretension adjustment in a small fraction of the time required for a corresponding manual adjustment. Such adjustment utilizing a robotic jig could allow for the use of concentrator structures exhibiting greater optimization and/or complexity than would otherwise be possible.

Ring Distortions

A stiffening truss can be used to resist unwanted distortions of a ring caused by inflation pressure, wind loading, gravity, or other forces. A stiffening truss can also be used to resist buckling resulting from the presence of a substantial circumferential compressive force in the ring.

Figure 81A:
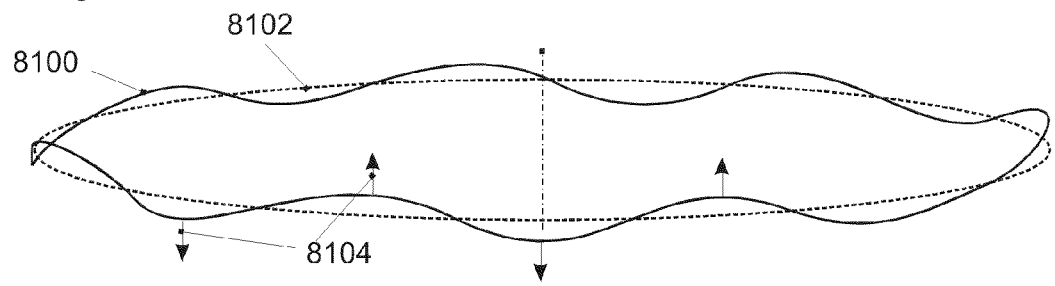
FIGS. 81A-81B show distortions of the rings that can adversely affect optical performance.
Figure 81B:
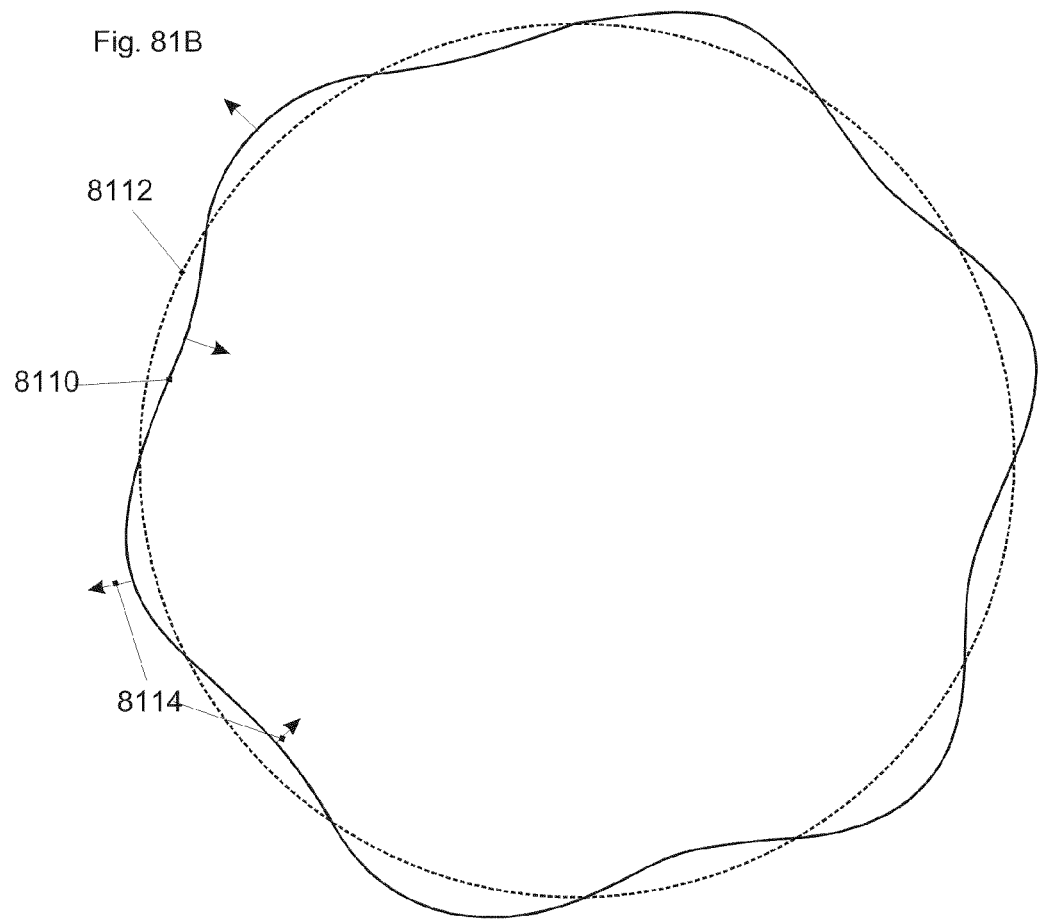

FIGS. 81A-81B show distortions of the rings that can adversely affect optical performance. FIG. 81A shows exaggerated axial distortions 8104 of a ring 8100 relative to an undistorted state 8102. FIG. 81B shows exaggerated radials distortions 8114 of a ring 8110 relative to an undistorted shape 8112.

The lowest order axial mode of distortion, is an axial saddle shape. This axial mode of distortion is the first buckling mode of a ring-supported film.

The stiffening truss provides a linear restoring force at a plurality of points along a ring, resisting low-order buckling modes. The remaining higher order modes, including axial and radial can be resisted by a ring of lower second moment of inertia and a correspondingly lower material mass.

A minimization of mass is achieved when the mass of additional truss elements equals the reduction in ring mass made possible by those elements. Several considerations may favor less than minimal-mass structures, however.

Some elements of a stiffening truss cast shadows on the receiver. Such shadows can reduce the power collected, and therefore the generated power per unit mass.

In addition, an excessive complexity of the stiffening truss may increase the cost of the structure in a manner that outweighs savings from reduced material use. Complexity can also increase the installation and assembly costs.

A full minimization of mass may also point to the use of excessively small wire diameters. Employing such small diameter wires could reduce the resiliency of the resulting structure to off-design loads, such as incidental contact during servicing and installation procedures. The use of excessively small wires may also reduce the ability of such a structure to convect heat away from a wire when a collector is accidentally mispointed and highly concentrated light falls on part of the stiffening truss.

Thermal Management of Wires

In addition to engineering the cross-section of a wire to convect heat, some embodiments mitigate unwanted heating of wires using coatings or materials that are substantially white, or are diffusely or specularly reflective. Examples of coatings include high-temperature polymer coatings, insulative coatings, powdery coatings, etc., including titanium and aluminum oxides, silicates, and other high-temperature materials.

Alternatively, some wires can be made of materials having weak light absorbance, such as fibers, threads, and yarns made of glass or high temperature polymers (such as polyester, polyamide, etc.) to reduce heating. Unwanted heating from accidental mispointing can also be reduced by routing wires through regions having relatively low light concentration, which has the further benefit of reducing the effect of the wires on shading of the receiver.

Elements such as that shown by reference number 7816 in FIG. 78A, which may pass through regions of highly concentrated light, may require active cooling. In addition to providing the desired structural characteristic, such elements may favorably be used to conduct coolant to or from a liquid-cooled receiver.

Torsional Ring Deflections

Figure 81C:
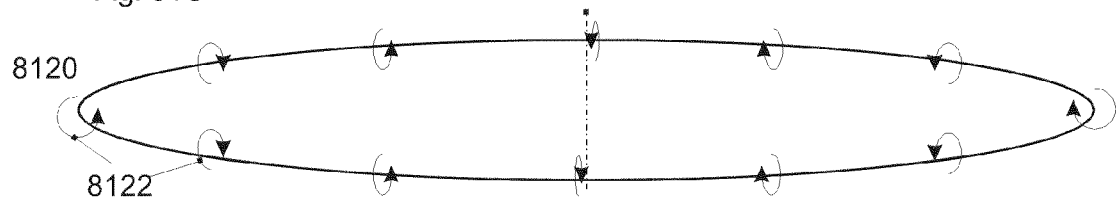
FIG. 81C shows torsional distortions of a ring.

FIG. 81C shows torsional distortions 8122 of a ring 8120. These distortions are not driven by instabilities, but can result from torques produced from forces applied to a ring. These torsional distortions can undesirably couple into errors in the profile of the optical film.

Figure 82A:
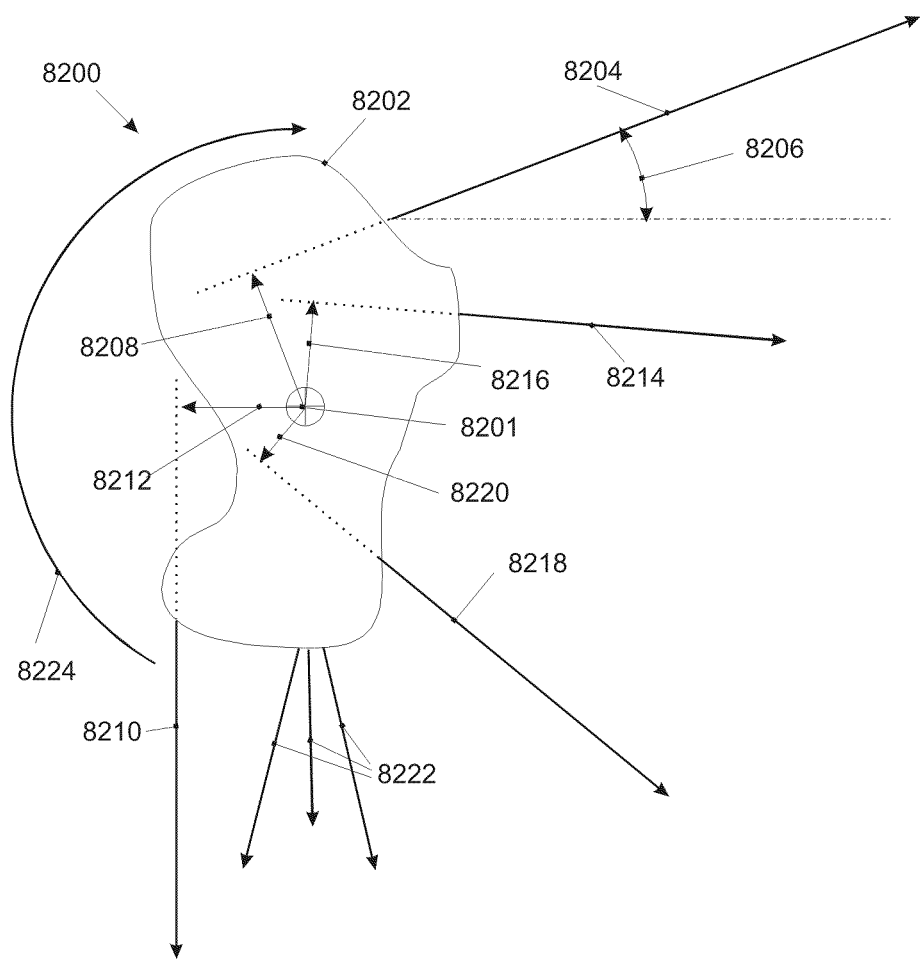
FIG. 82A shows a schematic diagram of forces applied to a ring having a cross section with torsional center.

FIG. 82A shows a schematic diagram of forces 8200 applied to a ring having a cross section 8202 with torsional center 8201. The film tension per unit length is $\tau_0$.

The product of $\tau_0$ and the ring's arc length between supports, is tension $\tau_0$ 8204 inclined at a ring-departure angle $\theta$ 8206 that is typically between 5° and 45° and may be between 15° and 35° from the radial direction. For the optical film, the departure angle may be nearly fixed during operation, since it can strongly influence the illumination pattern. This tension applies a force at an effective radius $r_0$ 8208 from the torsional center.

The torsional moment in the ring produced by a film can vary across the span between supports, potentially producing a profile like that shown in FIG. 81C. In some embodiments, the radius of gyration of the ring cross-section is engineered such that the torsional deflection produced by this variation does not substantially affect optical performance.

In some embodiments, mounting of the film may pre-compensate for torsional deflections. In some embodiments, the film is mounted in a position such that torsional deflections do not produce a first-order effect on the optical shape. In some embodiments, the film is mounted such that the forces it applies to the ring pass approximately through the torsional center and therefore do not produce a moment in the ring.

Alternatively, circumferentially varying torsional deflections can be reduced by engineering the interface between the ring and truss tension elements such as wires to distribute forces more continuously across the ring. For example, the interface between the ring and truss tension elements can be designed to distribute forces along a plurality of points of the ring or distribute forces substantially continuously along the ring.

In the embodiment of FIG. 82A shown in this diagram, the shroud applies a torque force $t_1$ 8210 at a radius $r_1$ 8212 from the center. This force may be applied continuously or discretely along the ring. If applied continuously, $t_1$ is the product of the force per unit length and arc length between supports. In other embodiments, the shroud may not apply a force on a ring.

Like the film tension, this torque force may similarly produce circumferentially varying torsional deflections in the ring. In this particular embodiment, a radial element applies a point load $t_2$ 8214 at a radius $r_2$ 8216 from the center.

A cross-radial element applies a force $t_3$ 8218 at a radius $r_3$ 8220 from the center. Additional forces, $t_i$ for example from cross-circumferential, ring-to-ring, or other elements, may also influence the ring respectively at radii $r_i$, in addition to an internal moment 8224 produced by torsional spring forces within the ring. In some embodiments, these forces are not applied at the same circumferential position on the ring. In these cases, internal torques vary along the ring.

Figure 82B:
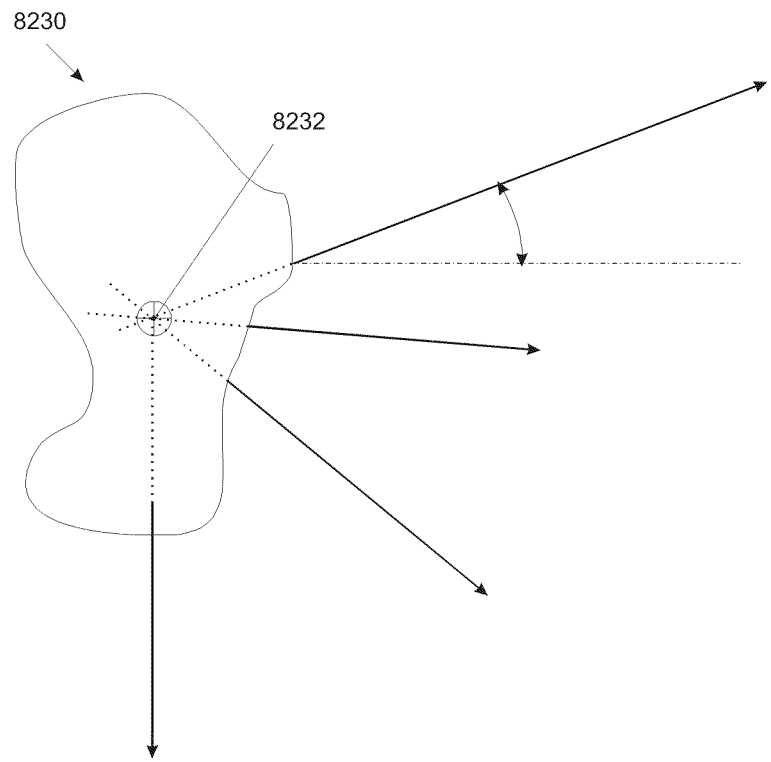
FIG. 82B shows an embodiment that mounts all forcing elements such that the forces pass approximately through the torsional center.

Some embodiments seek to minimize the tendency of the ring to undergo torsional deflection. FIG. 82B shows an embodiment 8230 that achieves this goal by mounting elements producing force such that the forces pass approximately through the torsional center 8232.

Figure 82C:
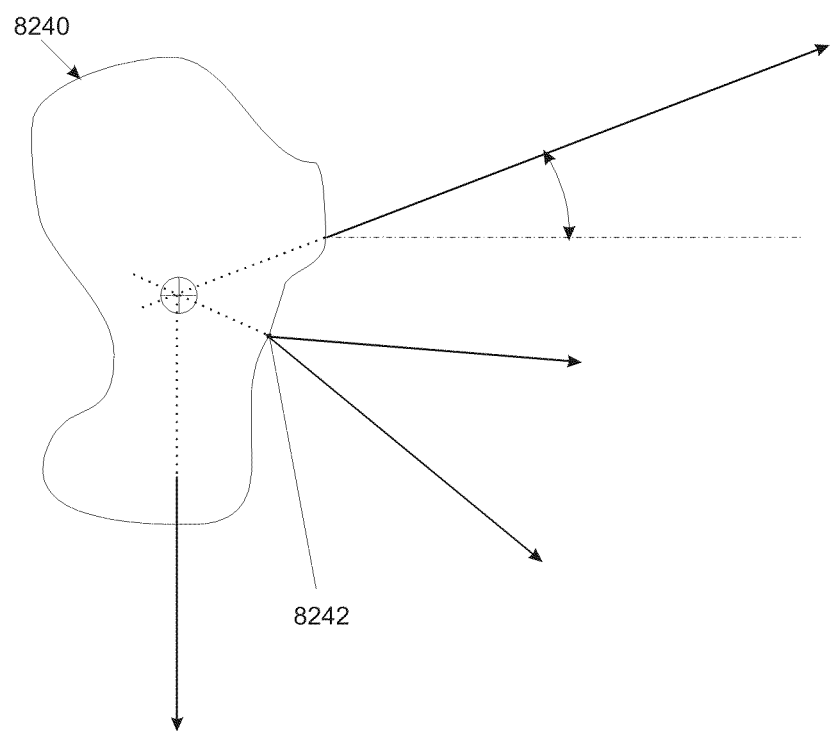
FIG. 82C shows an alternative embodiment simplifying the design of the embodiment of FIG. 82B.

FIG. 82C shows an alternative embodiment that may simplify the design. In the embodiment of FIG. 82C, pairs or multiples of elements 8242 are coordinated so as to substantially reduce torsional moments when combined.

Such an embodiment may require careful balancing of forces. This balancing can be achieved automatically if multiple forces are derived substantially from the same loading phenomenon. Examples of such loading phenomenon include but are not limited to inflation air, a tensioning spring, a fixed geometrical condition, or the like.

Alternatively, this balancing may be achieved by a pair or plurality of substantially constant length elements, acting in opposition at a relatively large radius from the torsional center to resolve torsional moments. For example, a plurality of substantially radial wires attached to the ring on opposite sides of the torsional center could counteract torsional moments. These wires could be coupled to the ring at substantially the same circumferential position or at staggered circumferential positions, for example to compensate for torsional gradients produced by resolving continuously applied film loads with discretely applied forces.

If a sum of the cross product of each discretely applied force with its radius from the torsional center, adds to zero, the ring experiences no global moment from the tensioning truss. This is advantageous in some embodiments because it may reduce geometrical changes related to load variations.

In certain embodiments, paired forces can be made to line up with the torsional center via the use of mounts with pivots. Similarly, a ring section that allows mounting of a pivot at the torsional center can eliminate moments applied to the ring.

Figure 83A:
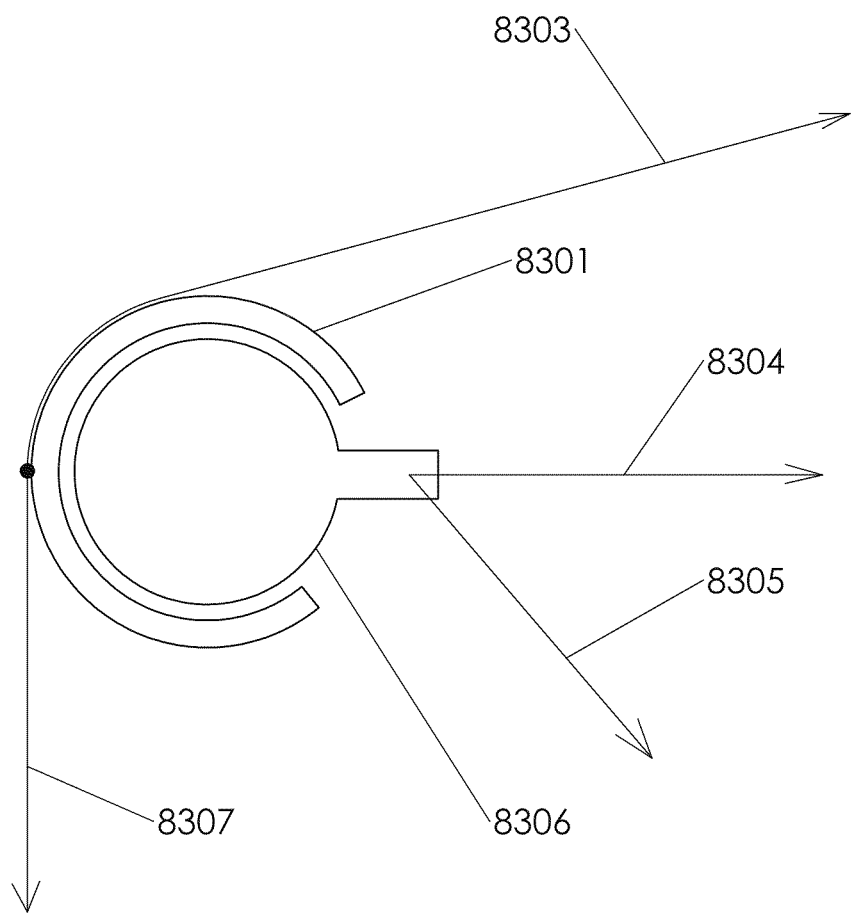
FIG. 83A shows a cross section of a ring with a pivotable insert to which pretensioned structure elements can be attached.

FIG. 83A shows a cross section of a ring 8301 with a pivotable insert 8302 to which pretensioned structure elements (spokes) 8303 and 8304 can be attached. Film 8306 and shroud 8305 are attached to ring 8301, such that the torque forces that film 8306 and shroud 8305 would each independently tend to apply to ring 8301, will counteract each other to result in little or no net torque.

Figure 83B:
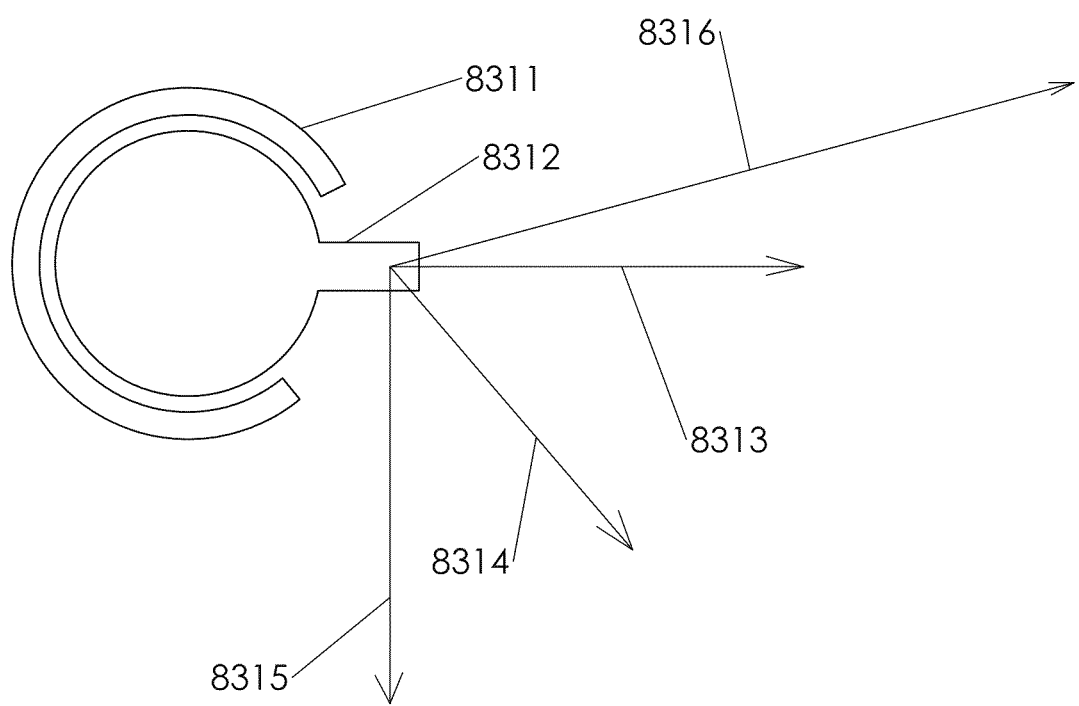
FIG. 83B shows an alternative embodiment with a pivotal insert to which pretensioned structural elements such as spokes as well as films and a shroud are attached.

FIG. 83B shows an alternative embodiment. In this embodiment, the ring 8311 receives a pivotal insert 8312 to which pretensioned structural elements such as spokes 8303 and 8304, as well as film 8306 and shroud 8305, are attached.

Figure 83C:
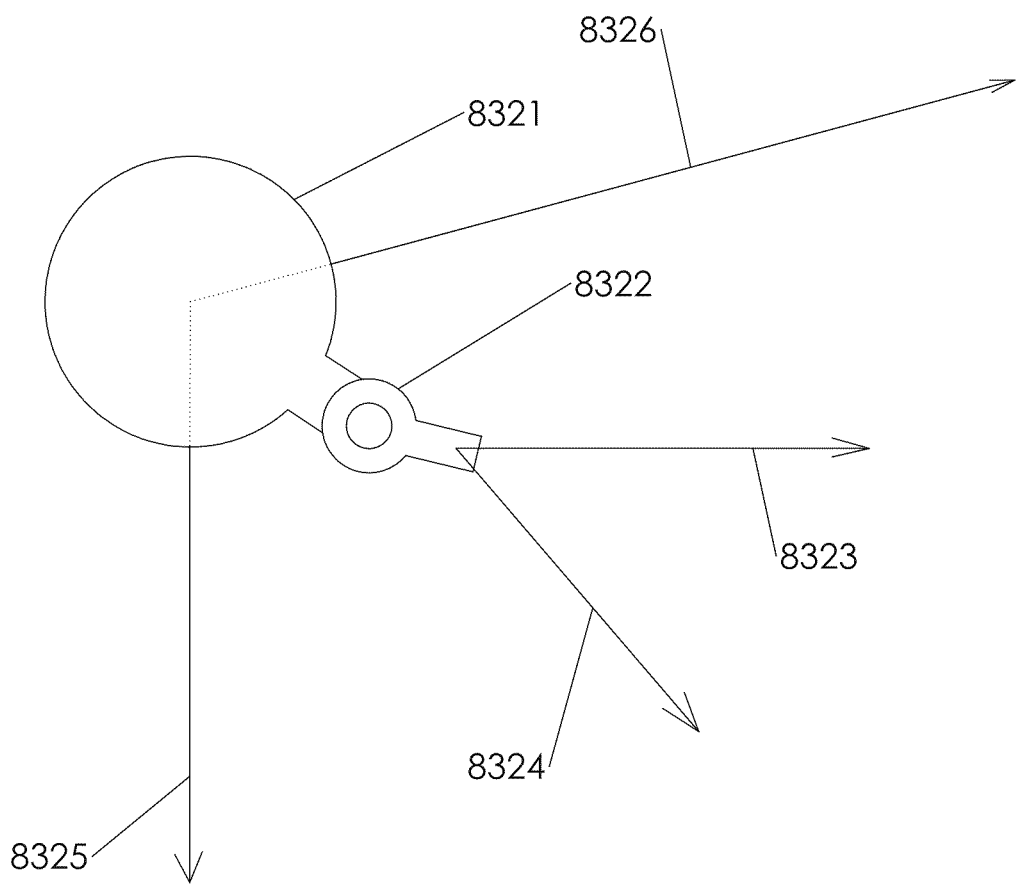
FIG. 83C shows another embodiment with a pivotal lug attached to the ring.

FIG. 83C shows yet another embodiment. In this embodiment, ring 8321 has attached thereto a pivotal lug 8322. Attached to the pivotal lug 8322 are pretensioned structural members 8323 and 8324. Films 8325 and 8326 may be attached to ring 8321 and/or lug 8322, in a manner that reduces net torque.

In some embodiments, the radii and magnitude of tensions is intentionally tailored to produce torsion of the ring. This tailoring can be used, for example, as a passive way to partly compensate for film creep. For example, a reduction in inflation pressure may induce a torsional rotation of the ring that draws the film tighter, extending the useful lifetime of a film.

Mechanical Compensation for Film Creep

Some embodiments employ a mechanism to enhance the ability of the ring to provide for more constant-pressure operation regardless of creep. In certain embodiments, this mechanism changes the effective length of one or more elements that act in opposition to the film tension.

In certain embodiments this mechanism can be manually adjusted. In some embodiments this mechanism can be actively powered, for example using a motor or a linear positioner, a shape-memory actuator, a drive screw, an inchworm mechanism, or a solenoid. In alternative embodiments this mechanism can be passive.

In some embodiments, this mechanism is a tensioning mechanism such as a spring. The spring may have an engineered preload and displacement, such that the variation in the spring force that applies tension to the creep-compensating wires is tailored to obtain the longest effective balloon life span. In this configuration the spring force may be reduced with displacement to allow the film to relax to a stress where creep is significantly reduced.

In some embodiments, such a spring may be held in a strained state during film servicing to facilitate installation of a film. In some embodiments, the mechanism holding the spring in this strained state may be released manually, by actuation, or by an automatic mechanism that works when the film tension appears on first inflation of the film.

In some embodiments the force that the spring must apply is comparatively large. This issue may need to be accounted for in the design of the apparatus or for servicing purposes, where strain and release may occur against potentially large forces.

An alternative embodiment of a creep compensating mechanism includes a ratchet that may be relatively weakly preloaded with a spring. The ratchet in such a mechanism would provide stiff resistance to extension of elements that work to oppose a film tension under pressure.

When that pressure is released, for example at night or on command, the relatively weak spring or other source of force produces a baseline tension in the creep-compensating elements. This baseline tension in the creep-compensating elements in turn produces a baseline film tension.

If the film has crept sufficiently, the displacement of the film under the baseline load would (for example via the creep-compensating elements), would allow the ratchet mechanism to advance one or more ratchet pawls. When the collector is inflated to operating pressure again, the ratchet would resist the much higher force of inflation.

Alternatively, a ratchet could be replaced with any other element having a nonlinear force displacement profile. Alternatively, the ratchet could be replaced by a "brake" mechanism that resists deflections against high forces in one state and allows deflections in another state.

In some embodiments, when the creep-compensating mechanism has reached the limit of its compensation range, the ratchet disengages and reverses the direction of a pawl. The spring in the mechanism can then be strained, either manually, actively, or via inflation pressure and held in the strained position by the reversed pawl. Such a strained state may be useful to facilitate film replacement.

In some embodiments, after a new film is installed the pawl is set to its forward orientation either manually, actively, or via inflation pressure by momentarily extending the ratchet past the end of its travel in the reverse direction. This allows the pawl to pivot to its forward position and reengage the ratchet when the inflation pressure is reduced. The creep-compensating mechanism may then be activated upon second inflation of the film.

If a ratchet type creep compensation mechanism is used, ratchet pawl features can be pressed into or glued onto the film itself. Examples of such ratchet pawl features include but are not limited to asymmetric or sawtooth ridges.

Some embodiments of creep compensating mechanisms can indicate their state—revealing a position relative to the limits of their compensation ability or indicating when a limit has been reached. Such an indication can be visual, electronic, or a change in an otherwise sensed parameter. Examples of such sensed parameters included but are not limited to total output power, concentrator volume, concentrator pressure, or concentrator pressure versus inflation volume.

According to some embodiments, the indication may be provided by a limit switch. In certain embodiments, the indication may be by a variable resister. In particular embodiments, the indication can be read remotely, for example by exposing a colored or gridded scale or bar. Some indicators may be read remotely via camera.

One possible mechanism for compensating for film creep, would tailor its effective spring constant, and/or its force vs. displacement curve, to match that of the film whose creep is being compensated for. In some embodiments, the net effect will be that an increment of creep (an incremental displacement) in the length of a film will result in a substantially equal displacement in the creep compensation mechanism. In this manner, the optical length across a film would remain substantially constant.

Certain embodiments of a creep compensation mechanism may use the ring as a spring. In such embodiments, the ring increases stored energy as experiences torque forces.

Specifically, as the length of the film changes due to creep and membrane forces are accordingly reduced, the ring toroidally rotates to maintain the optical length of the film. It is possible to engineer the spring constant of the toroid by selecting the correct toroid section (ring section), the material, and the active radii for film coupling as well as the coupling structure.

Some film creep compensation mechanisms may function with a set of rollers that rotate about a structural ring. The film may pass over these rollers, or it may be attached to the rollers and/or wound onto them. The rollers may be touching or nearly touching, or they may be spaced apart.

A continuous or semi-continuous roller could be designed by using a relatively flexible material in tube form, that provides relatively low resistance to toroidal torsion (twisting of a ring about its toroidal axis). This element could move in concert with the creeping film. A cross section of this element would rotate with respect to the cross section of the structural ring.

Efficient Mechanisms for Eliminating Concentrator Function

One issue associated with conventional solar concentrator apparatuses, is the occasional need to stop concentrating light onto a receiver. For example, a loss of coolant or cooling system power may necessitate a rapid shut-down of the light energy. Because the apparatus lacks control over the source of power (the sun continues to shine), an element of the apparatus can intervene and stop the process.

Moreover, pointing and tracking problems, as well as servicing, can be dangerous during the day because of uncontrolled concentrated solar power. An advantage of certain embodiments is the ability to alter the optics by simply controlling air pressure. Thus in a fault condition, an air pressure of a collector can be adjusted relatively rapidly and possibly reduced below atmospheric pressure, in order to defocus light.

In some embodiments, a tether between at least one point, e.g., the vertex, of the optical film may provide additional safety against uncontrolled focus. This tether may be spring or mass loaded, or actively biased to force a film into a safe shape upon loss of control or other error condition. Having such a secondary safety mechanism may be useful where a ruptured or leaking film prevents pressure control.

The optical film can be weakly prestrained in a pattern. In such embodiments, the optical film is an ineffective concentrator even when the film creeps to a concave shape, unless there is significant tension in the film from inflation to remove the distortion pattern.

Concentrator Characteristics at Less than Full Inflation

Inflatable concentrator structures may fulfill certain characteristics under conditions of less than full inflation. For example, concentrator structures may need to maintain their approximate shape or avoid damage. As another example, a pointing structure with multiple concentrators may still be required to function when a single concentrator film is damaged or there is a pressure loss in a single concentrator. Still another example occurs during assembly and maintenance, where concentrator structures are not yet inflated.

Taking into account such less than full inflation conditions, the choice of strength and stiffness for rings such as elements 7806 and 7808 in FIG. 78A, may be dictated by loads under less than full inflation.

Inflated buckling may not be the limiting behavior for several reasons. One reason is that radial and compressive forces from inflated membranes are likely to be evenly distributed.

Another reason is that an inflated membrane such as elements 7802 or 7804 in the embodiment of FIG. 78A, provides significant radial inward restoring force that would increase with any outward buckling deflection. Thus inflated buckling behavior is limited to inward buckling.

As used herein, the term "outward buckling" can be any deformed ring shape that compromises ring structural characteristics, where one or more locations on the ring translate to a radius from the ring center greater than their starting radius. In contrast to the full inflation scenario, outward buckling is also possible in the less than full inflation scenario.

One reason that inward planar ring buckling will occur at substantially higher loads than outward planar ring buckling, is that inflation pressure on coupled membranes/structures tends to provide an outward restoring force. Another reason that inward planar buckling occurs at substantially higher loads, is that such inward planar buckling is a higher order phenomenon. That is, inward planar buckling requires a sharp kink in the material and most likely compressive failure of the outer ring wall. Thus inward planar buckling involves local buckling of a tube wall, rather than the global shape buckling as happens when outward buckling is possible.

From an energy standpoint, the concentrator system will seek to find the local minimum energy state. Thus, inward ring buckling would occur if the system allows enough membrane area to move forward and expand sufficiently, to reduce a system energy state by more than the energy required to deform the ring in an inward buckled geometry.

Such conditions will only occur in extreme situations (for example with a very flimsy ring), because a given instance of local buckling only allows a small area of film to move forward a small amount. This means that the energy budget for localized buckling is small.

When inward buckling does occur with an inflated concentrator and a ring with a relatively low moment of inertia in the planar direction (for example a flimsy ring), many instances of local buckling will tend to happen all at once. This would allow the balloon to reach a more spherical shape—the minimum energy shape achievable neglecting potential uneven material elongation.

In a simple balloon formed by inflating two bonded flat circular sheets, it takes relatively little force to unbuckle a pleat and pull the locally buckled material back to the nominal seam radius. Because there are so many locally buckled pleats, the total energy required to unbuckle all of them simultaneously would be significant. Specifically, the total energy required is the integration of the pressure multiplied by an infinitesimal affected area, over the distance moved by that area and over the total affected area.

The available buckling energy for a given inflated shape is this integration, taken between the desired shape (in our case a drum shape) and a sphere. Local inward buckling can be predicted by comparing the available buckling energy to the energy required to bend a ring in N places. This energy takes the form of both elastic energy stored in the ring and likely dissipated energy that goes into plastically deforming the ring material locally.

Outward buckling may be most likely to occur when a concentrator is not inflated. It is a lower order phenomenon, and will tend to happen even in cases where a ring is stiff enough to prevent inward buckling during inflation. Outward buckling is likely undesirable even in the uninflated scenario, because it may compromise the ability of a concentrator structure to maintain its shape and avoid damage during wind or other likely loading scenarios.

Concerns regarding possible outward buckling may thus cause concentrator structures be designed to have a certain minimum stiffness in key directions when concentrators are uninflated and rings are primarily under the influence of local, uneven loads from individual pre-tensioned concentrator structural elements such as spokes. Thus in embodiments of a concentrator structure, factors such as a cross-section of a ring, a number of spokes, and a spoke pretension, may be chosen to prevent ring outward buckling with a safety factor, with an overall weight that is not heavier than necessary to meet this criterion.

Relation of Deflections of Inflated Concentrator Components

For concentrator structures having pretensioned elements (such as elements 7812, 7814, and 7815 of FIG. 78A), during operation the pretensioned elements may always need to maintain positive tension, even during the highest expected operating loads (such as high winds). This is because such highest expected operating loads determine the minimum pretension for a given element such as a spoke.

For example, upon inflation the structural rings (such as elements 7806 and 7808 in FIG. 78A) that are in communication with membranes (such as elements 7802 and 7804 in FIG. 78A), are radially compressed due to inward membrane forces from elements 7802 or 7804. Under this compression, the elements 7806 and 7808 deform to have a smaller radius. This inward radial deflection of a ring will also tend to reduce the tension in a spoke.

Accordingly, one design criterion may be that the effective spring constant for stretching of a spoke, be much lower than the effective radial compressive spring constant of a ring. Thus, the stretch of a spoke may be greater than the sum of a combination of radial ring deflection due to compressive membrane forces, and radial deflection under the largest design loads such as wind loads. Such a design criterion achieves the desired result that the spokes maintain positive tension.

Adjusting the Tension/Displacement of Stiffening Truss

Owing to the number of coordinated elements present in certain stiffening trusses according to embodiments, maintaining proper relative lengths of elements can be used for obtaining the best optical performance. A further goal of assembly and joint design is to produce subassemblies that install quickly and accurately.

In some embodiments, accurate relative lengths may be achieved by accurate automated assembly processes.

In some embodiments, the length of at least one element is independently adjustable. In some embodiments, the effective length of at least one element is adjustable by adjusting a joint. In some embodiments, the effective length of at least one element is adjustable by adjusting the position of a joint between that element and another element, a ring, or mechanism, for example a creep-compensation mechanism.

In certain embodiments, one such device adjusts a plurality of elements in a coordinated fashion. As used herein, the element that provides this kind of adjustment is called an "adjuster."

An embodiment of an adjuster can be configured to be operated to apply a constant force, a constant displacement, or a controlled force-displacement profile. An adjuster can also be configured to function to adjust the relative force or displacements of a plurality of elements, for example by effectively adjusting the fulcrum location in a lever linking more than one element.

In some embodiments adjusters are passive. In other embodiments the adjuster may be actively driven. In some embodiments, an adjuster may be manually trimmed, for example by actions such as turning threads, loosening and tightening a clamp, or changing a fixed load.

Some embodiments of passive adjusters include a simple gravitational or inertial weight-based preload. In some embodiments this preload works in concert with mechanical advantage. In some embodiments the mass of the preload can be adjusted. In some embodiments, the mechanical advantage can be adjusted.

In certain embodiments of passive adjusters, the adjustments may be made by a spring. In some embodiments this spring is configured to be operated with a substantial preload to effect a force displacement curve having a finite offset. In some embodiments this offset is sufficiently large that the spring acts substantially as a constant-force mechanism.

In some embodiments of passive adjusters, adjustments are made by a combination of spring and ratchet as described for an embodiment of a creep-compensating mechanism.

In some embodiments of active adjusters, adjustments are made by turning a leadscrew, turning a worm-driven drum, turning a spur or worm gear, changing the helix angle of a multiple-stranded element, operating an "inch-worm" mechanism, or releasing and applying a mechanical brake in concert with some other actuation, for example a spring or an adjustment in inflation pressure.

In particular embodiments of manually trimmed adjusters, an operator releases a clamp, applies a force or displacement, and re-applies a clamp. In other embodiments, an operator may adjust a spring preload, for example by turning a threaded element in communication with a spring. In some embodiments, adjustments are made by the use of a tool such as a long-shafted tool to reach a remote adjustment point. In some embodiments, adjustments are communicated via a flexible cable acting in axial tension or compression, such as bicycle handbrakes, or rotation.

The present invention is not limited to the specific embodiments previously described, and alternatives are possible. For example, in certain embodiments an external ring element may be employed.

Specifically, as used herein, a "concentrator ring" refers to a ring element of a concentrator structure that serves to maintain the shape of a film boundary. An approach to controlling shape and buckling stiffness of a concentrator ring uses an external ring of larger diameter and pretensioned elements that couple and communicate forces between the external ring and the concentrator ring.

Such pretensioned elements (such as spokes) can be positioned radially and/or diagonally between the rings. The pretensioned elements may lie in the plane of the rings, or may lie diagonally out of the plane of the rings to provide triangulated out-of-plane stiffness to the concentrator ring.

Figure 85A:
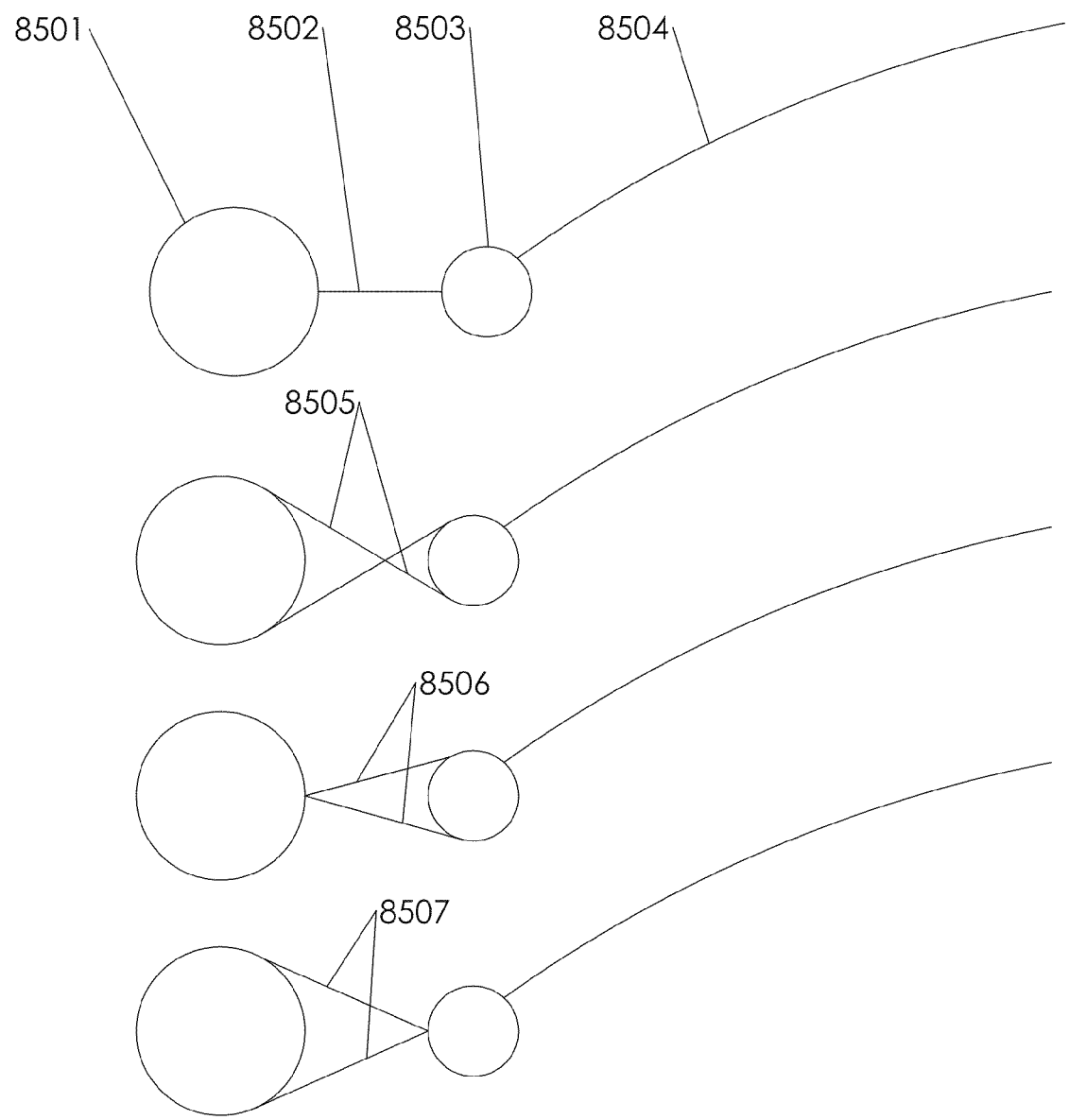
FIG. 85A shows cross-sections of four variations of an external ring and an internal ring that are coupled by pretensioned spokes.

FIG. 85A shows cross-sections of four variations of an external ring 8501 and an internal ring 8503 that are coupled by pretensioned spokes 8502. Spokes 8505, 8506, and 8507 represent alternative configurations to spokes 8502. Spokes can be arranged in many different possible orientations, including radial in-plane, diagonal in-plane, radial out-of-plane, diagonal out-of-plane, and crossing configurations, among others.

Figure 85B:
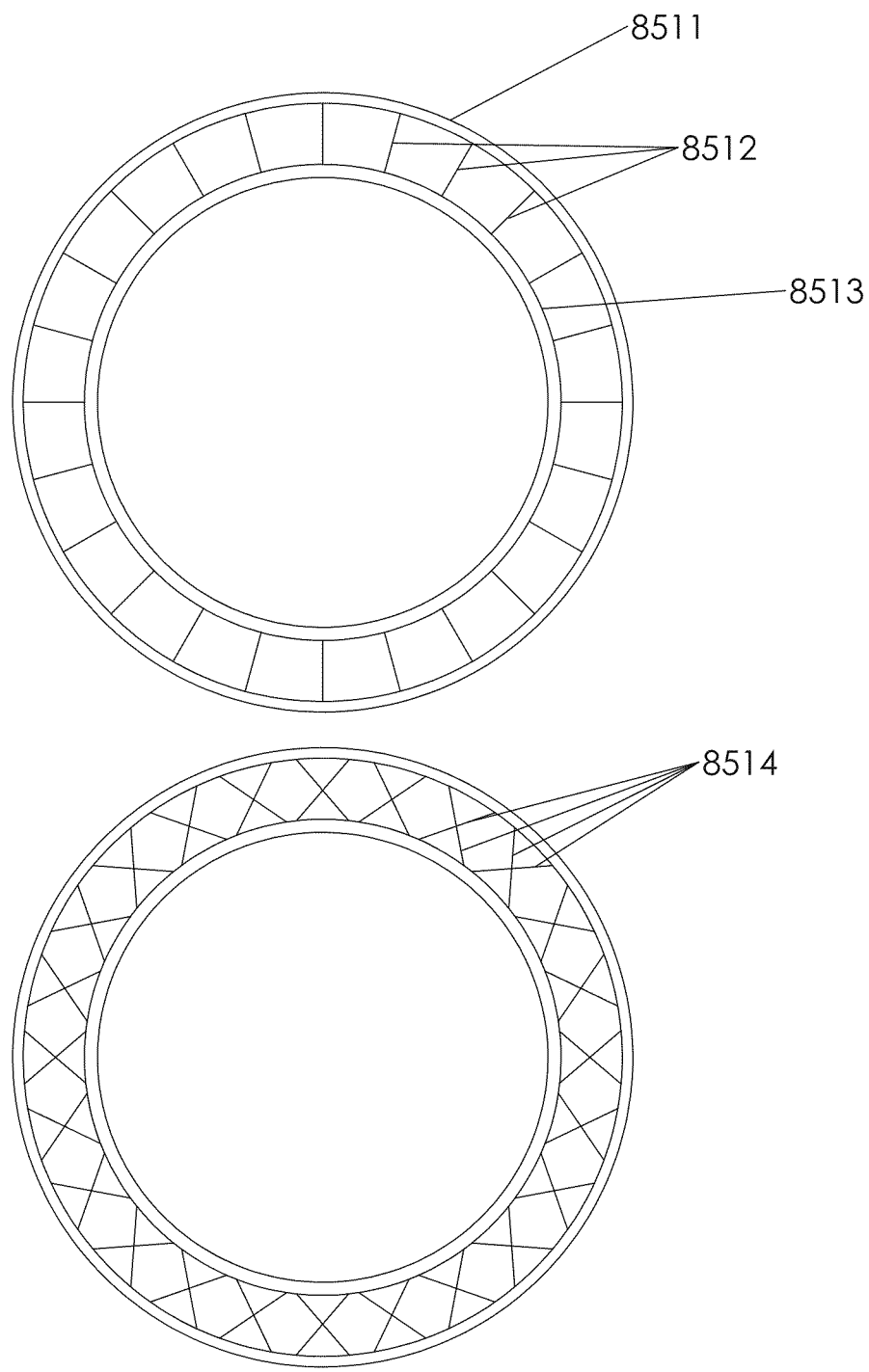
FIG. 85B shows a top view of two possible ring and spoke configurations.

FIG. 85B shows a top view of two possible ring and spoke configurations. Spokes 8512 represent a radial configuration. Spokes 8514 represent a diagonal configuration.

According to an embodiment, a solar concentrator apparatus includes a first ring, an optical film attached to the first ring, a cover film, a first hub, and a stiffening truss comprising a wire linking the first ring and the first hub.

In another embodiment, the apparatus further includes a second hub coupled to the first ring with a second wire.

In yet another embodiment, the apparatus further includes a second ring coupled to the first hub with a second wire.

In yet another embodiment, the apparatus further includes a second ring and a second hub coupled with a second wire.

In yet another embodiment, the apparatus further includes a third wire that couples the first ring to the second hub. The apparatus can further include a fourth wire that couples the second ring to the second hub.

In yet another embodiment, the apparatus further includes a second ring coupled to the first ring by a shroud. The optical film can be attached to the first ring such that a tension in the film passes through a torsional center of a cross-section of the first ring. The shroud can be attached to the first ring such that a tension in the shroud passes through a torsional center of a cross-section of the first ring. The optical film can be attached to the first ring such that a combined force of the tension in the shroud and a force of the optical film pass through the torsional center of the first ring at a designed departure angle of the optical film. The apparatus can further include a second wire coupling the first ring to a second hub, a third wire coupling the second ring to the first hub, and a fourth wire coupling the second ring to the second hub. The apparatus can further include a member coupling the first hub and the second hub, wherein the member can be in thermal communication with a coolant.

In yet another embodiment, the apparatus further includes a film creep compensation mechanism. The film creep compensation mechanism includes a second ring in contact with the optical film, and a plurality of wires in contact with the second ring and configured to impose a torque on the ring to stretch the optical film. The apparatus can further include a mechanism configured to adjust a length of the wire to change an internal force within the apparatus. The mechanism can include a spring, a ratchet, and/or a brake. The mechanism can include an indicator of strain in the optical film, wherein the indicator can include a visual indicator and/or an electronic indicator. The indicator can be an electronic indicator including a switch, an analog element, or a potentiometer.

In yet another embodiment, the wire of the apparatus exhibits a resistance to heating. The wire can bear a white coating and/or a thermally insulative coating. The wire can include a material exhibiting a low absorption of optical energy.

According to another embodiment, an apparatus for concentrating solar energy includes a first ring coupled to a second ring through an axial coupling member, a optical film attached to first ring, a cover film attached to second ring, a stiffening truss comprising a tensile member, and a hub proximate to a point of intersection between the tensile member and the first ring or the second ring. The optical film can include reflective, diffractive, or refractive optical structures. The cover film can include reflective, diffractive, or refractive optical structures. The optical film and the cover film can define an interior space containing pressurized air. The tensile member can include a radial member within the first ring or within the second ring. The tensile member can include a cross-radial member coupling the first ring and the second ring. The axial coupling member can include a shroud and can include axial members.

In yet another embodiment, the apparatus for concentrating solar energy further includes an internal or an external hub.

In yet another embodiment, the apparatus for concentrating solar energy further includes an optical enhancing member in contact with and configured to determine a shape of the optical film.

In yet another embodiment, the apparatus for concentrating solar energy further includes an adjuster configured to coordinate adjustment in lengths of multiple members to control internal forces.

In yet another embodiment, the optical film of the apparatus for concentrating solar energy is mounted to the ring in a position such that torsional deflections do not produce a first-order effect on the optical shape. Pairs or multiples of elements that are attached to the first ring can be coordinated so as to produce no torsional moment when combined.

According to another embodiment, a method of collecting solar energy includes providing an optical film mounted on a first ring and having a concave profile, providing a cover film mounted on a second ring and having a convex profile. The position of the second ring relative to the position of the first ring is constrained by a stiffening truss having a tensile element oriented substantially perpendicular to a plane of the first ring and a plane of the second ring. The method further includes causing light that has passed through cover film to be reflected by the optical film in a path that intersects a receiver. The concave profile of the optical film can be created by an inflation pressure within a space defined between the cover film, the optical film, and the tensile element, which includes a shroud extending between the first ring and the second ring. The tensile element can lie within a plane of the first ring or a plane of the second ring and extends in a radial direction. The tensile element can extend between the first ring and the second ring substantially perpendicular to a plane of the first ring and a plane of the second ring. Alternatively, the tensile element can extend between the first ring and the second ring not substantially perpendicular to a plane of the first ring and a plane of the second ring.

In yet another embodiment, the method further includes providing a second tensile truss element extending between the first ring and the second ring not substantially perpendicular to a plane of the first ring and a plane of the second ring, the first tensile truss element and the second tensile truss element intersecting at a node.

In yet another embodiment, the method further includes attaching a pointing structure at a hub proximate to a coupling point between the tensile truss element and the first ring or the second ring. The hub can be located at a point interior to a space defined between the optical film and the cover film. Alternatively, the hub can be located proximate to a central axis defined between a center of the first ring and a center of the second ring. Alternatively, the hub can be at the first ring or at the second ring.

According to another embodiment, a method includes providing a structure, which includes an optical film, for concentrating solar energy and compensating for creep in the optical film with a mechanism. The mechanism is configured to tailor an effective spring constant or a force versus displacement curve, to match an effective spring constant of the optical film or a force versus displacement film of the optical film, such that an increment of creep in the optical film results in an equal displacement in the creep compensation mechanism to maintain substantially constant an optical length across the optical film.

According to another embodiment, an apparatus for concentrating solar energy includes an optical film configured to reflect or refract incident light, a ring in physical communication with the optical film, and a plurality of tension elements in communication with the ring. A set of factors are selected from a section of the ring, a number of the tension elements, and a pretension of the tension elements, satisfies a criterion of preventing an outward buckling of the ring within a safety factor, with a combined weight of the ring and the tension elements not heavier than required to meet the criterion.

According to another embodiment, an apparatus for concentrating solar energy includes an optical film configured to reflect or refract incident light, a ring in physical communication with the optical film, and a plurality of tension elements in communication with the ring. An effective spring constant for stretching the tension element is substantially smaller than an effective radial compressive spring constant of the ring, such that the tension element maintains positive tension under a largest set of design loads.

Figure 86:
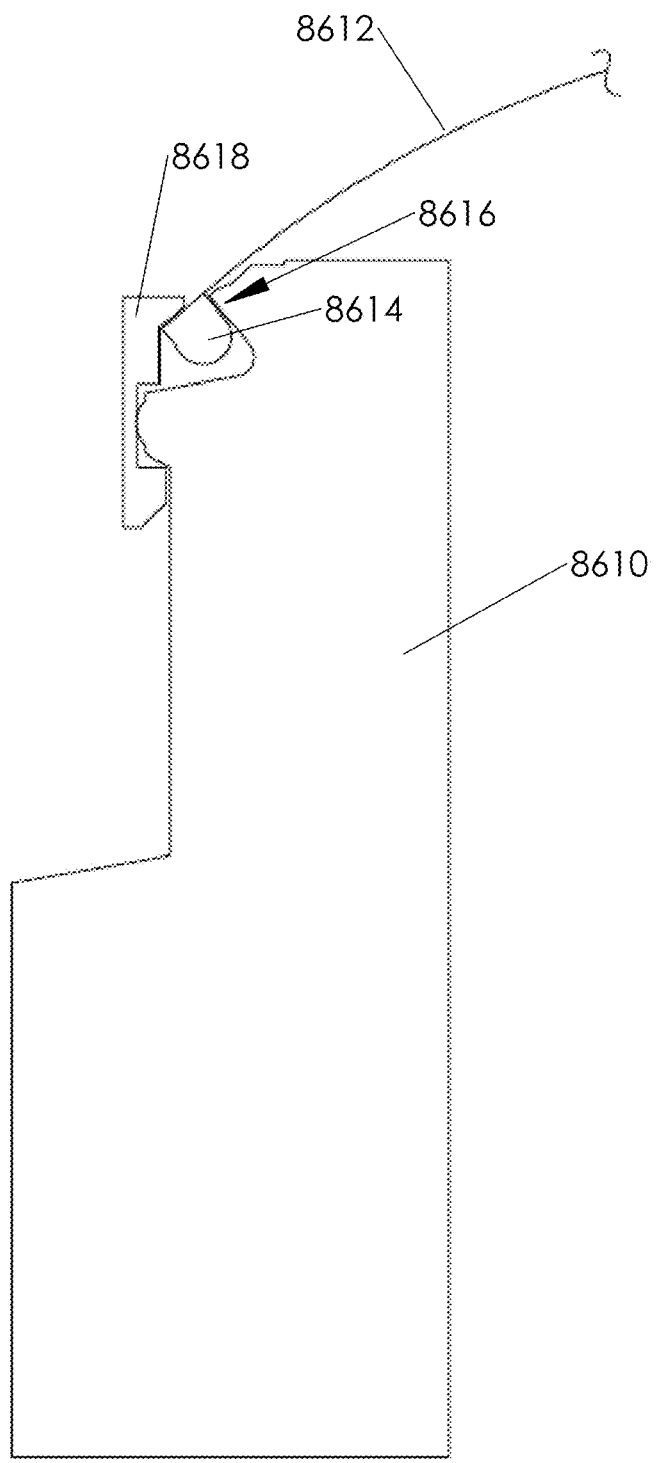
FIG. 86 shows an embodiment of a film attachment and seal system for an inflated solar concentrator.

FIG. 86 shows a simplified cross-sectional view of embodiment of a film attachment and seal system for an inflated solar concentrator. Ring 8610 creates structural rigidity required to retain a desired optical shape at the perimeter of film 8612. Film 8612 may have a reflective coating if it is a reflective element in a solar concentrator (the back film), or it may be clear if it is intended to let sunlight in (the front film). In practice, a solar concentrator configured to utilize this embodiment of a seal may employ two sets of seals: a first set for a clear front film, and a second set for a reflective back film.

Bead 8614 is adhered to film 8612, and defines the perimeter location of film 8612. The bead prevents slippage by contact with lip 8616 on ring 8610.

Bead 8614 may be formed from a number of materials, including but not limited to polymers, PET, urethane adhesive, metals, or other materials. The bead may be the same base material as film 8612 in order to facilitate recycling of both film 8612 and bead 8614.

Retaining band 8618 snaps onto ring 8610. This prevents bead 8614 and film 8612 from slipping off ring 8610.

FIGS. 87A-87B show other embodiments of a film attachment and seal system for an inflated solar concentrator, which comprises a cartridge that is insertable and removable from a cartridge support. In particular, FIG. 87A shows an embodiment wherein the cartridge support is in the form of a ring 8710 that creates axial stiffness sufficient to create a substantially planar optical boundary. Ring 8710 has an annular channel 8712 which retains film cartridge 8714. Cartridge 8714 comprises radial stiffening rings 8716 and 8718, transparent film 8720, and reflective film 8722.

In some embodiments such as is shown in FIG. 87A, a sealed volume between films 8720 and 8722 can be created without a separate seal component. However, FIG. 87B shows an alternative embodiment that features such a seal 8724. This seal embodiment has an advantage in that self-contained cartridges may be quicker to replace than individual films and seal components.

FIG. 87C shows how the ring forming the embodiment of the cartridge support 8780 opens to insert the cartridge. In particular, ring 8780 includes a first portion 8782 and a second portion 8784 that are fixed in pivotable relation to one another by hinge 8786. Pivoting of portions 8782 and 8784 relative to one another allows the cartridge to readily be inserted. A latch mechanism (not shown) would maintain the portions to remain in a locked position as desired.

Figure 88A:
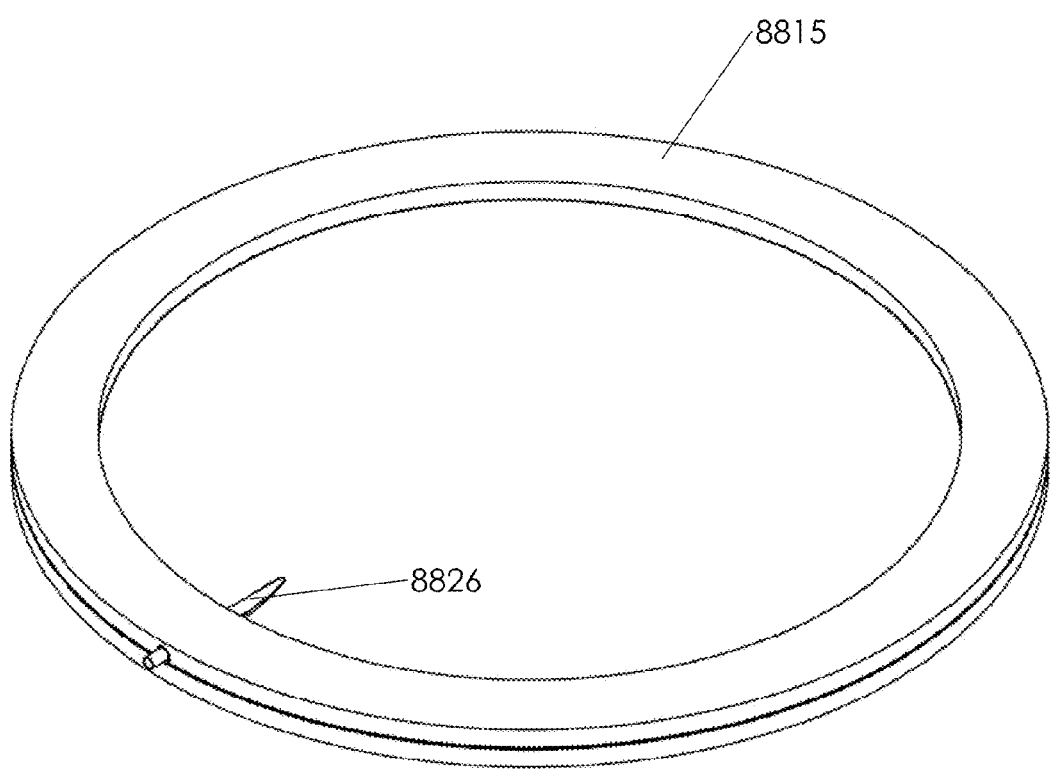
FIGS. 88A-88F show another embodiment of a film attachment and seal system for an inflated solar concentrator.

FIGS. 88A-88F show various views of an alternative embodiment. Specifically, in this embodiment, cartridge 8814 includes a filling tube 8826 between films 8816 and 8818. FIG. 88A shows a perspective view of such a cartridge embodiment.

Figure 88B:
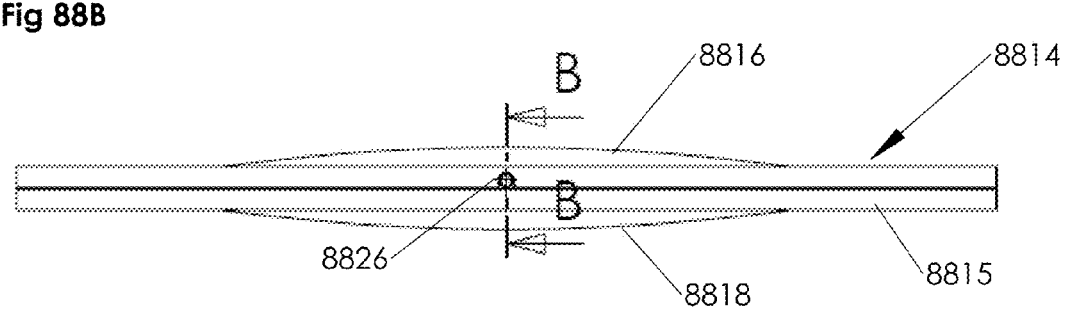
Figure 88C:
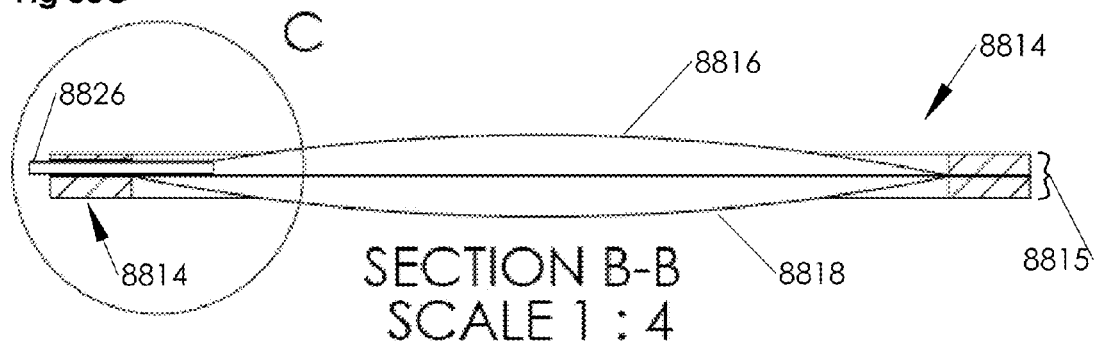

FIG. 88B shows an edge view of cartridge 8814 with filing tube 8826. FIG. 88C shows a cross-sectional view along line B-B of FIG. 88B.

Tube 8826 goes between films 8816 and 8818 in order to communicate gas between an outside source and the enclosed volume between films 8816 and 8818. In order to maintain a smooth, continuous optical boundary for reflective film 8818, tube 8826 is adjacent to film 8818 without changing the shape of film 8818.

Transparent film 8816 conforms to the shape of tube 8826 in order to form a tight seal around it. Ring 8815 which is in contact with transparent film 8816 has a channel that makes room for tube 8826 and the conforming shape of film 8818.

Figure 88D:
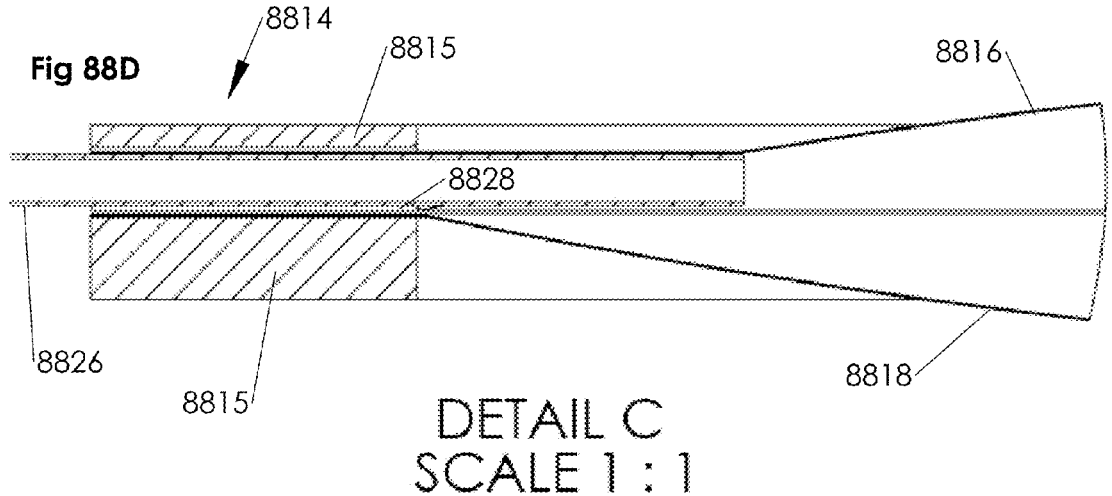
Figure 88E:
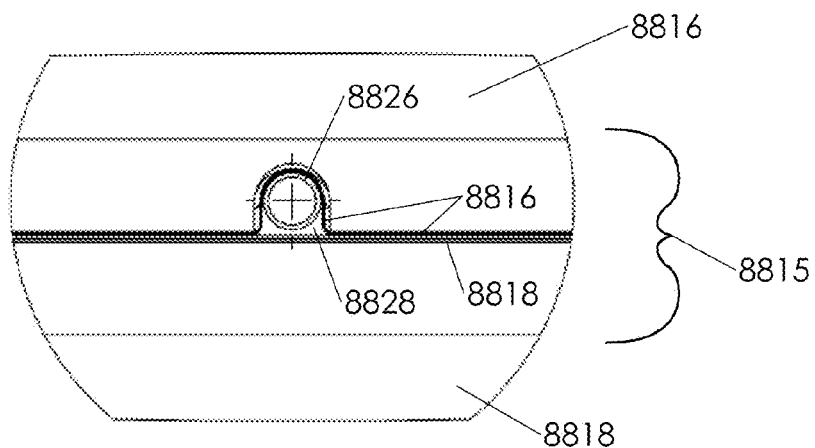
Figure 88F:
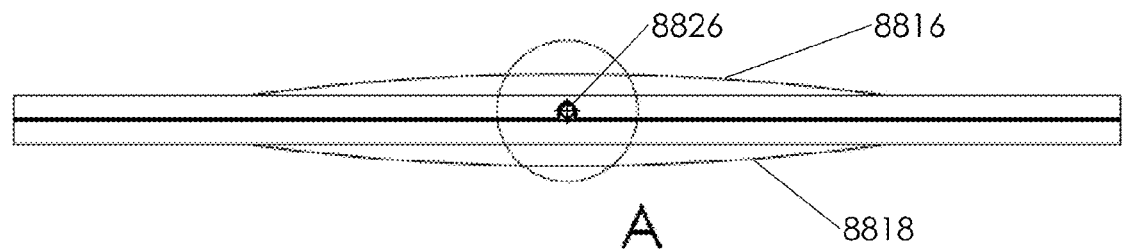

FIG. 88D shows a partial side view of cartridge 8814 with tube 8826. An optional seal component or adhesive 8828 may be used to prevent leaks around tube 8826. FIGS. 88E-88F show end-on views of the cartridge and the filling tube.

Figure 89A:
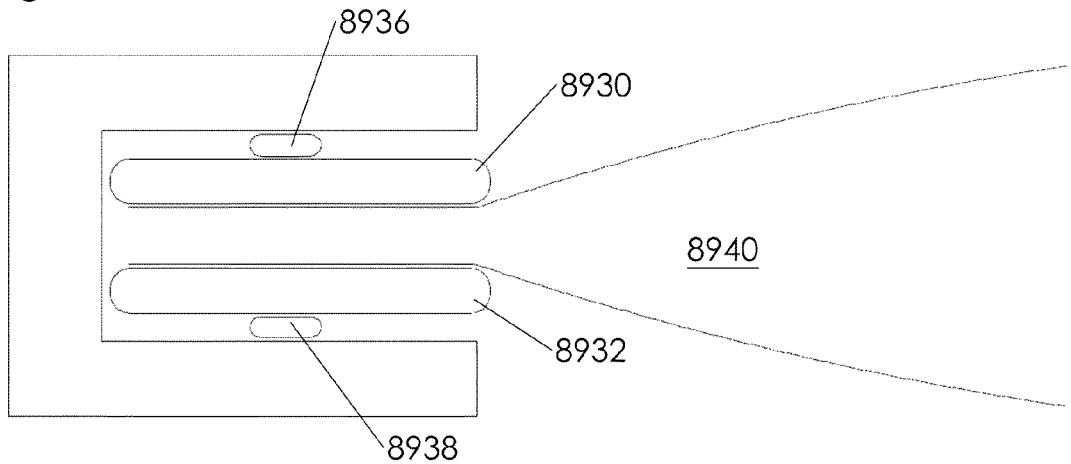
FIGS. 89A-89D show other embodiments of film attachment and seal systems for an inflated solar concentrator.

FIG. 89A shows another embodiment of an inflatable concentrator system similar to the concentrator of FIG. 87B. In this embodiment, radial support rings 8930 and 8932 of the cartridge are sealed to the axial support ring of the cartridge holder by seals 8936 and 8938. Seals 8936 and 8938 may be made of rubber, elastomer, polymer, tape, adhesive or some other compliant material. Gas or fluid pressure in chamber 8940 tends to force rings 8930 and 8932 apart and thus promote proper seal function.

Figure 89B:
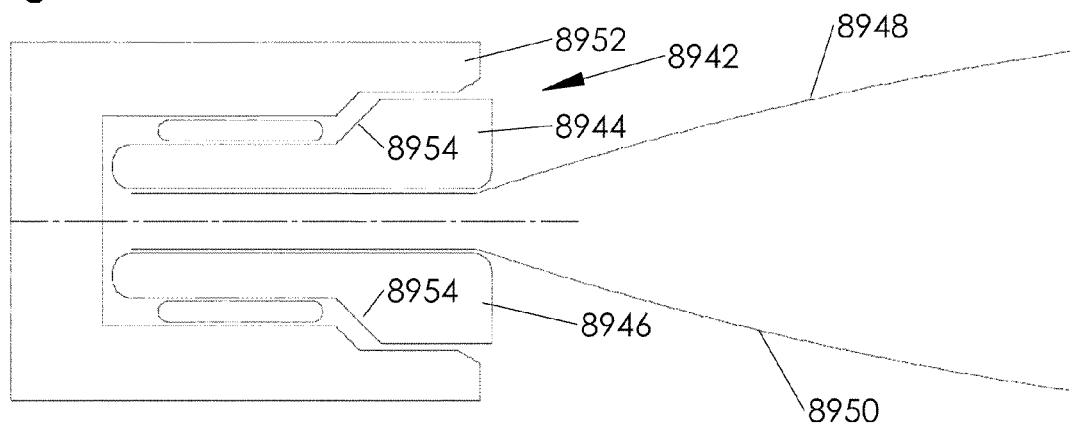

FIG. 89B shows another embodiment of an inflatable concentrator system similar to that of FIG. 89A. A replaceable cartridge 8942 comprises radial support rings 8944 and 8946 and films 8948 and 8950. In this embodiment, the axial rings have chamfers or lead-in features 8954 which facilitate insertion of cartridge 8942 into the cartridge holder comprising ring 8952.

Figure 89C:
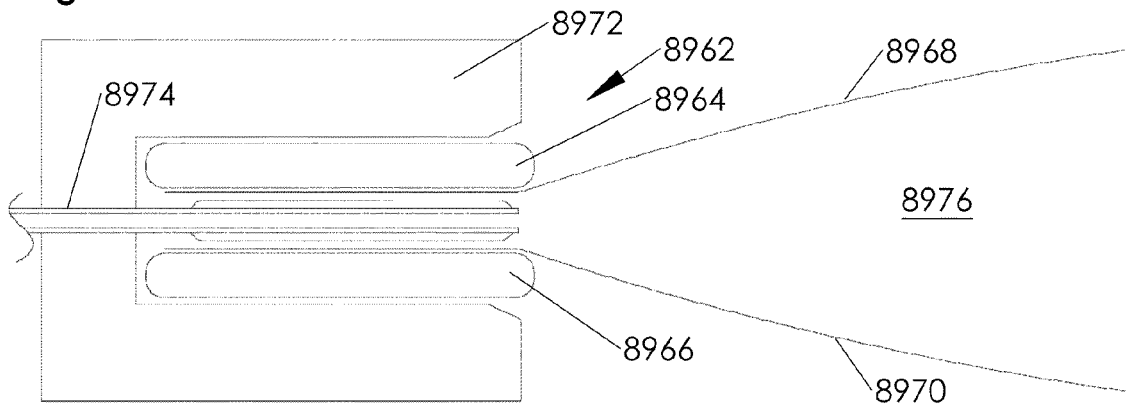

FIG. 89C shows another embodiment of an inflatable concentrator system similar to that of FIG. 89A. A replaceable cartridge 8962 comprises radial support rings 8964 and 8966, films 8968 and 8970 and seal ring 8972. Seal ring 8972 may be made of a compliant material so that it maintains tight contact with films 8968 and 8970, or it may be adhered to the films with adhesive or it may be heat sealed to the films. Filler tube 8974 passes through seal ring 8972 to allow fluid to be added to or taken out of cavity 8976. Alternatively, filler tube 8974 may be an integral part of seal ring 8972.

Figure 89D:
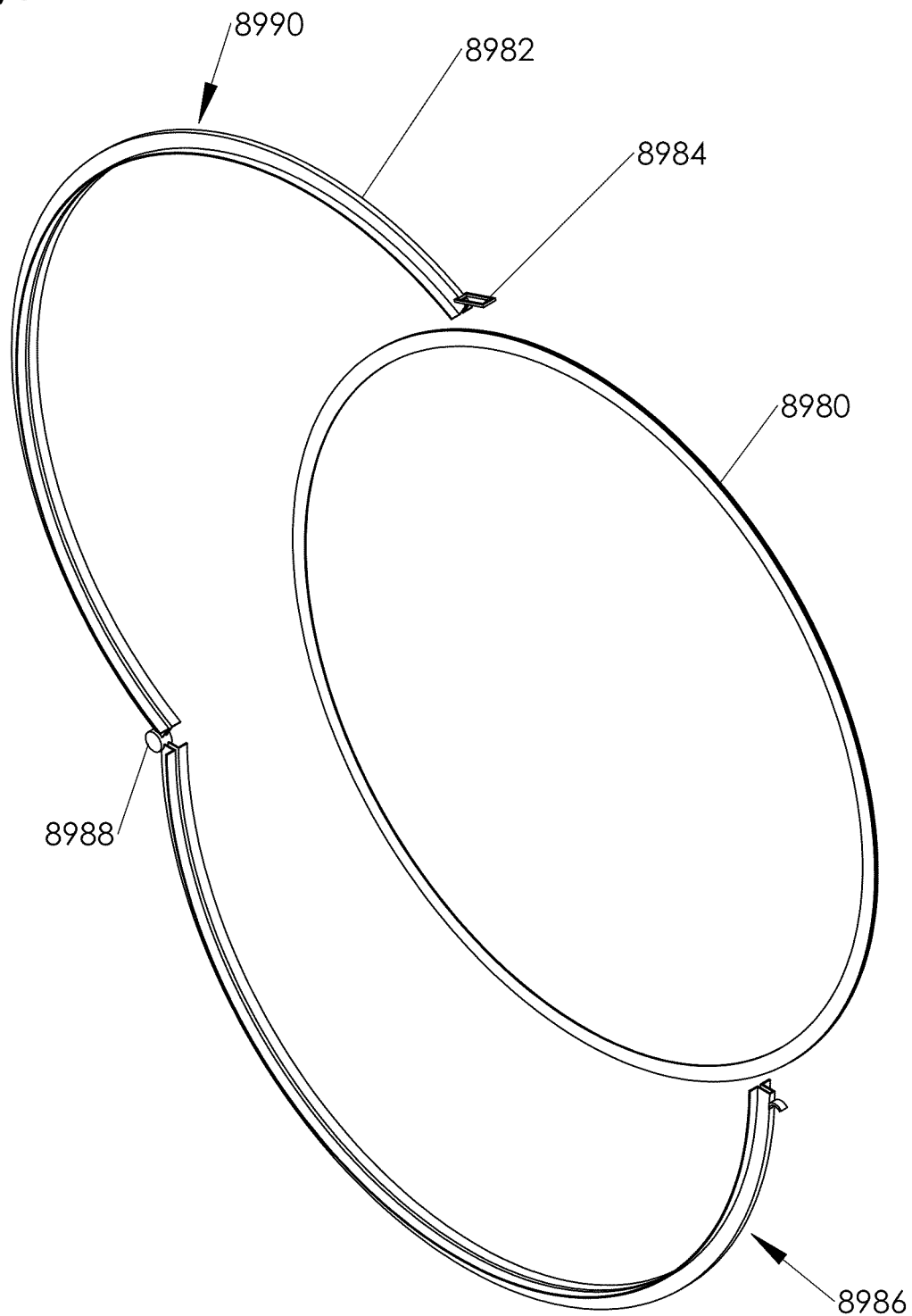

FIG. 89D shows an embodiment of a cartridge replacement system for a solar concentrator. Film cartridge 8980 is a replaceable unit. Axial stiffening ring assembly 8982 may be mounted to a base or tracking structure (not shown). When installed, cartridge 8980 is held securely in the cartridge holder of ring assembly 8982.

To install or remove cartridge 8980, a latch 8984 may be opened, allowing a moveable half-ring 8986 to rotate open about a hinge 8988. Cartridge 8980 may then be placed into a fixed half-ring 8990 and half-ring 8986 may be closed again and secured by latch 8984. A similar hinge and latch system may be used with various ring, cartridge or seal embodiments described in this application.

Figure 106:
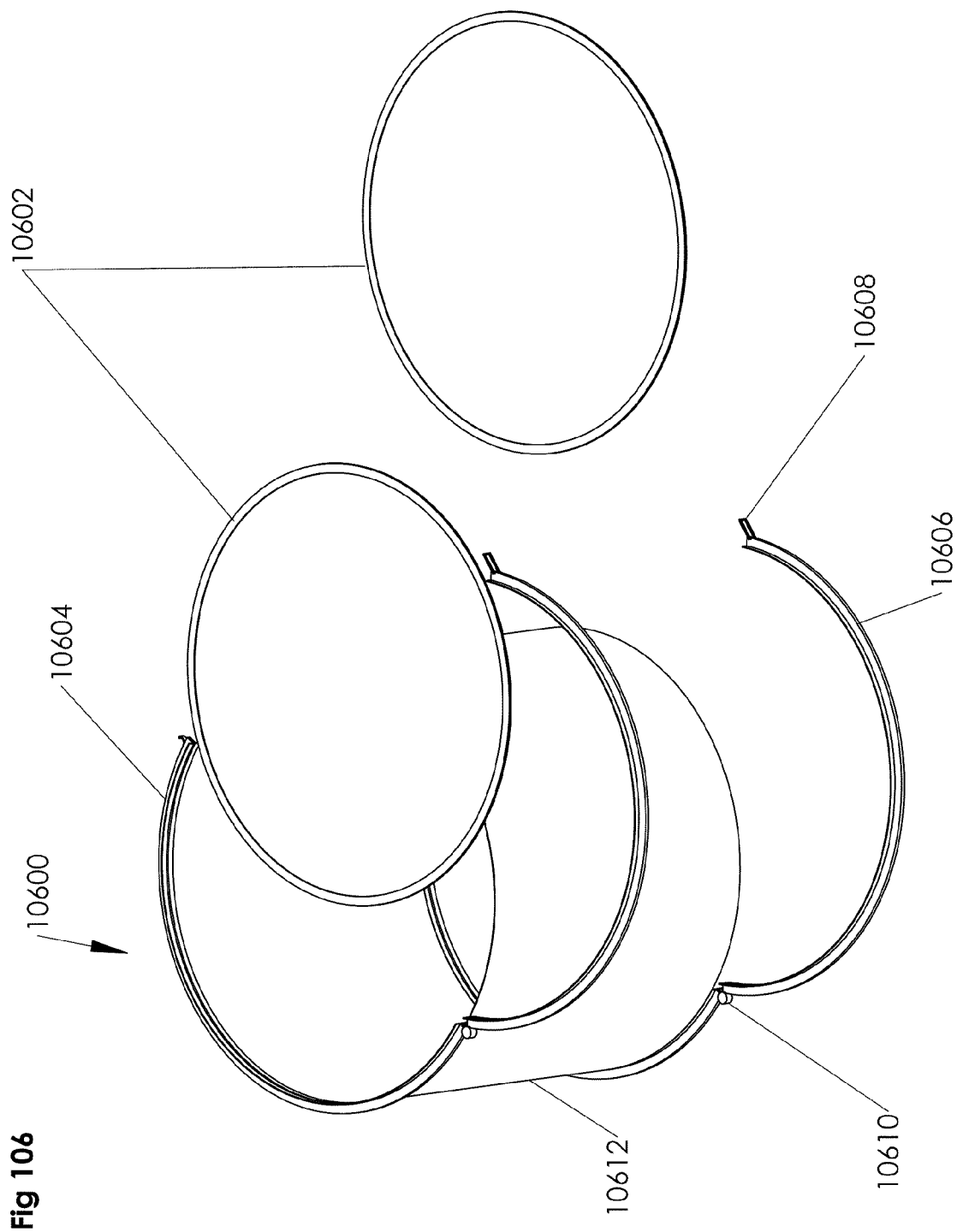
FIG. 106 shows one embodiment of a solar concentrator.

While FIG. 89D shows an embodiment of a collector comprising a single cartridge holder configured to receive a cartridge comprising two films, the present invention is not limited to this particular embodiment. For example, FIG. 106 shows an alternative embodiment of a solar concentrator 10600 in which an upper cartridge holder 10604 and lower cartridge holder 10606 are attached to a harness 10612. The harness serves to space cartridges 10602 apart by a desired distance and to create desired solar concentrator structural characteristics.

The film cartridges 10602 are replaceable. In particular, holder 10606 opens via hinge 10610 in order to accept cartridge 10602. Cartridge 10602 is retained securely when latch 10608 is fastened so that holder 10606 forms a substantially continuous ring.

FIGS. 90A-90B show other embodiments of a film attachment and seal system for an inflated solar concentrator. Cartridge 9010 rests in an annular groove 9012 in axial support ring 9014 cartridge holder. Cartridge 9010 comprises a single radial support ring 9016, transparent film 9018 and reflective film 9020.

The films 9018 and 9020 may be bonded to the ring in a number of ways. For example, one or both of the films may be bonded to the ring 9016 with adhesive. Alternatively, one or both of the films may be heat sealed without separate adhesive, or one or both of the films may be mechanically attached.

The particular embodiment of FIG. 90A shows adhesive beads 9022 at the edge of ring 9016. However, alternative approaches exist, and there are other ways of using adhesives including using placing a thin layer between each film and ring 9016. For example, heat sealing without adhesive (as shown in the embodiment of FIG. 90B) may be accomplished by selecting appropriate materials for ring 9016 and films 9018 and 9020, such that the materials adhere or merge or become welded when heated with a suitable tool.

In these embodiments, axial support ring 9014 defines the optical boundary of film 9020 along the radius where film 9020 departs from touching ring 9014. An additional seal component or compound may not be required because the inflated chamber 9024 is defined by ring 9016, and films 9018 and 9020.

FIG. 90C shows a cross section of another embodiment which includes a variation of an axial support ring cartridge holder, with a cross section that facilitates manufacturing. In particular, flanges 9028 and 9030 have predetermined dimensions and materials chosen to create the desired axial stiffness. The embodiment of FIG. 90C additionally includes a filler tube 9032 as shown, which passes through radial support ring 9016 and serves to inflate or deflate the concentrator structure by allowing a gas or fluid to pass into or out of chamber 9024.

Figure 91:
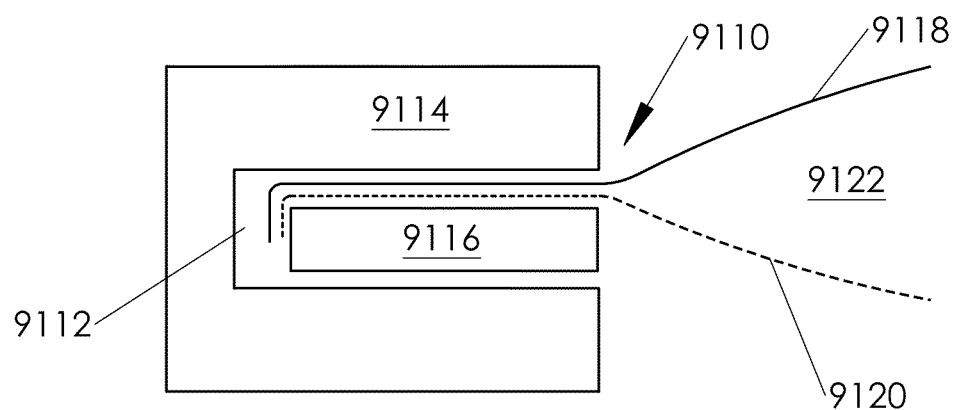
FIGS. 91-92 show other embodiments of film attachment and seal systems for an inflated solar concentrator.

FIG. 91 shows another embodiment of a film attachment and seal system for an inflated solar concentrator. In this embodiment, a cartridge 9110 is supported axially by an annular groove 9112 in axial support ring 9114 comprising the cartridge holder. Cartridge 9110 comprises radial support ring 9116, transparent film 9118 and reflective film 9120.

In this embodiment, films 9118 and 9120 are sealed to one another, to form a chamber 9122. They may be heat sealed together, or may be bonded with adhesive, or they may be mechanically attached.

One or both of the films is also attached to ring 9116, either by heat sealing, an adhesive, mechanical attachment, or by some other attachment method. FIG. 91 shows reflective film 9120 attached to ring 9116 so that the optical boundary of film 9120 is defined by the inner edge of ring 9116.

Other embodiments are also possible. For example film 9118 may be attached to ring 9116, and the optical boundary of film 9120 is defined by the inner edge of ring 9114.

It is also possible to incorporate a filler tube (not shown) into this or a similar embodiment. One way to do this is to allow the perimeter of film 9118 to pass over the filler tube and take the shape of the filler tube where it touches it so an effective seal can be formed. The boundary of film 9120 may be left substantially flat so that desired optical performance is maintained.

A filler tube may be sealed to the films with the use of an additional adhesive or seal compound, or it may be heat sealed to the films. A filler tube may have a round cross section, or it may have some other cross section such as a "D" shape or rectangular shape to facilitate sealing it to the film(s).

Figure 92:
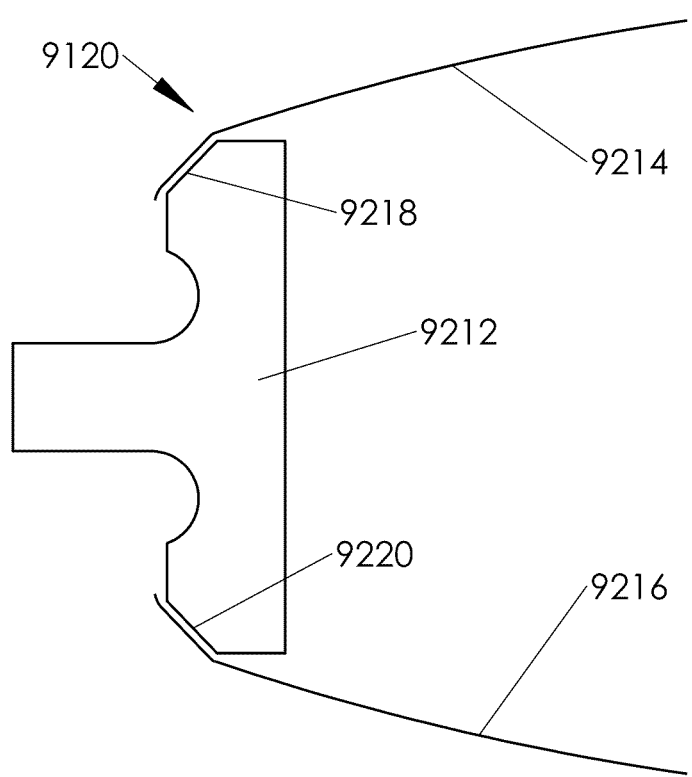

FIG. 92 shows another embodiment of a film attachment and seal system for an inflated solar concentrator. In this embodiment, the cartridge 9210 comprises ring 9212 which provides axial and radial stiffness, transparent film 9214 and reflective film 9216.

Ring 9212 has angled surfaces 9218 and 9220 which are steeper than the departure angle of the films at the normal internal operating pressure of the concentrator. This configuration allows the interface or bond with films 9214 and 9216 to be substantially in shear and not be subject to substantial peel forces which might cause a bond or seal to fail.

Cartridge 9210 may be designed to be stiff enough to provide a workable optical shape when supported by just a few points in a support structure (not shown). Alternatively or in conjunction with its natural stiffness, the cartridge may rely on an external structure with more support points to provide additional stiffness to create the desired optical shape.

Figure 93A:
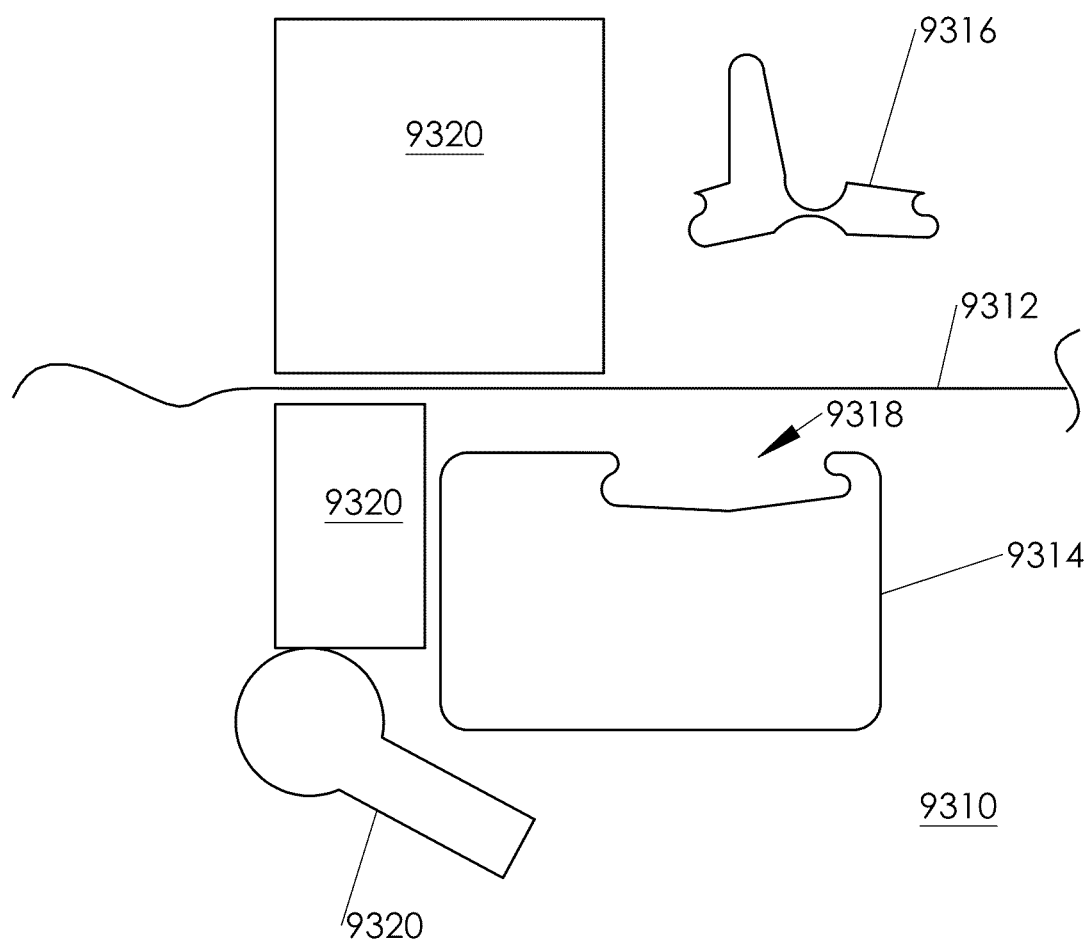
FIGS. 93A-93C show another embodiment of a film attachment and seal system for an inflated solar concentrator.
Figure 93B:
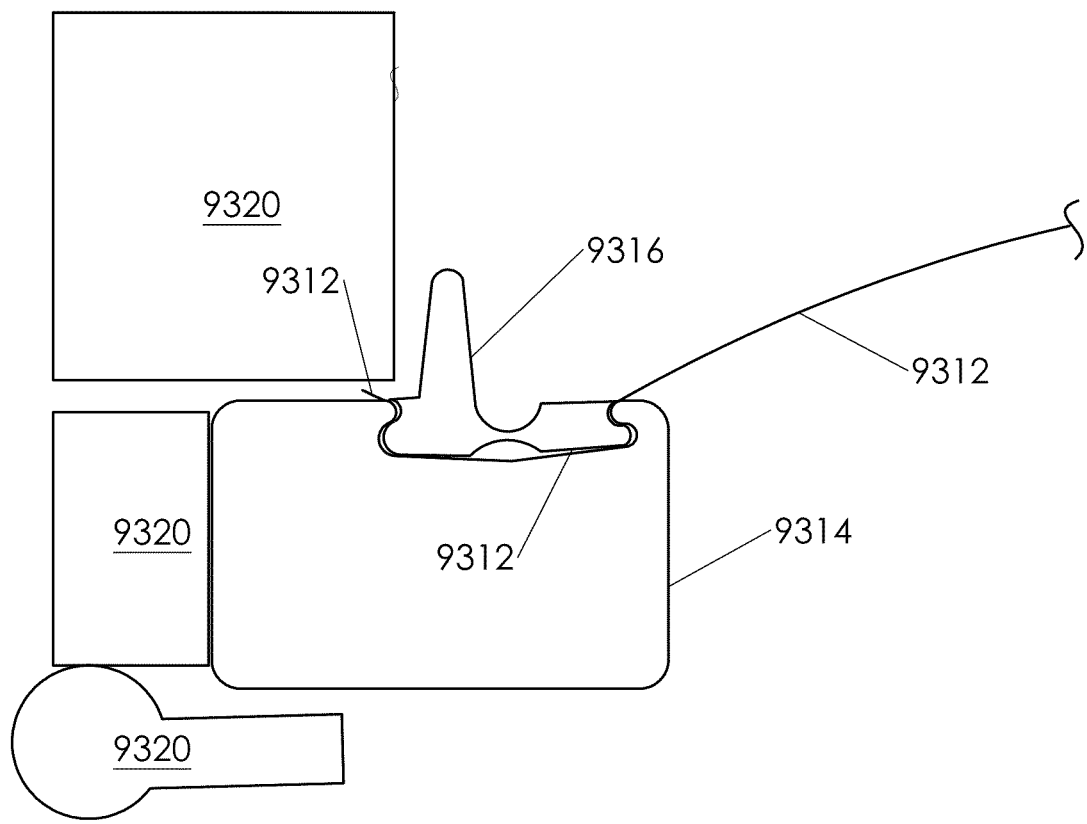
Figure 93C:
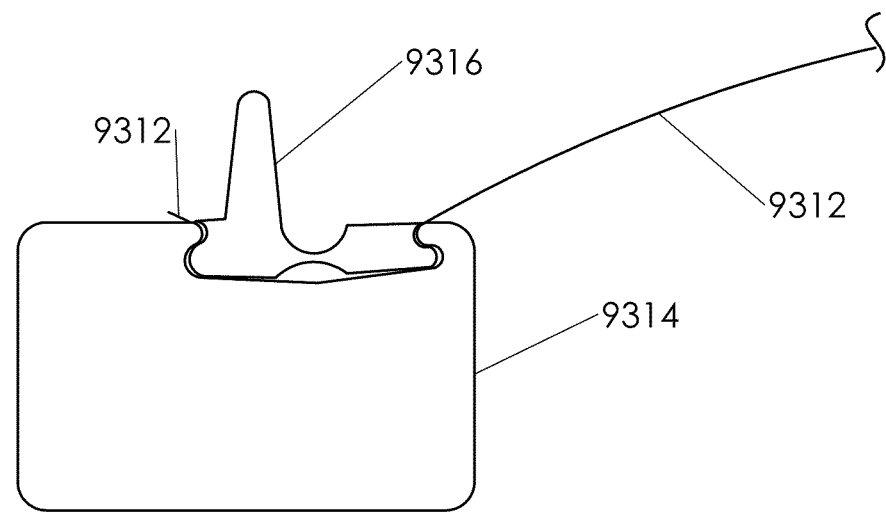

FIGS. 93A-C show another embodiment of a film attachment and seal system for an inflated solar concentrator. In this embodiment, a seal assembly 9310 may be permanently or removably attached to a support and tracking structure (not shown).

Assembly 9310 allows a film 9312 to be attached and removed from a ring 9314. Retaining ring 9316 snaps into a groove 9318 in ring 9314 and traps film 9312 with enough friction force that it will not slip under the influence of normal operating forces. Retaining ring 9316 may flex or it may have a pivot joint so that it snaps into groove 9318 with an over-center snap action.

Tool 9320 holds film 9312 before and during installation on ring 9314. Tool 9320 may or may not create some degree of pretension in film 9312. Tool 9320 may be removable when installation is complete.

Figure 94:
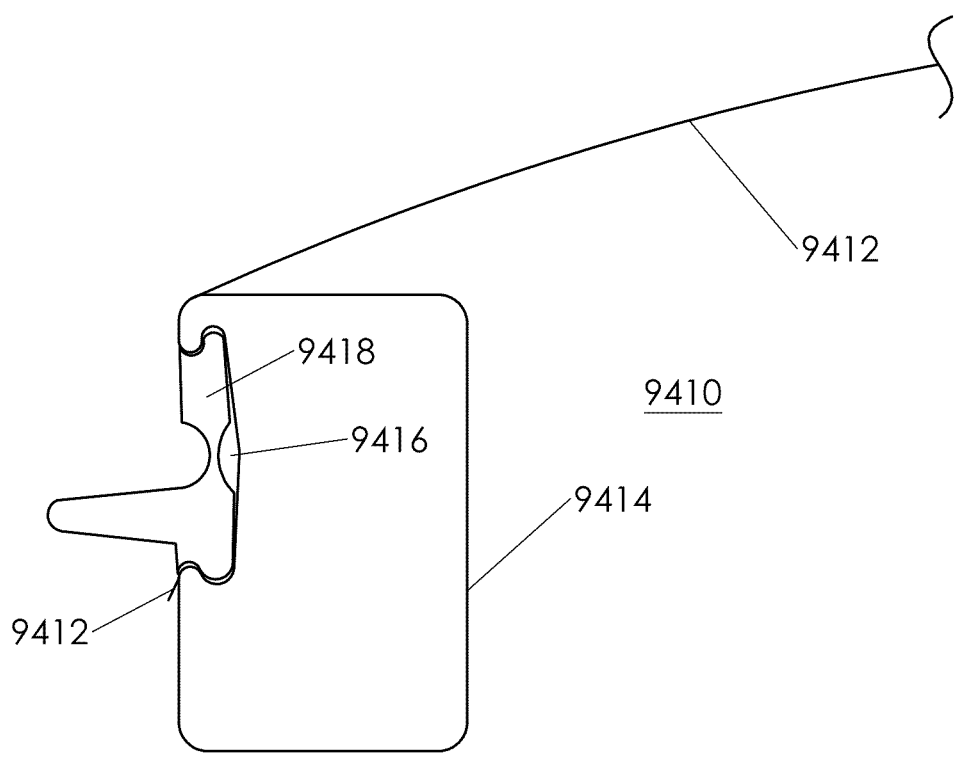
FIG. 94 shows another embodiment of a film attachment and seal system for an inflated solar concentrator.

FIG. 94 shows another embodiment of a film attachment and seal system for an inflated solar concentrator. This embodiment features a seal assembly 9410 which is similar to assembly 9310 of FIG. 93, with a difference in that film 9412 attaches to ring 9414 via groove 9416, which is on the outer diameter (OD) of ring 9414.

Retaining ring 9418 snaps into groove 9416. Film 9412 wraps around a corner of ring 9414, creating additional friction forces between film 9412 and ring 9414 to prevent slippage.

Figure 95:
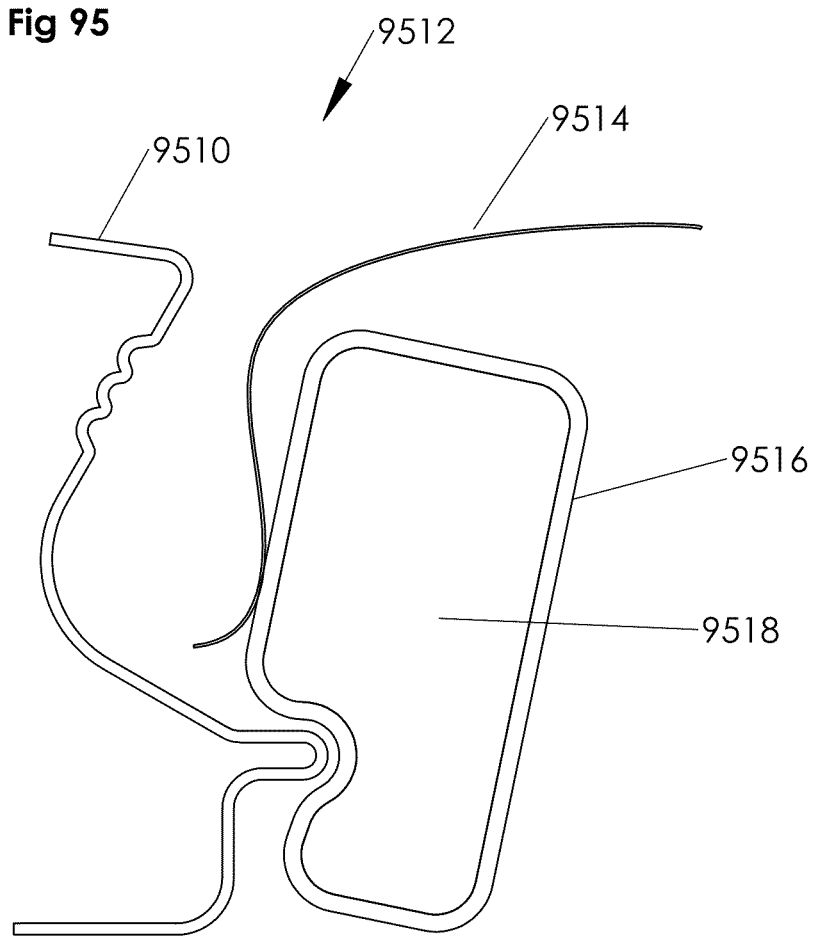
FIG. 95 shows another embodiment of a film attachment and seal system for an inflated solar concentrator.

FIG. 95 shows another embodiment of a film attachment and seal system for an inflated solar concentrator. Structural ring 9510 may be permanently or semi-permanently mounted to a base structure (not shown).

A replaceable film cartridge 9512 comprises film 9514 and inflatable ring 9516. Film 9514 may be pre-attached or bonded to ring 9516 for convenient transport or handling of cartridge 9512.

During installation of cartridge 9512, ring 9516 is inflated with a fluid 9518 and expands radially to press film 9514 against ring 9510 and creates an air-tight seal. Fluid 9518 may be a gas or a liquid or a foam. It may remain in a fluid form, or it may harden to maintain the seal geometry without internal pressure after the initial inflation period. In an embodiment where fluid 9518 is a gas, it may be maintained at a higher pressure during operation of the inflated solar concentrator in order to achieve a desired tension in film 9514 and a desired roundness or other perimeter shape of ring 9516 and the resulting interface between ring 9516 and film 9514. The inflatable nature of cartridge 9512 can have an advantage in that it may facilitate cartridge installation or replacement because when pressure is removed from fluid 9518, ring 9516 can flex enough to be easily installed or removed from ring 9510 or from a different holder or frame. In other related embodiments, a cartridge similar to 9512 may include more than one film for example, a transparent film and also a reflective film so that both films may be replaced by replacing a single cartridge.

Figure 96:
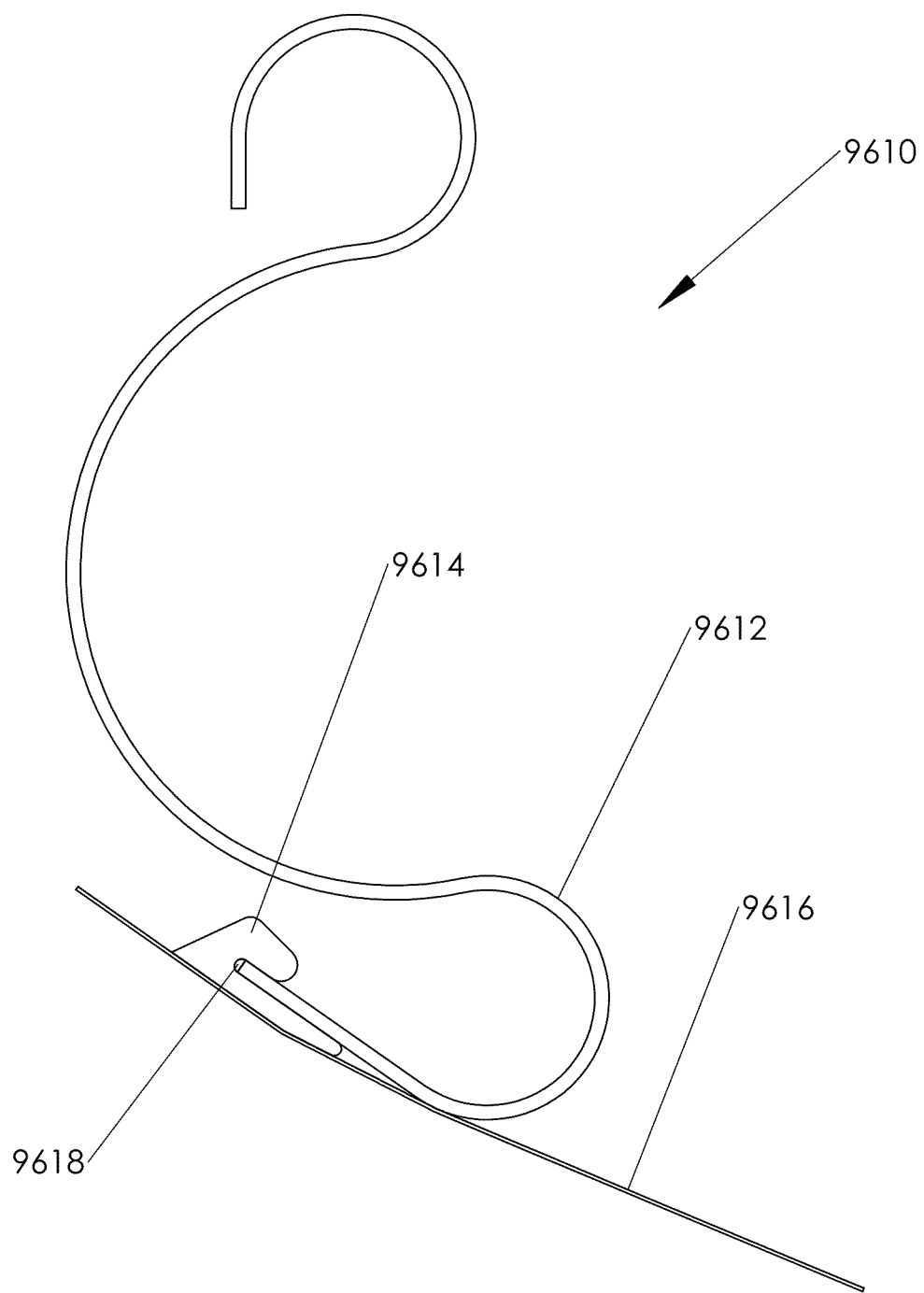
FIG. 96 shows another embodiment of a film attachment and seal system for an inflated solar concentrator.

FIG. 96 shows another embodiment of a film attachment and seal system for an inflated solar concentrator. The embodiment of FIG. 96 includes a film seal and ring system 9610 which includes ring 9612.

Ring 9612 has structural rigidity to create the desired optical boundary. Optional seal element 9618 prevents gas or fluid from passing.

Film 9616 can be attached to ring 9612 by clip 9614. Clip 9614 may be attached to film 9616 by heat bonding, with an adhesive, or by some other method. Clip 9614 may be pre-attached to film 9616 and provide enough rigidity that the two together may work as a replaceable cartridge.

Figure 97A:
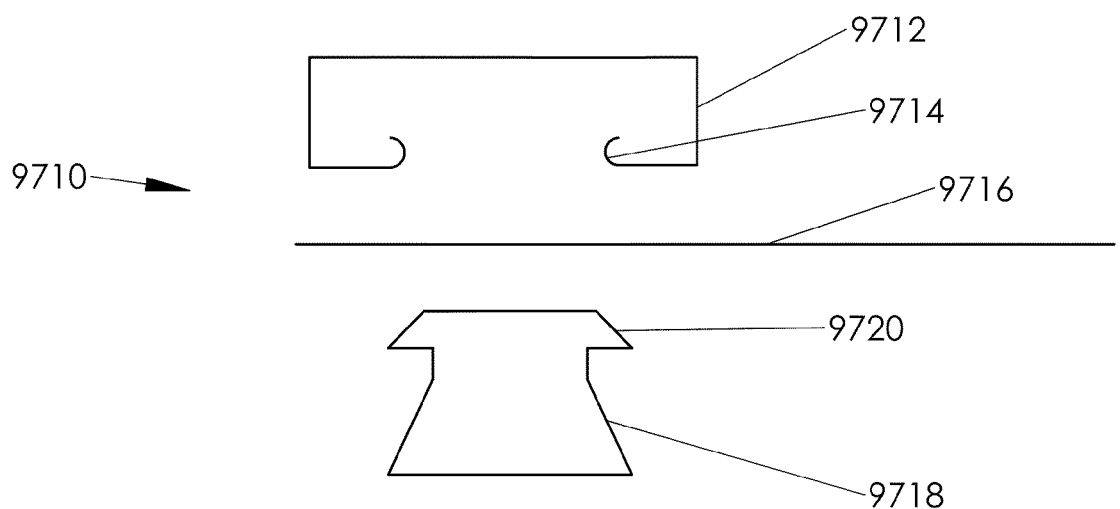
FIGS. 97A-97B show another embodiment of a film attachment and seal system for an inflated solar concentrator.
Figure 97B:
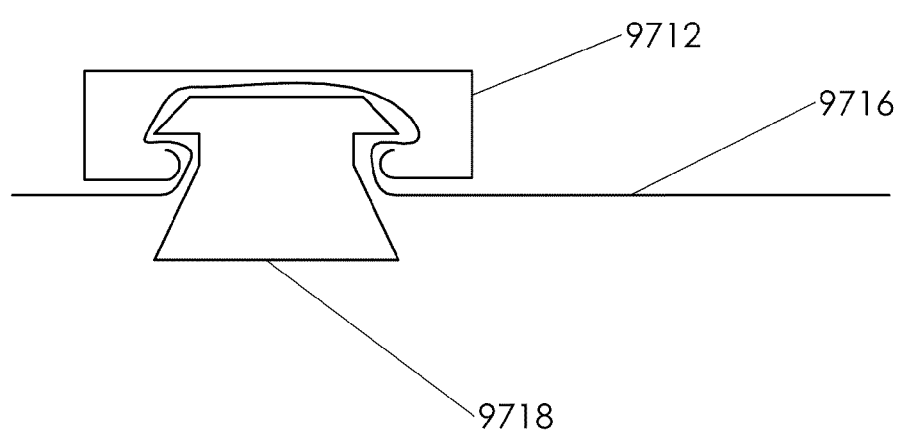

FIGS. 97A-97B show another embodiment of a film attachment and seal system for an inflated solar concentrator. In this embodiment, the ring 9718 of attachment and seal system 9710 may have structural rigidity to create the desired optical boundary.

FIG. 97A shows clip 9712 and film 9716 before installation. Ring 9718 has lead-in features which allow easy installation of a clip 9712. Clip 9712 snaps onto ring 9718 to capture film 9716.

Clip 9712 also has lead-in features 9714. Clip 9712 may or may not be pre-attached to a film 9716 to form a replaceable cartridge.

FIG. 97B shows clip 9712 and film 9716 installed onto ring 9718. Film 9716 may be retained by friction between the parts, or an additional seal element may be included (not shown) to prevent passage of inflation gas and create additional friction.

Figure 98A:
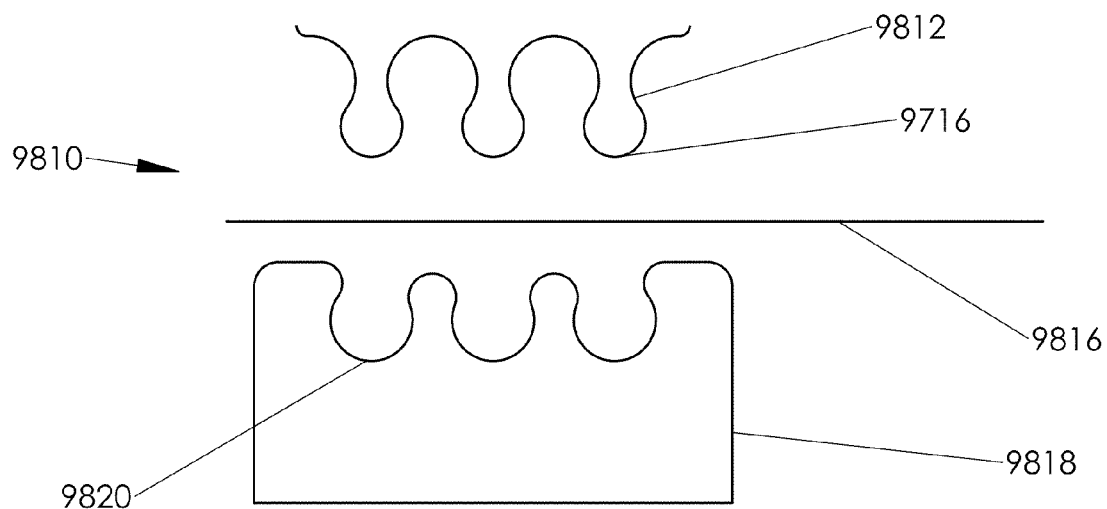
FIGS. 98A-98B show another embodiment of a film attachment and seal system for an inflated solar concentrator.
Figure 98B:
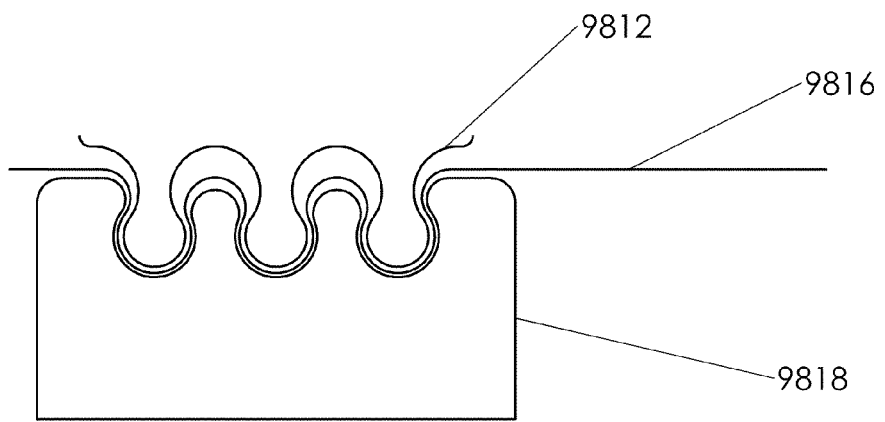

FIGS. 98A-98B show another embodiment of a film attachment and seal system 9810 for an inflated solar concentrator. FIG. 98A shows clip 9812 and film 9816 before installation.

A ring 9818 may have the structural rigidity required to create the desired optical boundary. Ring 9818 has retaining grooves 9820.

A retaining clip 9812 has convolutions or ridges 9814 which snap into grooves 9820 to capture a film 9816. Clip 9816 may be in the form of a continuous or semi-continuous ring and may be connected to film 9816 either at the time of film installation or in advance so that clip 9812 and film 9816 may form a replaceable cartridge.

FIG. 98B shows clip 9812 and film 9816 installed onto ring 9818. Film 9816 may be retained by friction between the parts, or an additional seal element may be included (not shown) to prevent passage of inflation gas and create additional friction.

Figure 99:
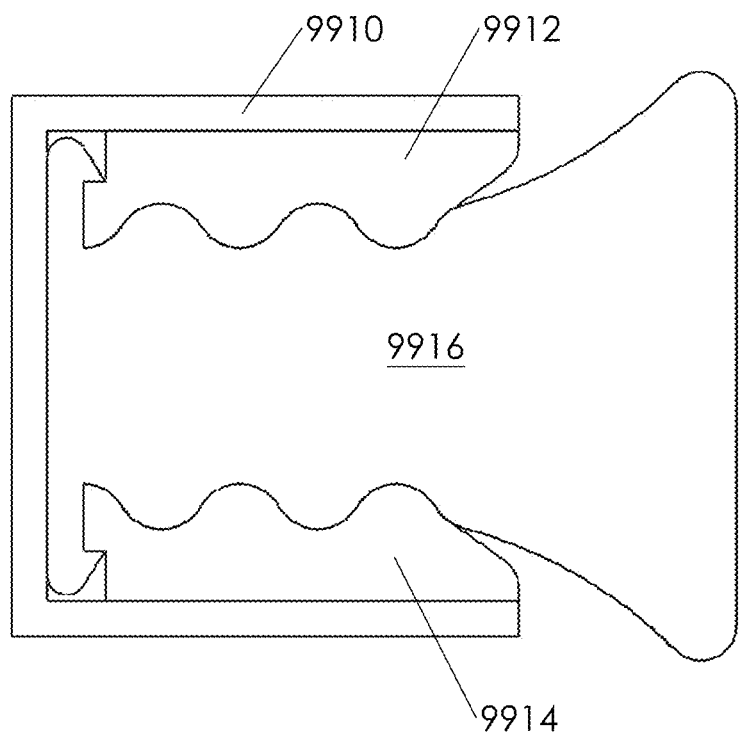
FIGS. 99-102 show other embodiments of film attachment and seal systems for an inflated solar concentrator.

FIG. 99 shows another embodiment of a film attachment and seal system for an inflated solar concentrator. Stiffening ring 9910 may be part of a base structure, or it may be used as the stiffening element in a replaceable cartridge. Seal elements 9912 and 9914 compress plug 9916 when assembled into ring 9910. Films (not shown) may be held and sealed at the interfaces between seal elements 9912 and 9914 and plug 9916.

Figure 100:
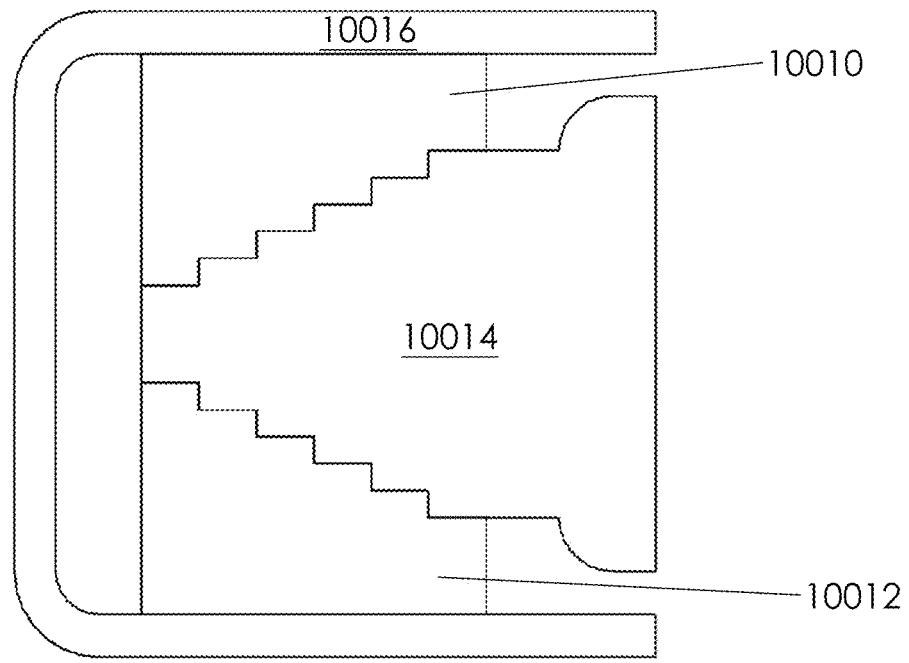

FIG. 100 shows another embodiment of a film attachment and seal system for an inflated solar concentrator, similar to that of FIG. 99. In particular, the films (not shown) are squeezed and sealed between seal elements 10010 and 10012 and plug 10014. Seal elements 10010 and 10012 and plug 10014 are compressed when they are inserted into ring 10016.

Figure 101:
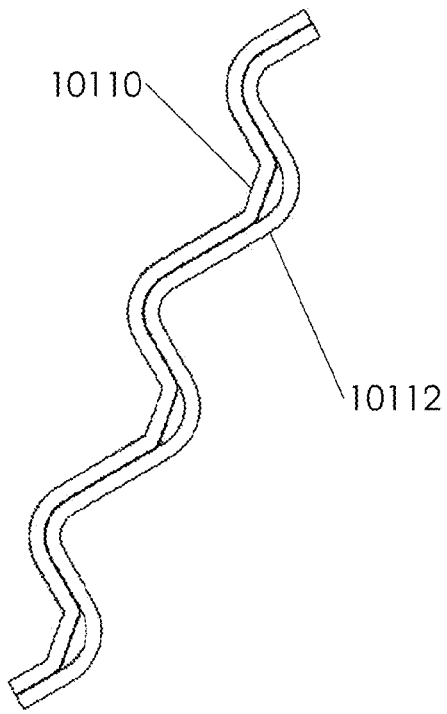

FIG. 101 shows another embodiment of a film attachment and seal system for an inflated solar concentrator. As shown in this view, according to this embodiment rings 10110 and 10112 snap together to capture a film (not shown) between them.

Figure 102:
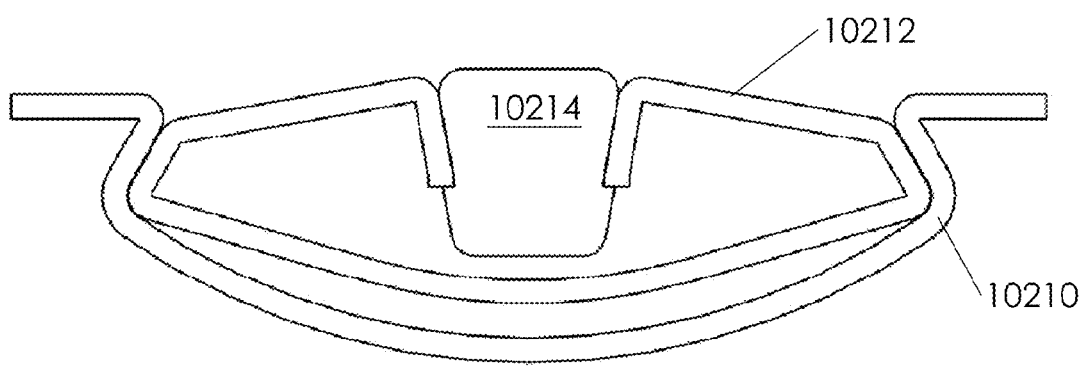

FIG. 102 shows a cross section of another embodiment of a seal system for an inflated solar concentrator. A film (not shown) gets captured between structural ring 10210 and retaining ring 10212. Retaining ring 10212 expands to lock the film in place when expander plug ring 10214 is inserted.

While the above has described various specific embodiments of concentrator seals, the present invention is not limited to these particular embodiments, and variations are possible. The various axial rings may be fabricated from a variety of materials, including but not limited to rolled steel, extruded aluminum, fiberglass, other composites, polymers, injection molded plastics, as well as other materials.

An embodiment of a support ring may incorporate a hinged joint, so that it opens to permit insertion of a film cartridge such as have been described in connection with the various embodiments above. Alternative embodiments could employ a single cut in an axial support ring, and the ring could flex open either by expanding the perimeter or flexing sideways across the cut so that a film cartridge could be inserted. Other axial ring embodiments could have removable sections allowing a film cartridge to be installed.

Different embodiments of radial support rings may be fabricated from a variety of materials, including but not limited to rolled steel, extruded aluminum, fiberglass, other composites, polymers, injection molded plastics, and other materials. The radial support rings of certain embodiments can have a width (difference between the outer diameter (OD) and the inner diameter (ID)), that is chosen in combination with thickness and material to create the desired radial stiffness.

In various embodiments the films may be formed from a polymer such as PET, acrylic, or other materials. Films may be coated with a material that heat permits heat sealing, such as polyethylene or another polymer.

Certain embodiments of film cartridges may comprise radial support ring(s) and two films, so that both films may be most easily replaced at the same time. Some embodiments of film cartridges may comprise support ring(s) and only a single film, so that the films may be replaced individually.

In certain embodiments a filler tube may be sealed to the films with the use of an additional adhesive or seal compound. In some embodiments a filler tube may be heat sealed to the films. A filler tube may have a round cross section, or it may have some other cross section, for example a D-shape or rectangular shape that facilitates its sealing to the film(s).

In certain embodiments a filler tube may be made out or the same base material as the films. Alternatively, it may be made out of another material.

According to some embodiments a filler tube may be made of film itself, to facilitate manufacturing of a sealed cartridge and sealing operations which are most easily accomplished with substantially flat components such as films. Such a filler tube may then be expanded from a flat configuration to allow fluid in and out.

As mentioned above, certain embodiments may relate to a lenticular balloon structure in which an optical receiver or a secondary optic in communication with an optical receiver, may be positioned outside the concentrator's internal inflation space in a plane containing a substantially circular pattern of concentrated reflected illumination, hereafter referred to as "the Spot". In certain embodiments, the inflation space may be defined between the reflective film having a concave shape, and an optically transparent thin film adopting a convex shape in response to the inflation pressure. In some embodiments the inflation space may be defined between the concave reflective film, and an optically transparent disk having a thickness resisting internal inflation pressure to adopt a planar or only slightly convex profile.

The smooth, concave shape adopted by a planar reflective film under inflation pressure, is not ideally parabolic. Rather, the surface offered by such a concave shape has previously been described by Hencky, and is hereafter referred to as a Hencky surface. Background information regarding the shape of a Hencky surface, is described by Marker and Jenkins in "Surface precision of optical membranes with curvature", OPTICS EXPRESS Vol. 1, No. 11 (1997), which is hereby incorporated by reference in its entirety for all purposes.

Rather than focusing reflected light on a single focal point (as expected by an ideally parabolic reflective surface), the Hencky surface focuses and concentrates light within a spatial region. As this spatial region lies well outside the internal inflation space of the concentrator, the receiver is positioned outside the concentrator in a plane containing a corresponding instance of the Spot.

Figure 103:
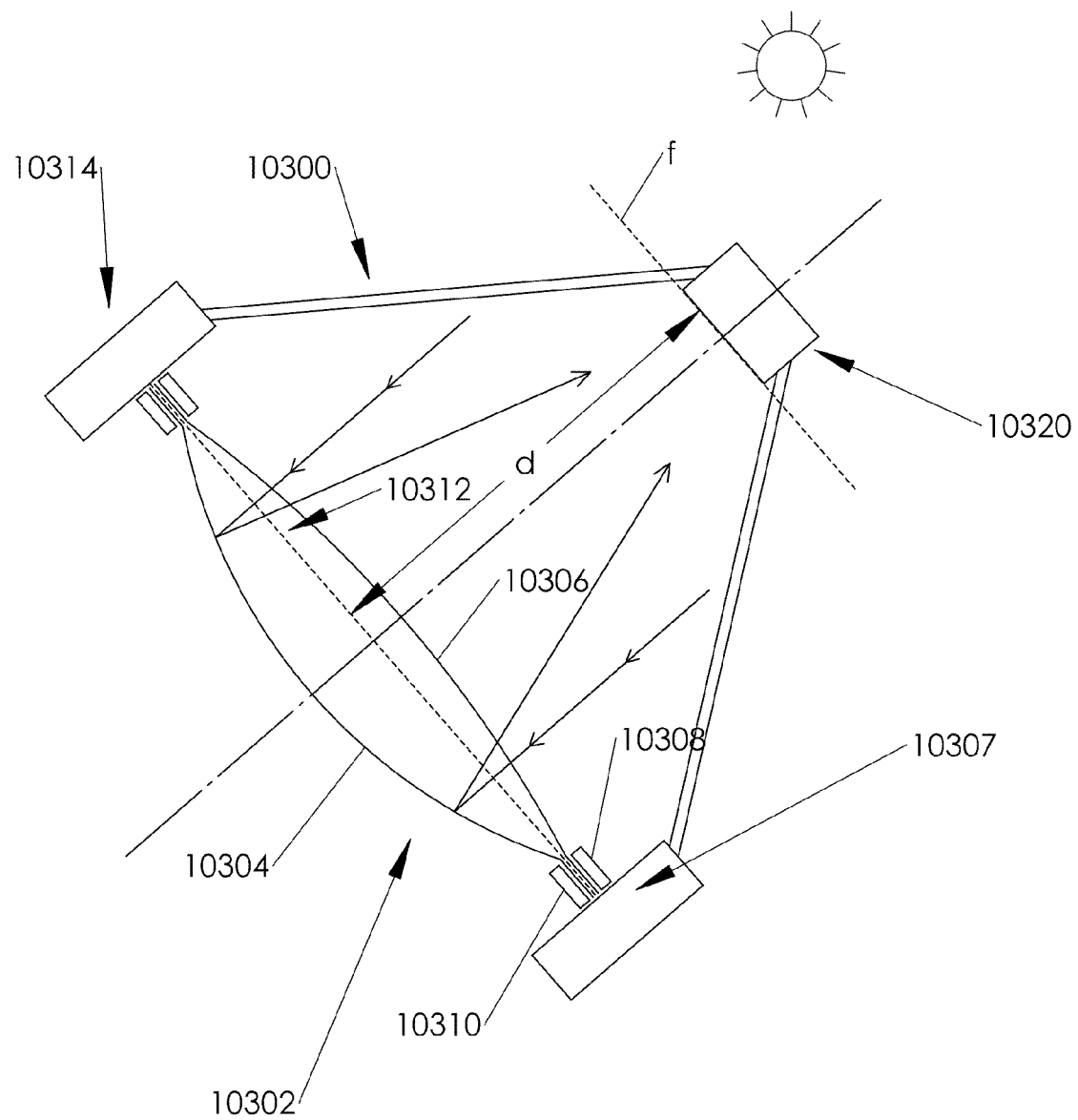
FIG. 103 shows a simplified cross-sectional view of an embodiment of an inflated solar power collector.

FIG. 103 shows a simplified cross-sectional view of an embodiment of an inflated solar power collector. Collector 10300 includes concentrator 10302 formed by a first lower reflective film 10304 sealed at its circumference with a second upper transparent film 10306, utilizing a harness structure 10307 comprising two rings 10308 and 10310 that are secured together, for example by continuous or discrete fasteners such as clips or bolts or screws. The reflective film 10304 may include aluminum or another reflective material. Provision of gas into the inflation space 10312 between the sealed films, forms a lenticular inflated concentrator structure.

In operation, a 2-axis tracking structure 10314 may be employed to maintain alignment of the concentrator with respect to the direction of light rays from the sun. Examples of support and tracking structures for embodiments of solar collectors, are described in detail in the '124 application. In addition, the '877 application describes examples of rigging systems for supporting and pointing solar concentrator arrays. Embodiments of apparatuses may share certain features disclosed in one or both of these patent applications.

Light incident from the sun passes through the upper transparent film 10306, is reflected off of the lower reflective film 10304, and is accordingly focused and concentrated. As is described below, the nature of inflation of the concentrator (for example its inflation pressure) can serve to maintain and control the optic focus of the lens formed by the concentrator. Upper transparent film 10306 and lower reflective film 10304 can also include an ultraviolet (UV) protective material to help prevent breakdown of the films when exposed to light. In some embodiments the upper transparent film 106 and the lower reflective film 104 include the UV protective material in the film itself whereas in other embodiments the UV protective material is applied as a protective overcoat on the films.

The '888 application, which has been incorporated by reference, discloses photovoltaic or thermal receivers for cost-effective solar energy conversion of concentrated light. The '429 application, which is incorporated by reference in its entirety herein for all purposes, describes certain optical structures, including secondary optics. Embodiments of apparatuses may share features with those disclosed in one or both of these patent applications.

When designing a solar collection system, an operating concentration is selected based upon a particular cell type. For example, silicon cells operate in the range of 1× through 350×. GaAs cells operate in the range 1× through 1500×, and typically in the range 500× through 1000×.

Once a net concentration is selected, that quantity is divided between the primary optic (the concentrator formed by the inflated film) and any secondary optic. Thus, for example, if the target concentration is 100×, that quantity may be divided between 33× by the primary optic, and multiplicative 3× by the secondary optic.

Specifically, it is desirable to steer light toward active areas of the receiver and away from non-active areas of the receiver. Non-active areas of the receiver can include margins of devices, metallization, and space between devices. Accordingly, a secondary optic may exhibit a concentration ratio of at least the ratio of: active area/total area. Thus in this example, if one third of the area of the receiver is active, the secondary optic must concentrate at least 3×.

The location of the secondary optic (or receiver itself if no such secondary optic is present) is known as the working distance. The working distance may be measured along the optical axis, from the plane occupied by a reflective film undeformed by inflation pressure. For example, in FIG. 103 the working distance is labeled as "d" and extends from the inflation space 10312 to the receiver 10320.

Thus, continuing with an example where the target concentration is 100×, a combination of film gauge and inflation pressure could be used to achieve a spot with a net concentration of 33× (including optical losses), chosen for a particular working distance. The balance of the 100×, 3×, would be in the secondary optic.

Selection of the working distance may represent a trade-off between a number of factors, including but not limited to spot quality (which is generally better for longer working distances), angles of incidence, and the practical aspects of mounting the receiver. If the working distance is too long, structural considerations (such as member length, and the mass required to provide cantilever support) may undesirably drive up cost.

A focal ratio provides a typical range of practical values for the working distance. As used herein, the term focal ratio refers to the ratio of:
 the working distance of the receiver/the primary diameter of the reflective film.

Embodiments may position the secondary optic or receiver at a distance corresponding to a focal ratio lying between about f/0.5 and f/2.5. Various embodiments could position a receiver and/or secondary optic at a working distance based upon a focal ratio falling into one or more of the following ranges:
 f/0.5-f/2.5; f/0.75-f/2.0; f/0.9-f/1.5; f/0.9-f/2.5; f/1.5-f/2.5; f/2.0-f/2.5.

Focal ratios longer than f/2.5 are possible. However, longer focal ratios may tend to drive up structural costs, because of the added strength needed to support the receiver at a long working distance.

Conversely, focal ratios shorter than f/0.5 are also possible, but the higher aberrations at lower focal ratios tend to render difficult the effective design of an efficient secondary optic, again increasing cost. Focal ratios substantially shorter than f/0.5 may also result in the receiver lying within the inflation space of the inflated solar power concentrator. However, given the geometry of the inflated films, working distances at the minimum focal ratio of f/0.5 could still be expected to lie outside the internal inflation space of the inflated solar power concentrator.

Returning to the embodiment of FIG. 103, the receiver 10320 (which may include a secondary optic) is positioned at or proximate to a plane f that is at working distance d from the inflated concentrator, corresponding to the desired focal ratio. The receiver is configured to convert the reflected and concentrated solar energy into other form(s) of energy.

According to some embodiments, the receiver 10320 may comprise a photovoltaic (PV) structure that is configured to convert solar energy into electrical energy. Such a PV receiver may be water- or air-cooled.

In certain embodiments, the receiver 10320 may comprise a concentrated solar power (CSP) structure that is configured to convert solar energy into thermal energy of a working fluid having a desirable heat capacity. Examples of such working fluids include water or oils.

Solar collector devices as disclosed herein may be modular in nature. For example, in some embodiments the concentrator structure 10302 comprising films 10304 and 10306 and optionally harness 10307, may comprise a cartridge that is readily removed from the remaining elements of the collector (such as the receiver and supporting/tracking elements), in order to facilitate inspection, maintenance, and/or replacement of the individual components (such as films) of the concentrator structure. Moreover, the discrete nature of such a modular concentrator 'cartridge' may facilitate its periodic transport to other locations, for the performance of such inspection/maintenance/replacement activities.

The precise location of the plane of the receiver outside of the inflation space, can vary depending upon the particular embodiment. In particular, a combination of factors can influence the focal distance exhibited by the inflated concentrator. One example of such a factor is the dimensions of the inflated concentrator, such as diameter if circular in shape, or length of major/minor axes if elliptical in shape, as the focal distance equals the specified focal ratio times the primary diameter as defined above. In FIG. 103, this focal distance is shown as dimension d and d', respectively.

While FIG. 103 depicts a collector comprising a concentrator having an inflation space defined between lower film 10304 and upper film 10306 exhibiting concave and convex profiles respectively, the present invention is not limited to this particular embodiment. Alternative embodiments could employ different concentrator designs and remain within the scope of the present invention.

In an embodiment, an apparatus includes an optically transparent layer, a reflective film secured at an edge to the optically transparent layer, an inflation space between the reflective film and the optically transparent layer the inflation space including a gas having a pressure that deforms the reflective film to locate a substantially circular pattern of concentrated reflected illumination in a plane outside of the inflation space, and an optical element positioned in the plane to receive light reflected by the reflective film.

In an embodiment, the optical element includes a photovoltaic receiver.

In an embodiment, the optical element includes a secondary optic.

In an embodiment, the optically transparent layer includes a transparent film deformed by the gas pressure.

In an embodiment, the optically transparent layer further includes an anti-reflective component.

In an embodiment, the optically transparent layer is secured to the edge of the reflective film by a harness including a first ring joined to a second ring.

In an embodiment, the apparatus further includes a tracking system in physical communication with the harness.

In an embodiment, the receiver includes a thermal receiver located proximate to a circle of least confusion.

In an embodiment, positioning the optical element includes positioning a photovoltaic receiver to convert the solar energy into electrical energy.

In an embodiment, positioning the optical element includes positioning a secondary optic in optical communication with a receiver.

In an embodiment, the optically transparent layer includes an optically transparent film whose shape is deformed by the gas pressure.

Although specific embodiments have been described, various modifications, alterations, alternative constructions, and equivalents are also encompassed within the scope of the invention. The described invention is not restricted to operation within certain specific embodiments, but is free to operate within other embodiments configurations as it should be apparent to those skilled in the art that the scope of the present invention is not limited to the described series of transactions and steps.

It is understood that all material types provided herein are for illustrative purposes only. Accordingly, reflective films can be made of various different reflective materials such as materials comprising polyethylene terepthalate (PET), as described in some the embodiments herein. Similarly, transparent films can be made of various transparent material such as materials comprising PET or poly(meth methacrylate) (PMMA) or polycarbonate (PC), as described in some the embodiments herein.

Figure 104:
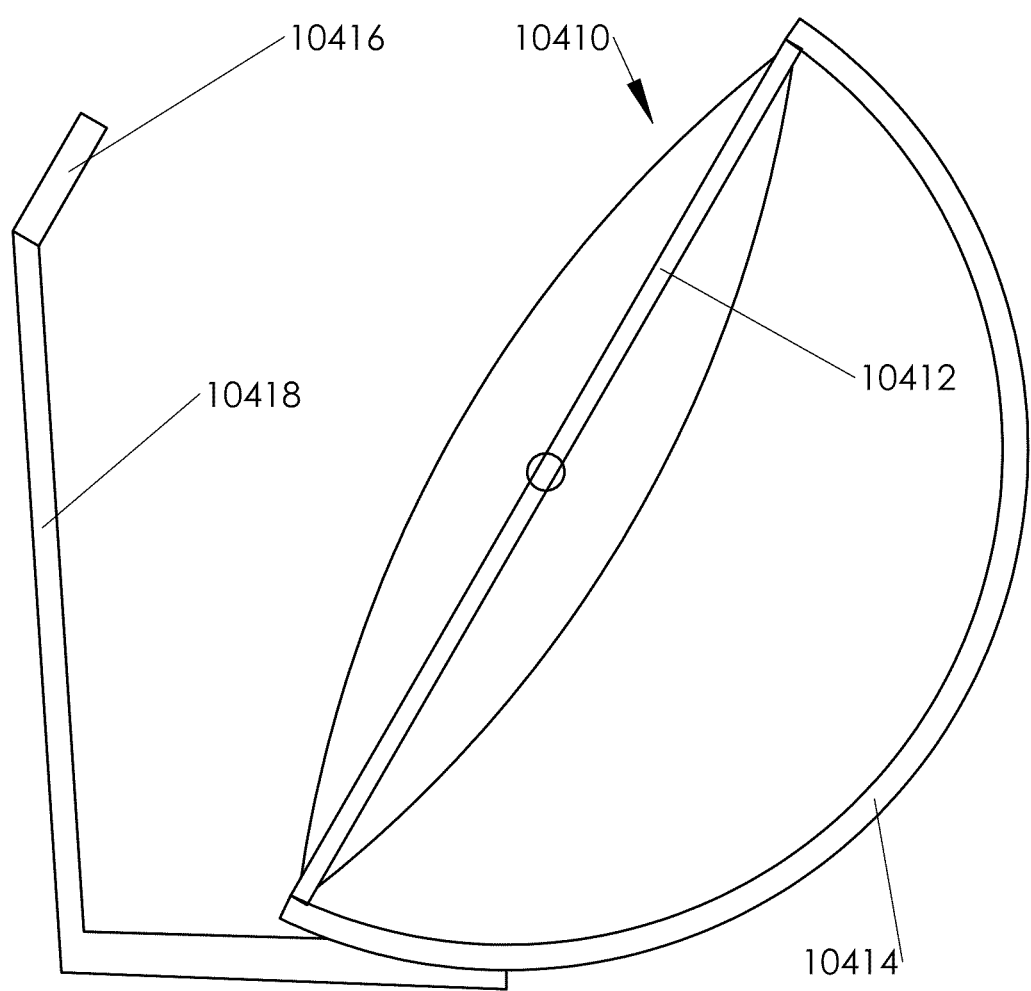
FIG. 104 shows an additional embodiment of a solar collector.

The present invention is not limited to the particular embodiments described above, and alternatives are possible. For example, FIG. 104 shows an embodiment of a solar concentrator structure which limits forces that could tend to distort the optical system. According to this embodiment, an inflatable solar concentrator 10410 includes an optical stabilizing ring 10412 and a movable frame element 10414.

In this embodiment, a receiver 10416 is attached to frame element 10414 by an arm 10418. When solar concentrator 10410 is moved, receiver 10416 moves with it as a rigid unit. In this manner, forces due to receiver 10416 such as wind loads and receiver weight are transferred to frame element 10414 without substantially loading or affecting the shape of ring 10412.

Figure 105:
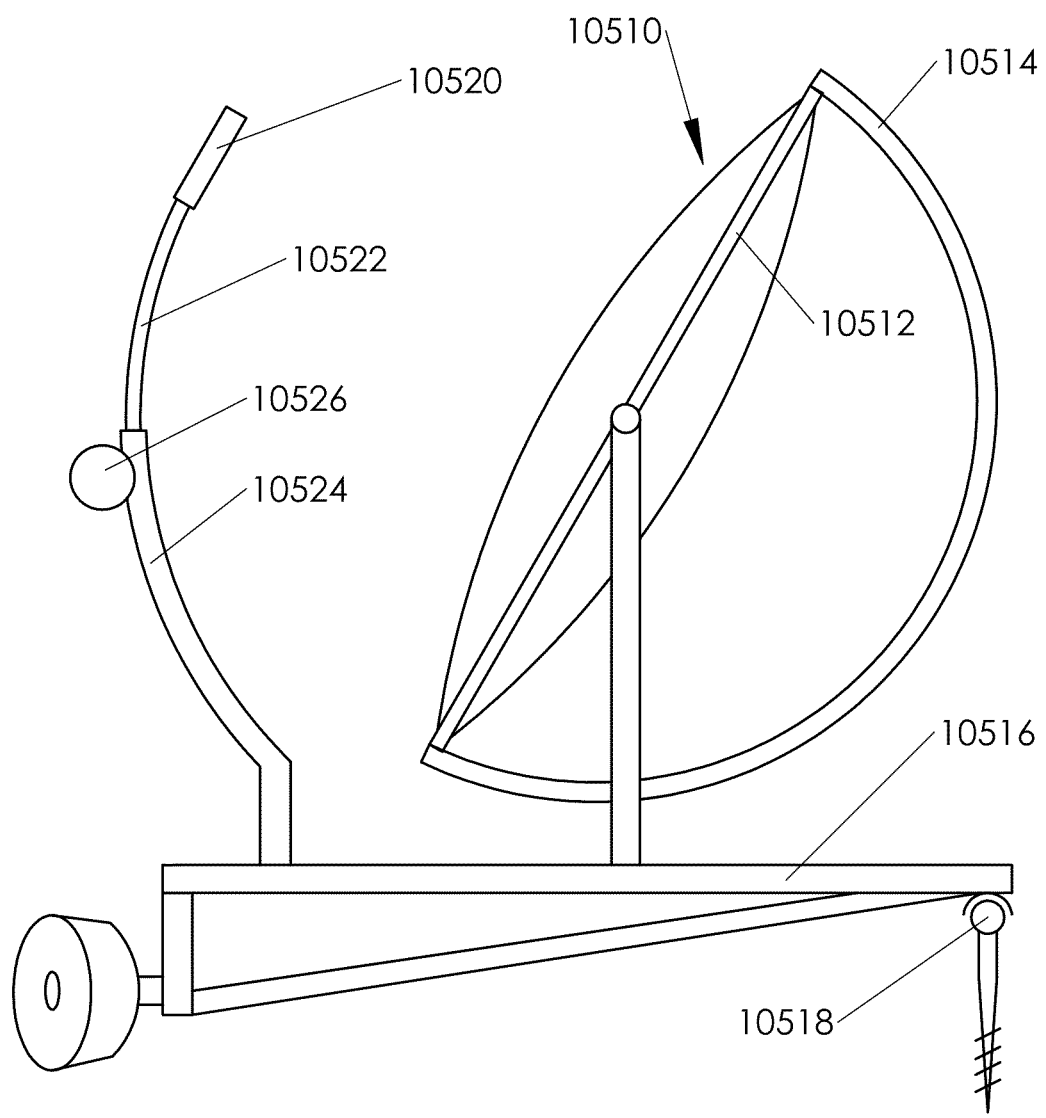
FIG. 105 shows an additional embodiment of a solar collector.

FIG. 105 shows another embodiment of a solar concentrator structure which limits forces that could tend to distort the optical system. Specifically, an inflatable solar concentrator 10510 includes an optical stabilizing ring 10512 and a movable frame element 10514 that moves with ring 10512 as it rotates about its elevation axis. Base frame 10516 rotates azimuthally about azimuth pivot 10518 and supports optical ring 10512.

A receiver 10520 is independently articulatable and can be made to change position and/or orientation to receive concentrated light from the solar concentrator defined by optical ring 10512. By articulating the receiver separately from the inflated concentrator, wind and weight loads from the receiver do not cause distortions of the inflated concentrator optics.

There are several possible ways in which to accomplish the articulation of receiver 10520. FIG. 105 shows a movable rail 10522 disposed to move as guided by the shape of a fixed rail 10524 with motivating force provided by an actuator 10526. In other embodiments, articulation could be accomplished via 4-bar or other mechanisms, a combination of linear actuators, a rotary actuator and rotational frame, or other articulation techniques.

What is claimed is:

1. An apparatus comprising:
    a solar energy collector supported by a base frame;
    a first ground interface coupled to the base frame through a linkage, the first ground interface configured to provide weight-bearing support for the base frame, the linkage providing two or more degrees of freedom;
    a second ground interface coupled to the base frame and configured to movingly engage a ground surface and provide weight-bearing support for the base frame;
    a third ground interface coupled to the base frame and configured movingly engage the ground surface and provide weight-bearing support for the base frame; and
    an azimuth drive system configured to pivot the base frame about the first ground interface, wherein the linkage is configured to accommodate a vertical movement of the base frame when the base frame is pivoting about the first ground interface, wherein the solar energy collector comprises an inflatable concentrator defining an inflation space.

2. The apparatus of claim 1 wherein the first ground interface comprises a ground anchor, a stake, an auger, a screw, a pad, a ballast, or an anti-skid contact.

3. The apparatus of claim 1 wherein the linkage comprises a ball joint.

4. The apparatus of claim 1 wherein the linkage comprises a ball joint, a flexible coupling, a multi-link coupling, a universal joint, or a coupling with two substantially orthogonal pivot axes.

5. The apparatus of claim 1 wherein the second ground interface is driven by the azimuth drive system.

6. The apparatus of claim 1 wherein the second ground interface comprises a wheel.

7. The apparatus of claim 1 wherein the second ground interface comprises a wheel, a leg, a roller, a track, a passively rolling belt, a vibratory pad, or a skid.

8. The apparatus of claim 1 wherein the linkage is further configured to offset a change in an elevation angle of the solar energy collector relative to the base frame caused by a vertical movement of at least one of the second and third ground interfaces.

9. The apparatus of claim 1 wherein the second and third ground interfaces each comprise a wheel.

10. The apparatus of claim 1 wherein the ground surface is unprepared.

11. The apparatus of claim 1 further comprising:
a support structure in contact with the solar collector and with the base frame, an elevation actuator in mechanical communication with the base frame and with the support structure, the elevation actuator configured to change an elevation angle of the solar collector relative to the base frame.

12. The apparatus of claim 11 wherein the support structure is rotatable about an axis relative to the base frame.

13. The apparatus of claim 12 comprising a curved elevation rack in communication with the support structure and with the elevation actuator.

14. The apparatus of claim 12 comprising a linear actuator in communication with the support structure and with the base frame.

15. The apparatus of claim 1 wherein the solar energy collector further comprises a receiver disposed inside the inflation space.

16. The apparatus of claim 1 wherein the solar energy collector further comprises a receiver disposed outside the inflation space.

17. The apparatus of claim 1 wherein the inflatable solar concentrator comprises:
a boundary;
an optically reflective element attached to and spanning the boundary;
an optically transparent element attached to and spanning the boundary, the optically reflective element and the optically transparent element defining a volume containing an inflation pressure of a pressurized gas; and
a receiver positioned to receive concentrated light from the optically reflective element.

18. The apparatus of claim 17 further comprising a cartridge holder.

19. The apparatus of claim 17 further comprising a primary structural element positioned substantially along a diameter of the inflated concentrator.

20. The apparatus of claim 19 where the primary structural element comprises one or more diametrical members spanning diameters of the boundary.

21. The apparatus of claim 1 wherein the inflatable solar concentrator comprises:
a bottom boundary and a top boundary separated by a distance;
a side material spanning the distance between the top and bottom boundaries;
an optically reflective element attached to and spanning the bottom boundary;
an optically transparent element attached to and spanning the top boundary, the side material, the optically reflective element, and the optically transparent element defining a volume containing an inflation pressure of a pressurized gas; and
a receiver positioned within the closed volume and configured to receive concentrated light from the optically reflective element.

22. The apparatus of claim 21 further comprising a primary structural element positioned substantially along a diameter of the inflated concentrator.

23. The apparatus of claim 22 wherein the primary structural element comprises a diametrical member spanning orthogonal diameters of the top boundary or of the bottom boundary.

24. The apparatus of claim 23 further comprising diagonal structural members connecting first and second diametrical members that respectively span orthogonal diameters of the top and bottom boundaries.

25. The apparatus of claim 24 wherein the first and second diametrical members and the diagonal members lie in two orthogonal planes.

26. The apparatus of claim 24 further comprising an array of solar energy concentrators, each solar energy concentrator comprising respective optically transparent and optically reflective top and bottom circular members corresponding with the top and bottom boundaries, the top and bottom circular members connected to the diagonal members of adjacent solar energy concentrators of the array, and wherein the top and bottom boundaries are circular.

27. The apparatus of claim 1 wherein the solar energy collector comprises a plurality of facets.

28. An apparatus comprising:
a solar energy collector supported by a base frame;
a first ground interface coupled to the base frame through a linkage, the first ground interface configured to provide weight-bearing support for the base frame, the linkage providing two or more degrees of freedom;
a second ground interface coupled to the base frame and configured to movingly engage a ground surface and provide weight-bearing support for the base frame;
a third ground interface coupled to the base frame and configured movingly engage the ground surface and provide weight-bearing support for the base frame; and
an azimuth drive system configured to pivot the base frame about the first ground interface, wherein the linkage is configured to accommodate a vertical movement of the base frame when the base frame is pivoting about the first ground interface, wherein the solar energy collector comprises an array of two or more inflated solar concentrators.

29. An apparatus comprising:
a solar energy collector supported by a base frame;
a first ground interface coupled to the base frame through a linkage, the first ground interface configured to provide weight-bearing support for the base frame, the linkage providing two or more degrees of freedom;
a second ground interface coupled to the base frame and configured to movingly engage a ground surface and provide weight-bearing support for the base frame;
a third ground interface coupled to the base frame and configured movingly engage the ground surface and provide weight-bearing support for the base frame; and
an azimuth drive system configured to pivot the base frame about the first ground interface, wherein the linkage is configured to accommodate a vertical movement of the base frame when the base frame is pivoting about the first ground interface, wherein the solar collector comprises a 3×1 array of inflated solar concentrators.

* * * * *